US010465850B2

(12) United States Patent
Killeen et al.

(10) Patent No.: US 10,465,850 B2
(45) Date of Patent: *Nov. 5, 2019

(54) METHOD AND APPARATUS FOR COMPRESSING GAS IN A PLURALITY OF STAGES TO A STORAGE TANK ARRAY HAVING A PLURALITY OF STORAGE TANKS

(71) Applicant: New Gas Industries, L.L.C., Mandeville, LA (US)

(72) Inventors: Walter H. Killeen, Mandeville, LA (US); Bryan Killeen, Mandeville, LA (US); Carl Guichard, Mandeville, LA (US)

(73) Assignee: New Gas Industries, L.L.C., Mandeville, LA (US)

( * ) Notice: Subject to any disclaimer, the term of this patent is extended or adjusted under 35 U.S.C. 154(b) by 64 days.

This patent is subject to a terminal disclaimer.

(21) Appl. No.: 15/484,239

(22) Filed: Apr. 11, 2017

(65) Prior Publication Data

US 2017/0314735 A1   Nov. 2, 2017

Related U.S. Application Data

(63) Continuation of application No. 13/462,177, filed on May 2, 2012, now Pat. No. 9,618,158.

(Continued)

(51) Int. Cl.
*F17C 5/06* (2006.01)
*F17D 3/00* (2006.01)
(Continued)

(52) U.S. Cl.
CPC .............. *F17C 5/06* (2013.01); *F16K 11/074* (2013.01); *F16K 11/085* (2013.01); *F17D 3/00* (2013.01);
(Continued)

(58) Field of Classification Search
CPC .... F17C 5/00; F17C 5/06; F17C 5/007; F17C 5/02; F17C 5/04; F17C 2227/04;
(Continued)

(56) References Cited

U.S. PATENT DOCUMENTS

| 1,331,111 | A | 2/1920 | Jones |
| 1,969,137 | A | 8/1934 | Karge |

(Continued)

FOREIGN PATENT DOCUMENTS

| CA | 2433722 | 12/2003 |
| EP | 0285099 | 10/1988 |

(Continued)

*Primary Examiner* — Andrew D Stclair
(74) *Attorney, Agent, or Firm* — Roy Kiesel Ford Doody & North, APLC; Brett A. North

(57) ABSTRACT

A method and apparatus for compressing gases and supplying fuel to a gaseous fuel consuming device, such as a gaseous fueled vehicle or the like. One embodiment includes a gas compressor for compressing the gaseous fuel to an array of tanks having predetermined initial set points which are increasing for tanks in the array. One embodiment provides a selecting valve having first and second families of ports wherein the valve can be operated to select a plurality of ports from the first family to be fluidly connected with a plurality of ports with the second family, and such fluid connections can be changed by operation of the valve.

17 Claims, 58 Drawing Sheets

Related U.S. Application Data

(60) Provisional application No. 61/518,111, filed on May 2, 2011.

(51) Int. Cl.
*F16K 11/085* (2006.01)
*F16K 11/074* (2006.01)

(52) U.S. Cl.
CPC .......................... *F17C 2201/0109* (2013.01); *F17C 2205/013* (2013.01); *F17C 2205/0323* (2013.01); *F17C 2205/0326* (2013.01); *F17C 2205/0335* (2013.01); *F17C 2205/0341* (2013.01); *F17C 2205/0382* (2013.01); *F17C 2209/234* (2013.01); *F17C 2223/0123* (2013.01); *F17C 2227/0157* (2013.01); *F17C 2227/0164* (2013.01); *F17C 2227/0337* (2013.01); *F17C 2227/043* (2013.01); *F17C 2227/047* (2013.01); *F17C 2250/032* (2013.01); *F17C 2250/043* (2013.01); *F17C 2250/0439* (2013.01); *F17C 2250/0495* (2013.01); *F17C 2250/0626* (2013.01); *F17C 2250/0694* (2013.01); *F17C 2265/012* (2013.01); *F17C 2265/015* (2013.01); *F17C 2270/0139* (2013.01); *F17C 2270/0168* (2013.01); *Y10T 137/0396* (2015.04)

(58) Field of Classification Search
CPC .......... F17C 2227/041; F17C 2227/042; F17C 2227/043; F17C 2227/046; F17C 2227/047; F17C 13/023; F17C 13/025; F17C 13/026; F17C 13/028; F17C 13/02; F16K 11/085
See application file for complete search history.

(56) References Cited

U.S. PATENT DOCUMENTS

| | | | |
|---|---|---|---|
| 2,464,560 A | 3/1949 | Davey | |
| 2,695,132 A | 11/1954 | Paget | |
| 3,674,123 A | 7/1972 | Lewis et al. | |
| 3,780,756 A | 12/1973 | Pennington | |
| 3,799,218 A | 3/1974 | Douglass | |
| 3,924,652 A | 12/1975 | Kah, Jr. | |
| 4,097,202 A | 6/1978 | Price | |
| 4,133,418 A | 1/1979 | Van Bilderbeek | |
| 4,178,963 A | 12/1979 | Riefler et al. | |
| 4,207,922 A | 6/1980 | Andrieux et al. | |
| 4,223,700 A | 9/1980 | Jones | |
| 4,291,724 A | 9/1981 | Miller | |
| 4,443,156 A | 4/1984 | Dunnam, Jr. | |
| 4,448,215 A | 5/1984 | Skelly | |
| 4,480,654 A | 11/1984 | Firey | |
| 4,501,253 A | 2/1985 | Gerstmann et al. | |
| 4,515,516 A | 5/1985 | Perrine et al. | |
| 4,522,159 A | 6/1985 | Engel et al. | |
| 4,523,548 A | 6/1985 | Engel et al. | |
| 4,527,600 A | 7/1985 | Fisher et al. | |
| 4,531,558 A | 7/1985 | Engel et al. | |
| 4,624,390 A | 11/1986 | Palmer et al. | |
| 4,646,940 A | 3/1987 | Kramer et al. | |
| 4,653,986 A | 3/1987 | Ashton | |
| 4,749,384 A | 6/1988 | Nowobilski et al. | |
| 4,807,662 A | 2/1989 | Verne | |
| 4,886,401 A | 12/1989 | Andrews et al. | |
| 4,966,206 A | 10/1990 | Baumann et al. | |
| 5,029,622 A | 7/1991 | Mutter | |
| 5,129,459 A | 7/1992 | Breese et al. | |
| 5,169,295 A | 12/1992 | Stogner et al. | |
| 5,188,151 A | 2/1993 | Young et al. | |
| 5,263,826 A | 11/1993 | Baumann et al. | |
| 5,333,465 A | 8/1994 | McBride | |
| 5,351,726 A | 10/1994 | Diggins | |
| 5,370,159 A | 12/1994 | Price | |
| 5,377,762 A | 1/1995 | Turner | |
| 5,385,176 A | 1/1995 | Price | |
| 5,406,988 A | 4/1995 | Hopkins | |
| 5,409,046 A * | 4/1995 | Swenson | F17C 9/02 141/11 |
| 5,431,203 A | 7/1995 | Schultz et al. | |
| 5,431,551 A | 7/1995 | Aquino et al. | |
| 5,441,234 A | 8/1995 | White et al. | |
| 5,458,167 A | 10/1995 | Schultz et al. | |
| 5,474,104 A | 12/1995 | Borland et al. | |
| 5,501,200 A | 3/1996 | Bogartz | |
| 5,522,369 A | 6/1996 | Povinger | |
| 5,538,051 A | 7/1996 | Brown et al. | |
| 5,586,587 A | 12/1996 | Leininger et al. | |
| 5,600,952 A | 2/1997 | Aquino et al. | |
| 5,613,532 A | 3/1997 | Kaliszewski | |
| 5,628,349 A | 5/1997 | Diggins et al. | |
| 5,656,090 A | 8/1997 | Preston et al. | |
| 5,673,735 A | 10/1997 | Crvelin et al. | |
| 5,676,180 A | 10/1997 | Teel | |
| 5,694,985 A | 12/1997 | Diggins | |
| 5,732,773 A | 3/1998 | Parks et al. | |
| 5,752,552 A | 5/1998 | Kountz et al. | |
| 5,771,948 A | 6/1998 | Kountz et al. | |
| 5,810,058 A | 9/1998 | Kountz et al. | |
| 5,862,833 A | 1/1999 | Perez | |
| 5,868,122 A | 2/1999 | Gram et al. | |
| 5,868,176 A | 2/1999 | Barajas et al. | |
| 5,881,779 A | 3/1999 | Kountz et al. | |
| 5,884,675 A | 3/1999 | Krasnov | |
| 5,887,567 A | 3/1999 | White et al. | |
| 5,921,291 A | 7/1999 | Hord et al. | |
| 6,000,430 A | 12/1999 | Nafz | |
| 6,135,170 A | 10/2000 | Lee et al. | |
| 6,257,360 B1 | 7/2001 | Wozniak et al. | |
| 6,358,330 B1 | 3/2002 | McGraw | |
| 6,360,793 B1 | 3/2002 | Sugano et al. | |
| 6,516,810 B1 | 2/2003 | Haul | |
| 6,619,336 B2 | 9/2003 | Cohen et al. | |
| 6,672,065 B1 | 1/2004 | Choroszylow et al. | |
| 6,732,769 B2 | 5/2004 | Del Campo | |
| 7,011,118 B2 | 3/2006 | Chan et al. | |
| 7,128,103 B2 | 10/2006 | Mitlitsky et al. | |
| 7,168,464 B2 | 1/2007 | Diggins | |
| 7,314,056 B2 | 1/2008 | Yamashita et al. | |
| 7,325,561 B2 | 2/2008 | Mathison et al. | |
| 7,415,995 B2 | 8/2008 | Plummer et al. | |
| 7,913,506 B2 | 3/2011 | Bittner et al. | |
| 7,967,036 B2 | 6/2011 | Ding et al. | |
| 7,987,877 B2 * | 8/2011 | Bavarian | F17C 7/00 137/255 |
| 8,783,303 B2 * | 7/2014 | Harty | F17C 5/007 141/11 |
| 8,899,278 B2 | 12/2014 | Cohen et al. | |
| 9,618,158 B2 * | 4/2017 | Killeen | F17D 3/00 |
| 9,714,739 B2 * | 7/2017 | Killeen | F17D 3/00 |
| 2004/0163731 A1 | 8/2004 | Eichelberger et al. | |
| 2005/0236049 A1 | 10/2005 | Manson et al. | |
| 2006/0042692 A1 | 3/2006 | Agnew et al. | |
| 2006/0118575 A1 | 6/2006 | Boyd et al. | |
| 2007/0079891 A1 | 4/2007 | Farese et al. | |
| 2008/0209916 A1 * | 9/2008 | White | F17C 5/02 62/48.1 |
| 2009/0151809 A1 | 6/2009 | Balasubramanian et al. | |
| 2009/0250138 A1 * | 10/2009 | Bavarian | F17C 7/00 141/4 |

FOREIGN PATENT DOCUMENTS

| | | |
|---|---|---|
| EP | 0916567 | 5/1999 |
| EP | 1452794 | 9/2004 |
| EP | 1522430 | 4/2005 |
| EP | 1798416 | 6/2007 |
| FR | 2858041 | 1/2005 |
| GB | 2051716 | 1/1981 |

(56) References Cited

FOREIGN PATENT DOCUMENTS

| JP | H0953798 | 2/1997 |
|----|----------|--------|
| RU | 2361144 | 7/2009 |
| WO | 03/018187 | 3/2003 |

* cited by examiner

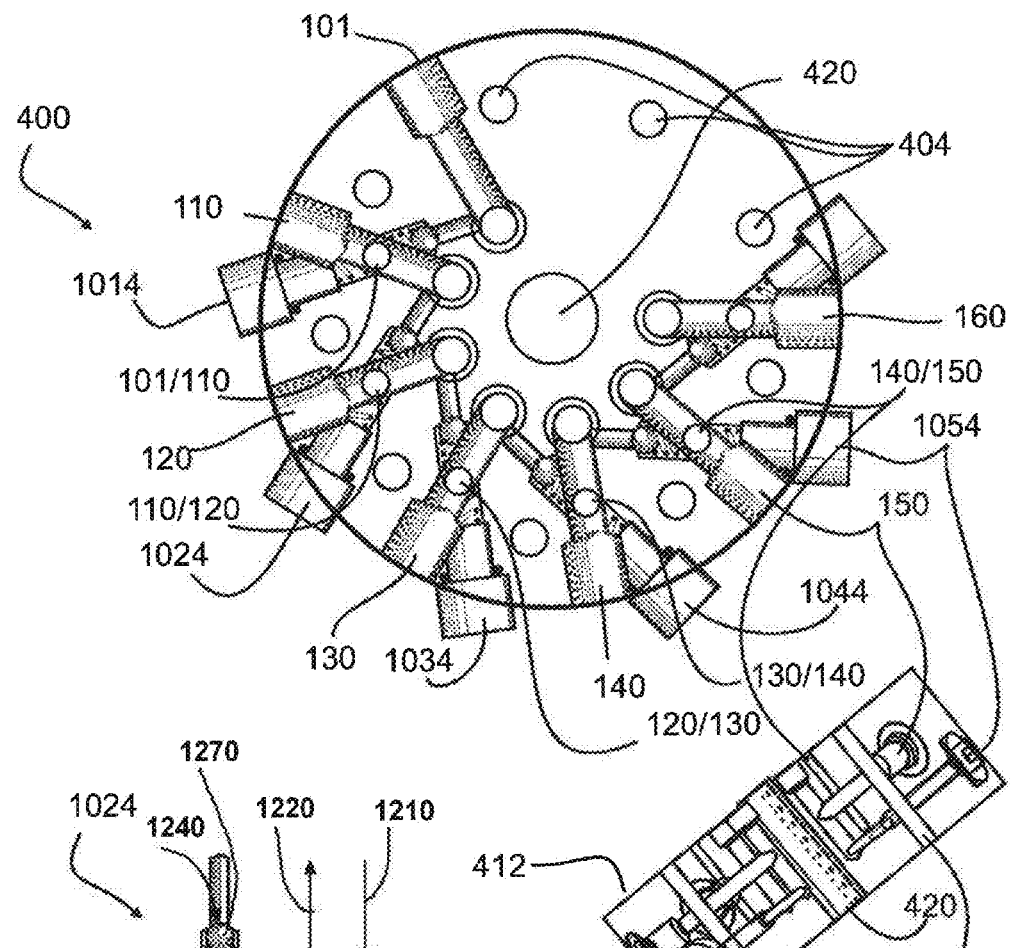

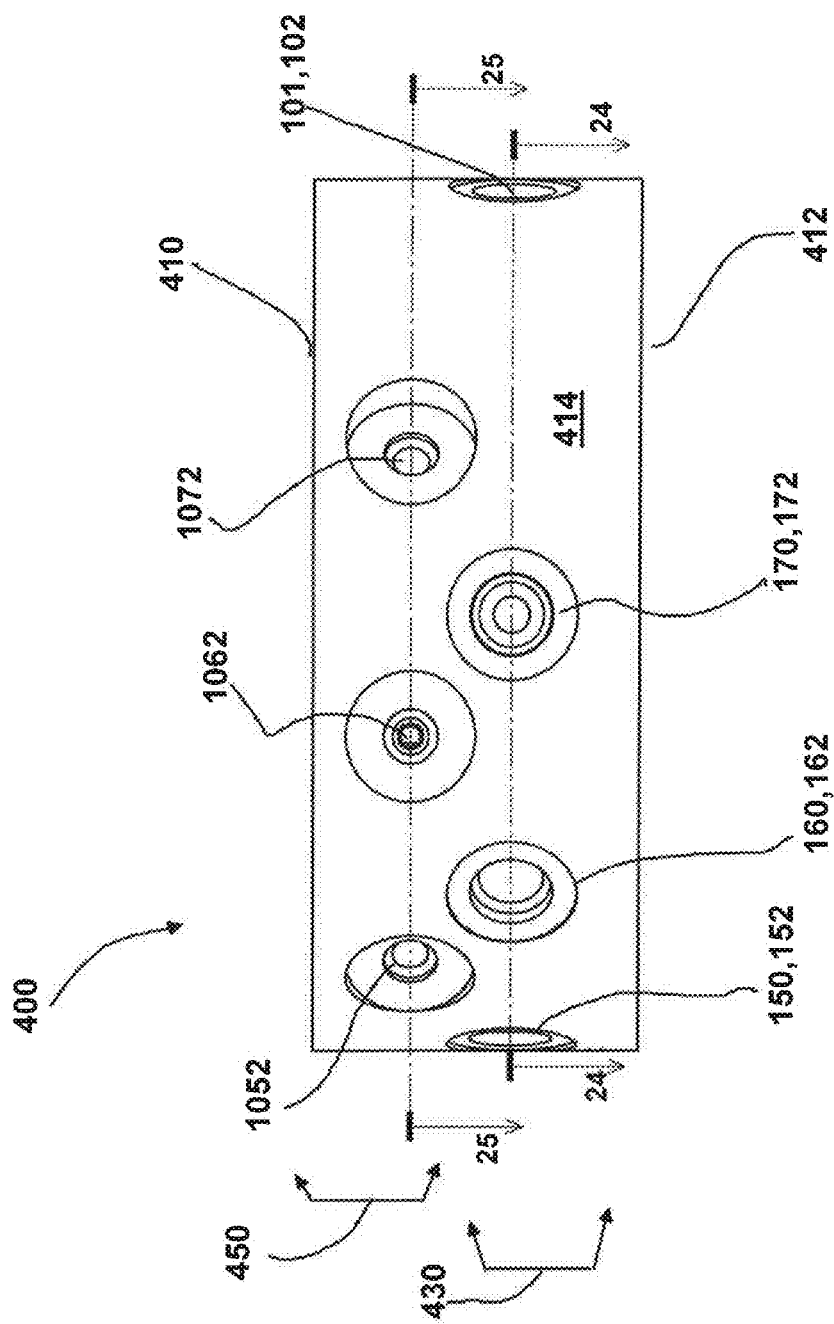

SYSTEM SIZING OPTIMIZATION

| Case | Total Tanks | HP Peak | Stage dP | Tank Volume, L | Tank Qty. | Tank Pressure SP High SP # | Tank Pressure SP Low SP #-1 | Time to Refresh System for 100%, 100L tank destination Off-load | Avg HP post vehicle fill, refresh |
|---|---|---|---|---|---|---|---|---|---|
| 1 | 8 | 0.75 | 500 | 50 | 1 | 150 | 100 | 48 Hrs | 0.11 |
|   |   |   |   |   | 2 | 650 | 325 |   |   |
|   |   |   |   |   | 3 | 1150 | 850 |   |   |
|   |   |   |   |   | 4 | 1650 | 1350 |   |   |
|   |   |   |   |   | 5 | 2150 | 1850 |   |   |
|   |   |   |   |   | 6 | 2650 | 2350 |   |   |
|   |   |   |   |   | 7 | 3150 | 2850 |   |   |
|   |   |   |   |   | 8 | 3650 | 3350 |   |   |
| 2 | 7 | 1 | 575 | 70 | 1 | 150 | 100 | 44 | 0.122 |
|   |   |   |   |   | 2 | 725 | 675 |   |   |
|   |   |   |   |   | 3 | 1300 | 1250 |   |   |
|   |   |   |   |   | 4 | 1875 | 1825 |   |   |
|   |   |   |   |   | 5 | 2450 | 2400 |   |   |
|   |   |   |   |   | 6 | 3025 | 2975 |   |   |
|   |   |   |   |   | 7 | 3600 | 3550 |   |   |
| 3 | 6 | 1.25 | 590 | 70 | 1 | 150 | 100 | 38 hrs | 0.13 |
|   |   |   |   |   | 2 | 840 | 790 |   |   |
|   |   |   |   |   | 3 | 1530 | 1480 |   |   |
|   |   |   |   |   | 4 | 2220 | 2170 |   |   |
|   |   |   |   |   | 5 | 2910 | 2860 |   |   |
|   |   |   |   |   | 6 | 3600 | 3550 |   |   |
| 4 | 5 | 1.5 | 860 | 100 | 1 | 150 | 100 | 44 | 0.13 |
|   |   |   |   |   | 2 | 1010 | 935 |   |   |
|   |   |   |   |   | 3 | 1875 | 1800 |   |   |
|   |   |   |   |   | 4 | 2740 | 2665 |   |   |
|   |   |   |   |   | 5 | 3600 | 3525 |   |   |

Given:
SET DISPLACEMENT
SET RPM = 3400
SET DESTINATION = 100L,
@ 3,000 psi

FIG. 65

METHOD AND APPARATUS FOR COMPRESSING GAS IN A PLURALITY OF STAGES TO A STORAGE TANK ARRAY HAVING A PLURALITY OF STORAGE TANKS

CROSS-REFERENCE TO RELATED APPLICATIONS

This is a continuation of U.S. application Ser. No. 13/462,177, filed May 2, 2012 (issuing as U.S. Pat. No. 9,618,158 on Apr. 11, 2017), which is a non-provisional of U.S. provisional patent application Ser. No. 61/518,111, filed May 2, 2011, which are both incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND

Over the years, concerns have developed over the availability of conventional fuels (such as gasoline or diesel fuel) for internal combustion engine vehicles, the operating costs and fuel efficiencies of such vehicles, and the potentially adverse effects of vehicle emissions on the environment. Because of such concern, much emphasis has been placed on the development of alternatives to such conventional vehicle fuels. One area of such emphasis has been the development of vehicles fueled by natural gas or other methane-type gaseous fuels, either as the sole fuel or as one fuel in a dual-fuel system. As a result, vehicles using such fuels have been produced and are currently in use on a relatively limited basis both domestically and abroad.

Compressed natural gas is an abundant resource in the United States of America. It has been estimated that the known resources of natural gas are sufficient to supply the needs of the United States for at least 200 years.

In order to provide such gaseous fueled vehicles with a reasonable range of travel between refuelings, it has previously been necessary to store the on-board gaseous fuel at very high pressures, generally in the range of approximately 2000 psig (13.9 MPa) to 3000 psig (20.7 Mpa) or higher. Without such high-pressure on-board storage, the practical storage capacity of such vehicles was limited because of space and weight factors to the energy equivalent of approximately one to five gallons (3.7 to 19 liters) of conventional gasoline. Thus, by compressing the gaseous fuel to such high pressures, the on-board storage capacities of such vehicles were increased.

One disadvantage of the compressed gaseous fuel systems discussed above is that they require complex and comparatively expensive refueling apparatus in order to compress the fuel to such high pressures. Such refueling apparatus has therefore been found to effectively preclude refueling the vehicle from a user's residential natural gas supply system as being commercially impractical.

Another alternative to the above-discussed fuel storage and vehicle range problems, has been to store the on-board fuel in a liquid state generally at or near atmospheric pressure in order to allow sufficient quantities of fuel to be carried on board the vehicles to provide reasonable travel ranges between refuelings. Such liquified gas storage has also, however, been found to be disadvantageous because it requires inordinately complex and comparatively expensive cryogenic equipment, both on board the vehicle and in the refueling station, in order to establish and maintain the necessary low gas temperatures.

In the field of natural gas distribution and storage, there is a need to gather fuel (natural gas, methane, or hydrogen) from the existing pipeline distribution system. In the United States for a residential environment, natural gas suppliers typically deliver this gas at less than one psig. In order to carry enough natural gas fuel for a respectable driving range, the fuel must be compressed to at least 3,000 psig or 3,600 psig.

Many processes require the creation of extreme pressure changes. Many well known prior art inventions use multi-stage compressors or hydraulic rams to effect large volume changes on known gases. Because of the mechanical limitations of the standard piston and crankshaft designs, multi-stage compressors are often used when attempting to compress gasses from atmosphere to pressures over 500 psig. In one embodiment, by using a specially constructed sequencing valve, a simpler and more reliable single stage compressor can be used, resulting in increased reliability and significantly lower power consumption.

While a well lubricated piston and crankshaft is probably the most reliable and well understood means of compressing a gas, numerous other arrangements have been created to overcome its limitations.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

SUMMARY

The apparatus of the present invention solves the problems confronted in the art in a simple and straightforward manner.

In one embodiment is provided a method and system for compressing gas, the system including a compressor and an array of tanks having predetermined initial set points which are increasing for tanks in the array. One embodiment provides a selecting valve operatively connecting the compressor to the tank array, the selecting valve having first and second families of ports, with the first family of ports operatively connected to the tank array and the second family of ports operatively connected to the compressor, wherein the valve can be operated to select a plurality of ports from the first family to be fluidly connected with a plurality of ports with the second family, and such selected plurality of ports from the first and second families to be fluidly connected to each other can be changed by operation of the valve.

One embodiment relates generally to a method and apparatus for refueling transportation vehicles or other devices fueled by natural gas or other gas.

In one embodiment is provided a method and apparatus for compressing, storing, and delivering a gaseous fuel, and/or supplying fuel to a gaseous fuel consuming device. In different embodiments the method and apparatus can be used to compress nitrogen, air, or cryogenic refrigerants.

In one embodiment is provided an apparatus having an array of at least three staged tanks which are filled with compressed gas to specified pressures.

In one embodiment during offloading to a vehicle to be fueled, the gas pressures in each of the tanks can be measured, a control system sequentially selects a first tank and withdraws gas from it to the vehicle to be filled until the rate of gas flow is less than optimum, the control system selects tank and withdraws gas from the next sequential of the tanks.

In one embodiment, during the time the vehicle is being fueled, one or more of the tanks are being replenished with compressed gas.

One embodiment provides a refueling method and apparatus that may be manufactured significantly less expensively than those of the prior art in a compact, modular form, and that is adapted to be connected to a user's residential natural gas or other gaseous fuel supply system.

Array of Increasingly Staged Pressurized Tanks

In one embodiment is provided a plurality of tanks having staged pressure set points, where staged pressure points are increasing.

In one embodiment there are at least 2, 3, 4, 5, 6, 7, 8, 9, 10, 11, 12, 13, 14, 15, 16, 17, 18, 19, 20 tanks. In various embodiments there is a range of staged pressure tanks between any two of the above referenced number of staged tanks.

In various embodiments it is contemplated that one or more of the Tanks can include two or more smaller tanks coupled together at the same pressure to make a larger volume tank.

In one embodiment, the stages array has a series of Tanks,
T1 at P1;
T2 at P2 where P2 is greater than P1;
T3 at P3 where P3 is greater than P2;
T4 at P4 where P4 is greater than P3;
T5 at P5 where P5 is greater than P4;
T6 at P6 where P6 is greater than P5;
T7 at P7 where P7 is greater than P6; and
T8 at P8 where P8 is greater than P7.

In this embodiment, one-way check valves between adjacent Tanks in the Tank array will prevent backwards bleeding of pressure from higher numbered Tanks in the Tank array to lower numbered Tanks in the Tank array. In different embodiments tanks T8 and T7 can be omitted, and/or T6, T7, and/or T8 can be comprised of one or more tanks coupled together.

Using the Same Compressor to Recompress Gas from a First Stage Tank in Tank Array, to a Second Stages Tank in Tank Array, and to a Third Staged Tank in Tank Array, and to Additional Stage Tanks in Tank Array In one embodiment, the staged tanks can be filled with compressed gas by using the same compressor to take gas from one of the tanks, compress it more, and discharge the gas to one of the other tanks.

In one embodiment, is provided a hermetically sealed compressor allowing differential compression between tanks in the tank array where compressed gas from a first tank in the array is compressed by the compressor and discharged to a second tank in the tank array at a higher pressure than the maximum absolute discharge pressure of the compressor because the hermetically sealed body allows the compressing piston to be precharged by the input pressure of the incoming gas from the first tank of the tank array.

In one embodiment a compressor is coupled to the Tank array where the compressor can:
(a) take a first quantity of gas from a first Tank in the Tank Array, compress it with a compressor, and discharge the compressed gas to a second Tank in the array;
(b) take a second quantity of gas from the second Tank in the Tank Array, compress it with the compressor, and discharge the second quantity compressed gas to a third Tank in the array.

In one embodiment a compressor is coupled to the Tank array where the compressor can:
(a) take a first quantity of gas from a first Tank in the Tank Array, compress it and discharge the first quantity of compressed gas to a second Tank in the array;
(b) take a second quantity of gas from the second Tank in the Tank Array, compress it with the compressor, and discharge the second quantity of compressed gas to a third Tank in the array;
(c) take a third quantity of gas from the third Tank in the Tank Array, compress it with the compressor, and discharge the third quantity of compressed gas to a fourth Tank in the array.

In one embodiment a compressor is coupled to the Tank array where the compressor can:
(a) take a first quantity of gas from a first Tank in the Tank Array, compress it and discharge the first quantity of compressed gas to a second Tank in the array;
(b) take a second quantity of gas from the second Tank in the Tank Array, compress it with the compressor, and discharge the second quantity of compressed gas to a third Tank in the array;
(c) take a third quantity of gas from the third Tank in the Tank Array, compress it with the compressor, and discharge the third quantity of compressed gas to a fourth Tank in the array;
(d) take a fourth quantity of gas from the fourth Tank in the Tank Array, compress it with the compressor, and discharge the fourth quantity of compressed gas to a fifth Tank in the array.

In one embodiment a compressor is coupled to the Tank array where the compressor can:
(a) take a first quantity of gas from a first Tank in the Tank Array, compress it and discharge the first quantity of compressed gas to a second Tank in the array;
(b) take a second quantity of gas from the second Tank in the Tank Array, compress it with the compressor, and discharge the second quantity of compressed gas to a third Tank in the array;
(c) take a third quantity of gas from the third Tank in the Tank Array, compress it with the compressor, and discharge the third quantity of compressed gas to a fourth Tank in the array;
(d) take a fourth quantity of gas from the fourth Tank in the Tank Array, compress it with the compressor, and discharge the fourth quantity of compressed gas to a fifth Tank in the array;
(e) take a fifth quantity of gas from the fifth Tank in the Tank Array, compress it with the compressor, and discharge the fifth quantity of compressed gas to a sixth Tank in the array.

In one embodiment a compressor is coupled to the Tank array where the compressor can:
(a) take a first quantity of gas from a first Tank in the Tank Array, compress it and discharge the first quantity of compressed gas to a second Tank in the array;

(b) take a second quantity of gas from the second Tank in the Tank Array, compress it with the compressor, and discharge the second quantity of compressed gas to a third Tank in the array;

(c) take a third quantity of gas from the third Tank in the Tank Array, compress it with the compressor, and discharge the third quantity of compressed gas to a fourth Tank in the array;

(d) take a fourth quantity of gas from the fourth Tank in the Tank Array, compress it with the compressor, and discharge the fourth quantity of compressed gas to a fifth Tank in the array;

(e) take a fifth quantity of gas from the fifth Tank in the Tank Array, compress it with the compressor, and discharge the fifth quantity of compressed gas to a sixth Tank in the array; and (f) take a sixth quantity of gas from the sixth Tank in the Tank Array, compress it with the compressor, and discharge the sixth quantity of compressed gas to a seventh Tank in the array.

In one embodiment a compressor is coupled to the Tank array where the compressor can:

(a) take a first quantity of gas from a first Tank in the Tank Array, compress it and discharge the first quantity of compressed gas to a second Tank in the array;

(b) take a second quantity of gas from the second Tank in the Tank Array, compress it with the compressor, and discharge the second quantity of compressed gas to a third Tank in the array;

(c) take a third quantity of gas from the third Tank in the Tank Array, compress it with the compressor, and discharge the third quantity of compressed gas to a fourth Tank in the array;

(d) take a fourth quantity of gas from the fourth Tank in the Tank Array, compress it with the compressor, and discharge the fourth quantity of compressed gas to a fifth Tank in the array;

(e) take a fifth quantity of gas from the fifth Tank in the Tank Array, compress it with the compressor, and discharge the fifth quantity of compressed gas to a sixth Tank in the array.

In one embodiment a compressor is coupled to the Tank array where the compressor can:

(a) take a first quantity of gas from a first Tank in the Tank Array, compress it and discharge the first quantity of compressed gas to a second Tank in the array;

(b) take a second quantity of gas from the second Tank in the Tank Array, compress it with the compressor, and discharge the second quantity of compressed gas to a third Tank in the array;

(c) take a third quantity of gas from the third Tank in the Tank Array, compress it with the compressor, and discharge the third quantity of compressed gas to a fourth Tank in the array;

(d) take a fourth quantity of gas from the fourth Tank in the Tank Array, compress it with the compressor, and discharge the fourth quantity of compressed gas to a fifth Tank in the array;

(e) take a fifth quantity of gas from the fifth Tank in the Tank Array, compress it with the compressor, and discharge the fifth quantity of compressed gas to a sixth Tank in the array;

(f) take a sixth quantity of gas from the sixth Tank in the Tank Array, compress it with the compressor, and discharge the sixth quantity of compressed gas to a seventh Tank in the array; and (g) take a seventh quantity of gas from the sixth Tank in the Tank Array, compress it with the compressor, and discharge the seventh quantity of compressed gas to an eighth Tank in the array.

In one embodiment a compressor is coupled to the Tank array where the compressor can:

(a) take a first quantity of gas from a first Tank in the Tank Array, compress it and discharge the first quantity of compressed gas to a second Tank in the array;

(b) take a second quantity of gas from the second Tank in the Tank Array, compress it with the compressor, and discharge the second quantity of compressed gas to a third Tank in the array;

(c) take a third quantity of gas from the third Tank in the Tank Array, compress it with the compressor, and discharge the third quantity of compressed gas to a fourth Tank in the array;

(d) take a fourth quantity of gas from the fourth Tank in the Tank Array, compress it with the compressor, and discharge the fourth quantity of compressed gas to a fifth Tank in the array;

(e) take a fifth quantity of gas from the fifth Tank in the Tank Array, compress it with the compressor, and discharge the fifth quantity of compressed gas to a sixth Tank in the array;

(f) take a sixth quantity of gas from the sixth Tank in the Tank Array, compress it with the compressor, and discharge the sixth quantity of compressed gas to a seventh Tank in the array; and (g) take a seventh quantity of gas from the seventh Tank in the Tank Array, compress it with the compressor, and discharge the seventh quantity of compressed gas to an eighth Tank in the array; and (h) take an eighth quantity of gas from the eighth Tank in the Tank Array, compress it with the compressor, and discharge the eighth quantity of compressed gas to a ninth Tank in the array.

Check Valves Fluidly Connecting Directly in a One Way Direction Adjacent Tanks, and Indirectly Non-Adjacent Tanks of Higher Numbers in the Array In one or more embodiments the pressure staged tanks are fluidly coupled together (from lower pressure to higher pressure) through a series of check valves between sets of two Tanks—where the gas can flow from the lowered numbered tank in the array to the next higher number Tank in the array.

In one embodiment a compressor is coupled to the Tank array where the compressor can:

(a) take a first quantity of gas from a first Tank in the Tank Array where the first Tank is at a first Tank first pressure, compress it with a compressor and discharge the first quantity of compressed gas to a second Tank in the array, and continuing this step until the first tank pressure drops to a first Tank second pressure where the difference between the first Tank first pressure and the first Tank second pressure is less than a predefined first Tank pressure drop;

(b) take a second quantity of gas from a second Tank in the Tank Array where the second Tank is at a second Tank first pressure, compress it with the compressor and discharge the second quantity of compressed gas to a third Tank in the array, and continuing this step until the second tank pressure drops to a second Tank second pressure where the difference between the second Tank first pressure and the second Tank second pressure is less than a predefined second Tank pressure drop;

(c) take a third quantity of gas from a third Tank in the Tank Array where the third Tank is at a third Tank first pressure, compress it with the compressor and discharge the third quantity of compressed gas to a fourth Tank in the array, and continuing this step until the third tank pressure drops to a third Tank second pressure where the difference between the third Tank first pressure and the third Tank second pressure is less than a predefined third Tank pressure drop;

(d) take a fourth quantity of gas from a fourth Tank in the Tank Array where the fourth Tank is at a fourth Tank first pressure, compress it with the compressor and discharge the fourth quantity of compressed gas to a fifth Tank in the array, and continuing this step until the fourth tank pressure drops to a fourth Tank second pressure where the difference between the fourth Tank first pressure and the fourth Tank second pressure is less than a predefined fourth Tank pressure drop;

(e) take a fifth quantity of gas from a fifth Tank in the Tank Array where the fifth Tank is at a fifth Tank first pressure, compress it with the compressor and discharge the fifth quantity of compressed gas to a sixth Tank in the array, and continuing this step until the fifth tank pressure drops to a fifth Tank second pressure where the difference between the fifth Tank first pressure and the fifth Tank second pressure is less than a predefined fifth Tank pressure drop;

(f) take a sixth quantity of gas from a sixth Tank in the Tank Array where the sixth Tank is at a sixth Tank first pressure, compress it with the compressor and discharge the sixth quantity of compressed gas to a seventh Tank in the array, and continuing this step until the sixth tank pressure drops to a sixth Tank second pressure where the difference between the sixth Tank first pressure and the sixth Tank second pressure is less than a predefined sixth Tank pressure drop; and (g) dispense gas from at least two tanks from the array of tanks to a vehicle storage tank.

In various embodiments the staged tanks in the staged tank array are fluidly connected with one way valves which allow pressure to flow in the direction from tanks having lower predefined staged pressure points to higher predefined staged pressure points. In various embodiments a series of check valves are used.

Offloading to Vehicle Tank

In one embodiment during operation, a line 102 is coupled to the fuel tank of the vehicle to be refueled. A controller begins the refueling process by first using tank 1, the lowest pressure tank, in the tank array. Once flow from tank 1 begins to fill vehicle, the pressure in tank 1 will decrease. At a certain point the pressure in tank 1 will substantially equalize to the pressure in the vehicle's tank, and flow from tank 1 to the vehicle will stop. When flow from tank 1 ceases (e.g., as determined by the system of a non-changing pressure in the tank after a predetermined period of time), indicating that the vehicle's fuel tank is refilled to the equalized pressure in tank 1, controller connects the next highest pressure tank 2 in the array to the vehicle's fuel tank. When flow ceases from tank 2 to the vehicle (e.g., as determined by the system of a non-changing pressure in the tank after a predetermined period of time), the controller connects to the next highest pressure tank (tank 3) to fill the vehicle's fuel tank. This process is repeated as the pressure in the vehicle fuel tank increases until finally the highest pressure tank delivers gaseous natural gas at 3,600 psi.

In one embodiment is provided a user interface which obtains input on the vehicle to be offloaded such as pressure and volume. In another embodiment is provided a method and apparatus which obtains the user input and, based on such input, along with the staged pressures in the tank array, volumes of individual tanks in the tank array, and volume of tank to be filled for the user's vehicle, starts the offloading process from an interstitially staged tank (e.g, tank 2, 3, 4, 5, 6, and/or n−1) of an n-staged pressurized tank array.

In one embodiment flow rate from each of the tanks in the tank array to the vehicle can be monitored by the controller to determine when flow from a particular tank to the vehicle has stopped.

In one embodiment an exit valve (not shown) connected to the outlet of the apparatus can be used to ensure that the vehicle fuel tank is not filled to a pressure exceeding its rated working pressure of, for example, 3,600 to 3,000 psi.

In one embodiment a gas flow meter can be connected to discharge line to monitor the flow rate of gas being delivered to automobile. The flow rate determined by flow meter can be sent to controller which, in response to such information and/or information furnished from pressure sensors, decides which tanks from tank array to connect to each other, and/or which tanks to offload gas to vehicle.

In one embodiment one or more valves can be remotely controlled, such as a solenoid valve. The controller controls valves in the tank array causing flow to change based on pressures in the tanks. Simultaneously, or sequentially, controller can cause a compressor operatively connected to controller to it to fill one or more tanks in the pressurized staged tank array which is less than the desired set point pressures for such tanks.

In one preferred embodiment, the total volume of any particular staged tank in a staged tank array (which will be the sum of each tank(s) fluidly connected together during compression for such stage and an example of this is provided as tanks 1060, 1060', and 1060" in FIG. 5, can vary from about 25 to about 200 liters. In another embodiment, the total volume of any particular tank will vary from about 50 to about 150 liters. In another embodiment the size will vary from about 1 to about 120 liters, and from about 50 to about 100 liters.

During off-loading/filling of a vehicle it will be apparent that there is preferably sequential sequencing of the tanks in the tank array. The first tank can be accessed, the second tank is accessed, the third tank is accessed, etc.

In another embodiment where the highest pressured staged tank is accessed and its pressure drops below a predefined minimum for vehicle to be considered filled, compressor can be used in combination with one or more tanks to complete the fill. In this embodiment, the compressor can be used to compress gas from a first pressurized staged tank to the next higher pressurized staged tank, then offloading from the higher pressurized staged tank to the vehicle, or compressing from such higher pressurized staged tank and into the vehicle.

Compressing Gas at More than 3, 4, 5, 6, 7, 8, 9, 10, 11, 12, 13, 14, 15, 16, 17, 18, 19, 20 Times the Compressor's Ability to Compress in a Single Stage In one embodiment at compressing at a range of between any two of the above referenced multiples of compressor ratings.

In one embodiment the compressor rating can be equal the maximum force which the driving motor can cause to be applied to the compressor's piston divided by the cross sectional area of the compressor piston chamber.

Using Same Compressor, Recompressing Gas Previously Compressed by Compressor

One embodiment includes at least 2, 3, 4, 5, 6, 7, 8, 9, 10, 11, 12, 13, 14, 15, 16, 17, 18, 19, 20 recompression stages. In various embodiments a range of recompression stages between any two of the above referenced number of recompression stages is envisioned.

Multiport Staging Valve Having Circular Staging Rotation

In one embodiment is provided a selecting valve having a first family of ports having a plurality of ports and a second family of ports having a plurality of ports, one of the first family of ports being selectively fluidly connectable with one of the second family of ports.

In one embodiment the first family has a plurality of ports. In one embodiment the first family has 2, 3, 4, 5, 6, 7, 8, 9, 10, 11, 12, 13, 14, 15, 16, 17, 18, 19, and 20 ports. In various embodiments the first family has between any two of the above specified number of ports.

In one embodiment the second family has a plurality of ports. In one embodiment the second family has 2, 3, 4, 5, 6, 7, 8, 9, 10, 11, 12, 13, 14, 15, 16, 17, 18, 19, and 20 ports. In various embodiments the second family has between any two of the above specified number of ports.

In one embodiment the first family has two ports and the second family has 4, 5, 6, 7, 8, 9, 10, 11, 12, 13, 14, 15, 16, 17, 18, 19, and 20 ports. In various embodiments the first family has two ports and the second family has between any two of the above specified number of ports.

In one embodiment the second family of ports can be fluidly connected in a first direction by a plurality of one way valves. In one embodiment the one way valves can be a plurality of check valves. In one embodiment the plurality of check valves can be ported in the body of the valve.

In one embodiment a selector operatively connected to the first and second family of ports is used to selectively fluidly connect a first port from the first family to a first port from the second family. In one embodiment the selector operatively connected to the first and second family of ports is used to selectively fluidly connect a second port from the first family to a second port from the second family.

In one embodiment the selector is used to selectively switch the fluid connection between the first port from the first family and the first port from the second family to the first port from the first family to a third port from the second family, and from the second port from the first family to a fourth port from the second family.

In one embodiment is provided a selecting valve comprising a body having a first family of ports having a plurality of ports and a second family of ports having a plurality of ports, and a selector rotatably mounted with respect to the body, the selector selectively fluidly connecting a first port from the first family to a first port from the second family and a second port from the first family to a second port from the second family.

In one embodiment rotation of the selector relative to the body selectively switches the fluid connection between the first port from the first family and the first port from the second family to fluidly connecting the first port from the first family to a third port from the second family, and fluidly connecting the second port from the first family to a fourth port from the second family.

In one embodiment the selector has a circular cross section and is rotationally connected to the body. In one embodiment the selector has a rotational axis relative to the body. In one embodiment the selector has at least one trunnion which rotationally connects the selector to the body.

In one embodiment the first port of the first family includes an opening which fluidly connects with the selector at the intersection of the rotational axis of the selector relative to the body. In one embodiment the second port of the second family includes a fluid connection with the selector that is spaced apart from the rotational axis of the selector relative to the body. In one embodiment the fluid connection between the selector and the second port of the second family includes an annular recess in the body the annular recess being circular with its center aligned with the rotational axis between the selector and the body. In one embodiment the annular recess is in the selector. In one embodiment the annular recess is in the body. In one embodiment mating annular recesses are located in the selector and the body.

In one embodiment the selector includes first and second selector fluid conduits, with the first selector fluid conduit having first and second port connectors and the second selector fluid conduit having first and second port connectors.

In one embodiment each port in the second family of ports includes a plurality of conduits having first and second openings with the second opening of each of the ports being located on a circle having its center located on the relative axis of rotation between the selector and the body, and with the angular spacing between adjacent second openings connectors being the same, and the selector having first and second conduits each having first and second connectors, with the second connectors being located on a circle having its center located on the relative axis of rotation between the selector and the body, and the angular spacing between the second connectors being a multiple of the angular spacing between adjacent second openings of the second family of ports. In one embodiment the angular spacing between the second connectors of the first and second conduits is the same as the angular spacing between adjacent second openings of the second family of ports. In various embodiments the multiple is 1, 2, 3, 4, 5, 6, 7, 8, 9, and/or 10.

In one embodiment, regardless of the relative angular position between the selector and the body, the first port connector of the first selector conduit of the selector remains fluidly connected to the first port of the first family of ports.

In one embodiment, regardless of the relative angular position between the selector and the body, the first port connector of the second selector conduit of the selector remains fluidly connected to the second port of the first family of ports.

In one embodiment, regardless of the relative angular position between the selector and the body, the first port connector of the first selector conduit of the selector remains fluidly connected to the first port of the first family of ports, and the first port connector of the second selector conduit of the selector remains fluidly connected to the second port of the first family of ports.

In one embodiment relative angular movement between the selector and the body causes the first port connector of the second selector conduit of the selector to traverse an arc having a substantially uniform radius of curvature. In one embodiment, relative angular movement greater than 360 degrees causes the first port connector of the second selector conduit of the selector to move in a circle having a radius, while the first port of the first selector conduit of the selector rotates in a single spot about the rotational axis between the selector and the body.

In one embodiment relative angular movement of the selector with respect to body causes the first port of the first family to be connected to the second port of the second family and the second port of the first family to be connected to a port of the second family which is not the first or second port. In one embodiment this is the third port of the second family.

In one embodiment, relative angular rotation of selector with respect to body of less than the angular spacing between the adjacent second openings of second family of ports causes the first and second conduits to change from being fluidly connected to being fluidly disconnected between first family of ports and the second family of ports.

By determining the angular spacing of the second openings for the second family of ports compared to the angular spacing of the second connectors for the first and second conduits, relative connections between the first family of ports and the second family of ports can be varied. For example, if the angular spacing is the same then adjacent second openings of the second family of ports will be fluidly connected with the first family of ports. If the relative angular spacing is 2, then spaced apart second openings of the second family of ports will be fluidly connected to the first family of ports. If the spacing is 3 times, then twice spaced apart second openings of the second family of ports will be fluidly connected to the first family of ports. For each multiple of spacing the formula of multiple minus 1 spaced apart second openings of the second family of ports will be fluidly connected to the first family of ports. In the case of 1-1, then no spaced apart but adjacent second openings of the second family of ports will be fluidly connected to the first family of ports.

In various embodiments the pressures set forth in the Table shown in FIG. 65 can be the middle points for ranges that vary about 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30 percent from such mid points on either side of such midpoints. In various embodiments the pressures can be the upper or lower points of ranges which vary respectively downwardly or upwardly by one of the specified percentages.

Compression of Gas at Less than X Amount of Energy Per Cubic Foot and Up to Y Psi

BRIEF DESCRIPTION OF THE DRAWINGS

FIG. 15 is a side view of the top of the valve of FIG. 9 showing both the lower selector porting and the upper check valve porting with check valves being omitted from the check valve porting (and with only seven selector ports included in this version for ease of discussion) and with many parts omitted for purposes of clarity in the discussion.

FIG. 16 is a top view of the top of the valve of FIG. 9 showing both the lower selector porting and the upper check valve porting with check valves placed in the check valve porting (and with only seven selector ports included in this version for ease of discussion).

FIG. 17 is a representative diagram of a check valve port with a check valve included in the port).

FIG. 23 is a side view of the top portion of the valve of FIG. 9 showing selector and check valve porting.

FIG. 65 is a table describing a system optimized sizing for a given 100 L, 3,000 psig and/or 3,600 psig destination need.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Overall System

Figure 1:
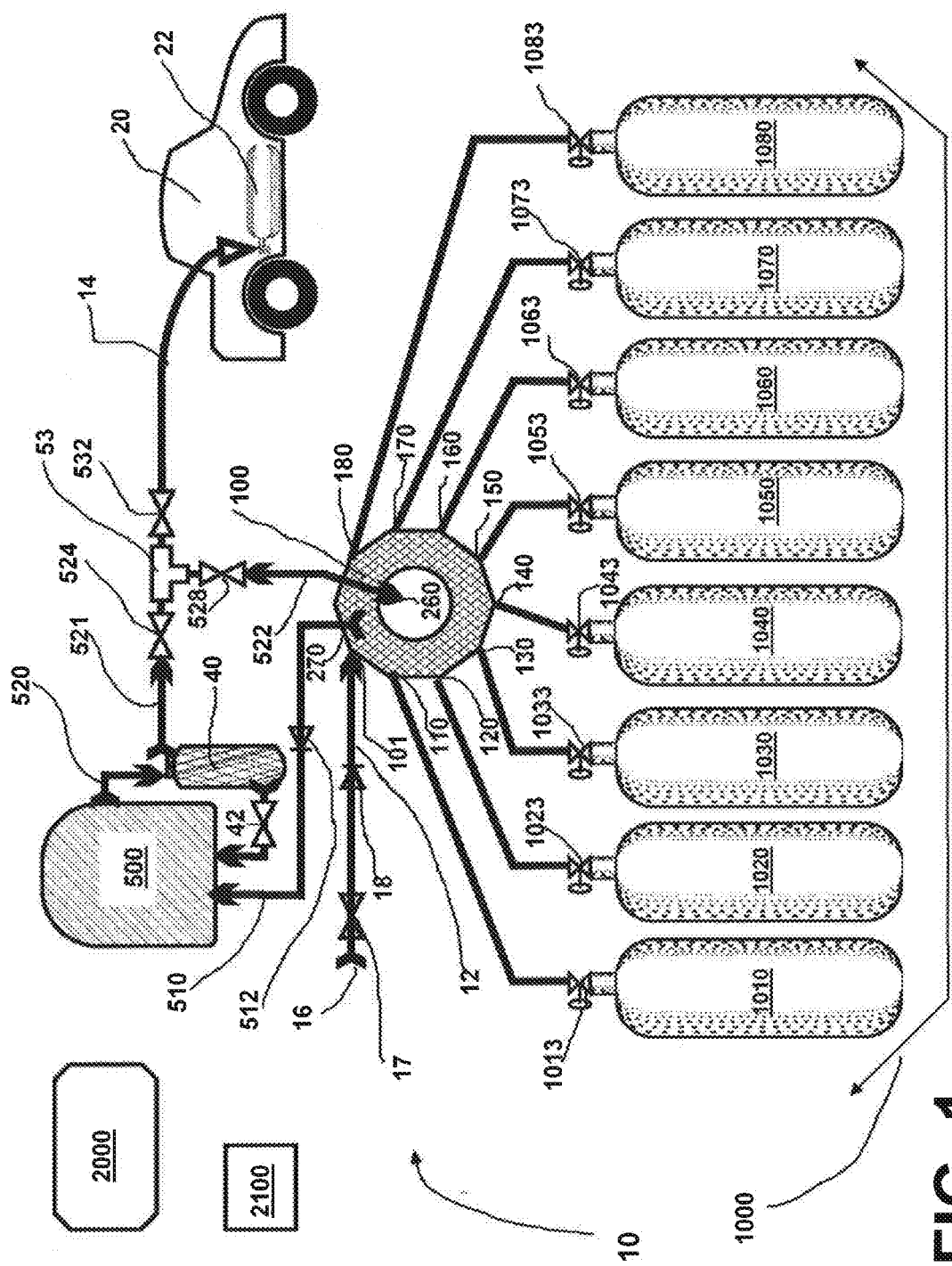
FIG. 1 is a schematic diagram of one embodiment using an eight tank storage array and a home source from which a single compressor can be used to incrementally compress from lower tanks or home source into higher tanks.
Figure 2:
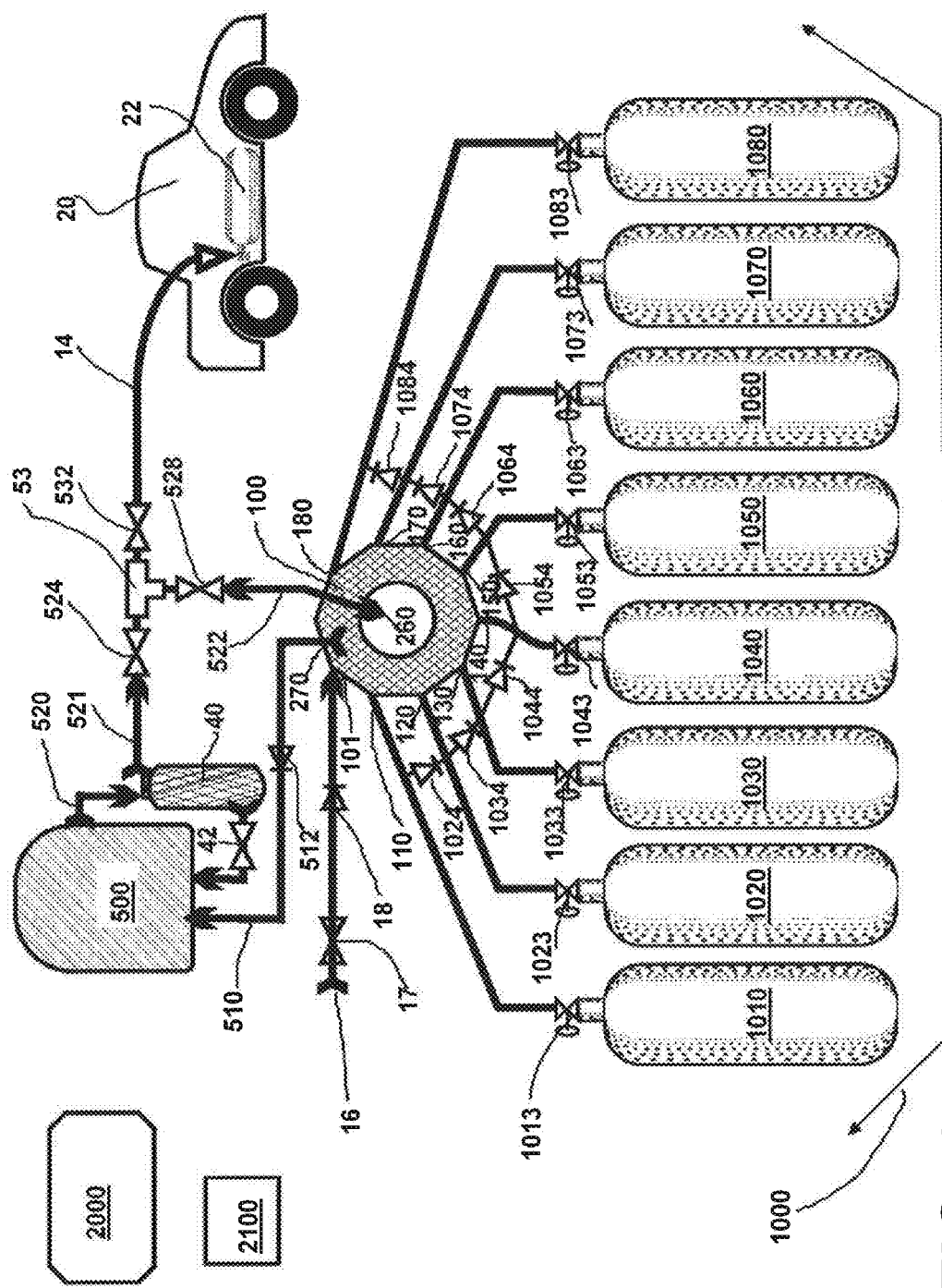
FIG. 2 includes the schematic diagram of FIG. 1, but with the addition of a plurality of one way valves between the tanks in the tank array.

FIG. 1 is a schematic diagram of one embodiment using an eight tank storage array (tanks 1010, 1020, 1030, 1040, 1050, 1060, 1070, and 1080) and a home source 17 from which a single compressor 500 can be used to incrementally compress from lower tanks or home source into higher tanks before ultimately using system to fill a vehicle 20 storage tank 22. FIG. 2 includes the schematic diagram of FIG. 1, but with the addition of a plurality of one way valves 1024, 1034, 1044, 1054, 1064, 1074, and 1084 between the tanks in the tank array 1000.

In one embodiment refueling system 10 can have a compressor 500 operatively connected to a tank array 1000. In one embodiment a valve 100 can selective and operatively connect the compressor 500 to one or more tanks in tank array 1000. Valve 100 can be a sequencing type valve. In another embodiment, schematically shown in FIG. 7, single sequencing valve 100 can be replaced by a series of pairs of controllable valves in a manifold system.

In one embodiment a controller 2000 can be operatively connected to both compressor 500 and valve 100. In one embodiment a remote panel 2100 can be used to control operation of system 10.

The number of tanks, containers, gas cylinders, or spheres which will be used in tank array 1000 can vary, depending upon the space available for system 10, the capacity of each tank, etc. In one embodiment tank array 1000 can include tanks 1010, 1020, 1030, 1040, 1050, 1060, 1070, and 1080. Tanks 1010, 1020, 1030, 1040, 1050, 1060, 1070, and 1080 are adapted to receive, store, and deliver pressurized gas. As is known to those skilled in the art, each of tanks may be comprised of a single storage container such as, e.g., a storage cylinder, sphere, or an non-symmetrically shaped container. In one embodiment, however, tank array 1000 comprises a multiplicity of storage containers. Cascaded tank arrays are well known to those skilled in the art and are described, e.g., in U.S. Pat. Nos. 5,351,726; 5,333,465; 5,207,530; 5,052,856; 4,805,674; 3,990,248; 3,505,996; and the like. The disclosure of each of these patents is hereby incorporated by reference into this specification.

Figure 1A:
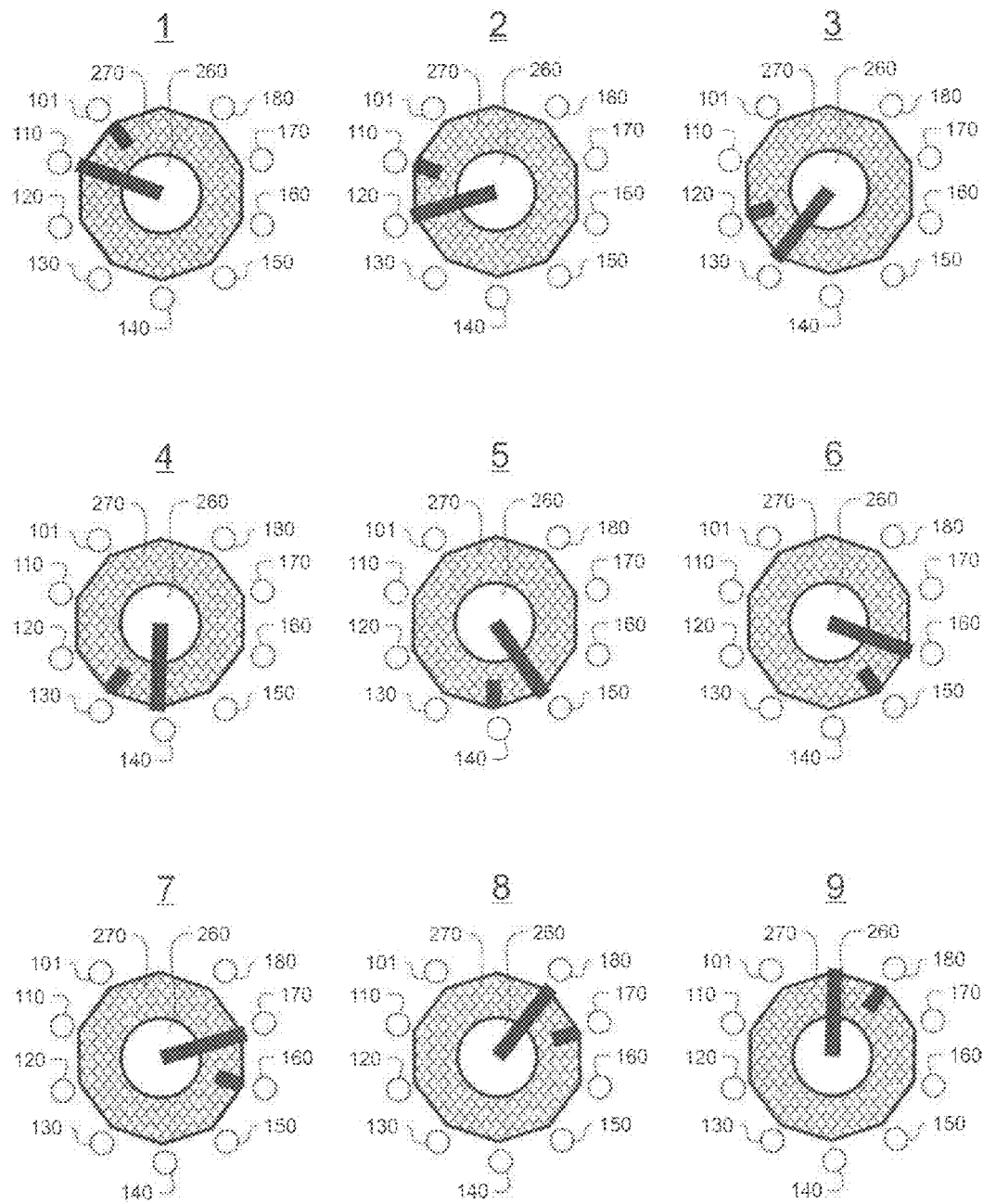
FIG. 1A is a schematic diagram showing the sequential operation of the valve for the embodiment shown in FIG. 1 switching fluid connections between adjacent ports when turning to allow compressor to create staged pressurized tank array.

FIG. 1 illustrates one embodiment of a tank array 1000 which may be used in the method and apparatus. In the embodiment the pressure of gas inside tanks 1010, 1020, 1030, 1040, 1050, 1060, 1070, and 1080 can be monitored by pressure gauges which provide input to a controller 2000. FIG. 1A is a schematic diagram showing the sequential operation of valve assembly 100 for the eight tank staged tank array 1000, and schematically showing fluid connections between increasing pressurized tanks in staged tank array 1000.

In one embodiment refueling system 10 is preferably housed in a small, unobtrusive module-type housing 15 (not shown for clarity) and is designed to operate on ordinary residential electrical supply systems (e.g. 110-230 volt systems) in order to provide a convenient and easy-to-operate system for home refueling of a gaseous fuel powered vehicle 20 or other device. One skilled in the art will recognize, however, that the principles of the present invention are equally applicable to larger versions of a gaseous refueling system, which are adapted for commercial use and which are capable of simultaneous multi-vehicle refueling, for example.

In one embodiment system 10 can include a flexible outlet conduit 14, with a suitable connector at its free end, is adapted to be releasably connected to a vehicle 20 or other gaseous fuel consuming device in order to discharge the gaseous fuel into a storage tank 22. System 10 can include an inlet 12 adapted to be connected to a gaseous fuel supply 16 by means of a conventional connector device of the type known to those skilled in the art. In one embodiment the inlet 12 can include a separator or filter 40 (such as an oil/gas separate or desiccant filter). Fuel supply 16 can comprise a natural gas supply system such as that commonly found in many residential and commercial facilities.

In one embodiment system 10 can also include a shut-off valve 17 for shutting down the system during extended periods of non-use or for isolating the system from the fuel supply 16 for purposes of servicing or repairing system 10. A gaseous fuel from the fuel supply 16 typically at between ¼ psig (1.72 Kpa), ½ psig, ¾ psig, and/or 1 psig for example, and flows through valve 17, into the inlet 12 of system 10. In other embodiments input source gas pressures to system 10 can be up to 60 psig.

Although a control panel 2100 may be on housing 15 (not shown), it is also contemplated that a remote control panel mounted can be used which is separate and spaced away from the refueling module, such as inside the user's home, for example.

In one embodiment the tanks in tank array 1000 and compressor can be selectively fluidly connected in a increasingly staged manner with respect to the suction and discharge side of compressor 500. This can be as follows:

| Suction Side Compressor | Discharge Side Compressor |
| --- | --- |
| outside gas source 16 | first tank 1010 |
| first tank 1010 | second tank 1020 |
| second tank 1020 | third tank 1030 |
| third tank 1030 | fourth tank 1040 |
| fourth tank 1040 | fifth tank 1050 |
| fifth tank 1050 | sixth tank 1060 |
| sixth tank 1060 | seventh tank 1070 |
| seventh tank 1070 | eighth tank 1080 |

In one embodiment, selected tanks in tank array 1000 can be selectively fluidly connected to the suction side of compressor 500 and simultaneously different selected tanks in tank array can be selectively connected to the discharge side of the compressor 500.

Smaller Number of Tanks in Tank Array 1000

Figure 3:
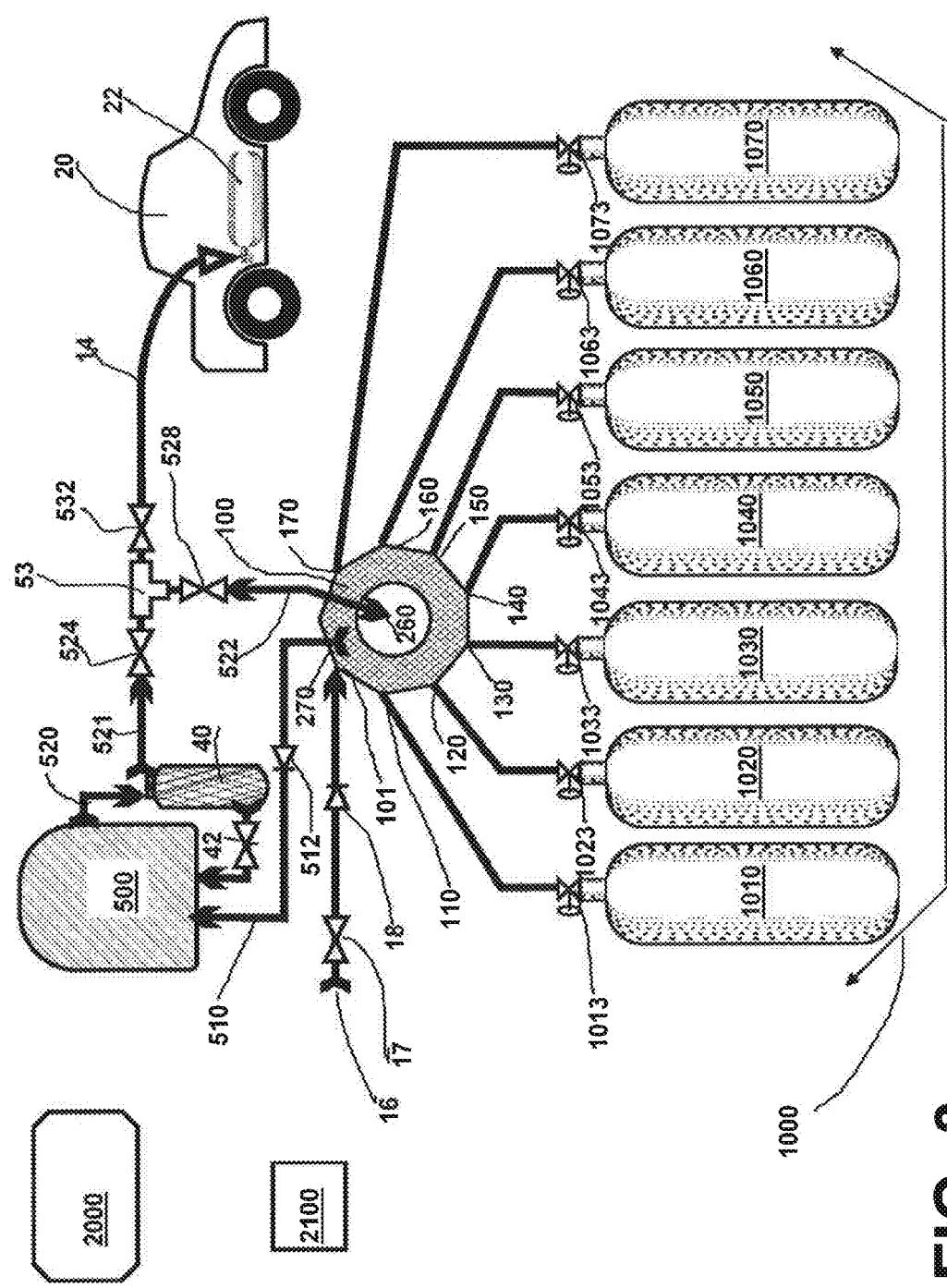
FIG. 3 is a schematic diagram of one embodiment using a seven tank storage array and a home source from which a single compressor can be used to incrementally compress from lower tanks or home source into higher tanks.
Figure 4:
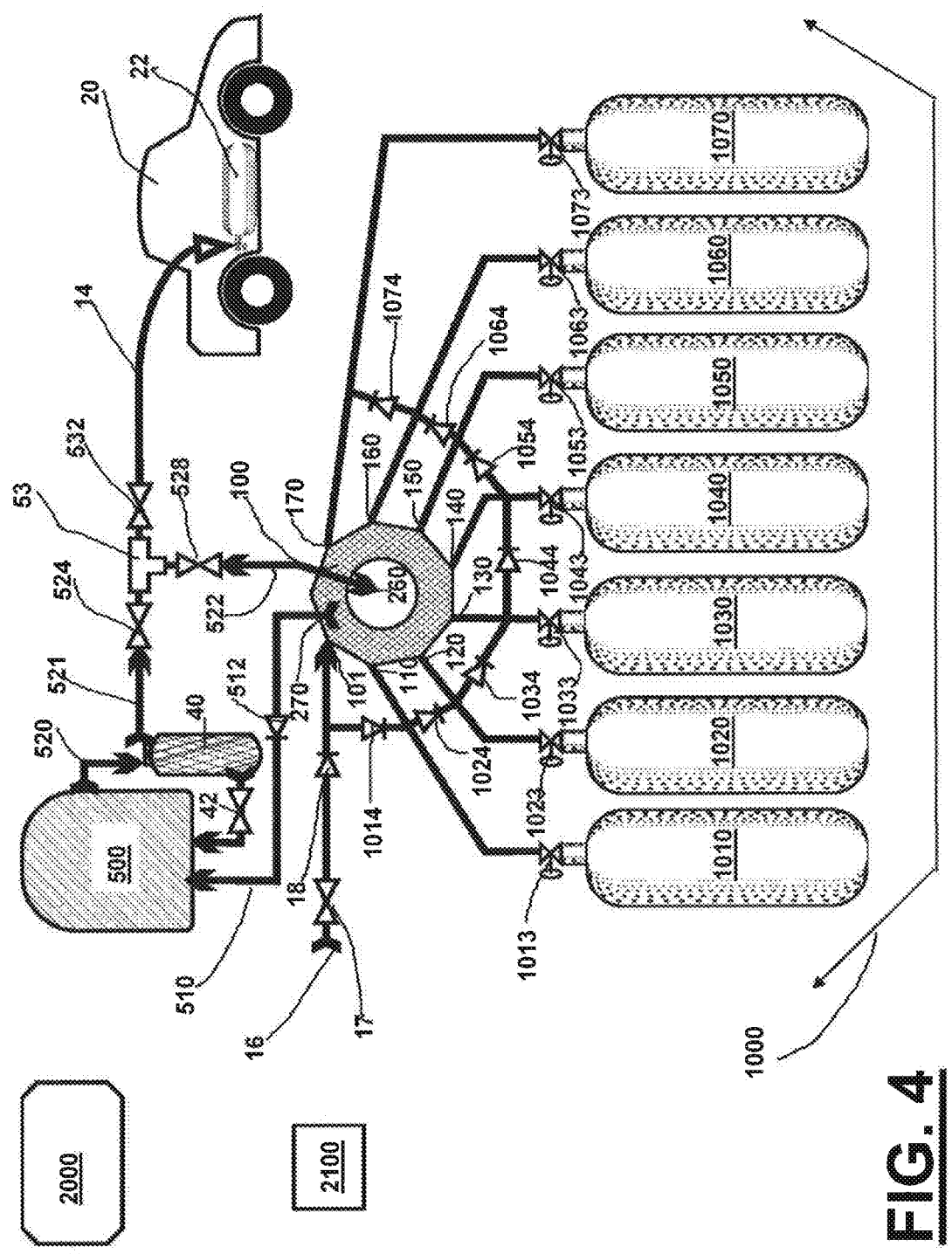
FIG. 4 includes the schematic diagram of FIG. 3, but with the addition of a plurality of one way valves between the tanks in the tank array.

FIGS. 3 and 4 are schematic diagram of one embodiment of system 10' using a seven tank storage array 1000 and an exterior gas supply 16 from which a single compressor 500 can be used to incrementally compress from lower tanks or exterior gas source into higher tanks. FIG. 4 shows the same system 10 with check valves included. The system 10' operates similarly to the system 10 schematically shown in FIGS. 1 and 2 but with only seven tanks instead of eight. The smaller number of tanks will reduce the number of staged compression steps performed by valve 100, and also incrementally reduce the highest stages set point pressure for the highest numbered tank (tank 1070 in this embodiment).

Figure 5:
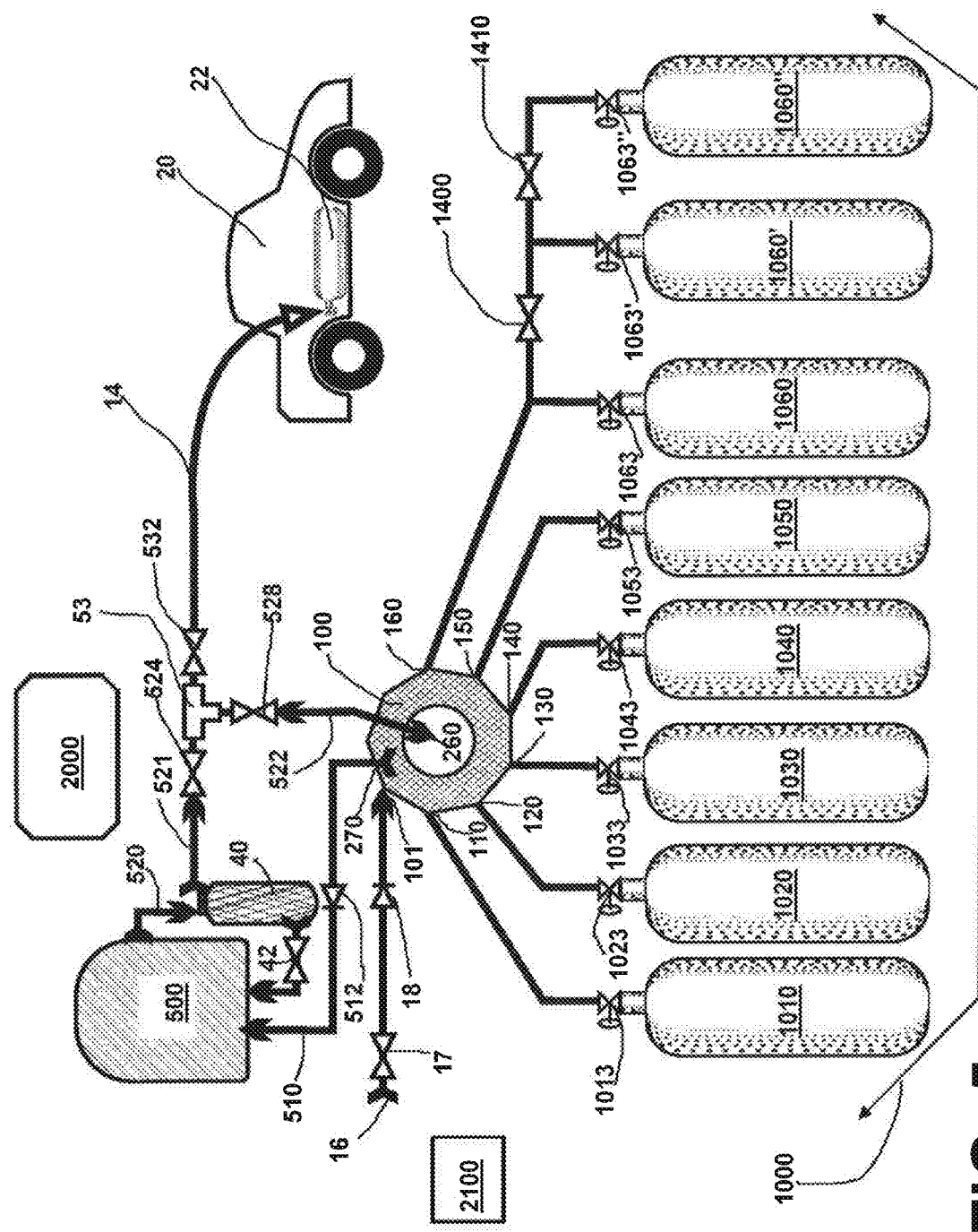
FIG. 5 is a schematic diagram of one embodiment using a seven tank storage array and a home source from which a single compressor can be used to incrementally compress from lower tanks or home source into higher tanks, but in this figure the highest numbered tank includes three storage sections of which two sections can be fluidly isolated with respect to each other during compression and/or offloading activities. Although not shown for purposes of clarity a plurality of one way valves between the tanks in the tank array can be added as in other embodiments.

FIG. 5 is a schematic diagram of one embodiment using an alternative six tank storage array 1000 and a exterior gas source 16 from which a single compressor 500 can be used to incrementally compress from lower tanks or exterior gas source into higher tanks, but in this figure the highest numbered tank (tank number 1070 in this embodiment) includes three storage sections of (tanks 1060, 1060', and 1060") of which two sections (tanks 1060' and 1060") can be fluidly isolated using a plurality of valves 1400 and 1410 with respect to each other during compression and/or offloading activities (e.g., 1060 isolated with respect to tanks 1060' and 1060" by closing valve 1400, or 1060" isolated with respect to 1060 and 1060' by closing valve 1410). Although not shown for purposes of clarity a plurality of one way valves between the tanks in the tank array 1000 can be added as in other embodiments.

Figure 6:
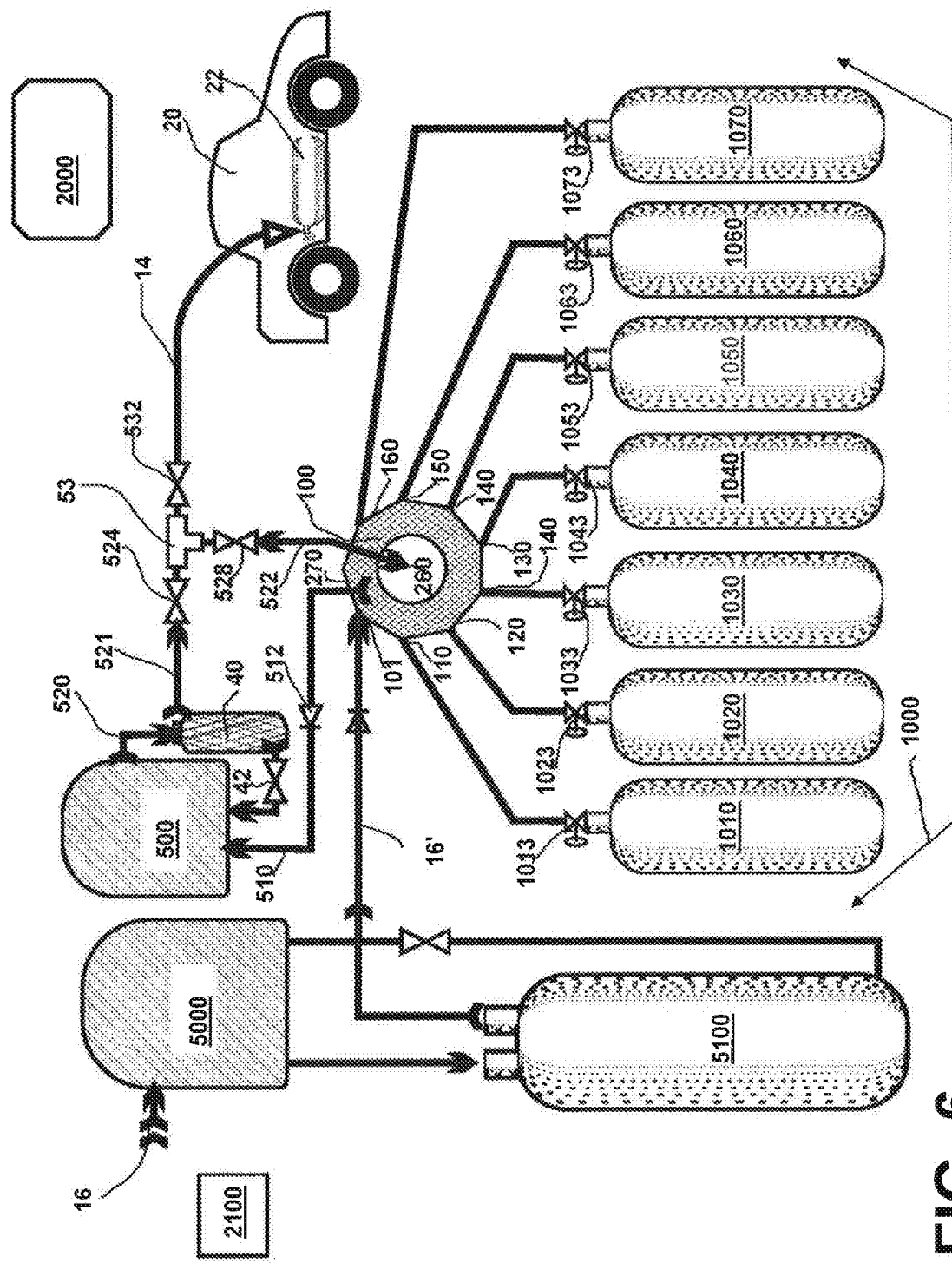
FIG. 6 is a schematic diagram of one embodiment using a seven tank storage array and a home source from which a single compressor can be used to incrementally compress from lower tanks or home source into higher tanks, but in this figure a second compressor has been added to pre-compress home source gas before being compressed by the single compressor in the seven tank storage array. Although not shown for purposes of clarity a plurality of one way valves between the tanks in the tank array can be added as in other embodiments.

FIG. 6 is a schematic diagram of one embodiment using a seven tank storage array 1000 and a exterior gas source 16 from which a single compressor 500 can be used to incrementally compress from lower tanks or exterior gas source into higher tanks, but in this figure a second compressor 5000 has been added to pre-compress exterior gas source 16 gas before being compressed by the single compressor 500 in the seven tank storage array 1000. Although not shown for purposes of clarity a plurality of one way valves between the tanks in the tank array 1000 can be added as in other embodiments. With this embodiment, the inlet pressure to selector port zero 101 of valve 100 will be increased from residential source pressure of 1 psig or less to the pressure inside tank 5100. Compressor 500 can then incrementally compress above such pressure. This embodiment can substantially increase the overall output of system 10 in environments where inlet gas pressure is low because compressor 5000 would normally employ a larger volume displacement than the compressor 500.

Manifold Embodiment

FIGS. 1-6 schematically show a single sequencing valve 100 used to selectively fluidly connect a first selected suction tank to the suction side of compressor 500 and a first selected discharge tank to the discharge side of compressor 500. However, tank array 1000 can also be selectively fluidly connected to compressor 500 using a manifold and series of controllable valves providing similar capabilities of switching tanks from suction to discharge sides of compressor 500.

Figure 7:
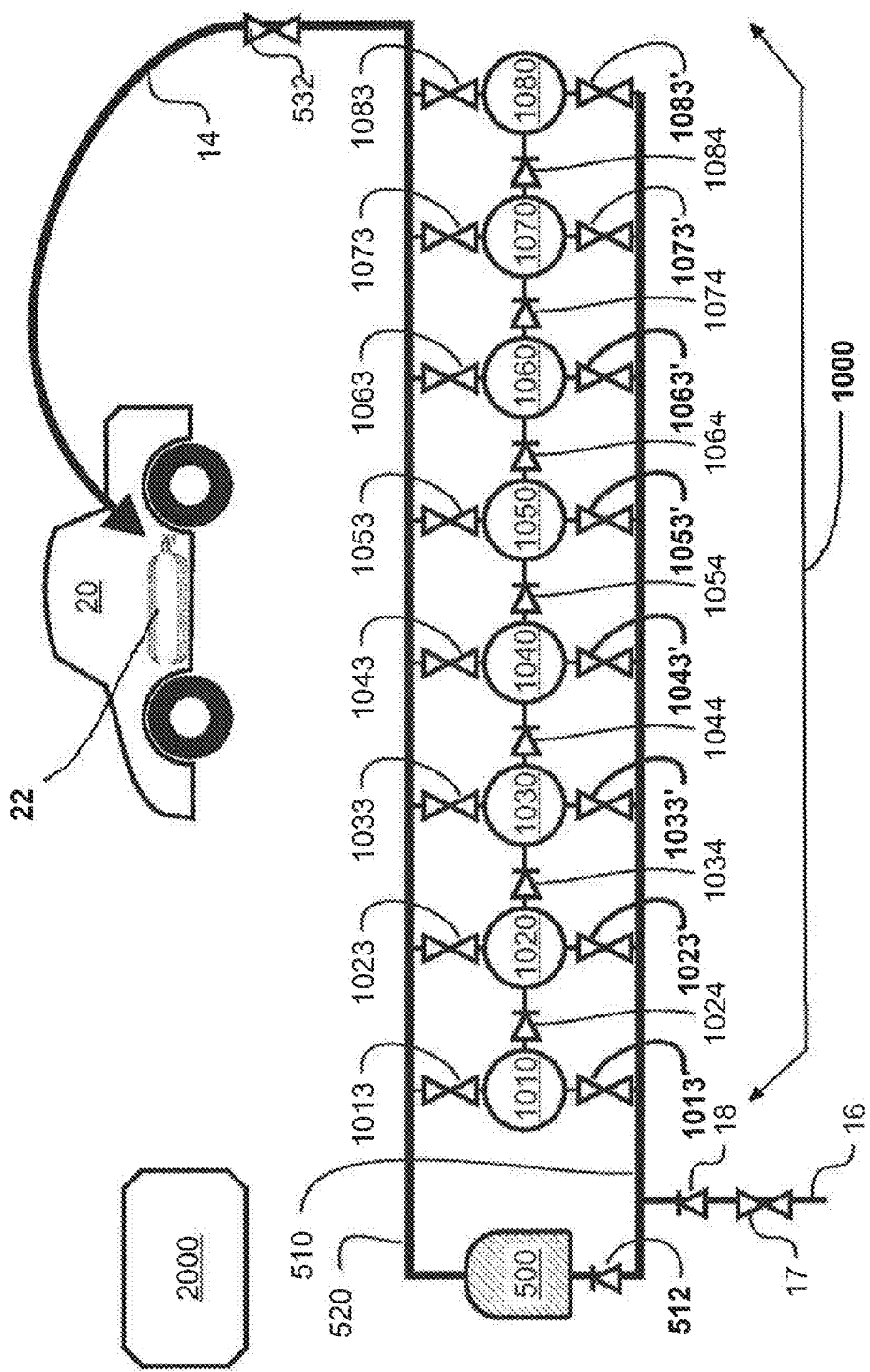
FIG. 7 is a schematic diagram of one embodiment using an eight tank storage array and a home source from which a single compressor can be used to incrementally compress from lower tanks or home source into higher tanks, where selection of suction and discharge to the single compress can be made using a manifold and plurality of valves for each tank in the storage tank array.

FIG. 7 is a schematic diagram of one embodiment using an eight tank storage array 1000 and a exterior gas source from which a single compressor 500 can be used to incrementally compress from lower tanks or exterior gas source into higher tanks, where selection of suction and discharge to the single compress can be made using a manifold and plurality of valves for each tank 1010, 1020, 1030, 1040, 1050, 1060, 1070, and 1080 in the storage tank array 1000.

FIG. 7 schematically shows tank array 1000 with manifold system and controllable valves. In this embodiment a second series of controllable valves (valves 1013', 1023', 1033', 1043', 1053', 1063', 1073', and 1083') can be added to replace single sequencing valve 100 shown in other embodiments. The valves and compressor 500 are controlled by controller 2000.

In one embodiment a plurality of the tanks 1010, 1020, 1030, 1040, 1050, 1060, 1070, and 1080 can be secondarily fluidly connected to each other (in a single flow direction) through a plurality of valves, preferably a plurality of check valves 1024, 1034, 1044, 1054, 1064, 1074, and 1084. In one embodiment each of the tanks 1010, 1020, 1030, 1040, 1050, 1060, 1070, and 1080 can include a controllable shutoff valve 1013, 1023, 1033, 1043, 1053, 1063, 1073, and 1083.

Figure 7A:
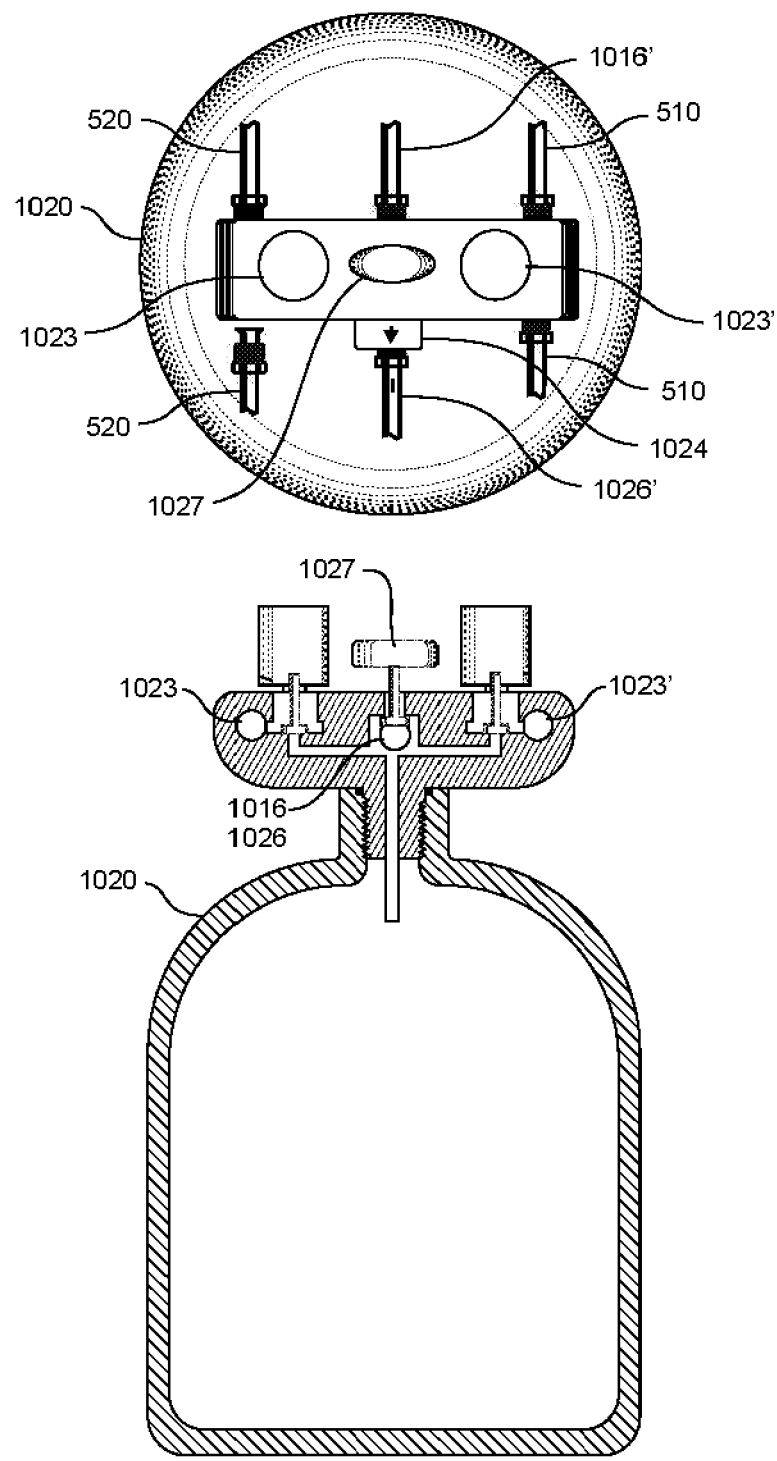
FIG. 7A shows a valve and check valve embodiment for one of the tanks in the staged pressurized storage tank array of FIG. 7 (second tank)

FIG. 7A shows an alternative valve and check valve embodiment for one of the tanks 1010 in the staged pressurized storage tank array of this embodiment. This embodiment would include a manual shutoff valve to be included in each of the tanks (shutoff valve 1027 for tank 1020).

This embodiment is not preferred because of the increased cost and reduced reliability of the increased number of controllable valves in system 10. Additionally, it would allow the accidental connection of two non-adjacent tanks (e.g., tank 1080 with tank 1030), thereby causing possibly harmful differential pressure loads on compressor 500 between suction and discharge. In addition, each connection has a potential for leaks. On the other hand, if properly designed, each could be connected directly to the top of the tanks, replacing the standard tank valve. This technique would allow for the easy re-sizing and diagnosis of a system.

General Compression Method

FIG. 1 schematically shows sequencing valve set in position 1. In this position compressor 500 initially has its suction line 510 fluidly connected via valve 100, through zero port (Port 101) to outside gas supply 16. Additionally, when sequencing valve 100 is set in position 1, compressor 500 discharge output 520 goes through separator 40, valve 524, valve 528, and line 522 into sequencing valve 100, and into tank 1010 of tank array 1000.

When first tank 1010 has reached its predetermined pressure, the sequencing valve 100 is rotated so that compressor 500 suction line 510 is now connected to first tank 1010 and discharge line 520 is connected to second tank 1020. Because the gas in first tank 1010 is now at a higher density and pressure compared to exterior gas source 16, compressor 500 now compresses additionally the higher density gas into second tank 1020. Depending on the relative sizes of first and second tanks 1010 and 1020 along with the set point pressure to be achieved in the second tank 1020, valve 100 may need to be reset by controller 2000 to again use exterior gas source 16 as suction for compressor 500 and the first tank 1010 as discharge, in order to have enough gas to fill the second tank 1020 (or a multiplicity of higher numbered staged tanks 1020, 1030, 1040, 1050, 1060, 1070, and 1080 such as by using a plurality of one way check valves) to its predefined pressure set point for the second compression stage.

Once the amount of gas pressure in the second tank 1020 has reached the desired predefined pressure set point for tank 1020, valve 100 can be repositioned so that second tank 1020 becomes the suction for compressor 500 and third tank 1030 receives discharge from compressor 500. Because the gas in second tank 1020 is now at a higher density and pressure compared to gas in first tank 1010, compressor 500 now compresses additionally the higher density gas into third tank 1020. Depending on the relative sizes of third and second tanks 1030, 1020 along with the set pressure points to be achieved in second and third tanks 1020 1030, valve 100 may need to be reset by controller 2000 to again use first tank 1010 as suction for compressor (relative to compressing into second tank), along with using exterior gas source 16 as suction for compressor 500 and the first tank 1010 as discharge, in order to have enough gas to fill the third tank 1030 to its predefined pressure set point.

The above referenced staged compressing process is repeated through as many staged pressurized tanks 1010, 1020, 1030, 1040, 1050, 1060, 1070, 1080, etc. as needed to reach the desired output pressure of the highest numbered tank using the selected horsepower of compressor 500. Unlike a multi-stage compressors, the same compressor unit 500 and compressor chamber 570 can be used for each stage of compressor (i.e., each differing suction and discharge connections to compressor 500).

In one embodiment discharge from compressor 500 can be run through a gas cooler 50 (not shown), where it can be cooled to substantially ambient temperature at the outlet of gas cooler 50. One embodiment can include a lubricant filter and separator 40. The lubricant filter and separator 40 may comprise any of a number of known filter-type devices adapted to remove lubricating oil or liquids from a gas stream passing therethrough. The lubricant filter and separator 40 functions to return compressor 500 lubricants to the suction 510 of compressor 500. Additionally, since at ambient temperatures most gaseous fuels are capable of containing vaporized or entrained lubricants or moisture, a moisture-removing means may be included downstream of the lubricant filter and separator 40. A properly sized and shaped lubricant separator/filter 40 can substantially reduces the discharge temperature of the gas while it separates the lubricant from the gas. It is believed to accomplish this where the gas/lubricant mixture is thrown at the separator walls (often in a cyclonic action) which walls are cooler than the incoming gas. In addition, because of the sizing of the compressor 500 and tanks 1000, substantial cooling will occur as the gas is waiting for the next stage to occur. Moisture removal is not shown in the schematic drawings because moisture removal can be done at inlet line 16 in this embodiment.

In another embodiment, where moisture and other condensables need to be removed, means, well known to the art, will need to be used at appropriate pressures for liquid removal.

Figure 8:
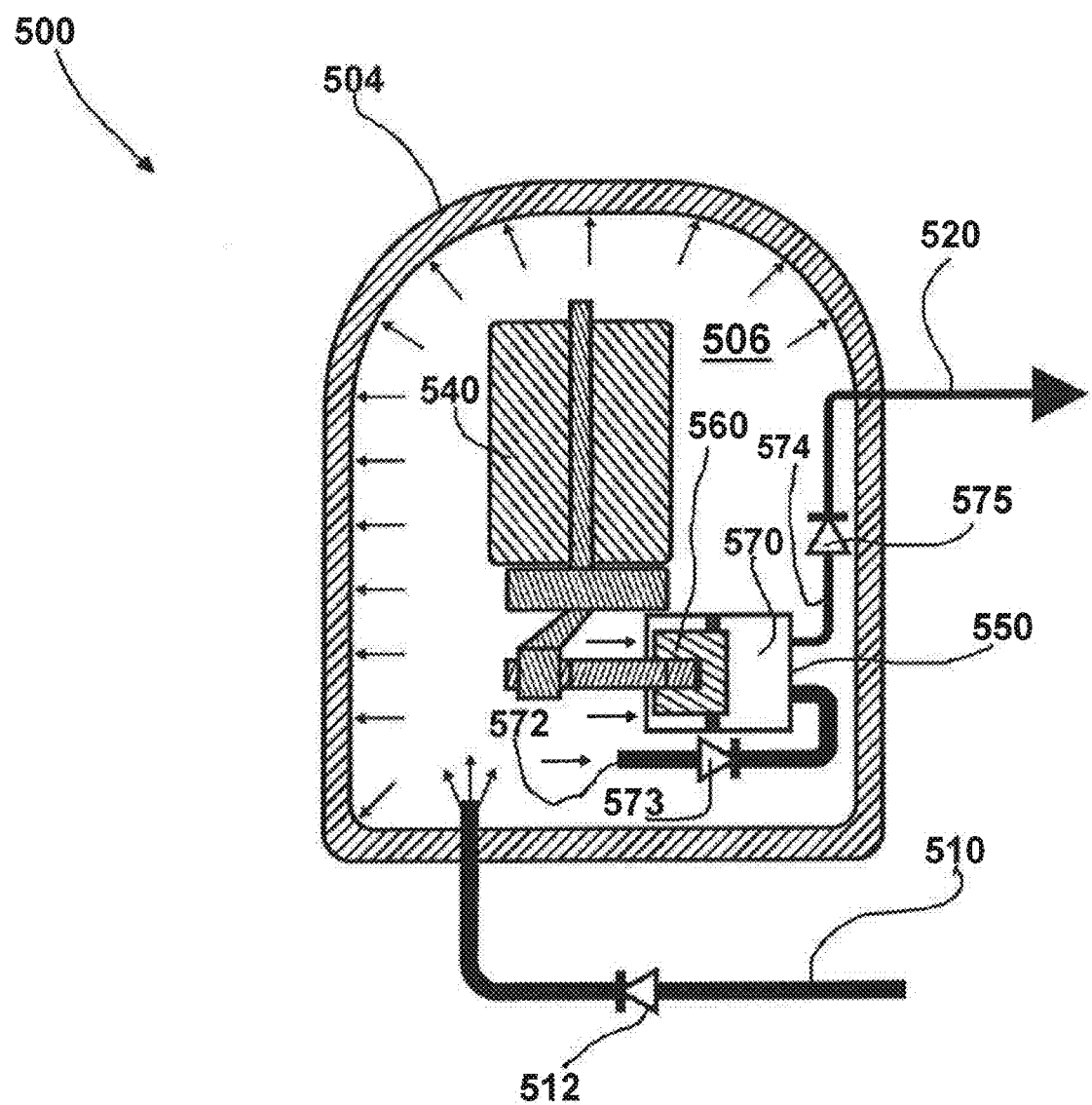
FIG. 8 is a schematic diagram of a hermetically sealed single stage compressor with a piston and cylinder compression chamber.

FIG. 8 is a schematic diagram of a hermetically sealed single stage compressor 500 with a piston 560 and cylinder compression chamber 570. In one embodiment compressor 500 can be used to compress a gas into any of tanks 1010, 1020, 1030, 1040, 1050, 1060, 1070, or 1080. In one embodiment the input to compressor 500 can be changed by controller 2000 from either an external source 16, or one of the tanks in the tank array 1000.

In one embodiment a hermetically-sealed gas compressor 500 of similar design to the types commonly employed in refrigeration apparatuses can be used. One skilled in the art will readily recognize, of course, that other compressors may alternatively be used. Compressor 500 is schematically shown in FIG. 8 and can be a hermetically sealed compressor having a housing or body 504 with interior 506, input 510, output 520, motor 540, cylinder 550, piston 560, and chamber 570. Chamber can have interior volume, input 572, and output 574. Check valve 573 can be attached to input 572 of chamber 570. Check valve 575 can be attached to output 520. Check valve 512 can be attached to compressor input 510. Check valve 512 is used to prevent the high pressure gas energy built up in the housing 504 from being lost as valve 100 cycles (such as cycling to Position 1).

In one embodiment a sequencing valve 100 as described herein can be used to operatively connect compressor 500 to tank array 1000. In another one embodiment a plurality of valves in a manifold array can be used to operatively connect compressor 500 to tank array 1000. In one embodiment controller 2000 can control sequencing valve 100 or plurality of valves which operatively connect compressor 500 to tank array 1000. In one embodiment pressure sensors are provided at each of the tanks in tank array 1000 (tanks 1010, 1020, 1030, 1040, 1050, 1060, 1070, and 1080. Tanks 1010, 1020, 1030, 1040, 1050, 1060, 1070, and 1080) and real time pressure data for each of the tanks are sent by such sensors to controller 2000. With such information provided by pressure sensors/transducers, controller 2000 operates compressor 500 and sequencing valve 100 to control the flow of gas into (and out of) each of the tanks in tank array 1000. Such control can be based on a predefined set point for compressed gas in each of the tanks in tank array 1000.

In one embodiment is provided a refueling system 10 along with method of using the system 10 to refuel a vehicle 20 with pressurized gaseous fuel. System 10 can be comprised of a gas compressor 500 operatively connected to storage tank array 1000 by a controller 2000. In one embodiment system 10 can switch sources of gas to be compressed by compressor 500, and in one embodiment tanks from tank array 100 into which compressor 500 had previously discharged compressed gas, can in turn be used as the source of gas to be further compressed by compressor 500 to another one of the tanks in tank array 1000. In various embodiments this stacking or layering of using the same compressor 500 to compress additionally gas that compressor 500 had previously compressed can be repeated limited only by the number of tanks in tank array 1000. In this manner each tank can serve as a separate stage of compressor ultimately increasing the possible maximum compressive output of compressor 500 based on the number of different staged compressed inputs.

In one embodiment system 10 can be used to deliver compressed natural gas to a motor vehicle 20. Additionally, it is envisioned that system 10 may be used to deliver compressed gas to devices other than motor vehicles. For example, apparatus/system 10 can deliver compressed gas to any storage tank, to a self-contained breathing apparatus, a self-contained underwater breathing apparatus, and like. Furthermore, as will be apparent to those skilled in the art, the gas delivered need not be compressed natural gas but may be other gases, e.g., be hydrogen, oxygen, air, or any other compressible gas or fluid. For the sake of simplicity of description, the remainder of this specification will refer to the delivery of compressed natural gas, it being understood that the system is applicable to the delivery of other compressible fluids.

In one embodiment compressor 500 compresses the gaseous fuel, and thereby increases its pressure to a predetermined desired pressure level between tanks in tank array 1000. In one actually-constructed prototype embodiment, such predetermined gas pressure is limited to a 500 psi pressure differential between tanks in tank array 1000. In one embodiment the following set pressure points are desired for an eight tank array 1000.

| Tank number | Predefined Staged High Press Set Point (psi) | Predefined Staged Low Press Set Point(psi) |
| --- | --- | --- |
| T1 1010 | 150 | 150 |
| T2 1020 | 650 | 350 |
| T3 1030 | 1150 | 850 |
| T4 1040 | 1650 | 1350 |
| T5 1050 | 2150 | 1850 |
| T6 1060 | 2650 | 2350 |
| T7 1070 | 3150 | 2850 |
| T8 1080 | 3650 | — |

For the initial fill process when each tank array 1000 is essentially empty, compressor 500 pressurizes each tank (tanks 1010, 1020, 1030, 1040, 1050, 1060, 1070, and 1080) until a first predetermined pressure (e.g., 150 psig) is reached in all tanks. Once 150 psig is reached in each tank, valving is switched such that the first tank 1010 will now serve as the compressor 500 suction tank. The compressor 500 depressurizes the first tank 1010 and pressurizes stages 2 through 8 (tanks 1020, 1030, 1040, 1050, 1060, 1070, and 1080) until the pressure in the first tank 1010 drops below a pressure predetermined first pressure drop (e.g., 50 psig). When the first tank 1010 drops below 100 psig valving is switched such that the first tank 1010 will now be replenished by the 0.5 psig domestic gas supply. Once the first tank 1010 is re-pressurized to 150 psig using compressor 500, and valving is switched again to make the first tank 1010 the compressor 500 suction tank to pressurize tanks 2 through 8 (tanks 1020, 1030, 1040, 1050, 1060, 1070, and 1080). This process is repeated many times over until tanks 2 through 8 (tanks 1020, 1030, 1040, 1050, 1060, 1070, and 1080) reach a pressure of 650 psig.

Once tanks 2 through 8 (tanks 1020, 1030, 1040, 1050, 1060, 1070, and 1080) reach a pressure of 650 psig, valving is switched such that the second tank 1020 now serves as the compressor 500 suction tank for pressurizing tanks 3 through 8 (tanks 1030, 1040, 1050, 1060, 1070, and 1080). Compressor 500 depressurizes the second tank 1020 and pressurizes tanks 3 through 8 (tanks 1030, 1040, 1050, 1060, 1070, and 1080) until the second tank 1020 drops below a pressure predetermined first pressure drop (e.g., 350 psi). Once the second tank 1020 drops below 320 psig, valving is switched such that the first tank 1010 is now the compressor 500 suction tank and the compressor 500 is pressurizing the second tank 1020 (only the second tank because tank 3 is at a higher pressures than tank 2 at this point and the check valve 1034 connecting tanks 2 and 3 blocks flow until the pressure of tank 2 exceeds the pressure of tank 3). Several similar cycles of depleting the first tank 1010 to pressurize the second tank 1020 (and refilling the first tank 1010 with the domestic gas supply) will occur to bring the second tank 1020 back up to a pressure of 650 psig which is the first predefined pressure for the second tank. Once the second tank 1020 achieves a pressure of 650 psig, valving is switched again to make the second tank 1020 the compressor 500 suction tank for pressurizing tanks 3 through 8 (tanks 1030, 1040, 1050, 1060, 1070, and 1080) as the compressor discharge tanks.

Generally the above specified pattern can be repeated up through tank 8 with each lower tank serving as the compressor suction tank once their respective predefined pressure set point value is achieved. Upon the tank pressure dropping below the predefined lower tank value is reached when using a tank as a suction tank for compressor 500, valving is switched to make lower tanks replenish the upper tank. A more detailed method of preparing tank array 1000 is provided below.

Filling Vehicle Tank

Discharge of Gas into Car

In order to discharge gaseous fuel from system 10 into the vehicle storage system 22, the outlet 14 is connected to the vehicle storage system 22, valves 528 and 532 are opened, and valve 524 is closed to minimize backflow through compressor 500. It is noted that when valve 100's second port 260 is fluidly connected to a chosen selector port of first family 109, second selector port 270 from valve 100 is also fluidly connected with a different selector port from first family of ports. As the suction line of compressor 500 is fluidly connected to tanks of staged tank array 100 of increasingly higher pressures, then such increasingly higher pressures can be used as starting pressures to compress above and beyond as such suction pressure fills interior 506 of housing 504.

In a default setting system 10 first fluidly connects first tank 1010 to outlet 14. The pressure of first tank 1010 is monitored for a predetermined period of time to determine whether a transient decrease in tank pressure is seen or pressure has entered a static condition. After no change in pressure of first tank 1010 is seen for a predetermined period of time, system 10 next fluidly connects second tank 1020 to outlet 14. The pressure of second tank 1020 is monitored for a predetermined period of time to determine whether a decrease in tank pressure is seen or pressure has equalized. After no change in pressure of second tank 1020 is seen for a predetermined period of time, system 10 next fluidly connects third tank 1030 to outlet 14. The pressure of third tank 1030 is monitored for a predetermined period of time to determine whether a decrease in tank pressure is seen or pressure has equalized. After no change in pressure of third tank 1030 is seen for a predetermined period of time, system 10 next fluidly connects fourth tank 1040 to outlet 14. The pressure of fourth tank 1040 is monitored for a predetermined period of time to determine whether a decrease in tank pressure is seen or pressure has equalized. After no change in pressure of fourth tank 1040 is seen for a predetermined period of time, system 10 next fluidly connects fifth tank 1050 to outlet 14. The pressure of fifth tank 1050 is monitored for a predetermined period of time to determine whether a decrease in tank pressure is seen or pressure has equalized. After no change in pressure of fifth tank 1050 is seen for a predetermined period of time, system 10 next fluidly connects sixth tank 1060 to outlet 14. The pressure of sixth tank 1060 is monitored for a predetermined period of time to determine whether a decrease in tank pressure is seen or pressure has equalized. After no change in pressure of sixth tank 1060 is seen for a predetermined period of time, system 10 next fluidly connects seventh tank 1070 to outlet 14. The pressure of seventh tank 1070 is monitored for a predetermined period of time to determine whether a decrease in tank pressure is seen or pressure has equalized. After no change in pressure of seventh tank 1080 is seen for a predetermined period of time, system 10 next fluidly connects eight tank 1080 to outlet 14. The pressure of eighth tank 1080 is monitored for a predetermined period of time to determine whether a decrease in tank pressure is seen or pressure has equalized. After no change in pressure of eighth tank 1080 is seen for a predetermined period of time, system 10 enters a "topping off" mode depending on the amount of extra compressed gas to be offloaded into vehicle's tank 22.

Single Selecting Valve Embodiment

FIGS. 1-8 and 9-39 show one embodiment of a single selecting valve 100. Selecting valve 100 can be used to operatively connect suction and discharge ports of compressor 500 to selected tanks the tank array 1000 (with suction port also being connectable to exterior gas source 16).

The number of ports in first family of ports 109 can be 4, 5, 6, 7, 8, 9, 10, 11, 12, 13, 14, 15, 16, 17, 18, 19, and/or 20 ports. In various embodiments there can be a range of number of ports in first family of ports 109 between any two of the above specified numbers.

The number of ports in second family of ports 209 can be 2, 3, 4, and/or 5. In various embodiments there can be a range of number of ports in second family of ports 209 between any two of the above specified numbers.

Generally, selecting valve 100 can include first family of selectable ports 109 and second family of selectable ports 209, wherein two of the ports from the second family of selectable ports can be selected to be fluidly connected with two of the first family of selectable ports 109. First family of ports 109 can include a plurality of ports 101, 110, 120, 130, 140, 150, 160, 170, and 180. Second family of ports can include a plurality of ports 260 and 270.

Generally, valve 100 can comprise top 400, selector 300, and body 200. Selector 300 can be rotatively connected to both top 400 and body 200.

In one embodiment top 400 can include first family of ports 109, and body 200 can include second family of ports 209.

Figure 9:
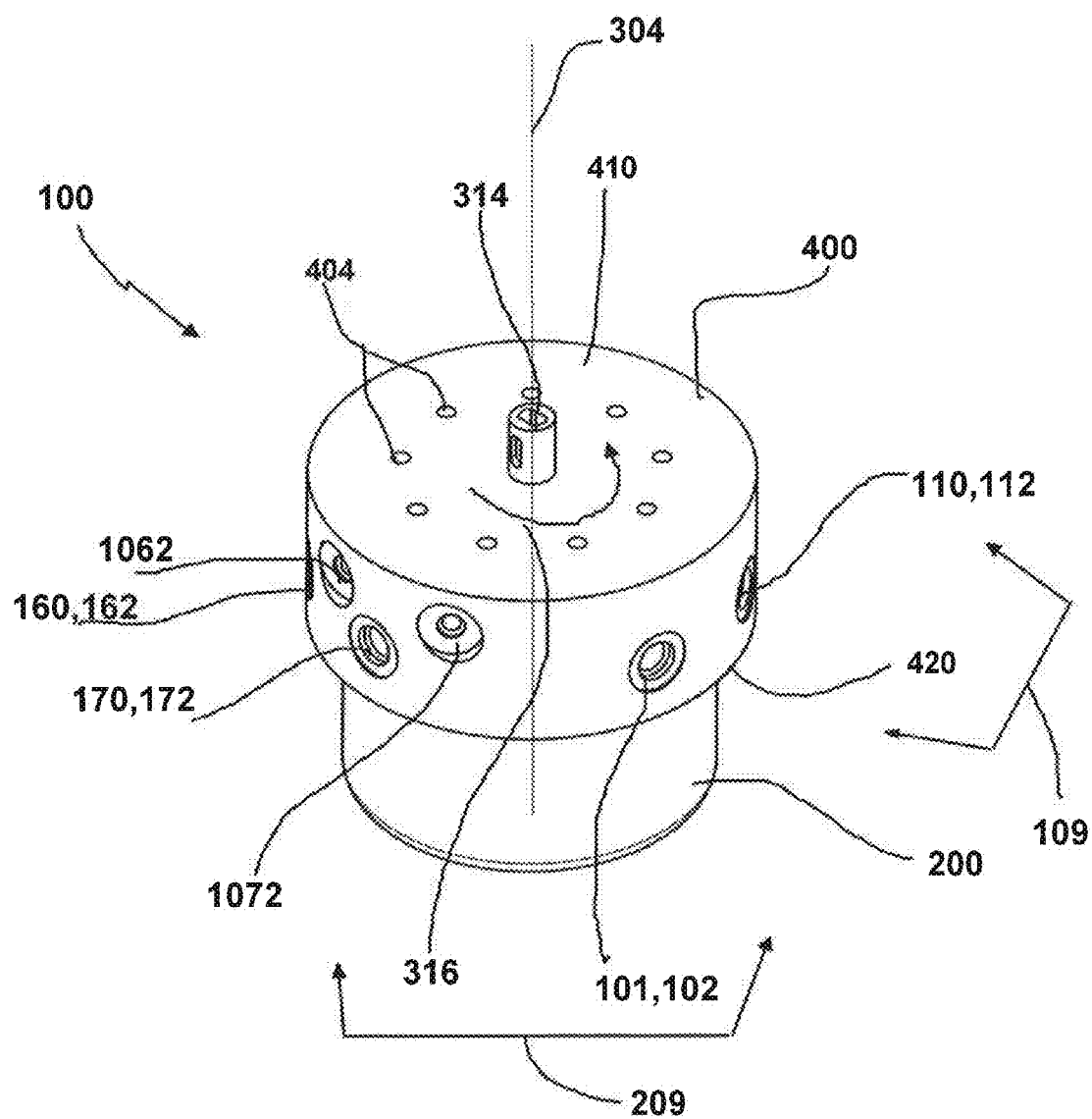
FIG. 9 is a perspective view of a multi family multi port selector valve which can be used to connect the suction and discharge lines of the compressor to selected different suction source and selected different discharge from the compressor.
Figure 10:
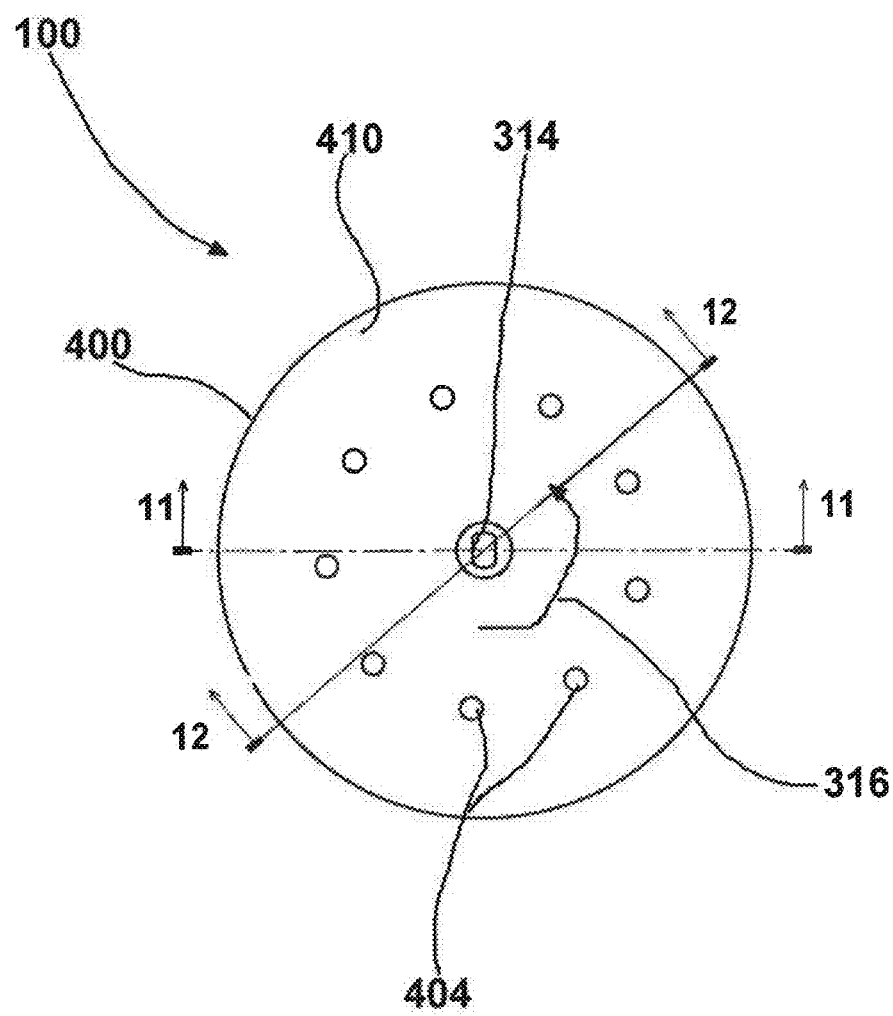
FIG. 10 is a top view of the valve of FIG. 9.
Figures 11, 12:
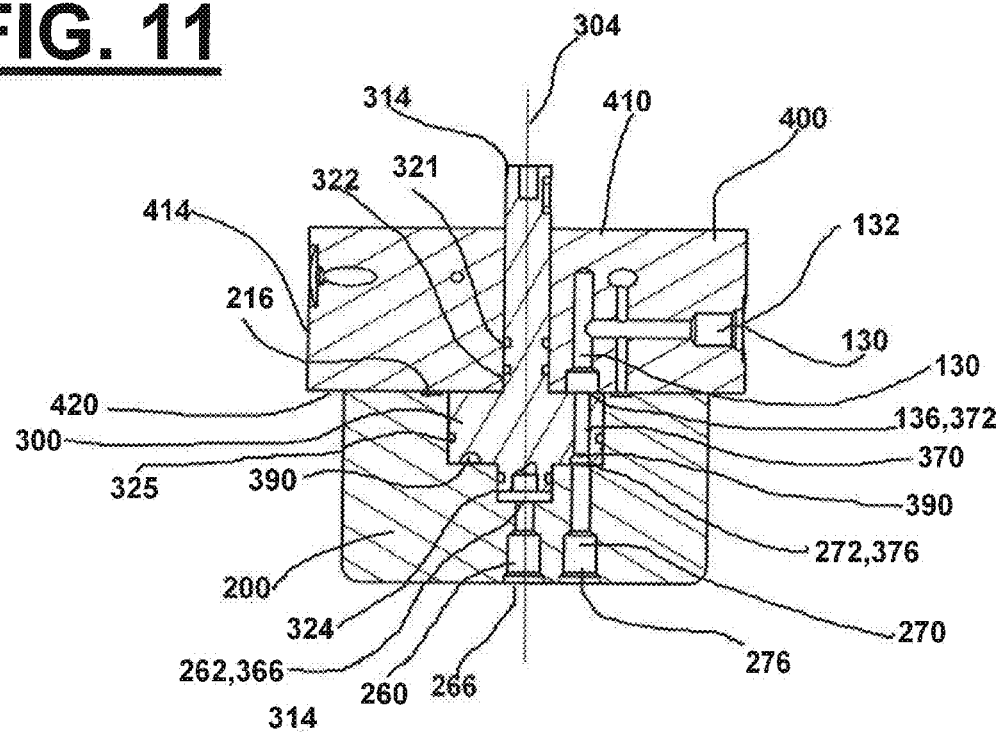
FIG. 11 is a sectional view of the valve of FIG. 9 taken along the lines 11-11 shown in FIG. 10.
FIG. 12 is a sectional view of the valve of FIG. 9 taken along the lines 12-12 shown in FIG. 10.

FIG. 9 is a perspective view of multi family multi port selector valve 100 which can be used to connect the suction 510 and discharge 520 lines of the compressor 500 to selected different suction source and selected different discharge from the compressor 500. FIG. 10 is a top view of valve 100. FIG. 11 is a sectional view of valve 100 taken along the lines 11-11 shown in FIG. 10. FIG. 12 is a sectional view of valve 100 taken along the lines 12-12 shown in FIG. 10.

Figure 13:
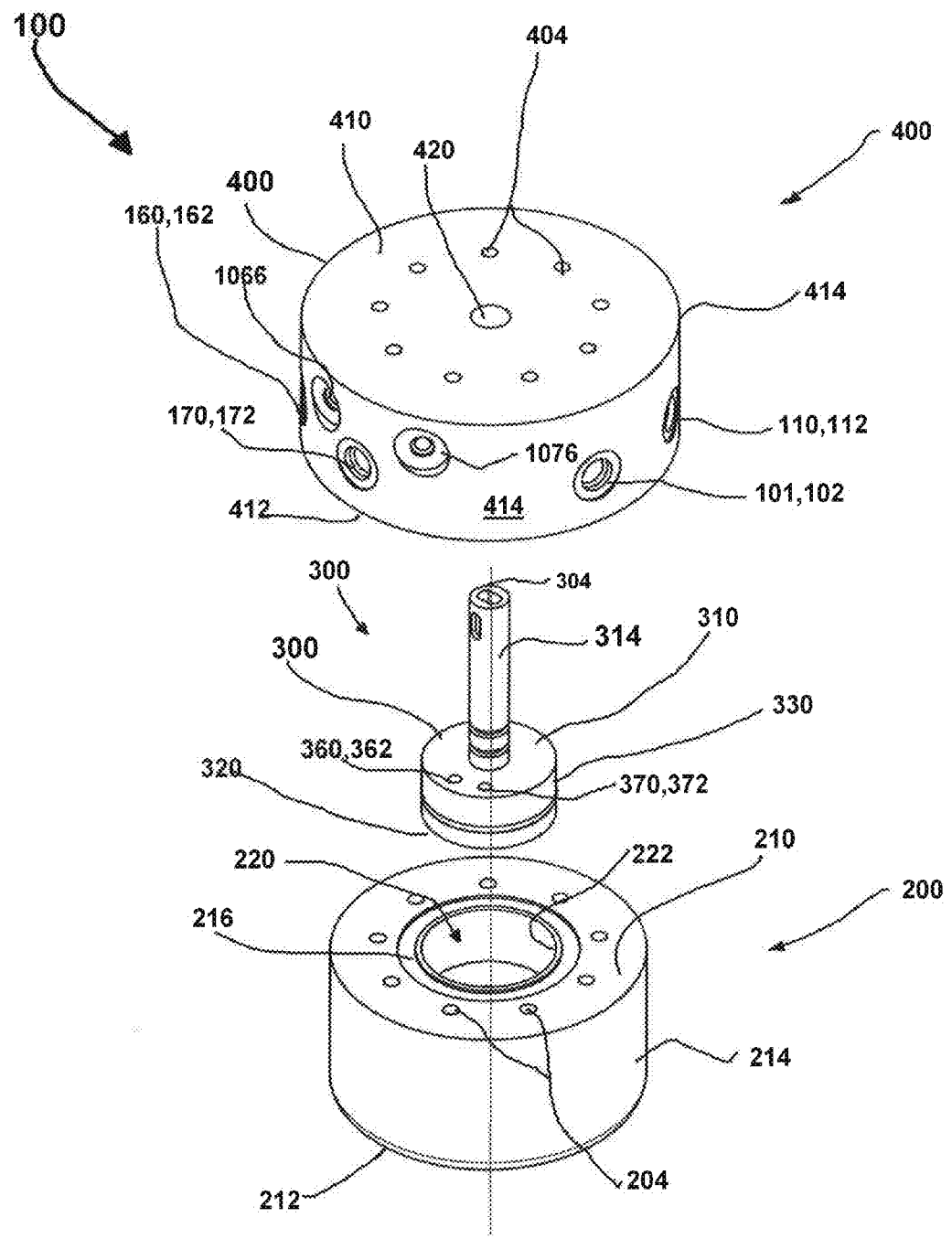
FIG. 13 is a top exploded view of the valve of FIG. 9 showing the three main components: (1) top with selector and check valve porting; (2) selector with selector porting; and body with selector recess and base porting.

FIG. 13 is a top exploded view of the valve 100 showing the three main components: (1) top 400 with first family of selector porting 109 and check valve porting; (2) selector 300 with selector porting; and body 200 with selector recess 200 and second family of selector porting 209 or base porting.

Figure 14:
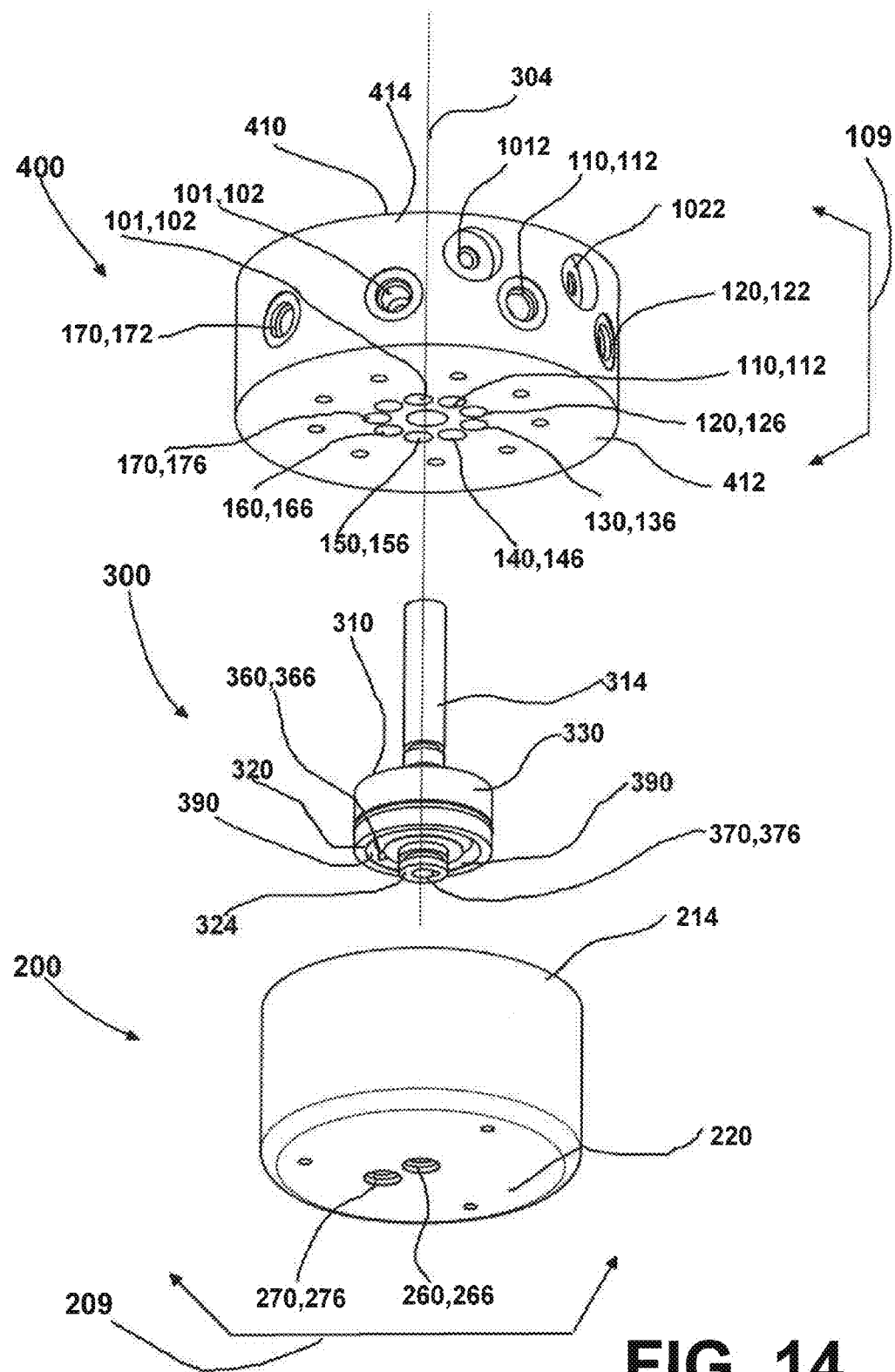
FIG. 14 is a bottom exploded view of the valve of FIG. 9 showing the three main components: (1) top with selector and check valve porting; (2) selector with selector porting; and body with selector recess and base porting.

FIG. 14 is a bottom exploded view of valve 100 showing the three main components: (1) top with selector and check valve porting; (2) selector with selector porting; and body with selector recess and base porting.

FIG. 15 is a side view of the top of the valve 100 showing both the lower selector porting (first family 109 of selector porting) and the upper check valve porting with check valves being omitted from the check valve porting (and with only seven selector ports 101, 110, 120, 130, 140, 150 and 160 included in this version ease of discussion).

FIG. 16 is a translucent top view of the top 400 of valve 100 showing both the lower selector porting (first family 109 of selector porting) and the upper check valve porting (and with only seven selector ports 101, 110, 120, 130, 140, 150 and 160 included in this version ease of discussion).

FIGS. 16 and 17 include representative diagrams of a check valve port 1024 with a check valve included in the port. Those skilled in the art will recognize that the check valve 1024 can comprise ball 1260 and spring 1270 components. Spring 1270 will push ball 1260 in the direction of arrow 1220 blocking flow in check valve 1024 in the direction of arrow 1220 because gas attempting to flow in the direction of arrow 1220 will be blocked by ball 1260 sealing the port for flow going past ball 1260, while gas attempting to flow in the direction of arrow 1210 will place a force on ball 1260 and, if enough force on ball 1260 is seen, move both ball 1260 and spring 1270 in the direction of arrow 1210, and allow flow in the direction of arrow 1240 until spring 1270 overcomes such gaseous force and pushes back ball 1270 to seal the port.

Figure 18:
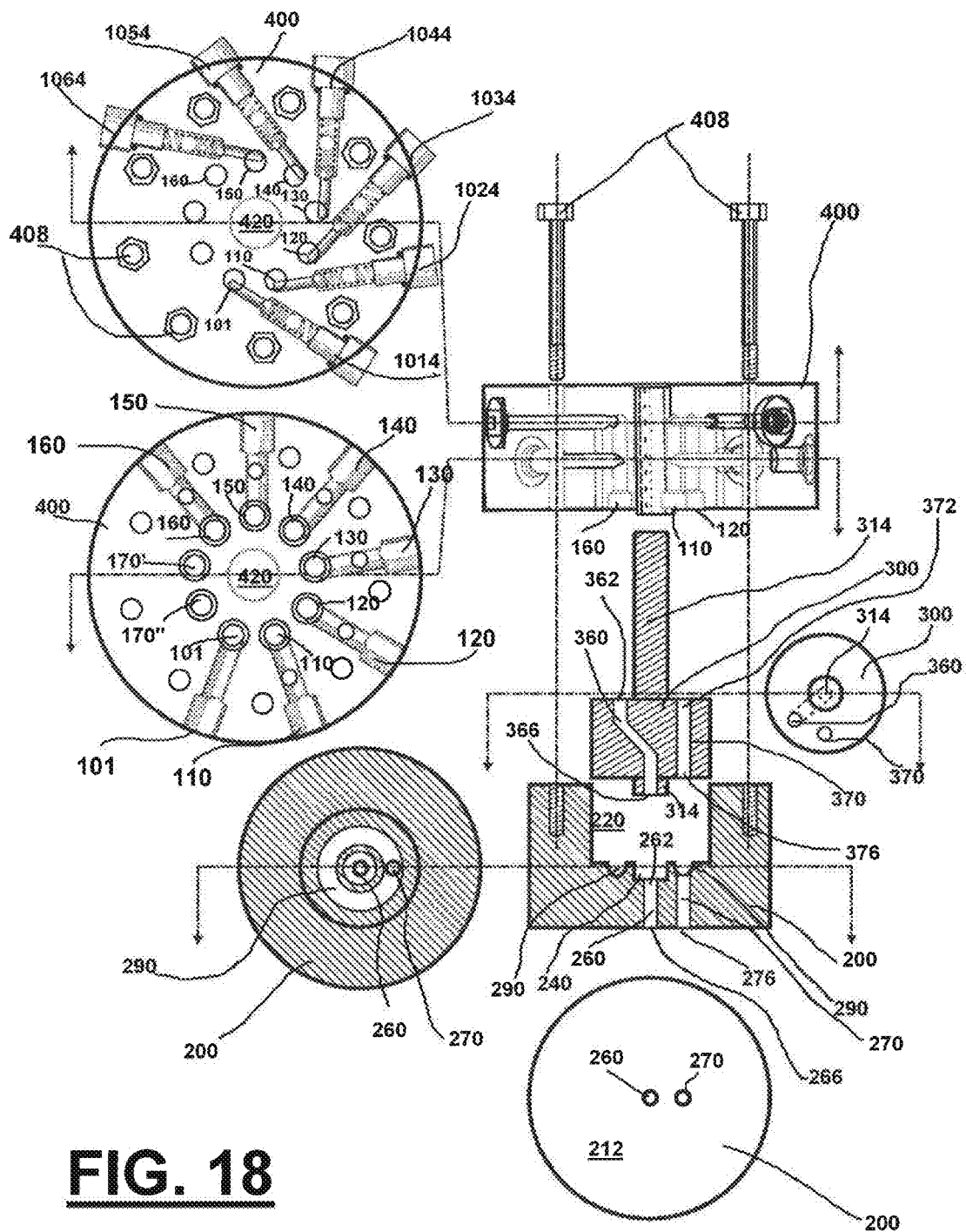
FIG. 18 includes various views of the exploded valve of FIG. 9 (and with only seven selector ports included in this version for drawing clarity and ease of discussion.

FIG. 18 includes various views of the exploded valve 100 (and with only seven selector ports 101, 110, 120, 130, 140, 150, and 160 of the first family 109 included in this version for drawing clarity and ease of discussion). Several of the cutaway views in FIG. 18, while not technically correct have been edited for clarity of presentation. Rather than mirror port and check valve cutaways as is shown by the direction arrows, they are oriented the same way for ease of understanding. The cutaway of the selector spool 300 doesn't exist as a flat plane but are showing together in the same page to make clearer the simultaneous fluid connections conduits 360 and 370 and first and second selector ports 260 and 270 of the second family of ports 209.

In one embodiment valve 100 can be operated to select a plurality of ports from the first family 109 to be fluidly connected with a plurality of ports with the second family 209, and such selected plurality of ports from the first 109 and second 209 families to be fluidly connected to each other can be changed by operation of the valve 100.

As best seen in FIGS. 11, 12, and 18, selector 300 can be used to select which ports from the first family of ports 109 will be selectively connected to which ports of the second family of ports 209. Valve 100 in this embodiment includes a second family of ports 209 having two ports 260, 270 which are selectively connected to a selected two of the first family of ports 109. That is, valve 100 allows two ports of the first family 109 to be connected to a selected two ports of the second family 209.

To operate as a port selector between the first 109 and second 209 family of ports, selector 300 includes two selector conduits—first conduit 360 and second conduit 370. In this embodiment, regardless of the position of selector 300, first selector conduit 360 remains fluidly connected to first port 260 of second family of ports 209, however, first selector conduit 360 can be selectively connected to a selected one of the first family of ports 109 (e.g., port 101, 110, 120, 130, 140, 150, 160, 170, and/or 180). In this embodiment, regardless of the position of selector 300, second selector conduit 370 remains fluidly connected to second port 270 of second family of ports 209, however, second selector conduit 370 can be selectively connected to a selected one of the first family of ports 109 (e.g., port 101, 110, 120, 130, 140, 150, 160, 170, and/or 180). Selection of what port from the first family of ports 109 first selector conduit 260 is connected to and what port from the first family of ports 109 second selector conduit 270 is connected to can be controlled by rotation of selector 300 relative to top 400.

In this embodiment, which pair of ports from the first family of ports 109 is connected to first 360 and second 370 conduits of selector 300 is dependent on the spaced geometry of upper/first connector 362 of first conduit compared to upper/first connector 372 of second conduit in relation to the geometry of second connectors (106, 116, 126, 136, 146, 156, 166, 176, 186) of first family of ports 109 (101, 110, 120, 130, 140, 150, 160, 170, 180).

Figure 22A:
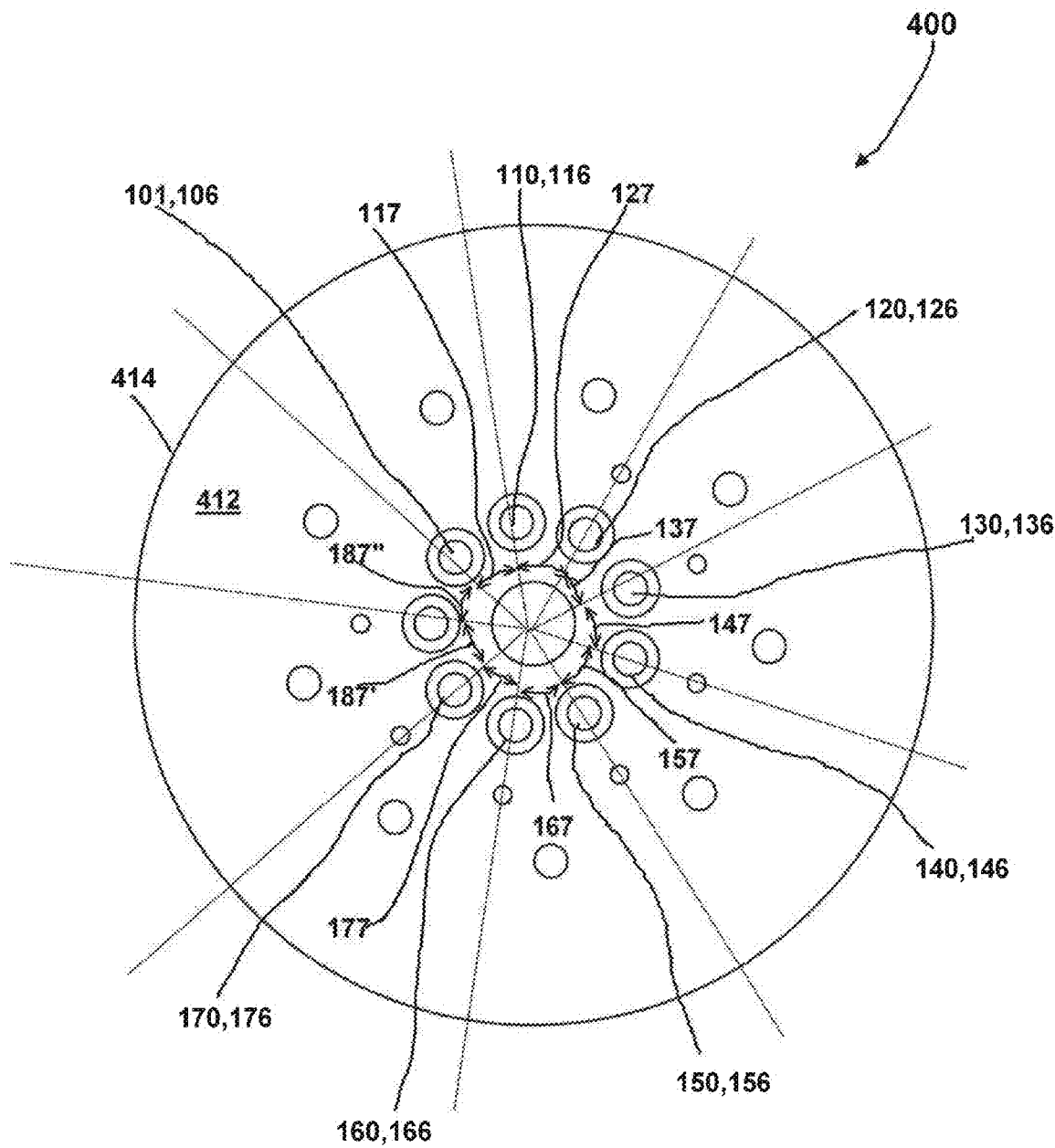
FIGS. 22A and 22B are bottom views of the top portion of the valve of FIG. 9 showing selector and check valve porting.
Figure 22B:
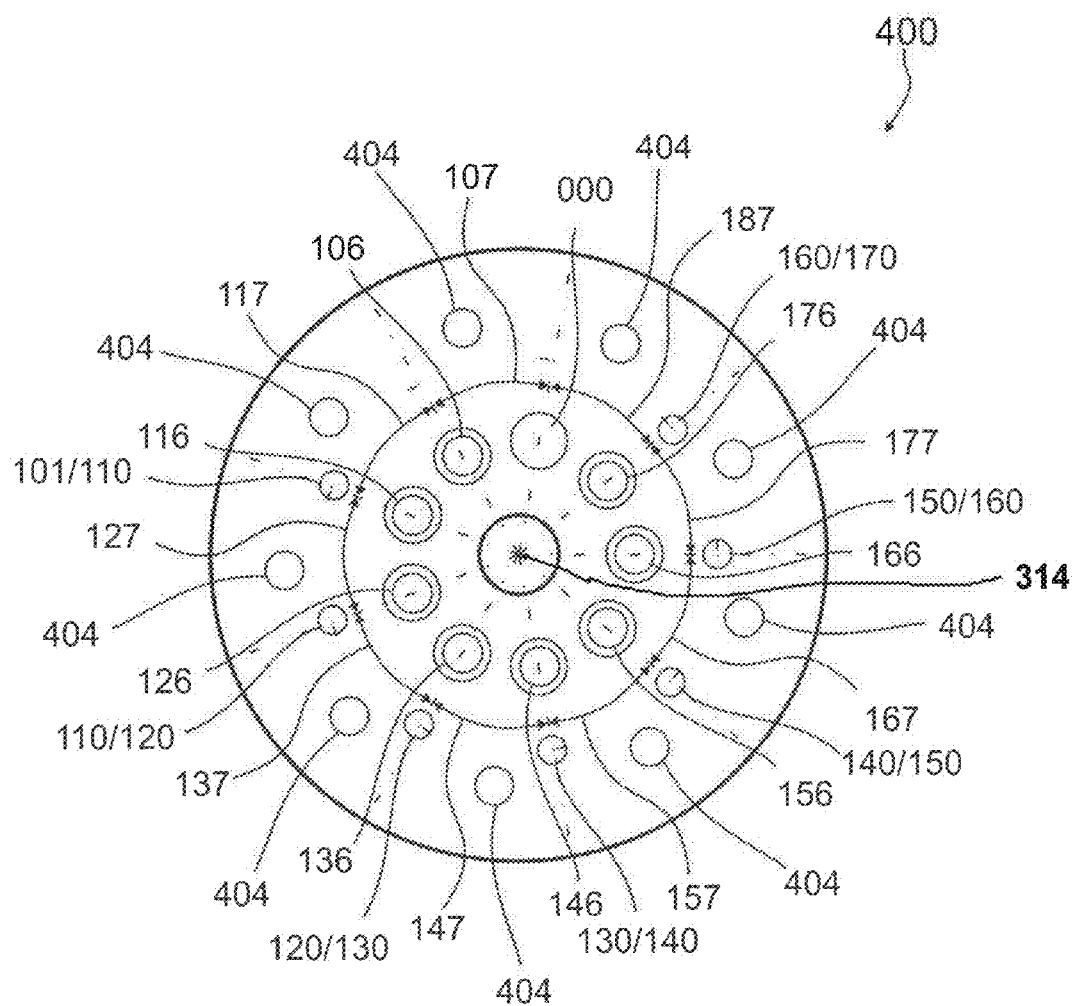
Figure 31:
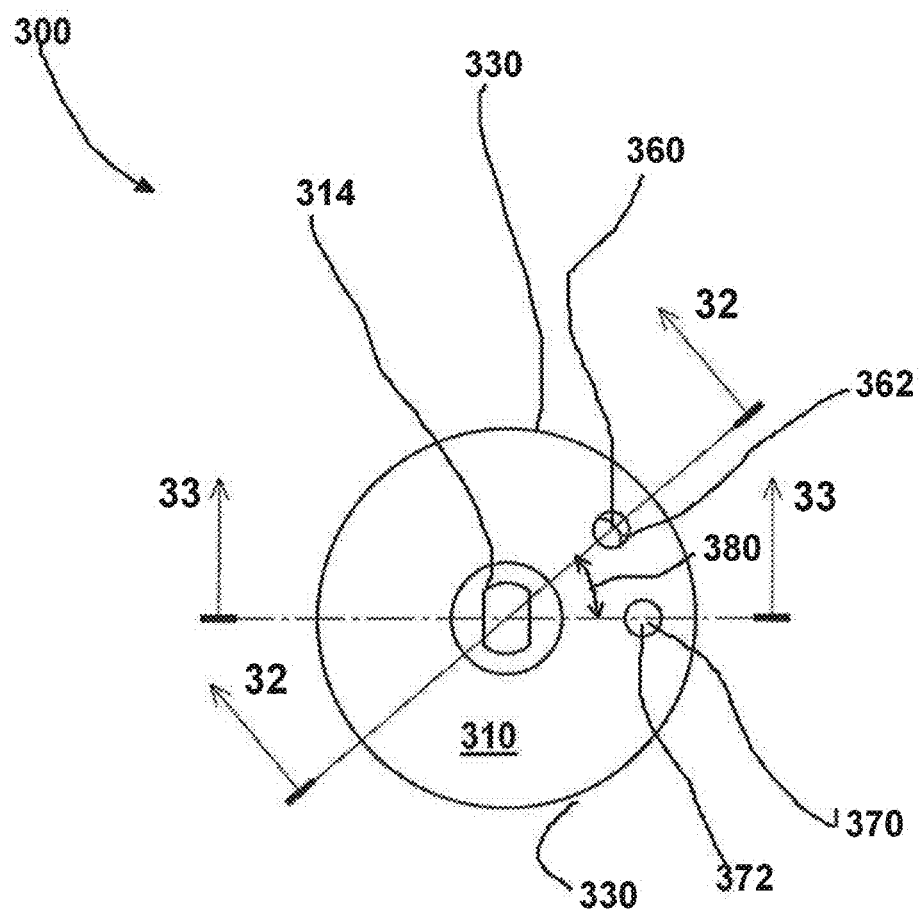
FIG. 31 is a top view of the selector shown in FIG. 27.
Figures 32, 33:
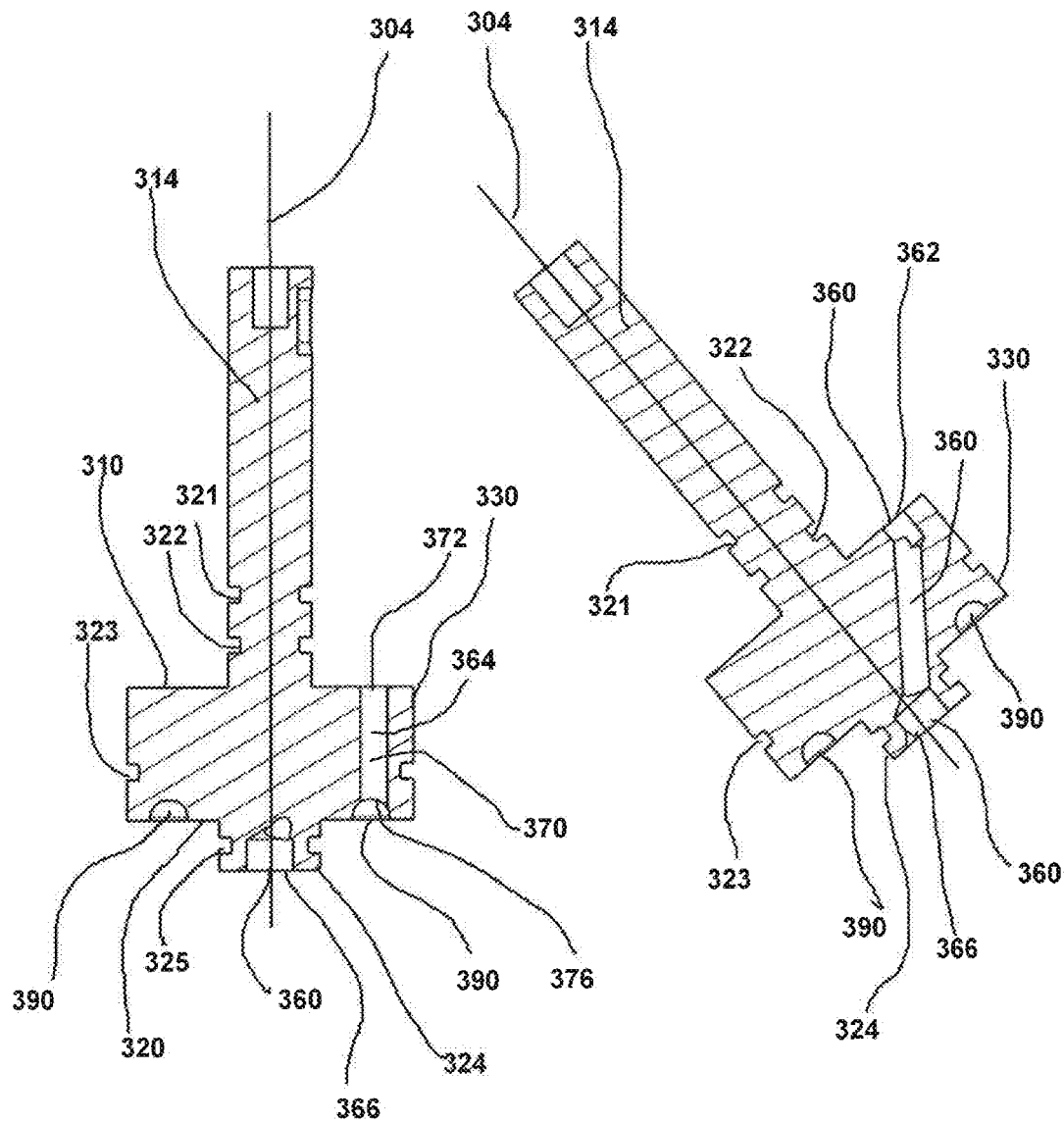
FIG. 32 is a sectional view of the selector of FIG. 28 taken along the lines 32-32 shown in FIG. 31.
FIG. 33 is a sectional view of the selector of FIG. 28 taken along the lines 33-33 shown in FIG. 31.

As best shown by FIG. 31 first connectors (362 and 372) of first and second conduits (360 and 370) can be spaced about a circle centered around the rotational axis 304 between selector 300 and top 400 with an angular spacing of angle 380. Similarly, as best shown by FIGS. 22A and 22B, second connectors (106, 116, 126, 136, 146, 156, 166, 176, 186) of first family of ports 109 (101, 110, 120, 130, 140, 150, 160, 170, 180) can likewise be symmetrically spaced about a circle centered around the rotational axis 304 between selector 300 and top 400. The symmetrical spacing is schematically indicated by double arrows 107, 117, 127, 137, 147, 157, 167, 177, 187', and 187" wherein the angles 107, 117, 127, 137, 147, 157, 167, and 177 are equal to each other to obtain symmetry. The angular spacing 380 can be an integer multiple of the angular spacing between second connectors (106, 116, 126, 136, 146, 156, 166, 176, 186) of first family of ports 109 (101, 110, 120, 130, 140, 150, 160, 170, 180); wherein the integer can be 1, 2, 3, 4, 5, 6, 7, 8, 9, and/or 10 (or any range between any two of these integers). Port 000 is labeled only as a dead port and will not allow gas flow.

As disclosed in this embodiment angle 380 is equal to the angular spacing between second connectors (106, 116, 126, 136, 146, 156, 166, 176, 186) of first family of ports 109 (101, 110, 120, 130, 140, 150, 160, 170, 180). With an equal spacing (i.e., integer multiple of 1), first and second conduits 360 and 370 can only be fluidly connected with adjacent ports of the first family of ports 109 (and therefore first and second ports 260 and 270 of the second family of ports can only be fluidly connected to adjacent ports of the first family of ports 109). The following table provides examples of fluid port connections between first family 109, selector conduits, and second family of ports 209.

On the other hand if the integer multiplier is 2 (angle 380 is twice the size of the angles between second connectors (106, 116, 126, 136, 146, 156, 166, 176, 186) of first family of ports 109 (101, 110, 120, 130, 140, 150, 160, 170, 180), then first and second conduits 360 and 370 can only be fluidly connected with one port skipped adjacent ports of the first family of ports 109 (and therefore first and second ports 260 and 270 of the second family of ports can only be fluidly connected to one port skipped adjacent ports of the first family of ports 109)

The numbers of ports in first family of ports 209 can be varied to provide a user with the desired number of ports from which to select fluid connections with. However, the angular spacing between the second connectors (e.g., angular spacing 117 between second connectors 106 and 116 of ports 101 and 110 should be equal to the angular spacing 127 between second connectors 116 and 126 of ports 110 and 120 should be equal to the angular spacing, 126, etc.) should remain equal, and such angular spacing should be an integer multiple of the angular spacing between first connectors 362 and 372 of first and second conduits 360 and 370 of selector 300. Such a construction allows selected fluid connection between selected plurality of ports in the first family 109 with a selected plurality of ports in the second family 209.

Below is a table listing various examples of selected fluid connection between selected plurality of ports in the first family 109 with a selected plurality of ports in the second family 209.

Each row shows the fluid port connections for a selected position or option with respect to valve 100. The listed Positions and first and second selector port family connections are also shown schematically in FIG. 1A.

TABLE 1

Listing of Selected Port Fluid Connections Options:

| Position Selected | 1st Family 109 Ports | Selector 300 Fluid Connection | 2nd Family 209 Ports |
|---|---|---|---|
| 1 | 101 | 370 | 270 |
|   | 110 | 360 | 260 |
| 2 | 110 | 370 | 270 |
|   | 120 | 360 | 260 |
| 3 | 120 | 370 | 270 |
|   | 130 | 360 | 260 |
| 4 | 130 | 370 | 270 |
|   | 140 | 360 | 260 |
| 5 | 140 | 370 | 270 |
|   | 150 | 360 | 260 |
| 6 | 150 | 370 | 270 |
|   | 160 | 360 | 260 |
| 7 | 160 | 370 | 270 |
|   | 170 | 360 | 260 |
| 8 | 170 | 370 | 270 |
|   | 180 | 360 | 260 |
| 9 | 180 | 370 | 270 |

With the above Table 1, it should be noted that, even with stage changes, the fluid connections between selector conduits 360 and 370 and the second family of ports 260 remain the same. That is regardless of the position of selector relative to valve, first conduit 360 of selector 300 remains fluidly connected with first port 260 of second family of ports 209, and second conduit 370 of selector 300 remains fluidly connected with second port 270 of second family of ports 209.

In one embodiment rotation of selector 300 selects which plurality of ports from first family 109 are fluidly connected with which plurality of ports from second family 209.

Figure 40:
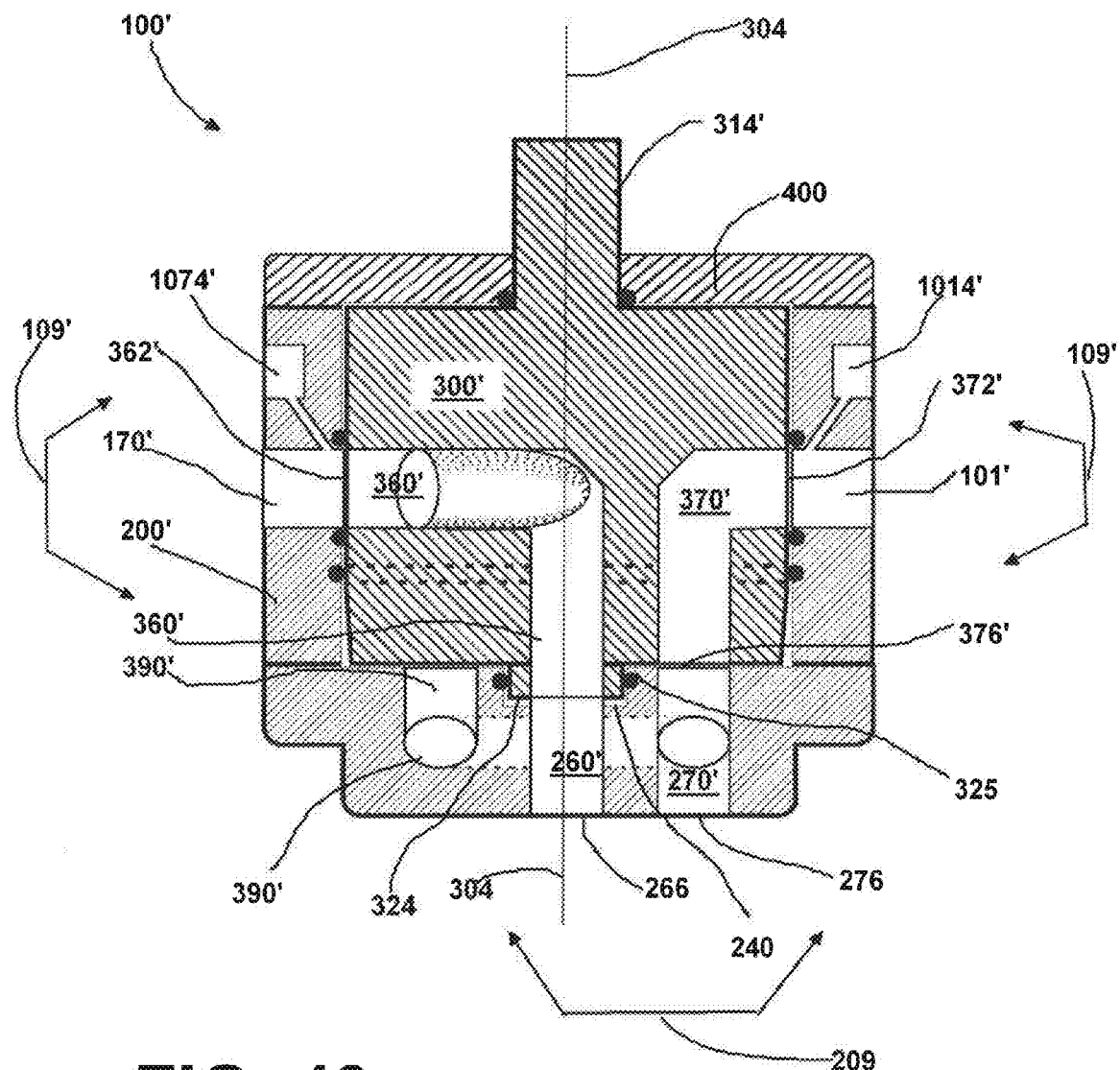
FIG. 40 is a schematic diagram of another embodiment of a selecting valve which is modified from the construction of the valve shown in FIG. 9 by having the selector porting and check valve porting in the body of the valve instead of in the top of the valve.

In the preferred embodiment first plurality of ports 109 can be included in top 400, and second family of ports 209 can be included in bottom. In an alternative embodiment first family or ports 109' can be included in body 200 as well as second family of ports 209 (this is schematically shown in FIG. 40). In other embodiments first family of ports 109 can be partly located in top 400 and partly located in body 200.

In other embodiments (not shown) it is envisioned that first family of ports 109 and second family of ports 209 can be located in top 400 (although such is not preferred as it would complicate the construction and fabrication of top 400 and operation of valve 100).

The individual components of this embodiment of selector valve 100 will not be reviewed.

Top

Figure 19:
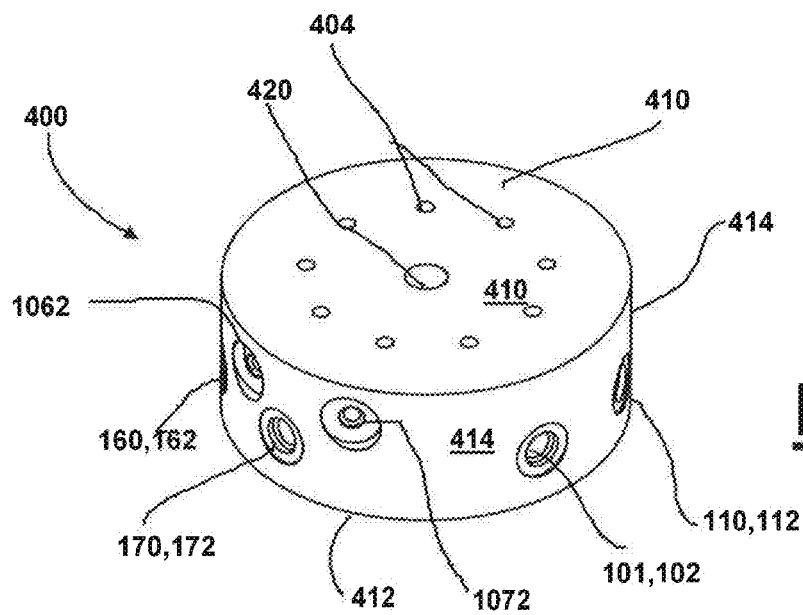
FIG. 19 is a top perspective view of the top portion of the valve of FIG. 9 showing selector and check valve porting.
Figure 20:
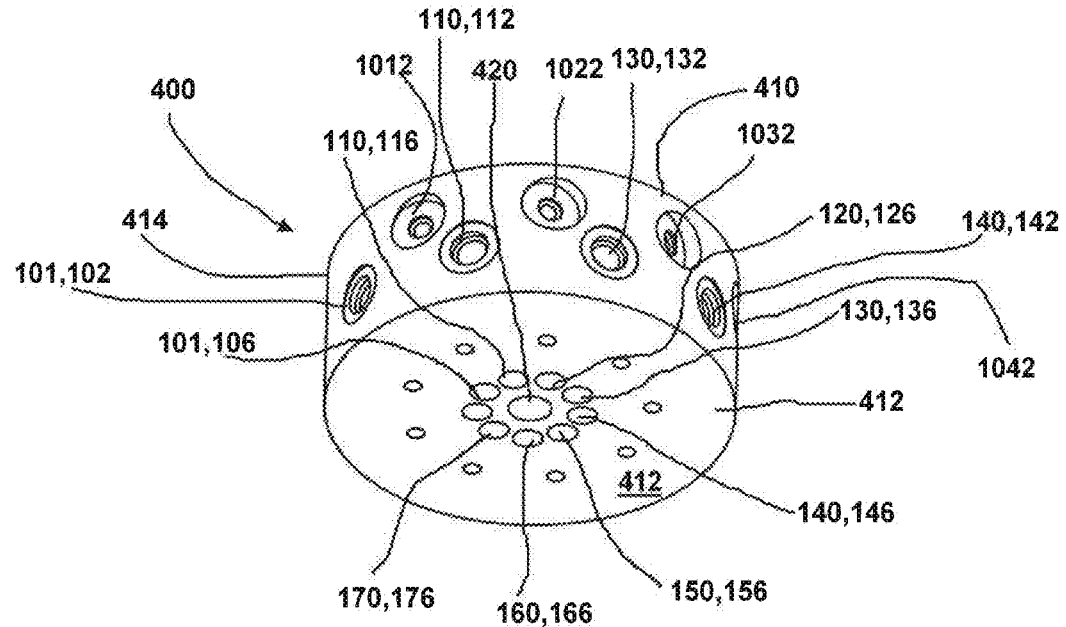
FIG. 20 is a bottom perspective view of the top with selector and check valve porting.
Figure 21:
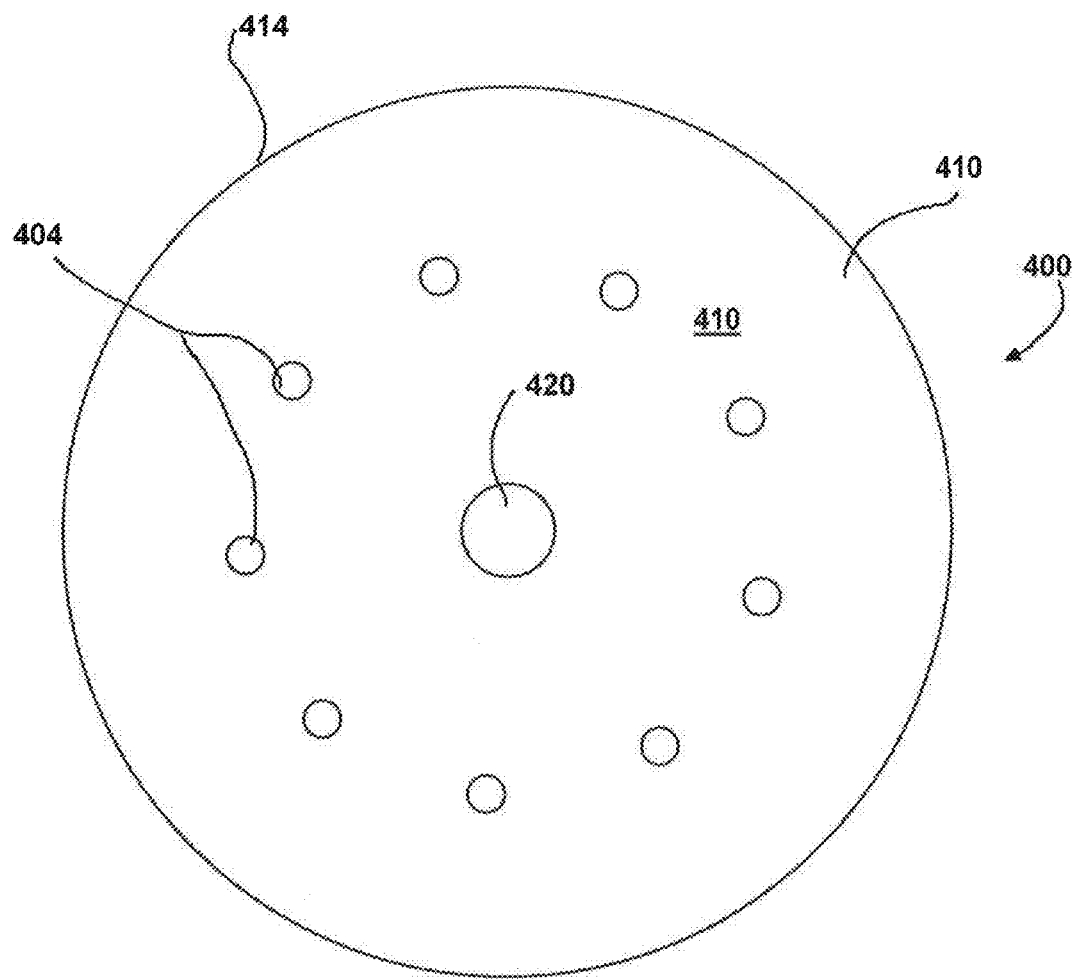
FIG. 21 is a top view of the top portion of the valve of FIG. 9 showing selector and check valve porting.

FIGS. 19 and 20 are respectively top and bottom perspective views of the top portion 400 of valve 100 showing selector first family 109 and check valve porting. FIGS. 21 and 22 (22A and 22B) are respectively top and bottom views of top portion 400.

Top 400 can include upper portion 410, lower portion 420, and outer periphery 414 thereby being cylindrical in shape. Top 400 can also include a plurality of connector openings 404 which can be used to connect top 400 to valve 100 (e.g., by body 200 as schematically indicated in FIG. 18). The shape of top 400 does not have to be cylindrical and other shapes are contemplated. It is only the circular pattern of second connectors (e.g., 106, 116, 126, 136, 146, 156, 166, 176, etc.) that is required in order to match up with first connectors 362 and 372 of first and second conduits 360 and 370 of selector that need to match up to provide that ability to select between first 109 and second 209 families of ports for fluid connection.

Top 400 can also include opening 420 for rod 314 of selector 300 which will control the rotational axis 304 between selector 300 and valve 100.

Figure 24:
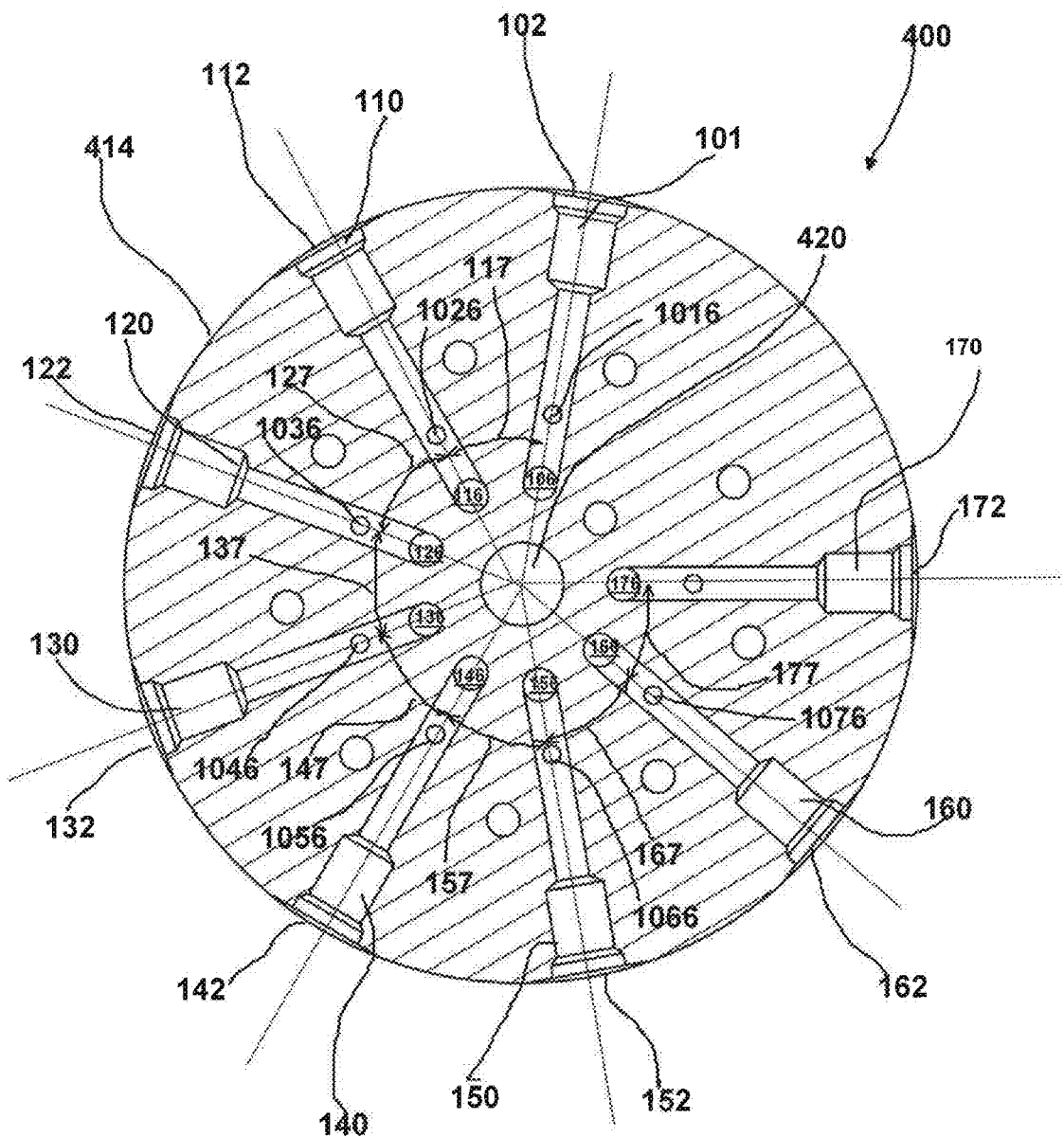
FIG. 24 is a sectional view of the top of the valve of FIG. 9 taken along the lines 24-24 shown in FIG. 23.

Generally, top 400 includes a plurality of selector porting 430 which includes the first family 109 of selector ports. FIG. 23 is a side view of the top portion 400. FIG. 24 is a sectional view taken along the lines 24-24 of FIG. 23. Generally, in this embodiment top 400 has two sets of porting: (1) selector porting for the first family of ports 109 and (2) check valve porting which can be used to provide secondary fluid connection between specific selector ports of the first family of ports 109.

As shown in the embodiment of FIG. 24, eight selector ports are shown which include zero selector port 101 having first 102 and second 106 connectors; first selector port 110 having first 112 and second 116 connectors; second selector port 120 having first 122 and second 126 connectors; third selector port 130 having first 132 and second 136 connectors; fourth selector port 140 having first 142 and second 146 connectors; fifth selector port 150 having first 152 and second 156 connectors; sixth selector port 160 having first 162 and second 166 connectors; and seventh selector port 170 having first 172 and second 176 connectors. As noted previously, the angular spacing between radially adjacent second connectors of selector porting should be equal, and angles 117, 127, 137, 147, 157, 167, and 167 should be equal. The angle between ports second connectors 106 of zero port 101 and second connector 176 of seventh port 170 does not have to be equal to the other angular spacing as this is dead space where the first connectors 362 and 366 of selector 300 moving in such dead space area will not be fluidly connected to any of the selector ports of the first family 109 of selector porting. However, as discussed elsewhere, regardless of the position of selector 300, first and second conduits 360 and 370 remain fluidly connected respectively with first and second ports 260 and 270 of the second family of selector porting 209.

FIG. 15 is a side view of the top of the valve 100 showing both the lower selector porting (first family 109 of selector porting) and the upper check valve porting with check valves being omitted from the check valve porting (and with only seven selector ports 101, 110, 120, 130, 140, 150 and 160 included in this version ease of discussion). FIG. 16 is a top view of the top 400 of valve 100 showing both the lower selector porting (first family 109 of selector porting) and the upper check valve porting with check valves being omitted from the check valve porting (and with only seven selector ports 101, 110, 120, 130, 140, 150 and 160 included in this version ease of discussion).

Figure 25:
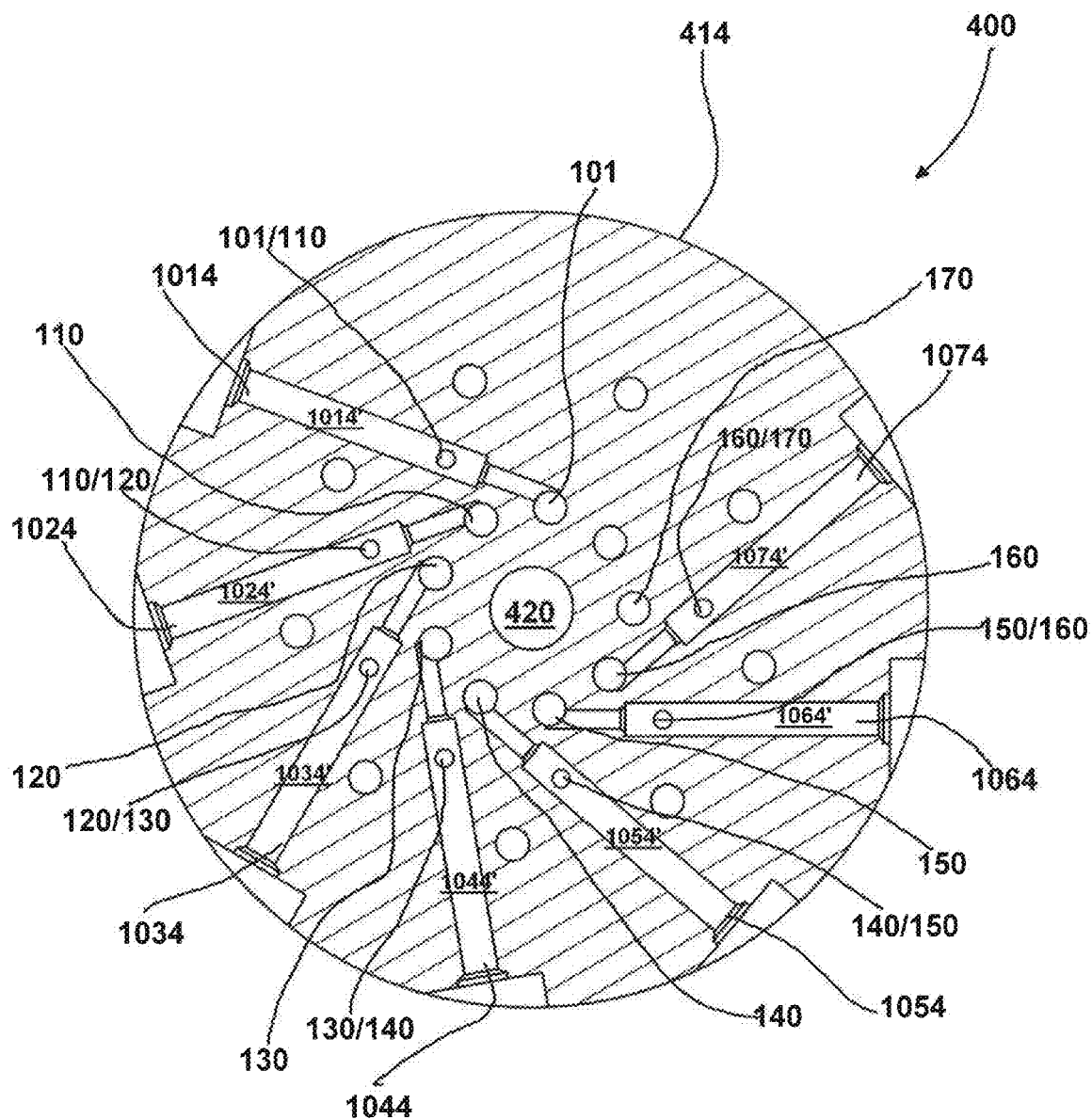
FIG. 25 is a sectional view of the top of the valve of FIG. 9 taken along the lines 25-25 shown in FIG. 23 but with check valves omitted for clarity.
Figure 26:
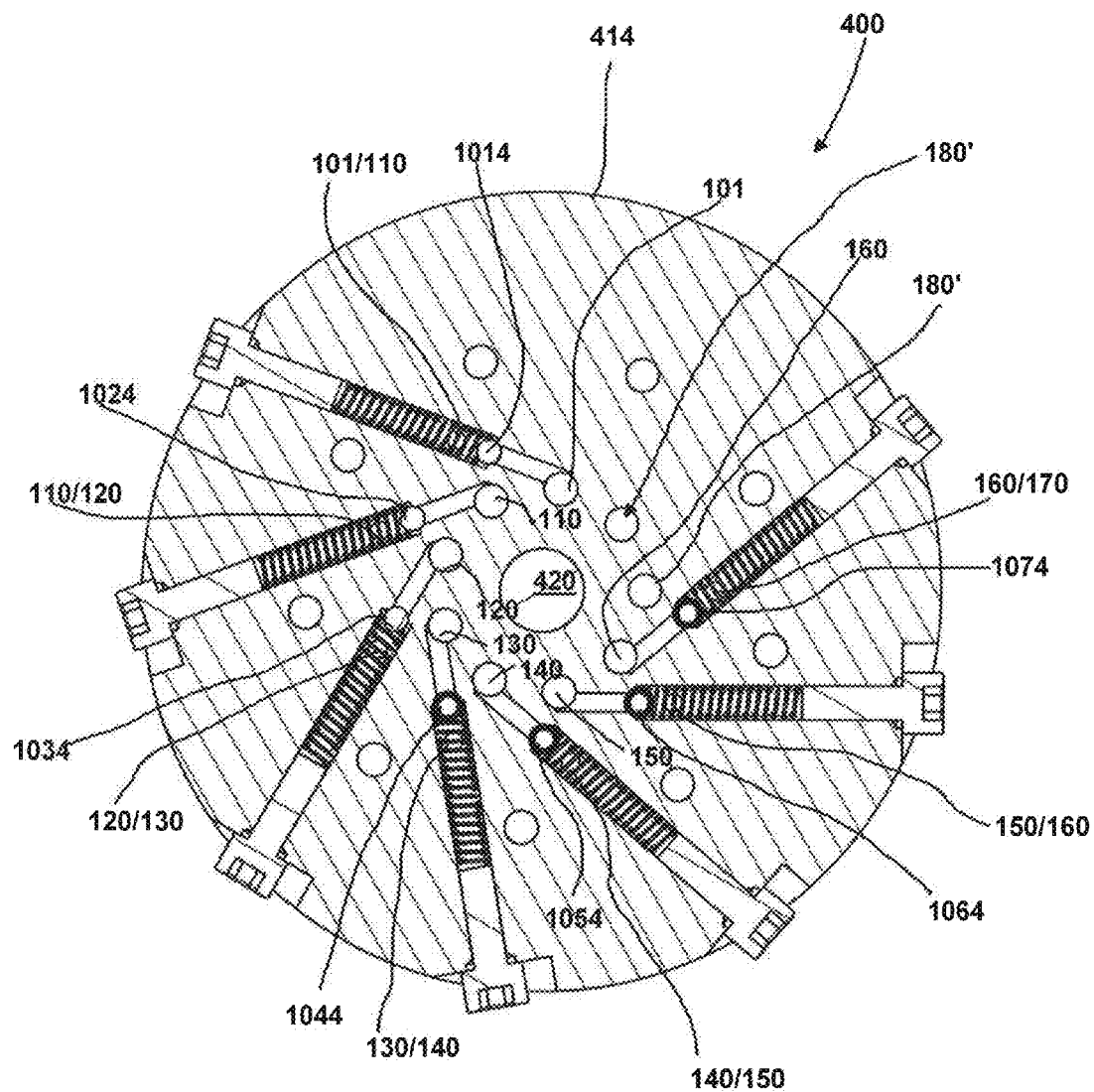
FIG. 26 is a sectional view of the top of the valve of FIG. 9 taken along the lines 25-25 shown in FIG. 23, this figure including check valves in the check valve porting.

FIG. 25 is a sectional view taken along the lines 25-25 of FIG. 23 (but with check valves omitted for clarity). FIG. 26 is a sectional view taken along the lines 25-25, but with check valves included.

Generally, top 400 can also include a plurality of alternative flow check valve porting 450 which, regardless of the position chosen for selector 300 relative to valve 100, check valve porting 450 fluidly connects individual pairs of ports in the first family 109 of selector ports for fluid flow in a first direction as long as pressure between the connected ports exceeds the pressure required to overcome the check valve closing action, but does not allow fluid flow in a second direction, which is opposite to the first direction between the connected ports regardless of differential pressures between selector ports. In one embodiment adjacent selector porting of the first family 109 of ports can be chained via check valve porting to fluidly connect more than single pairs of first family ports.

As shown in the embodiment of FIGS. 24-26, seven check valve ports are shown which include check valve port 1014' having first 1015 and second 1016 ends (between zero selector port 101 and first selector port 110); check valve port 1024' having first 1025 and second 1026 ends (between first selector port 110 and second selector port 120); check valve port 1024' having first 1025 and second 1026 ends (between second selector port 120 and third selector port 130); check valve port 1044' having first 1415 and second 1046 ends (between third selector port 130 and fourth selector port 140); check valve port 1054' having first 1055 and second 1056 ends (between fourth selector port 140 and fifth selector port 150); check valve port 1064' having first 1065 and second 1066 ends (between fifth selector port 150 and sixth selector port 160); check valve port 1074' having first 1075 and second 1076 ends (between sixth selector port 160 and seventh selector port 170).

FIGS. 25 and 26 show the use of check valve porting to fluidly connect various ports in the first family of selector ports 109. Zero port 101 can be fluidly connected to first port 110 in a first direction (i.e., from zero port 101 to first port 110) through check valve porting 1014'. First port 110 can be fluidly connected to second port 120 in a first direction (i.e., from first port 110 to second port 120) through check valve porting 1024'. Second port 120 can be fluidly connected to third port 130 in a first direction (i.e., from second port 120 to second port 130) through check valve porting 1034'. Third port 130 can be fluidly connected to fourth port 140 in a first direction (i.e., from third port 130 to fourth port 140) through check valve porting 1424'. Fourth port 140 can be fluidly connected to fifth port 150 in a first direction (i.e., from fourth port 140 to fifth port 150) through check valve porting 1054'. Fifth port 150 can be fluidly connected to sixth port 160 in a first direction (i.e., from fifth port 150 to sixth port 160) through check valve porting 1064'. Sixth port 160 can be fluidly connected to seventh port 170 in a first direction (i.e., from sixth port 160 to seventh port 170) through check valve porting 1074'.

In each of the above check valve porting connections gas can flow in a first direction as explained, but gas is prevented from flowing in a second direction (which is the opposite of the first direction) via the applicable check valve porting:

(1) via check valve porting 1014' from first port 110 to zero port 101;
(2) via check valve porting 1024' from second port 120 to port 110;
(3) via check valve porting 1034' from second port 120 to second port 130;
(4) via check valve porting 1044'. from fourth port 140 to third port 130;
(5) via check valve porting 1044' from fifth port 150 to fourth port 140;
(6) via check valve porting 1054' from sixth port 160 to fifth port 150; and
(7) via check valve porting 1064' from seventh port 170 to seventh port 170.

Although not shown in this embodiment, top 400 can include an eighth selector port 180, and seventh port 170 can be fluidly connected to eighth port 180 in a first direction (i.e., from seventh port 170 to eighth port 180) through check valve porting 1084'. An eight selector port 180 would allow valve 100 to be used with the seven tank embodiment disclosed in FIGS. 1 and 2.

Selector

Figure 27:
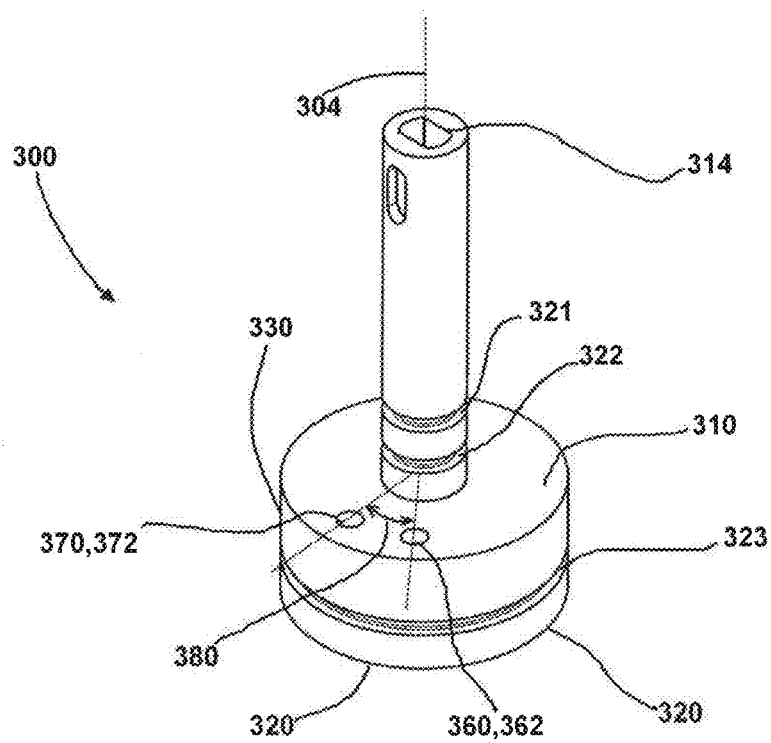
FIG. 27 is a top perspective view of one embodiment of a selector for the valve shown in FIG. 9.
Figure 28:
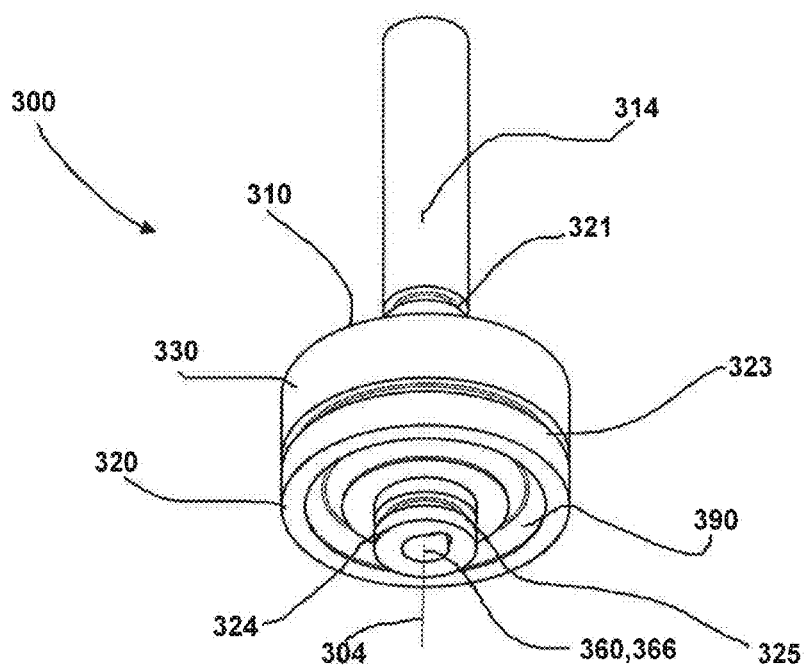
FIG. 28 is a bottom perspective view of one embodiment of a selector for the valve shown in FIG. 9.
Figures 29, 30:
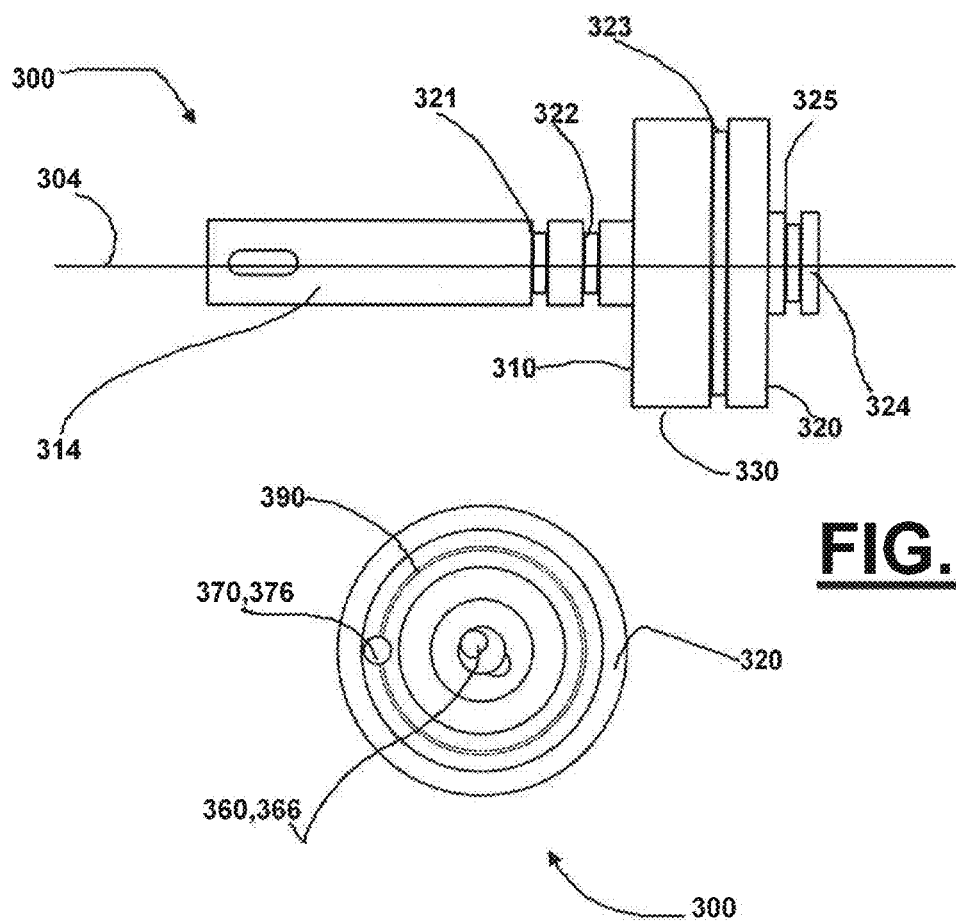
FIG. 29 is a side view of the selector shown in FIG. 27.
FIG. 30 is a bottom view of the selector shown in FIG. 27.

FIGS. 27 and 28 are respectively top and bottom perspective views of one embodiment of selector 300. FIGS. 29 and 30 are respectively is a side and bottom views of selector 300. FIG. 31 is a top view of selector 300 with FIG. 36 being a sectional view taken along the lines 32-32, and FIG. 33 being a sectional view taken along the lines 33-33.

Selector 300 generally can include upper 310 and lower 320 portions with an outer periphery 330 between upper 310 and lower 320 portions, along with rod 314 being attached to upper 310 section (shown in FIG. 12). Selector 300 can have a rotational axis 304. Arrow 316 schematically indicates relative rotation between selector 300 and top 400/body 200 in a clockwise direction.

Between upper 310 and lower 320 portions can be first 360 and second 370 conduits. First conduit 360 can include first connector 362 which opens onto upper portion 310 and second connector 366 which opens onto lower 320 portion. Second conduit 370 can include first connector 372 which opens onto upper portion 310 and second connector 372 which opens onto lower 320 portion.

Lower portion 320 can include annular recess 390 which fluidly connects with second conduct 370.

Lower portion 320 can also include trunnion connector 324 which will sit in trunnion recess 240 of body 200. Second connector 366 can open from lower portion of trunnion 324.

To maintain a seal between selector 300 and body 200 seal recess 323 and 325 along with seal components such as o-rings or other conventionally available sealing can be included. To maintain a seal between selector 300 and top 400 seal recess 321 and 322 along with seal components such as o-rings or other conventionally available sealing can be included.

Sealing in recess 325 can fluidly seal the connection between first conduit 360 and first selector port 260 of the second family of porting 209. Both sealing in recess 323 and recess 325 can fluidly seal the connection between second conduit 370 and second selector port 270 of the second family of porting 209.

Between first connector 362 of first conduit 360 and first connector 372 of second conduit 370 can be angle 380 which as stated elsewhere is preferably equal to the angular spacing between second connectors of the first family of selector ports 109.

Conventionally available sealing can be used for effecting a seal between first connector 362 of first conduit 360 and its selected port of the first family of ports 109, along with first connector 372 of second conduit 370 and its selected port of the first family of ports 109

By controlling the angular spacing 380 of the first connectors 362 and 372 relative to the angular spacing for the second connectors of the first family of selecting ports 109, relative connections between the first family of selector ports 109 and the second family of selector ports 209 can be controlled varied. For example, if the angular spacing 380 is the same then adjacent second connectors of the first family of selector ports 109 will be fluidly connected with the second family of selector ports 209. If the relative angular spacing is 2, then spaced apart second openings of the first family of selector ports 109 will be fluidly connected to the second family of selector ports 209. If the spacing is 3 times, then twice spaced apart second openings of the first family of selector ports 109 will be fluidly connected to the second family of selector ports 209. For each multiple of spacing the formula of [multiple−1]*spaced apart second openings of the first family of selector ports 109 will be fluidly connected to the second family of selector ports 209. In the case of 1-1, then no spaced apart connections are made, but adjacent second openings of the first family of selector ports 109 will be fluidly connected to the second family of selector ports 209.

Body

Figure 34:
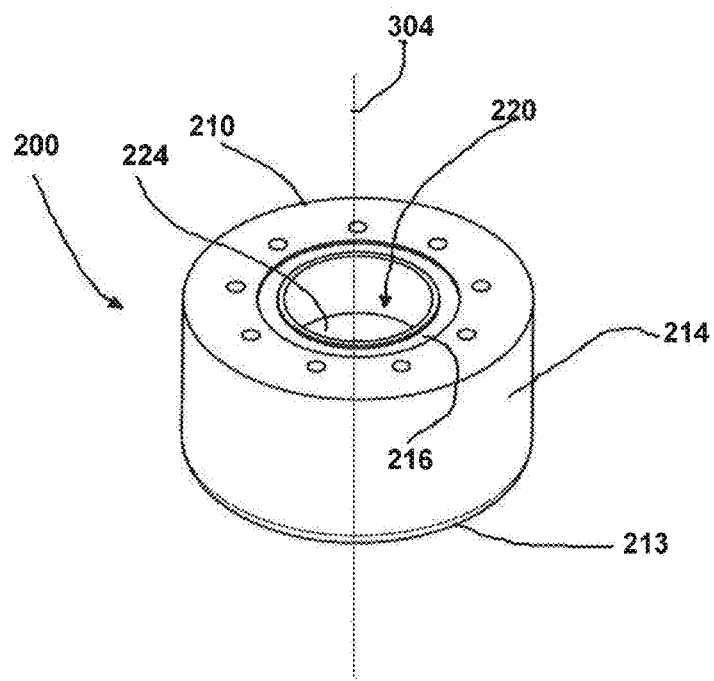
FIG. 34 is a top perspective view of one embodiment of a body for the valve shown in FIG. 9.
Figure 35:
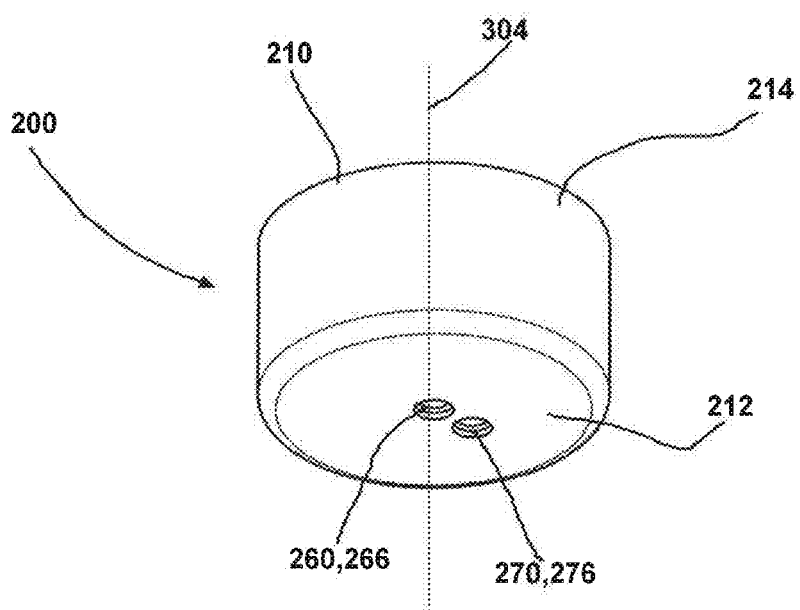
FIG. 35 is a bottom perspective view of one embodiment of a body for the valve shown in FIG. 9.
Figure 36:
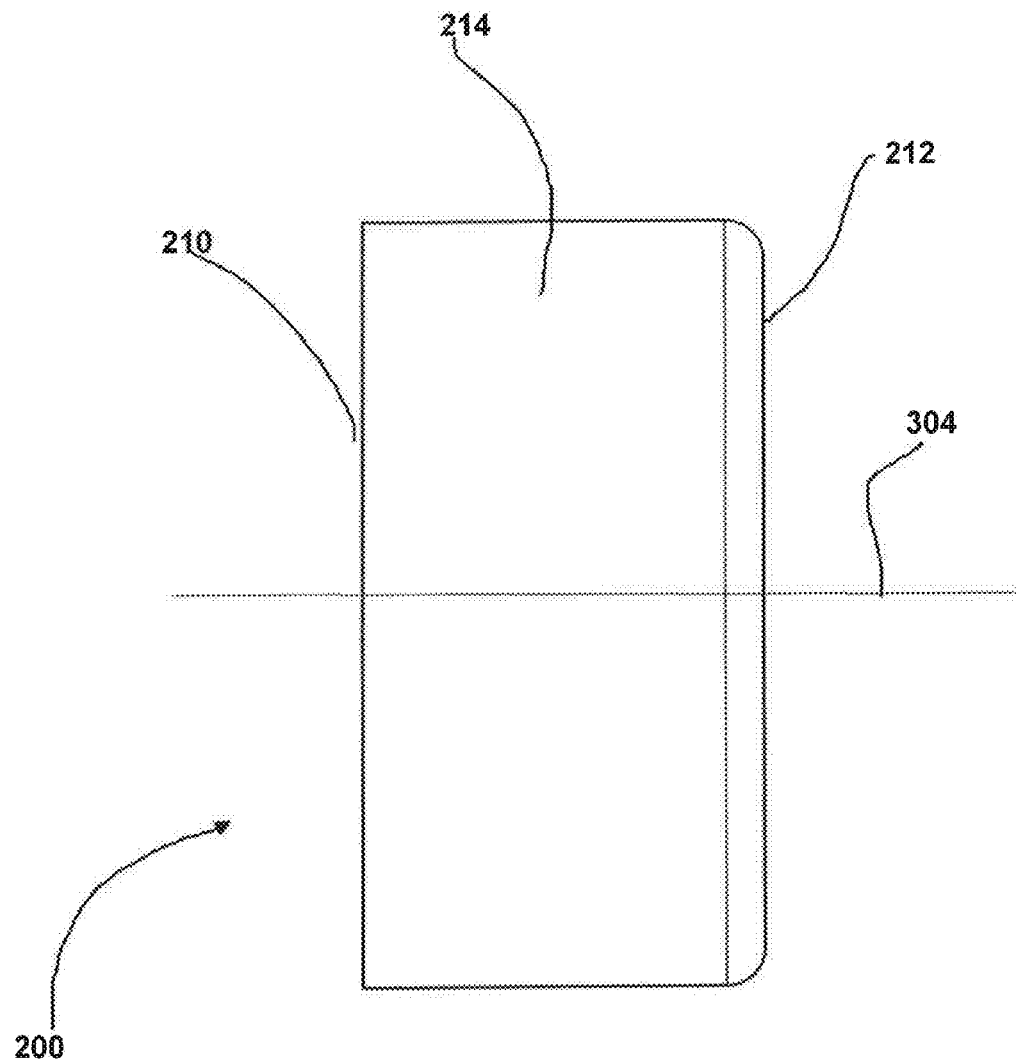
FIG. 36 is a side view of the body shown in FIG. 34.
Figure 37:
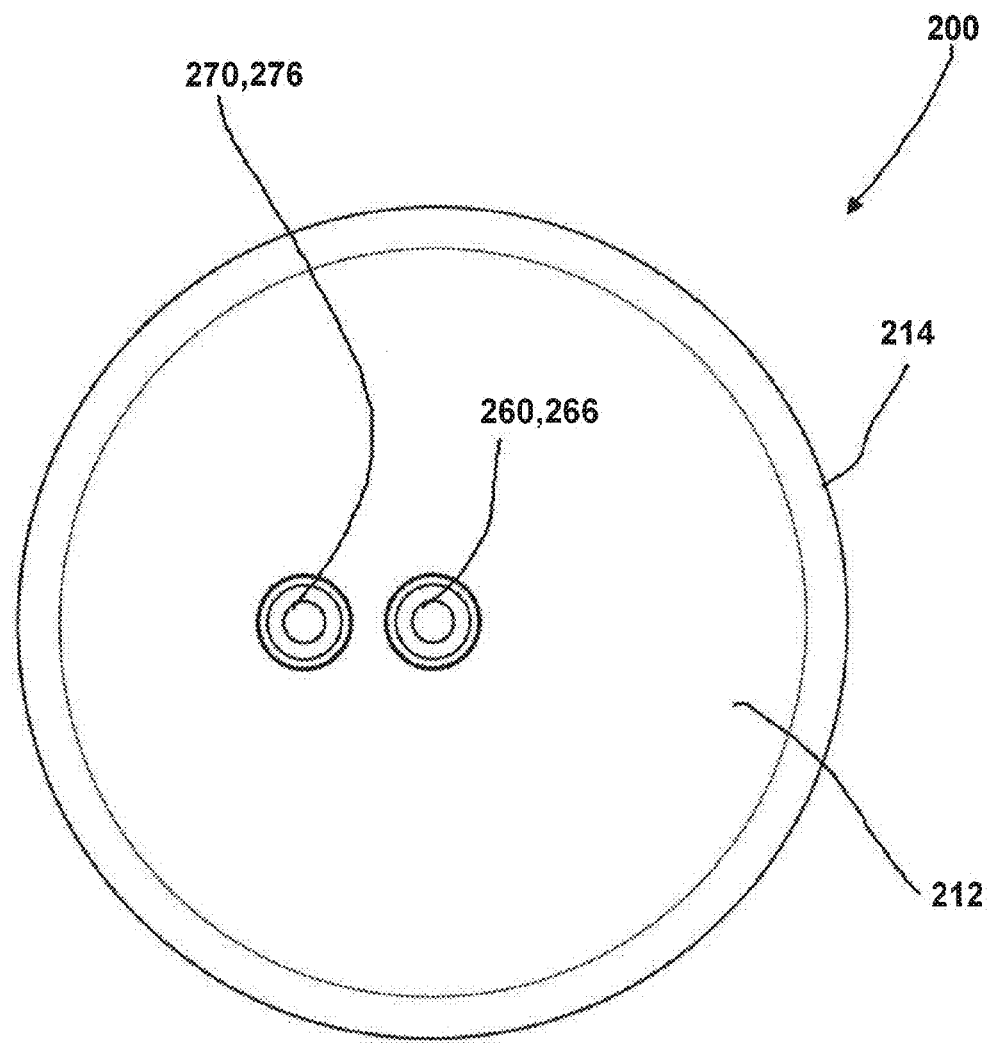
FIG. 37 is a bottom view of the body shown in FIG. 34.
Figure 38:
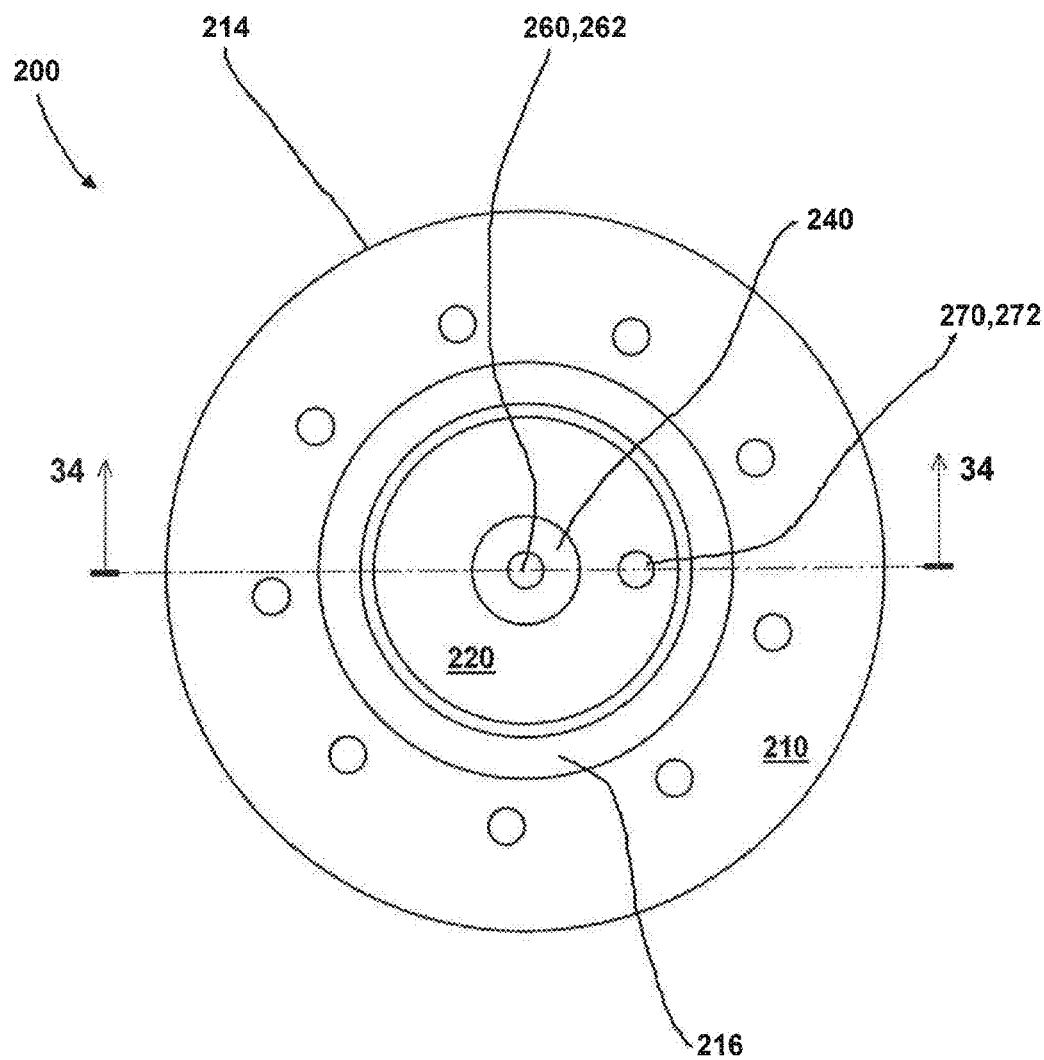
FIG. 38 is a top view of the body shown in FIG. 34.
Figure 39:
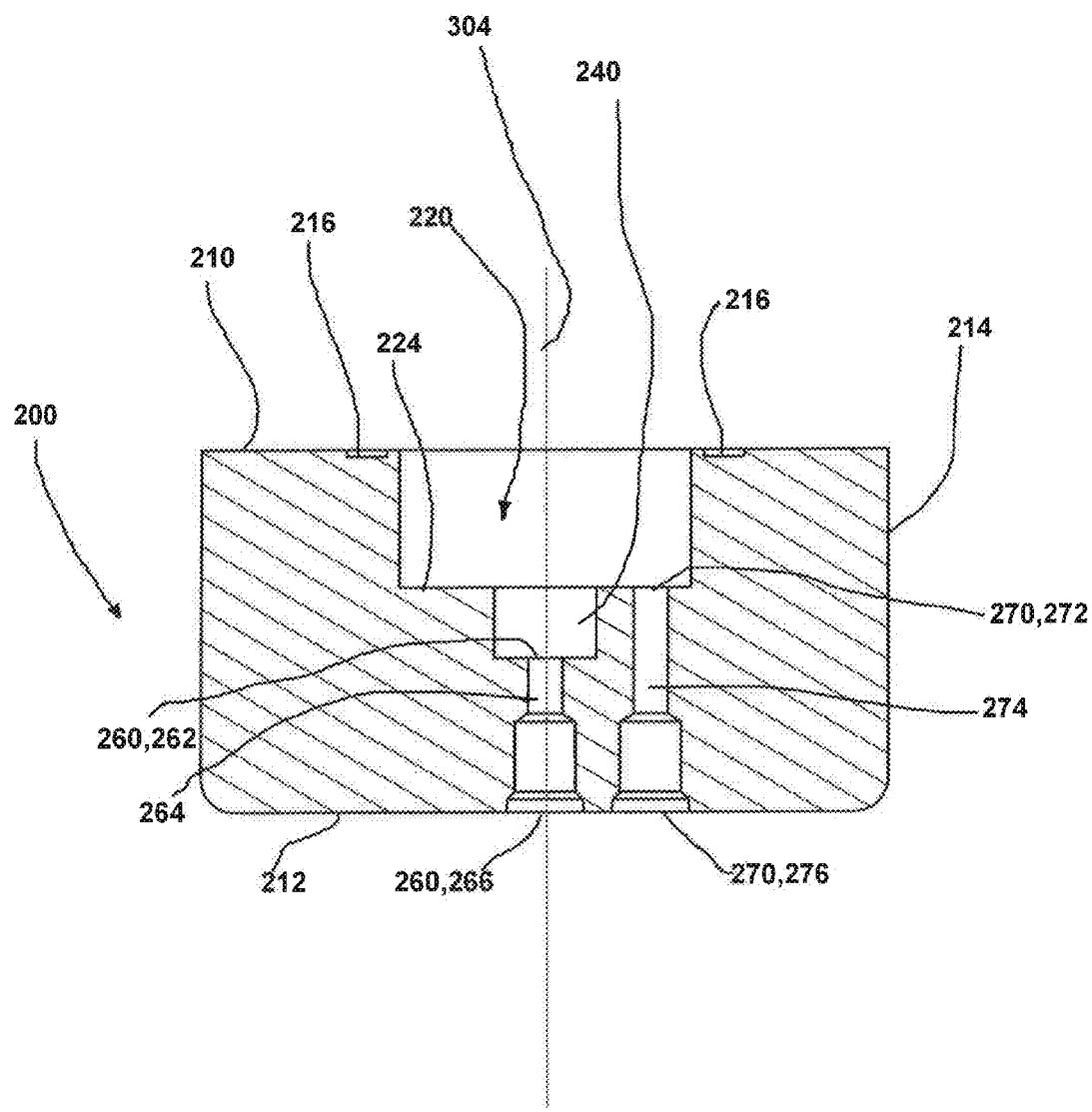
FIG. 39 is a sectional view of the body of FIG. 34 taken along the lines 39-39 shown in FIG. 38.

FIGS. 34 and 35 are respectively top and bottom perspective views of one embodiment of body 200. FIGS. 36 and 37 are respectively side and bottom views of body 200. FIG. 38 is a top view of body 200 with FIG. 39 being a sectional view of body 200 taken along the lines 39-39.

Body 200 generally can include upper 210 and lower 220 portions with an outer periphery 214 between upper 210 and lower 220 portions, along with a selector recess 220 for rotationally attaching selector to body 200. Base 224 of recess 240 can also include trunnion recess 240 for rotationally connecting trunnion 324 of selector 300. With rotational connection selector 300 and body have a rotational axis 304. Arrow 316 schematically indicates relative rotation between selector 300 and top 400/body 200 in a clockwise direction.

Between base 224 of recess 220 and lower 220 portion can be first 260 and second 270 selector ports. First selector port 260 can include first connector 262 which opens into the bottom of trunnion recess 240 and second connector 266 which opens into lower 220 portion. Second selector port 270 can include first connector 272 which opens into base 224 of recess 240 and second connector 272 which opens into lower 220 portion.

To maintain a seal between body 200 and top 400 annual seal 216 with seal components such as o-rings or other conventionally available sealing can be included. In one embodiment annular seal 216 can be used to seal porting drill holes made for either check valve porting and/or selector porting of the first family of selector ports 109 in top 400. In other embodiments the extraneous drilling porting can be backfilled or sealed in other manner conventionally available.

Alternative Valve Constructions

FIG. 40 is a schematic diagram of another embodiment of a selecting valve 100' which is modified from the construction of the valve 100 shown in FIG. 9 by having the selector porting of the first family of selector ports 109 (e.g., 101', 110', 120', 130', 140', etc.) located in lower body 200 portion instead of the upper top 400. The second family of selector porting 209 can be substantially the same as in other embodiments. In this embodiment, the first 360 and second 370 selector conduits have first 362 and second 372 connectors which open into the outer periphery 330 of selector 300 instead of top 310.

In this alternative valve 100' check valve porting (e.g., 1014', 1024', 1034', 1044', 1054', 1064', 1074', etc.) is also located in and in lower body 200 portion instead of the upper top 400, and the check valve porting will similarly provide one way fluid paths between adjacent selector ports of the first family of selector porting 109'.

Figure 41:
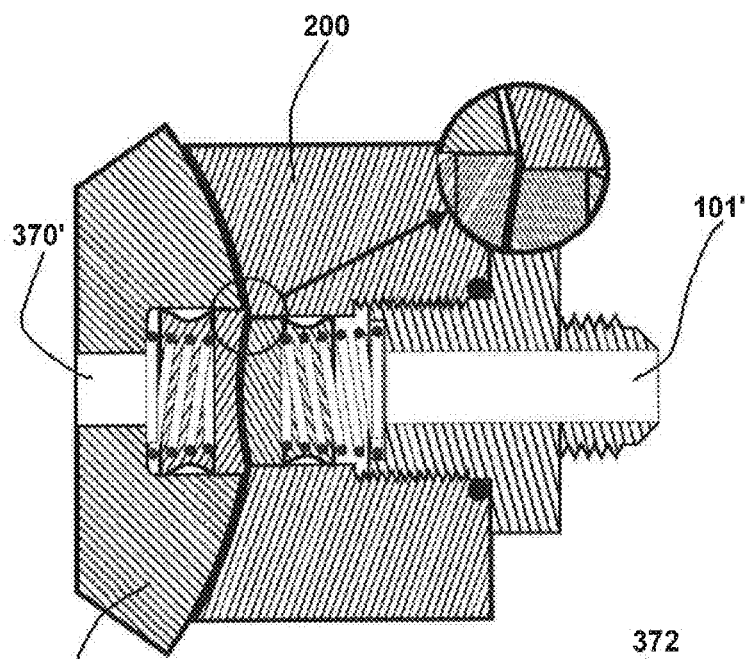
FIGS. 41 and 42 show one embodiment of a sealing mechanism between a selector and the selector porting of either the body (e.g., FIG. 40) or the top (e.g., FIG. 9).

FIG. 41 shows one embodiment of a sealing mechanism between selector 300 and the selector porting of the first family of selector porting 109' located in body 200 (e.g., FIG. 40). Similar sealing can be used for sealing when selector porting of the first family 109 is located in the top 400 (e.g., FIG. 9). This sealing embodiment has a two sealing members which are biased towards each other.

Figure 42:
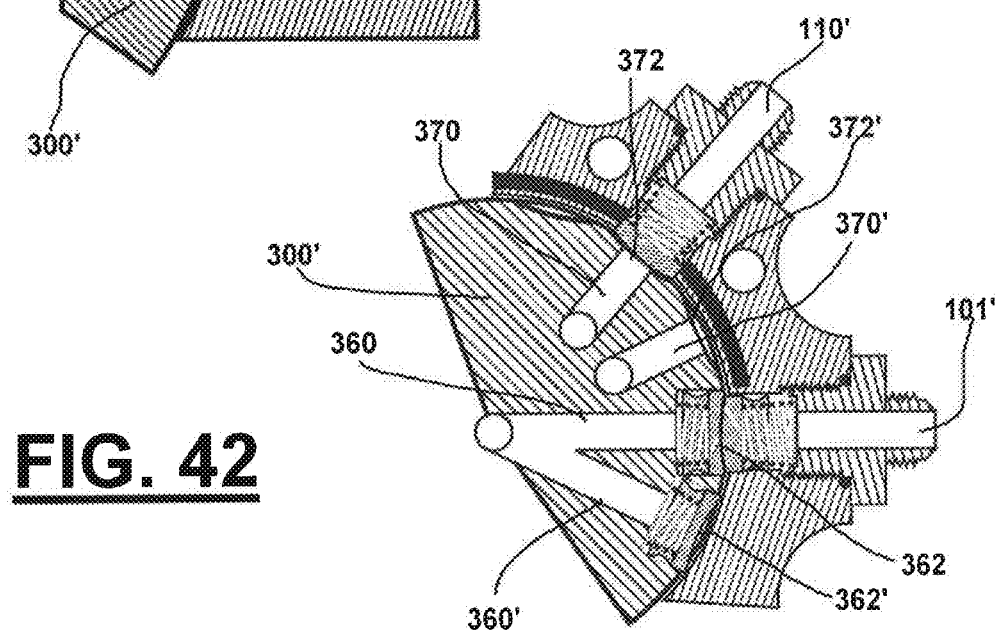

FIG. 42 shows alternative selector 300 porting having two first conduits 360 and 360' with first connectors 362 and 362', along with two second conduits 370 and 370' each having first connectors 372 and 372'. The angular spacing between first connectors 362 and 362' along with first connectors 372 and 372' should be equal and the angular spacing between the pair of first conduits 360, 360' and pair of second conduits 370,370' should be double the spacing between individual connectors.

Figure 43:
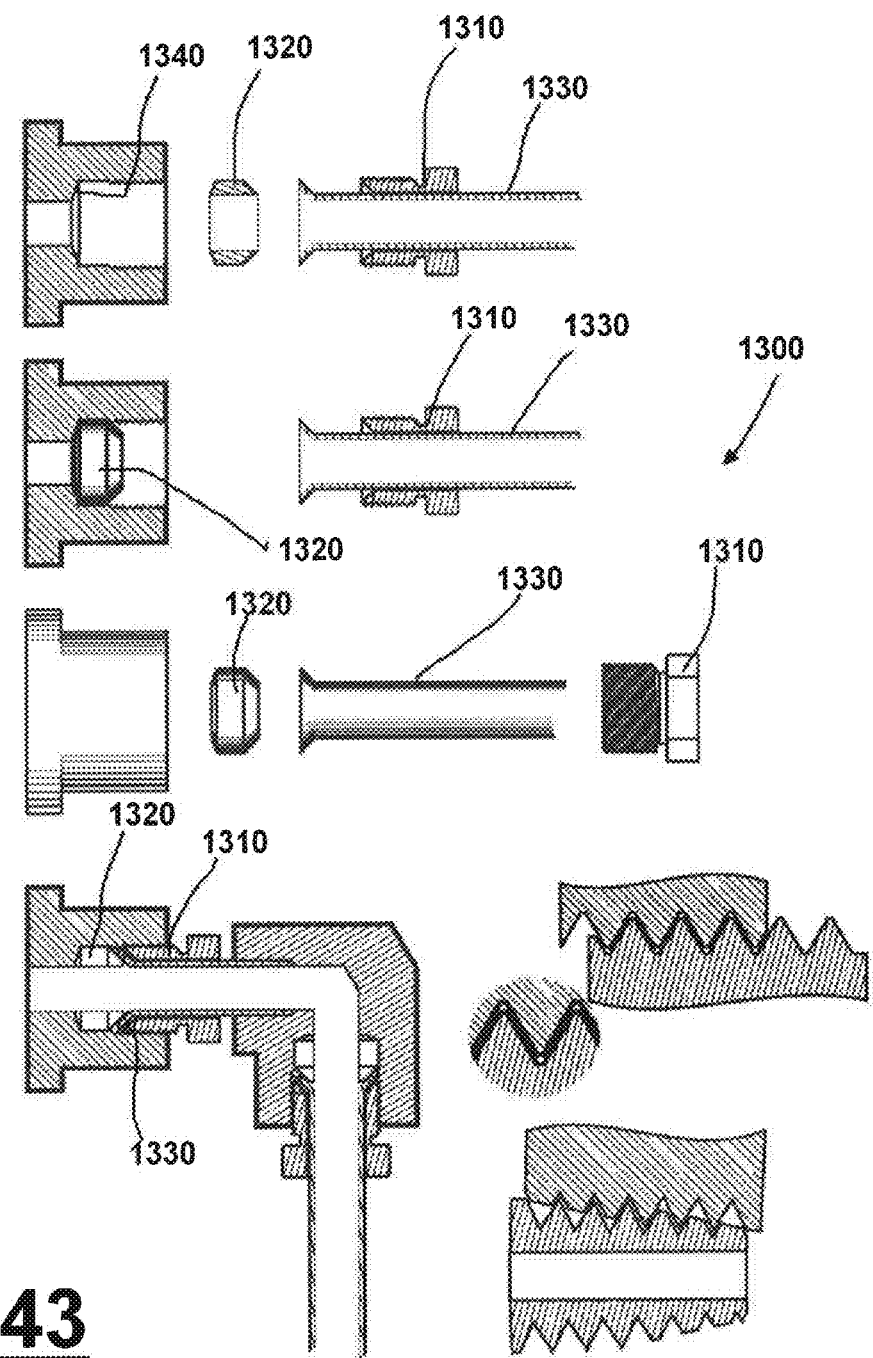
FIG. 43 includes various embodiments of high pressure tubing connections which can be used with one or more embodiments disclosed in this application.
Figure 44:
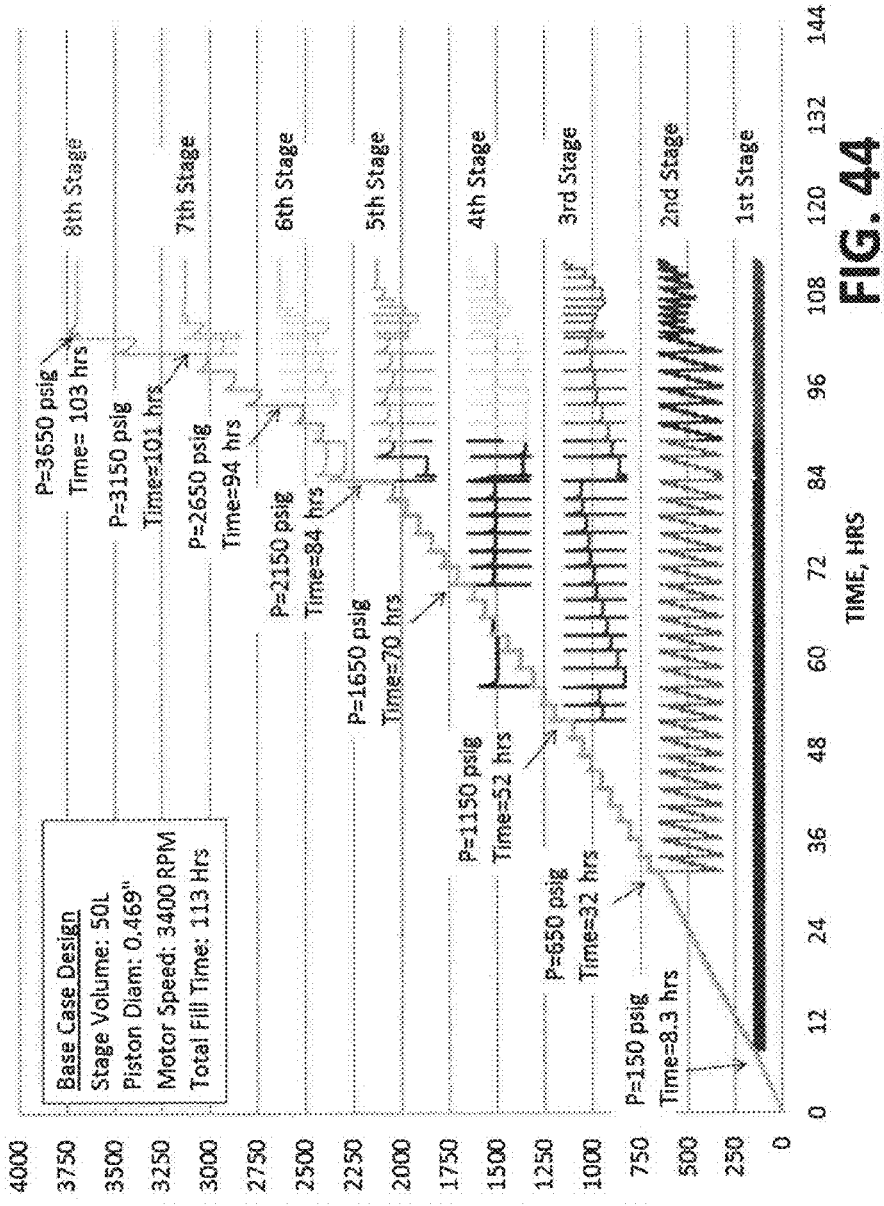
FIG. 44 is a plot diagram showing calculated pressure changes over time of an eight stage tank array during an initial fill process.
Figure 45:
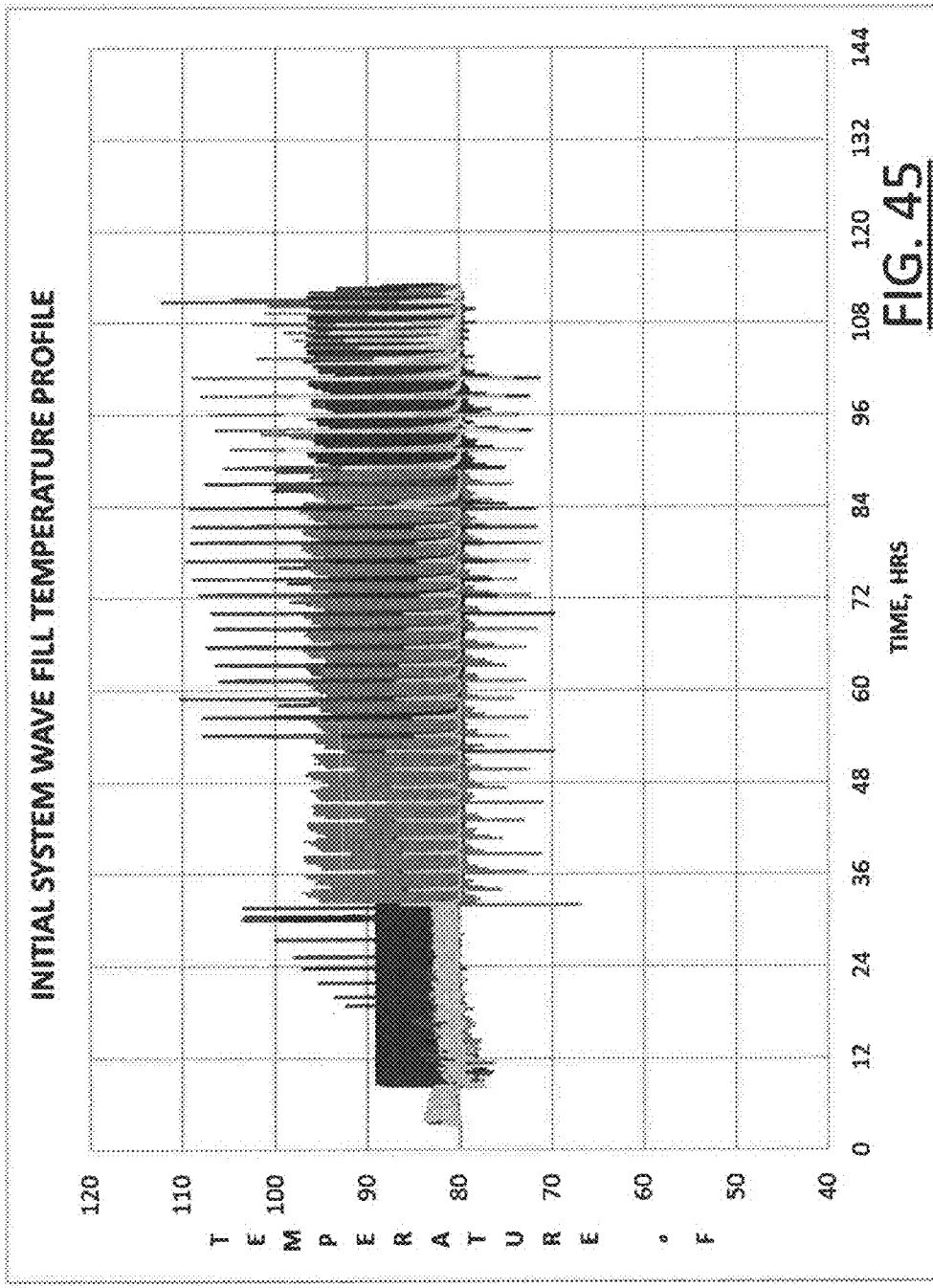
FIG. 45 is a plot diagram showing calculated temperature changes over time at a compressor discharge port, with ambient air cooling as the only means of heat dissipation.
Figure 46:
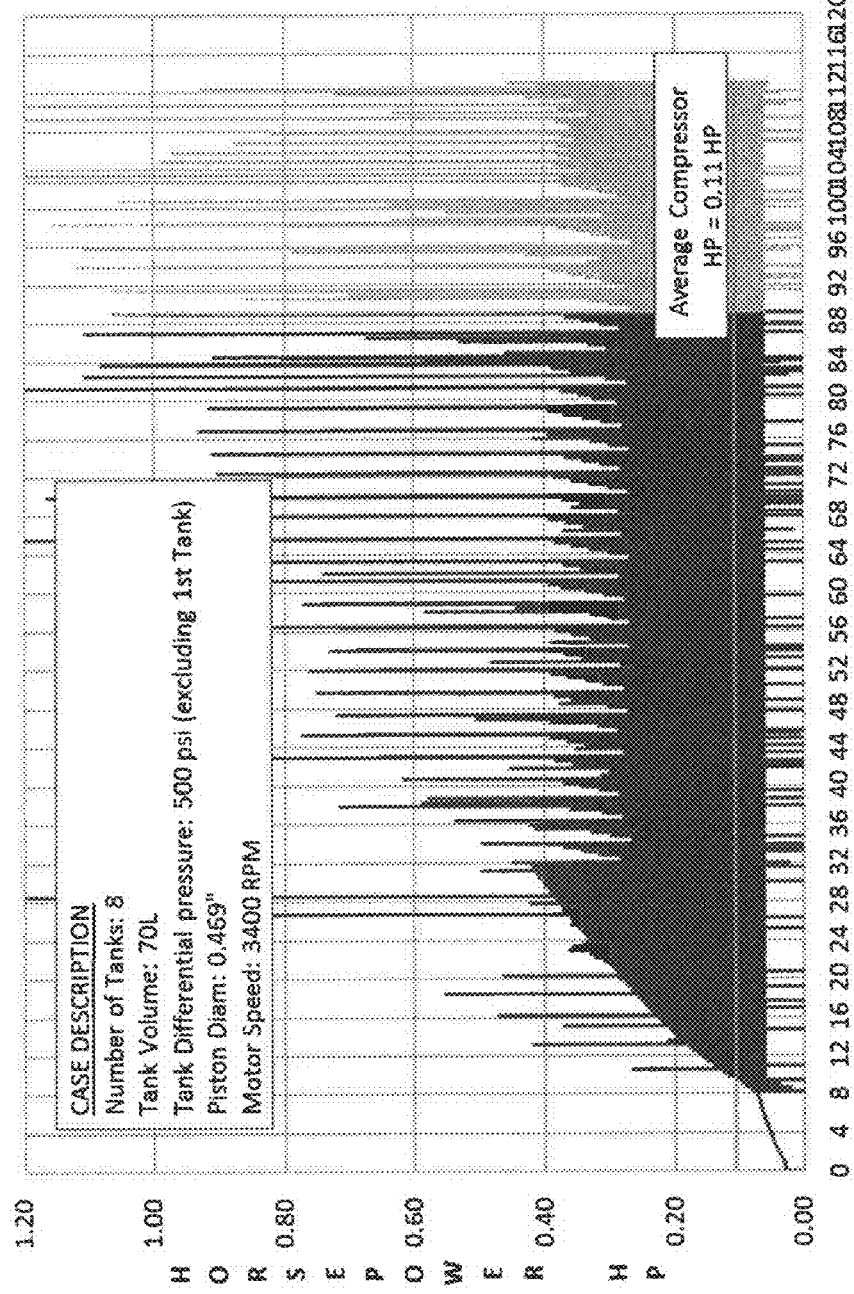
FIG. 46 is a plot diagram showing the horse power required throughout the completely empty System Fill Process, over 113 hours with an average horse power consumption of 0.11.
Figure 47:
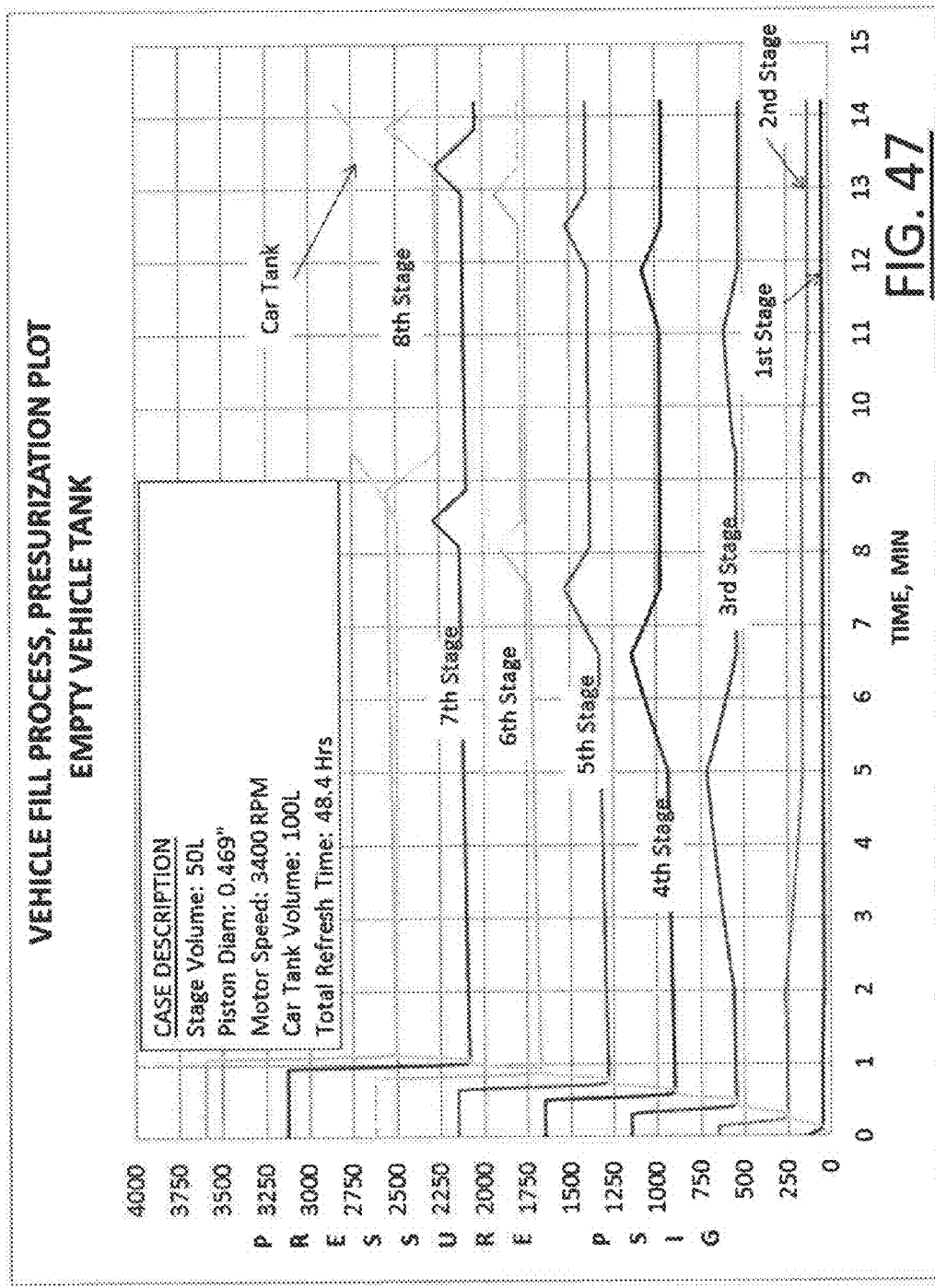
FIG. 47 is a plot diagram of calculated tank pressures over time during a vehicle fill, assuming a 100 L vehicle tank which begins at 0 psig.
Figure 48:
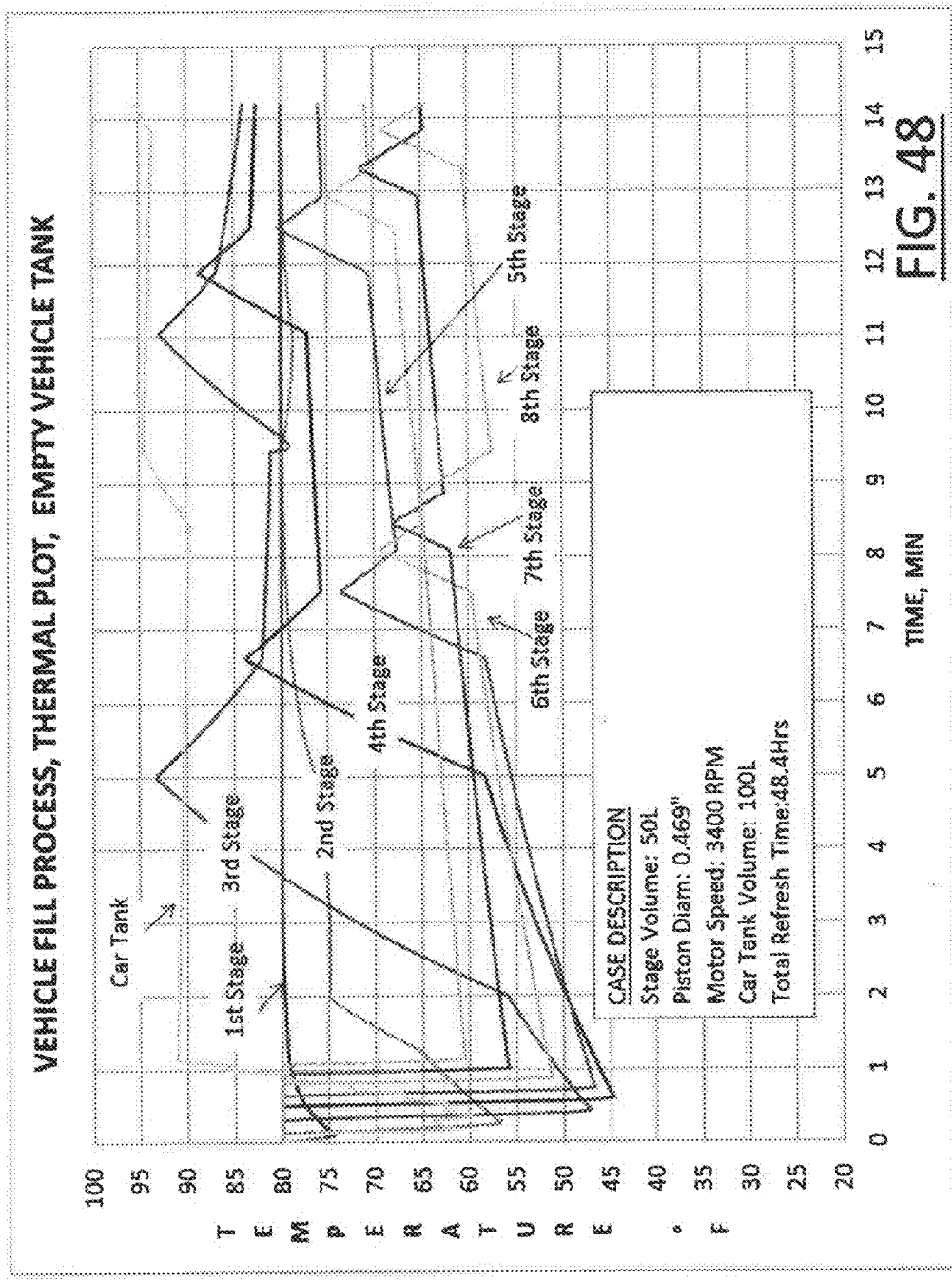
FIG. 48 is a plot diagram of calculated tank temperatures over time during a vehicle fill, assuming a 100 L vehicle tank which begins at 0 psig.
Figure 49:
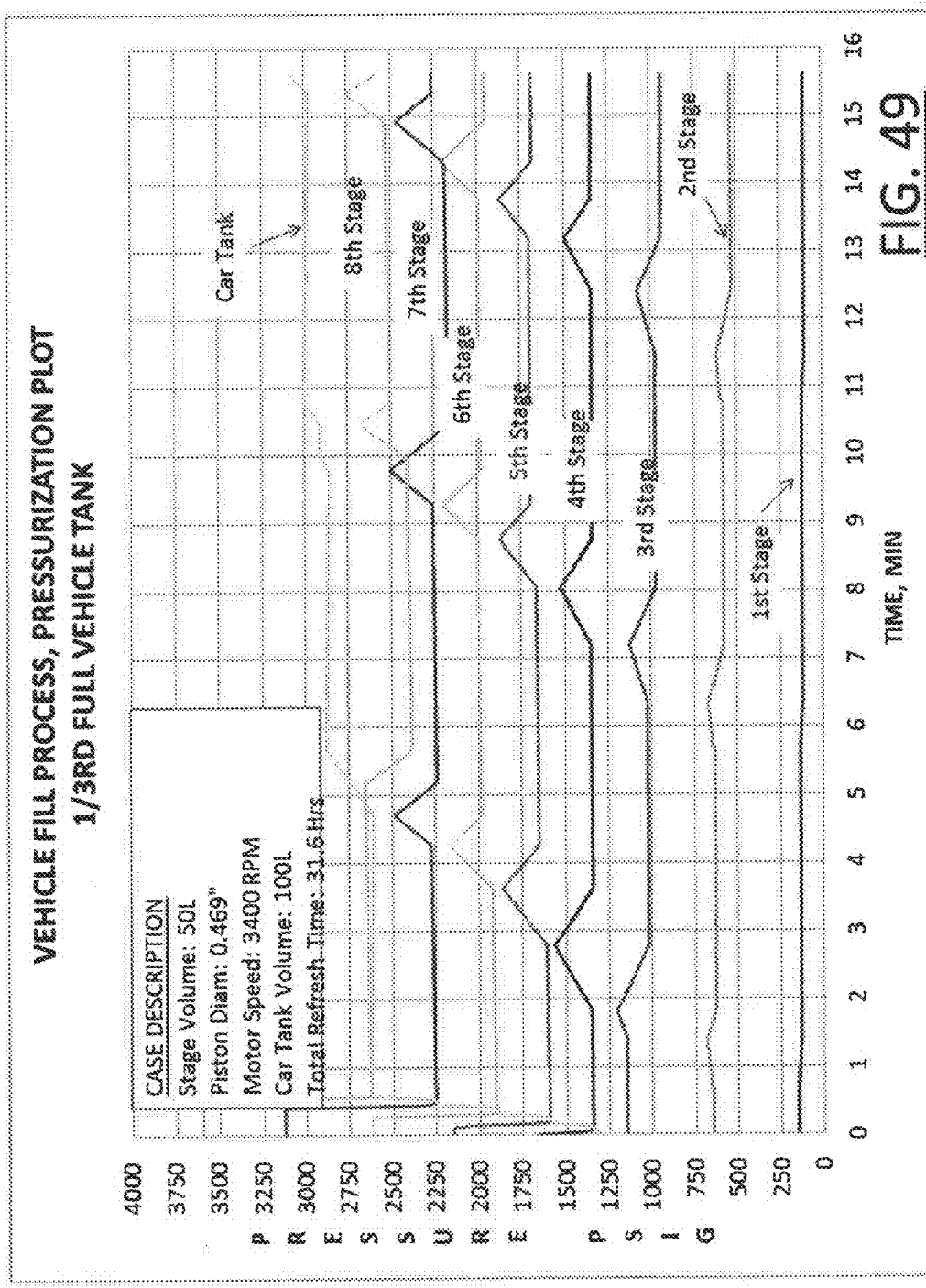
FIG. 49 is a plot diagram of calculated tank pressures over time during a vehicle fill, assuming a 100 L vehicle tank which begins at 1200 psig.
Figure 50:
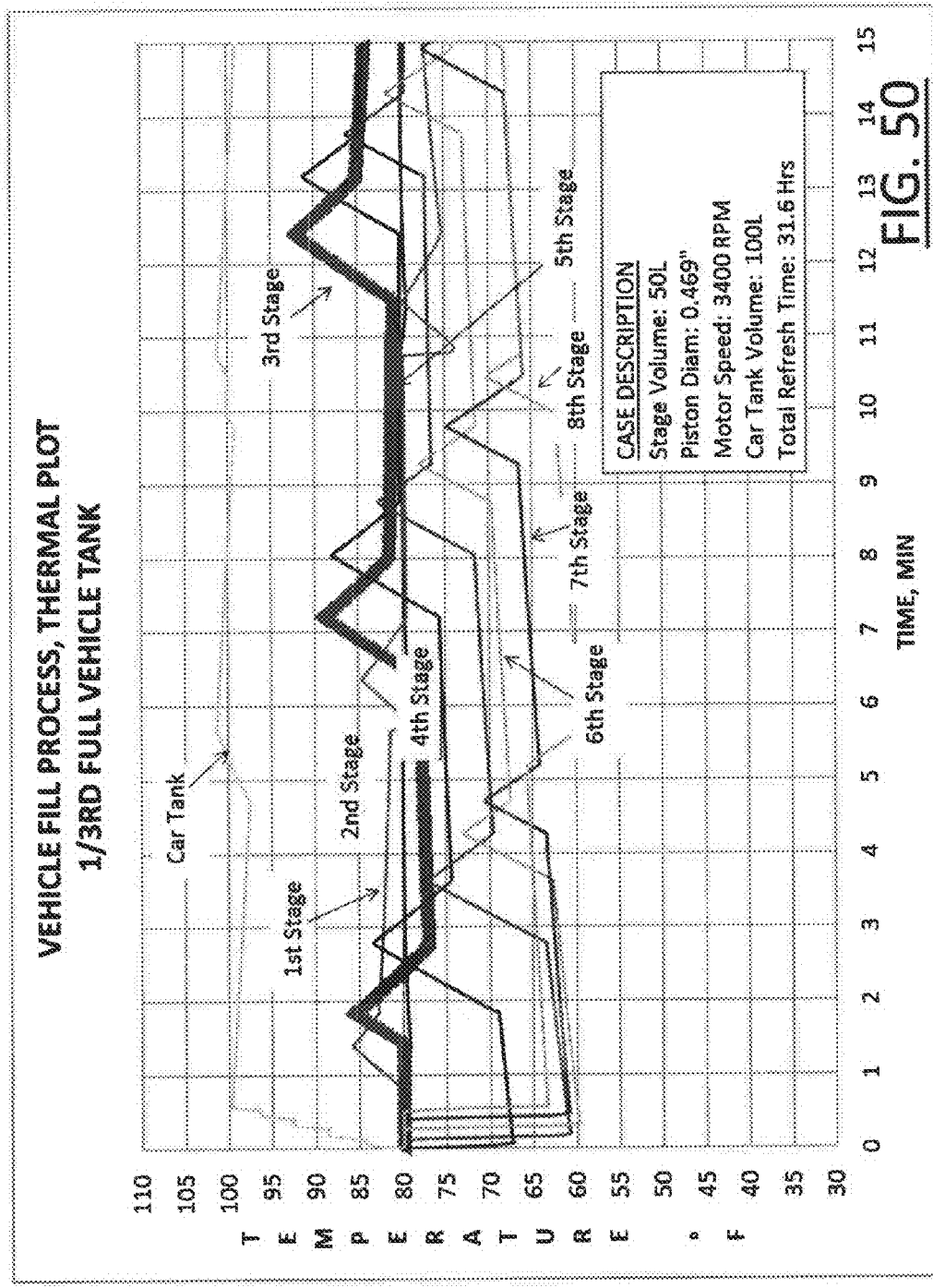
FIG. 50 is a plot diagram of calculated tank temperatures over time during a vehicle fill, assuming a 100 L vehicle tank which begins at 1200 psig.
Figure 51:
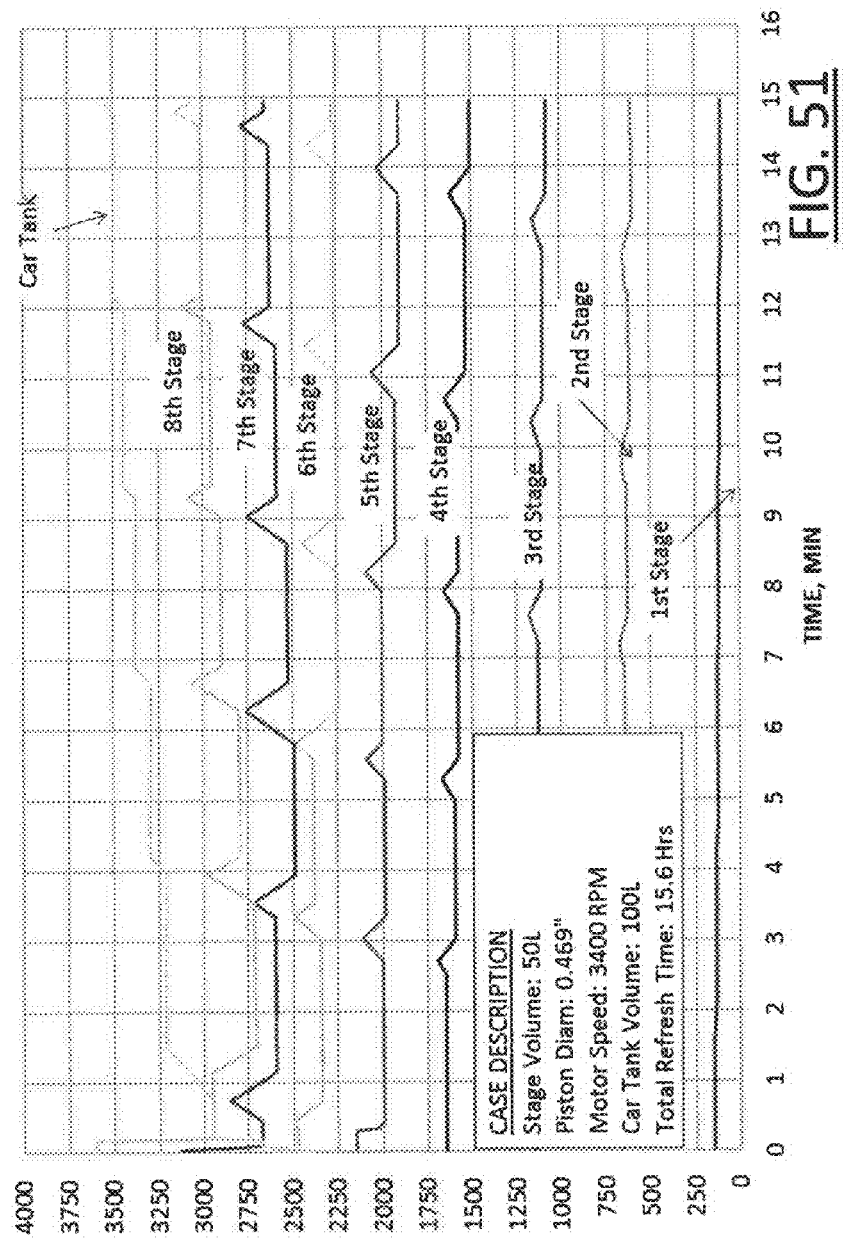
FIG. 51 is a plot diagram of calculated tank pressures over time during a vehicle fill, assuming a 100 L vehicle tank which begins at 2400 psig.
Figure 52:
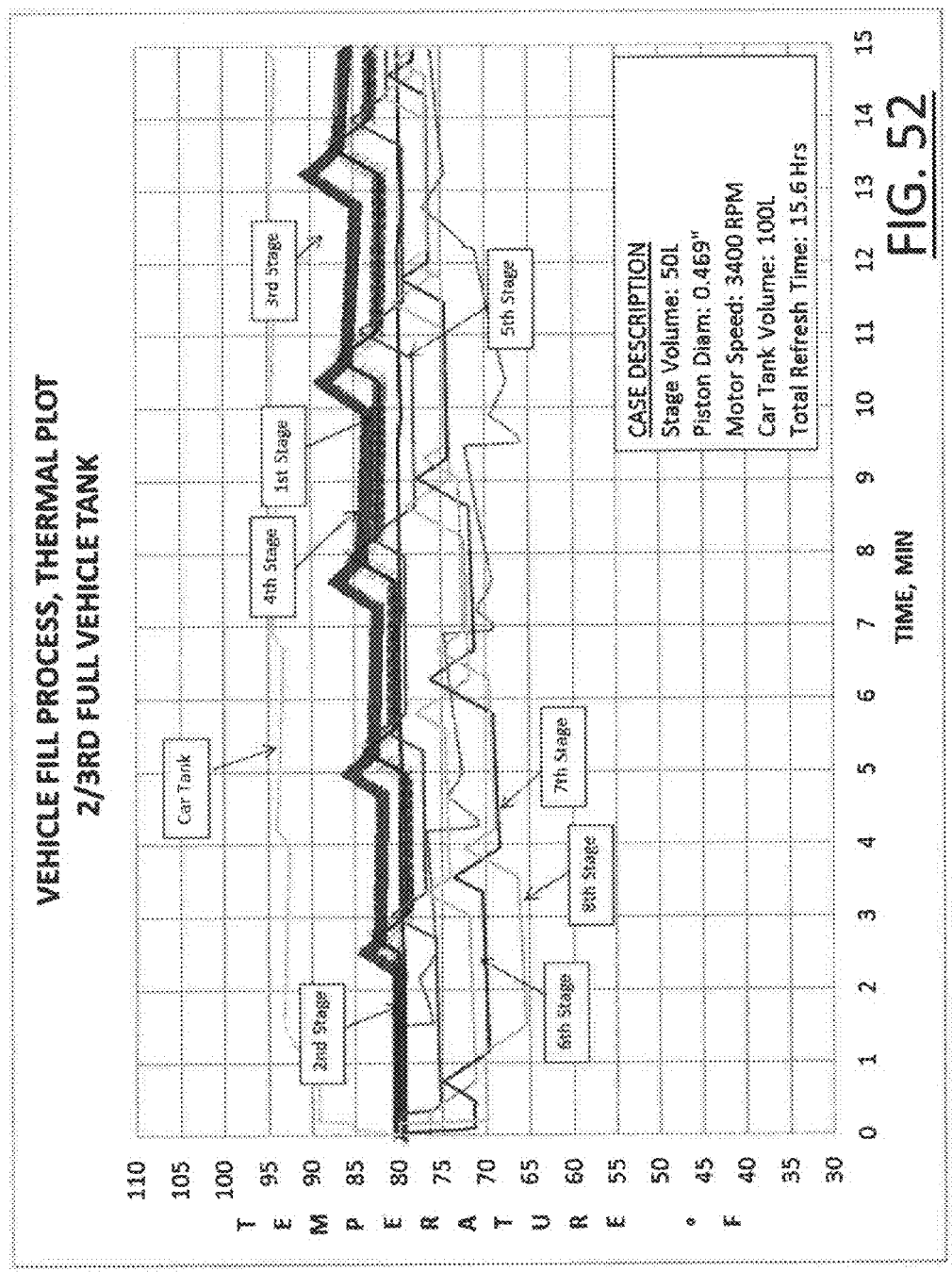
FIG. 52 is a plot diagram of calculated tank temperatures over time during a vehicle fill, assuming a 100 L vehicle tank which begins at 2400 psig.
Figure 53:
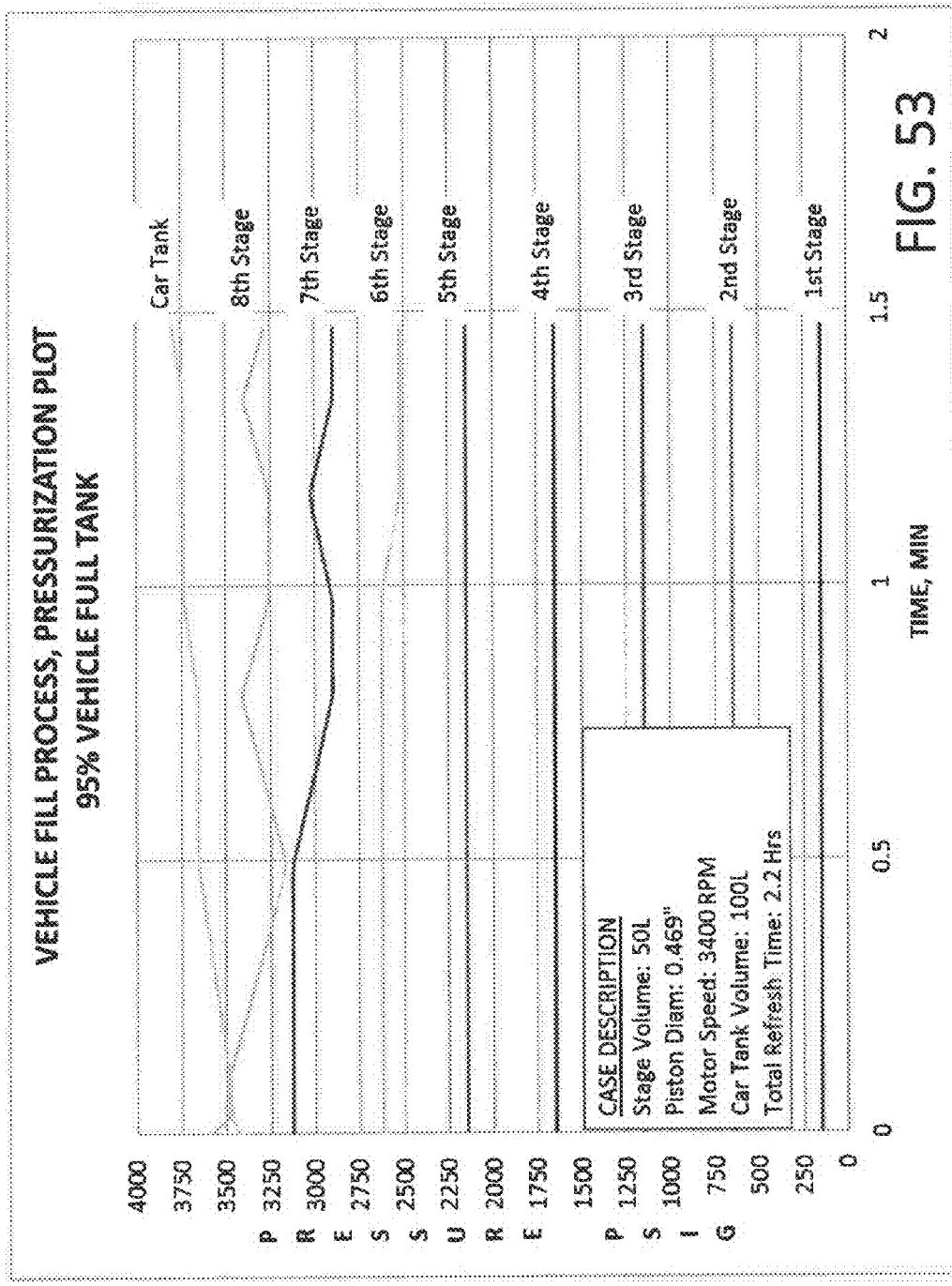
FIG. 53 is a plot diagram of calculated tank pressures over time during a vehicle fill, assuming a 100 L vehicle tank which begins at 3420 psig.
Figure 54:
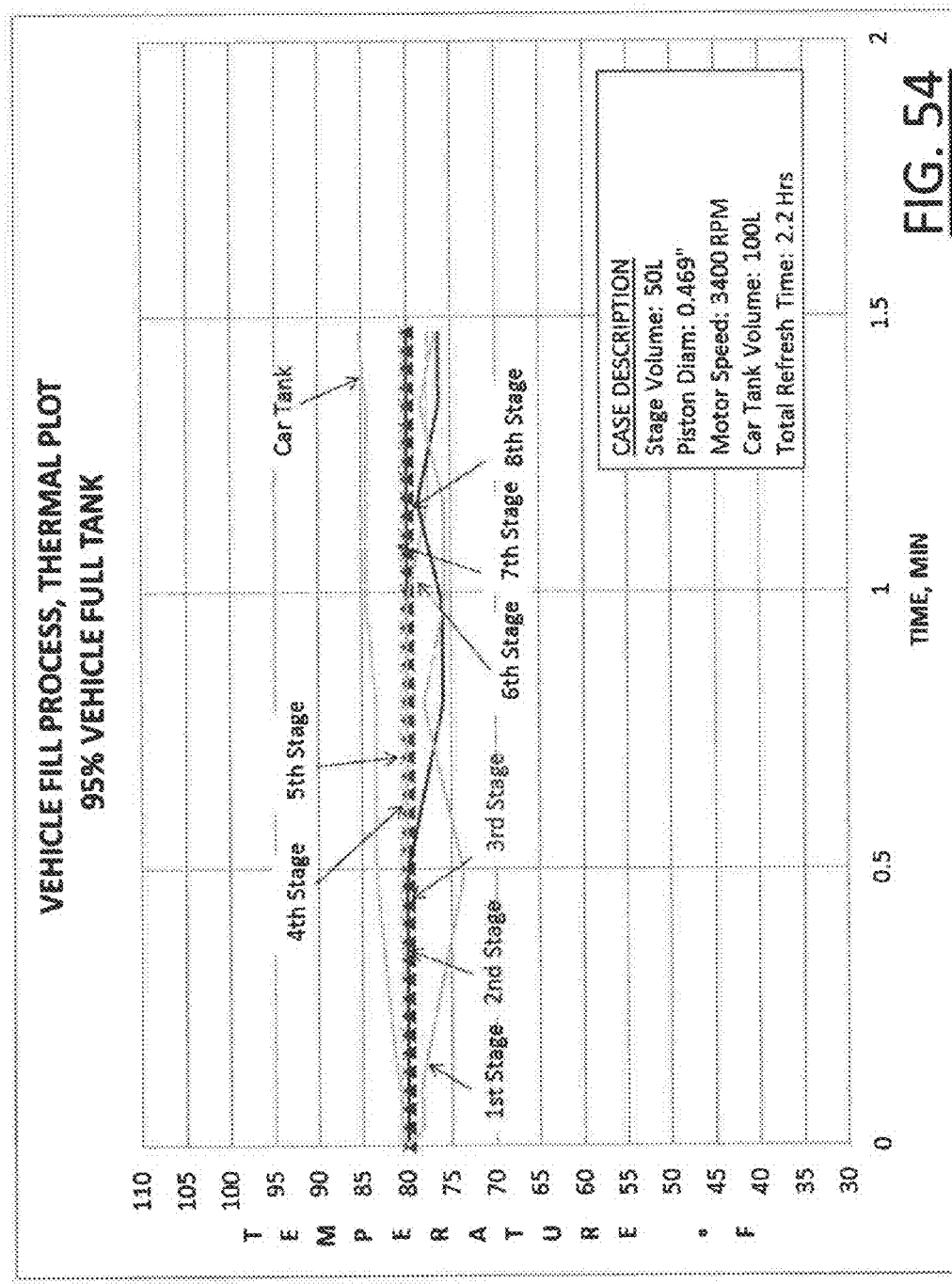
FIG. 54 is a plot diagram of calculated tank temperatures over time during a vehicle fill, assuming a 100 L vehicle tank which begins at 3420 psig.
Figure 55:
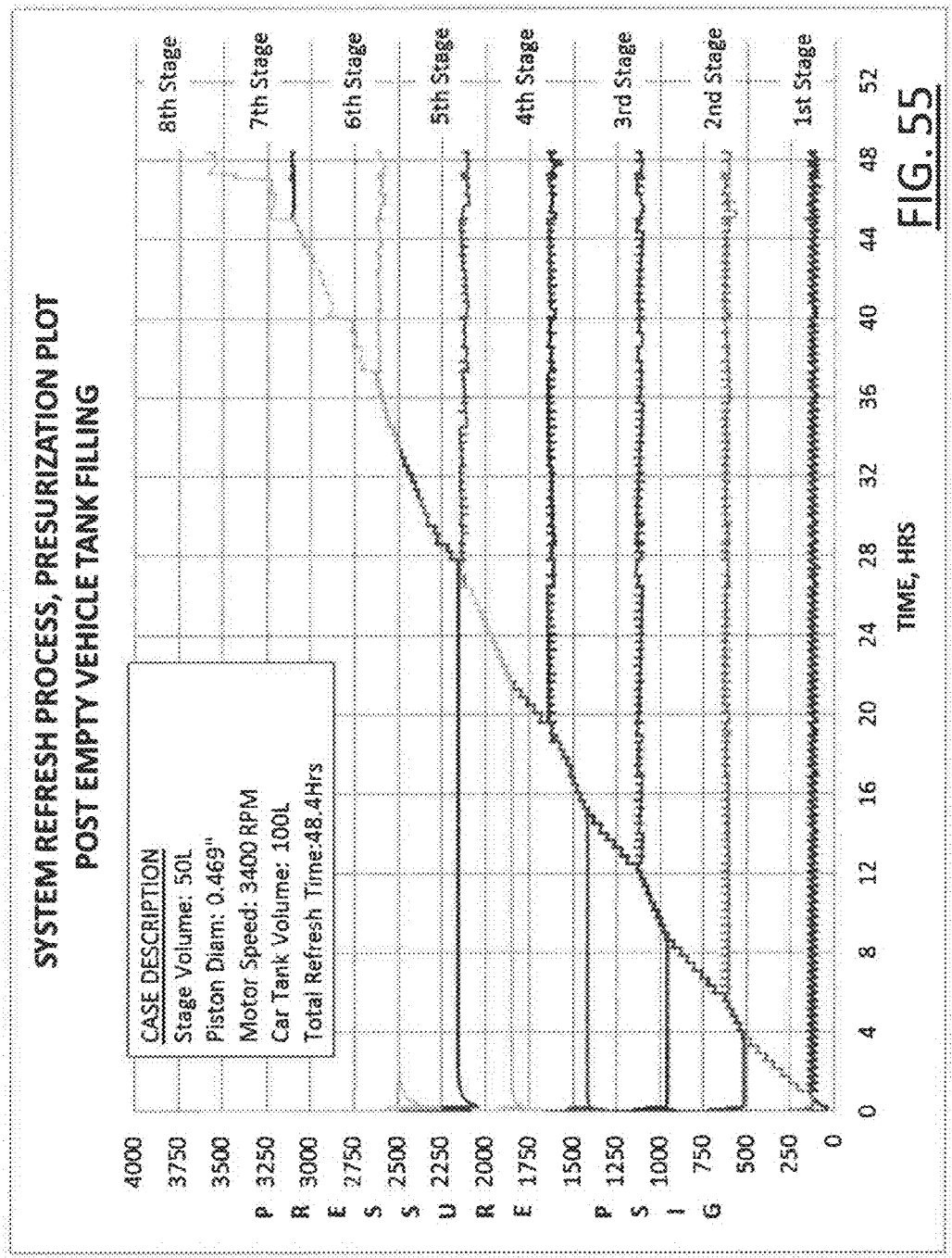
FIG. 55 is a plot diagram of calculated tank pressures over time during a system refresh fill, assuming that the system has previously offloaded gas to a 100 L vehicle tank which began at 0 psig. This is also an example of WAVE Option #5 step methodology.
Figure 56:
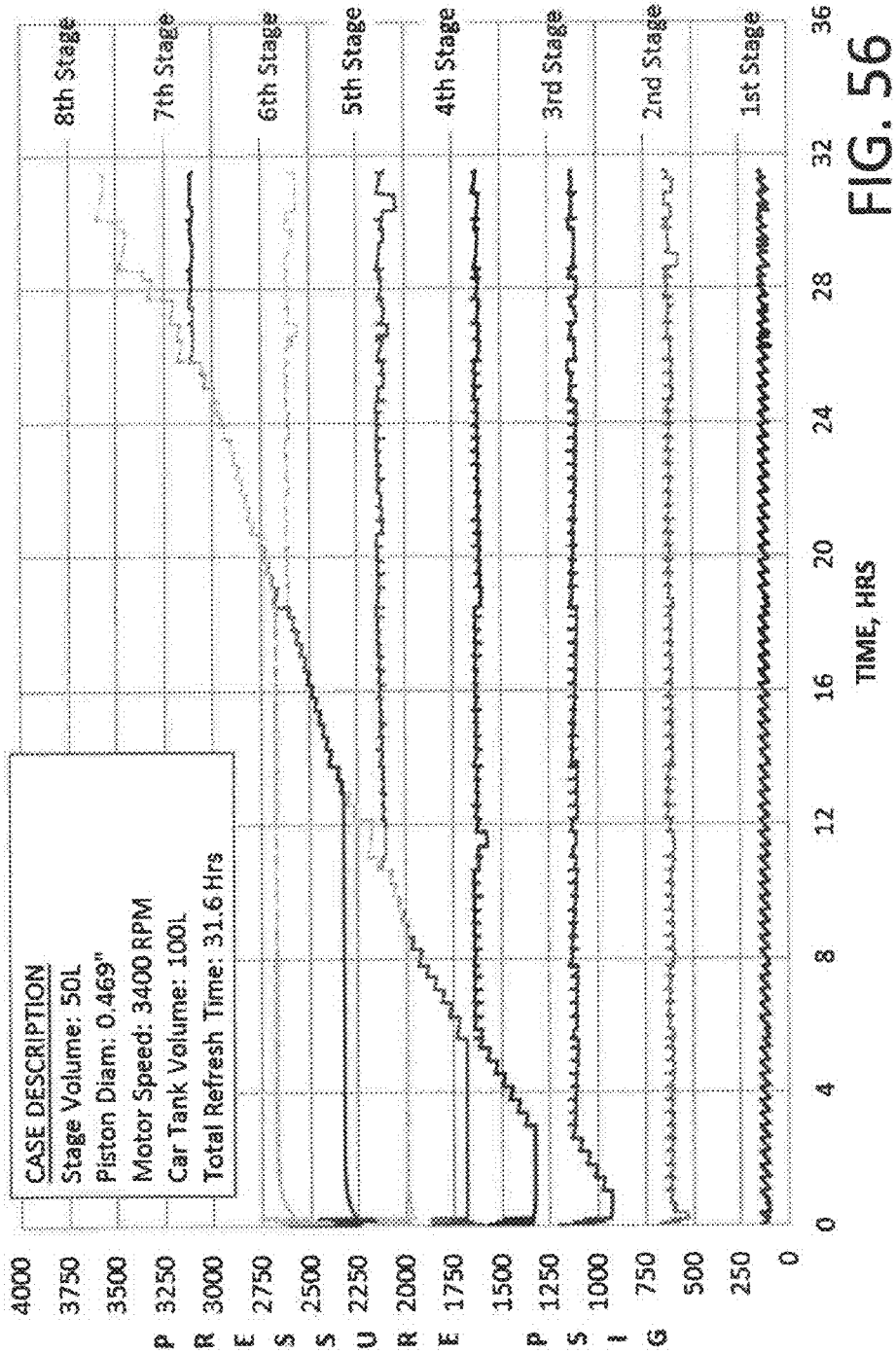
FIG. 56 is a plot diagram of calculated tank pressures over time during a system refresh fill, assuming that the system has previously offloaded gas to a 100 L vehicle tank which began at 1200 psig. This is also an example of WAVE Option #5 step methodology.
Figure 57:
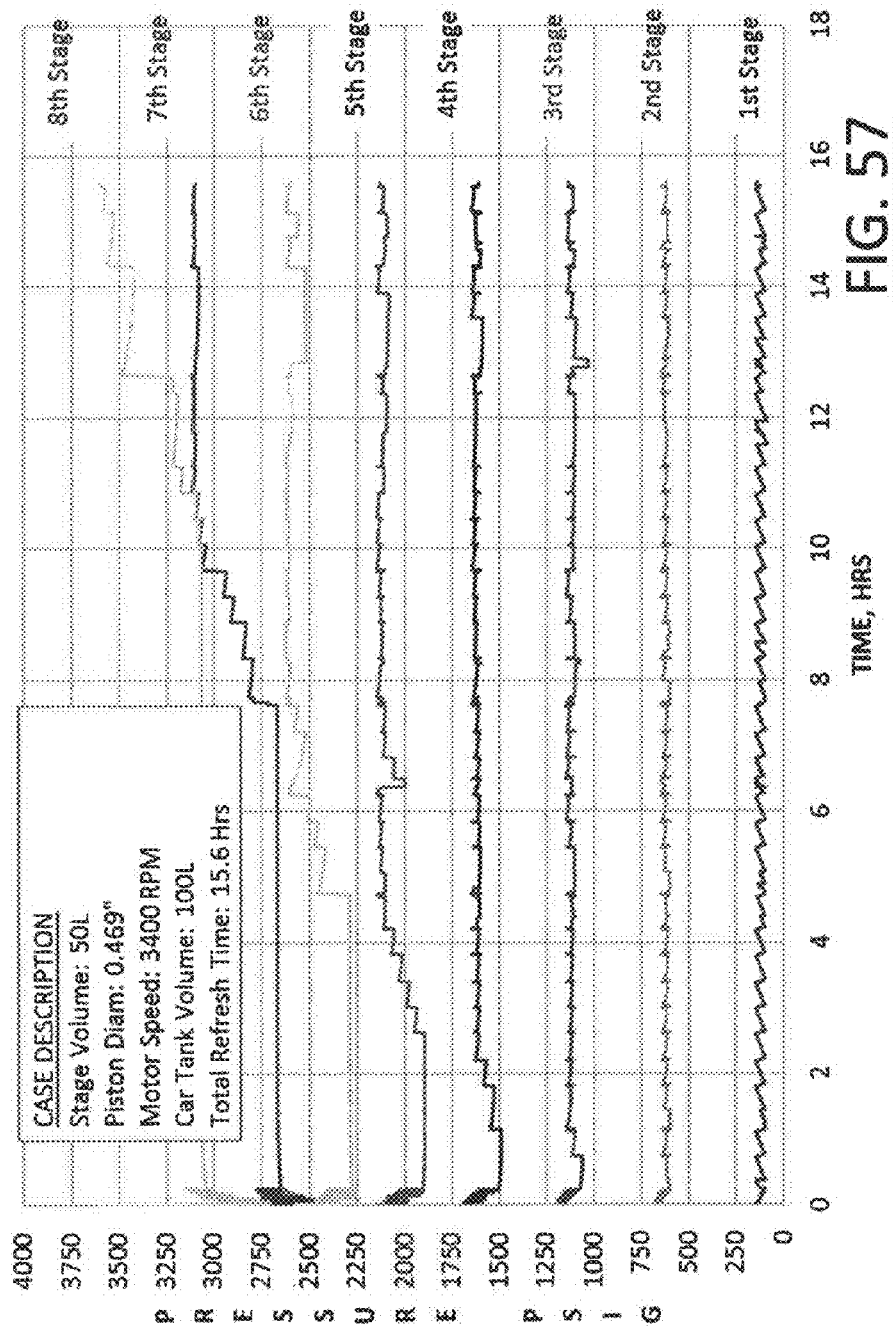
FIG. 57 is a plot diagram of calculated tank pressures over time during a system refresh fill, assuming that the system has previously offloaded gas to a 100 L vehicle tank which began at 2400 psig. This is also an example of WAVE Option #5 step methodology.
Figure 58:
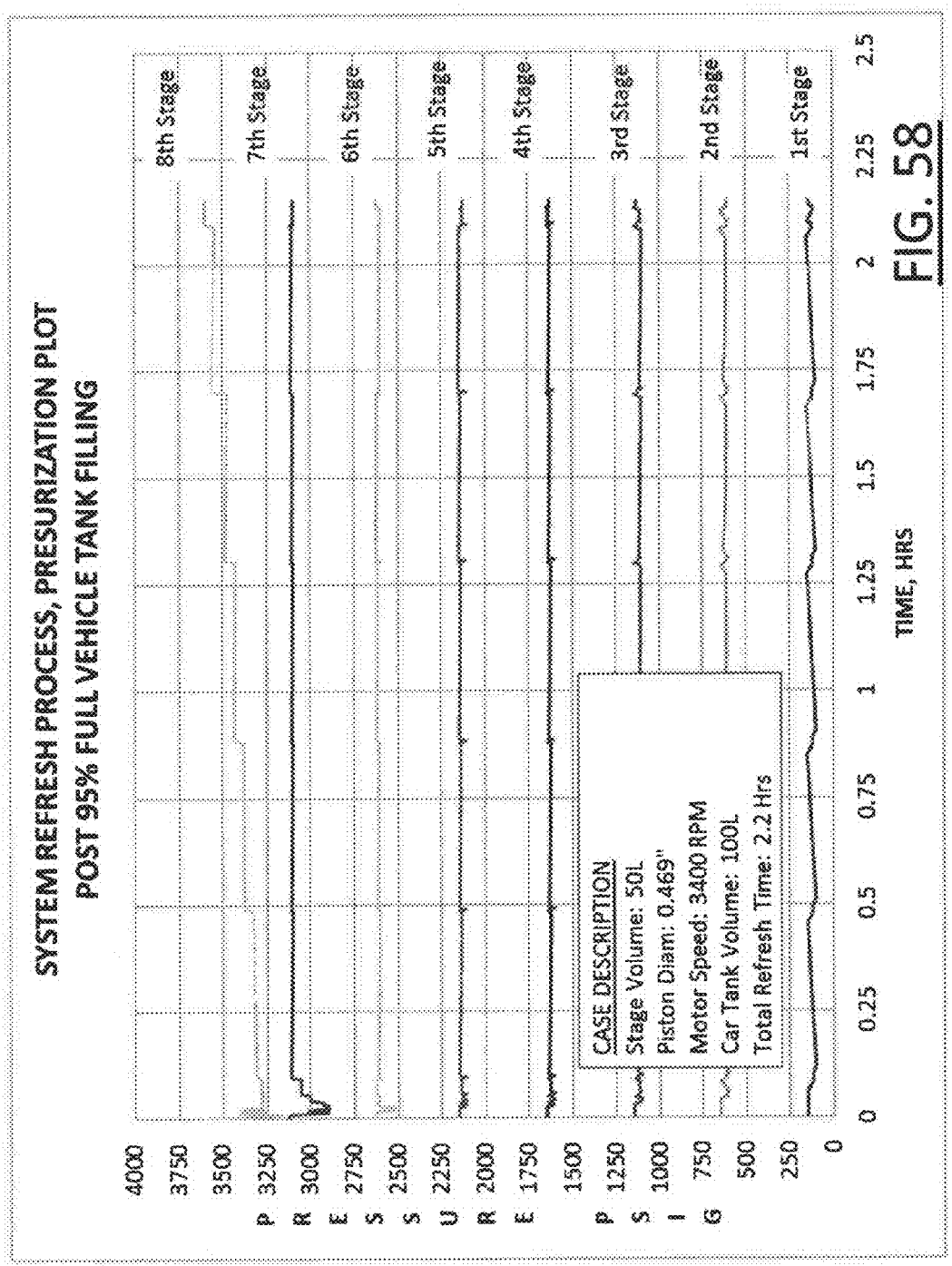
FIG. 58 is a plot diagram of calculated tank pressures over time during a system refresh fill, assuming that the system has previously offloaded gas to a 100 L vehicle tank which began at 3420 psig. This is also an example of WAVE Option #5 step methodology.
Figure 59:
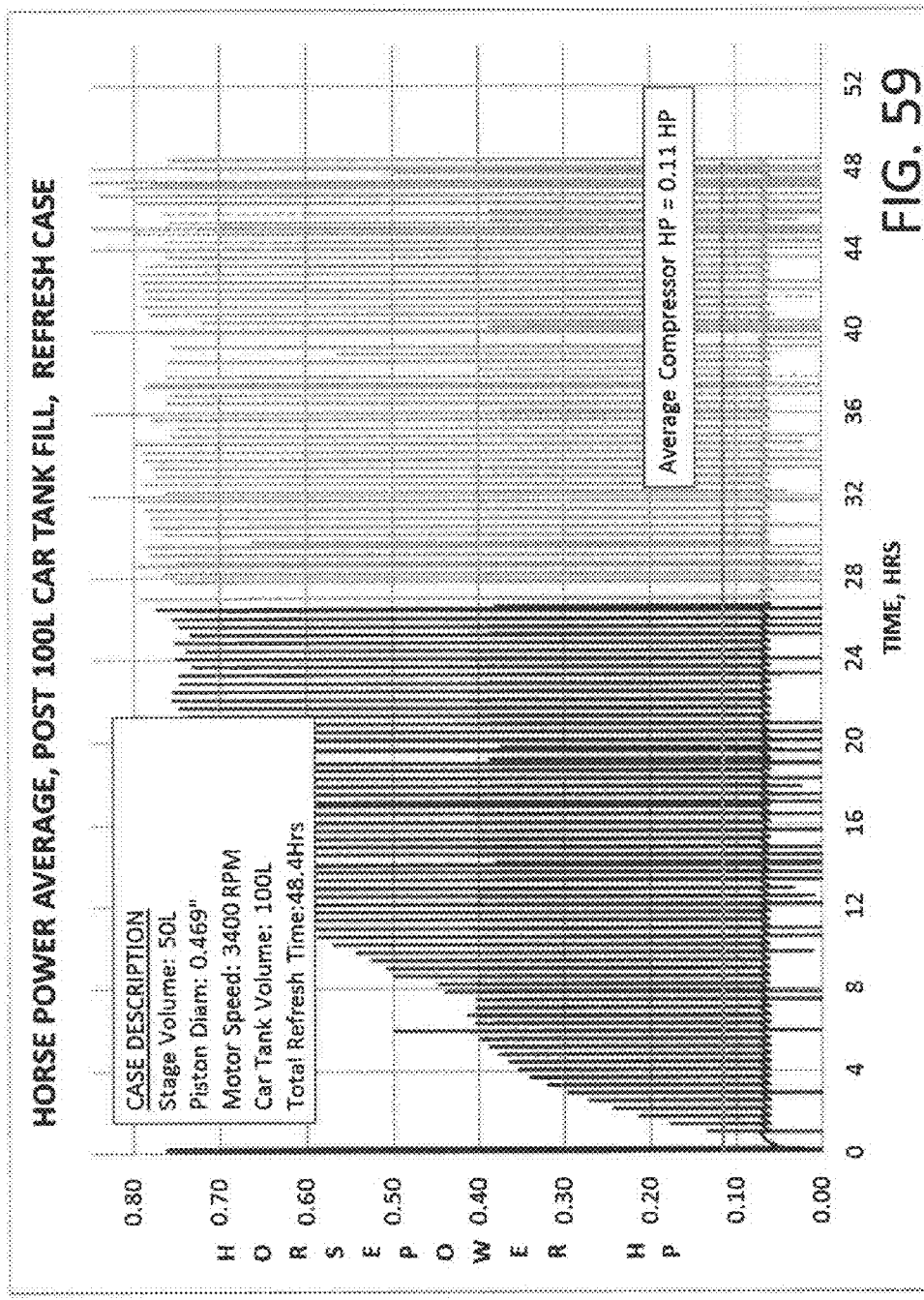
FIG. 59 is a graph comparing efficiency for a typical 4 stage compressor vs. the WAVE methodology.
Figure 60:
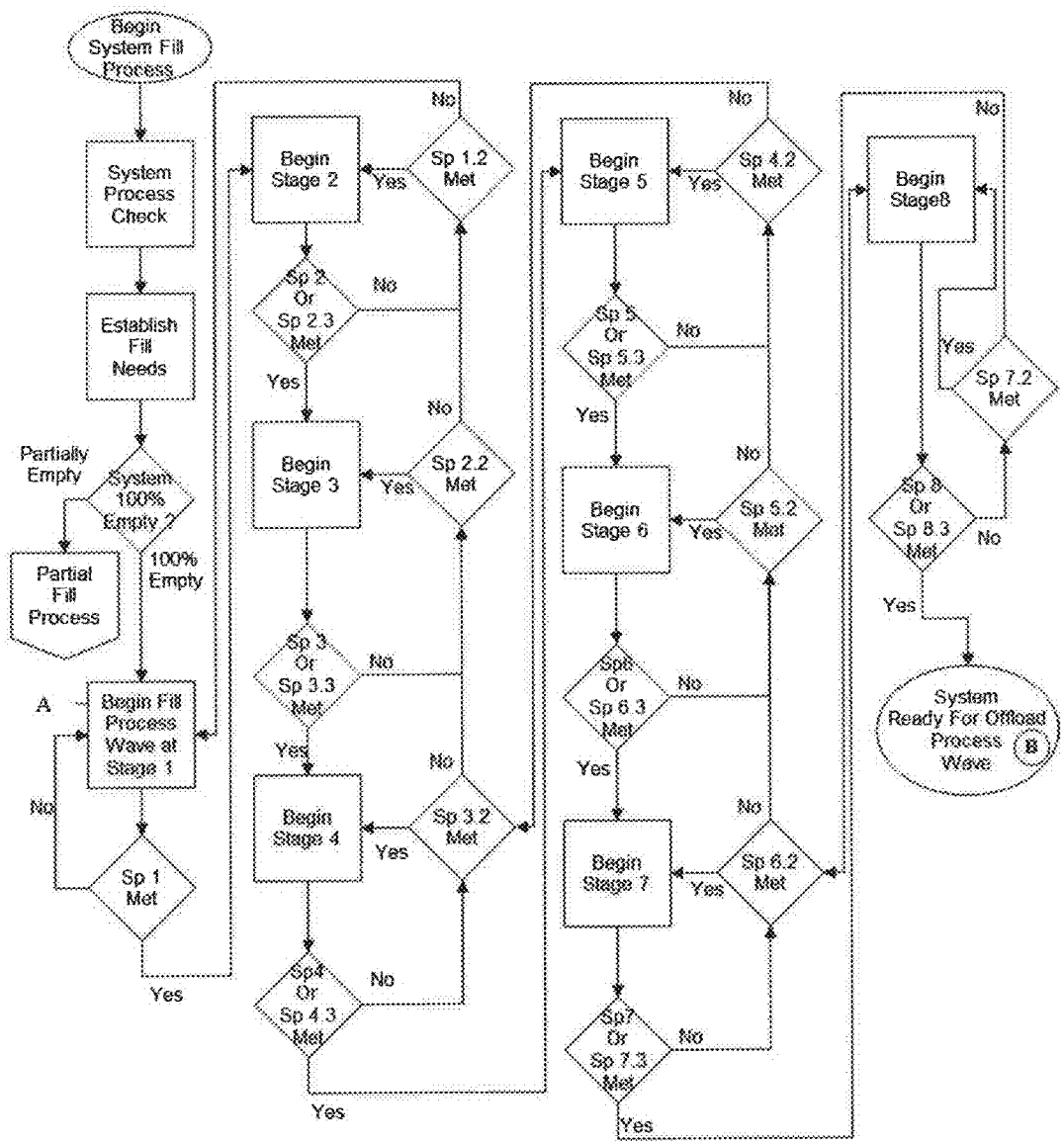
FIG. 60 is a process flow diagram showing an initial or refresh fill.
Figure 61:
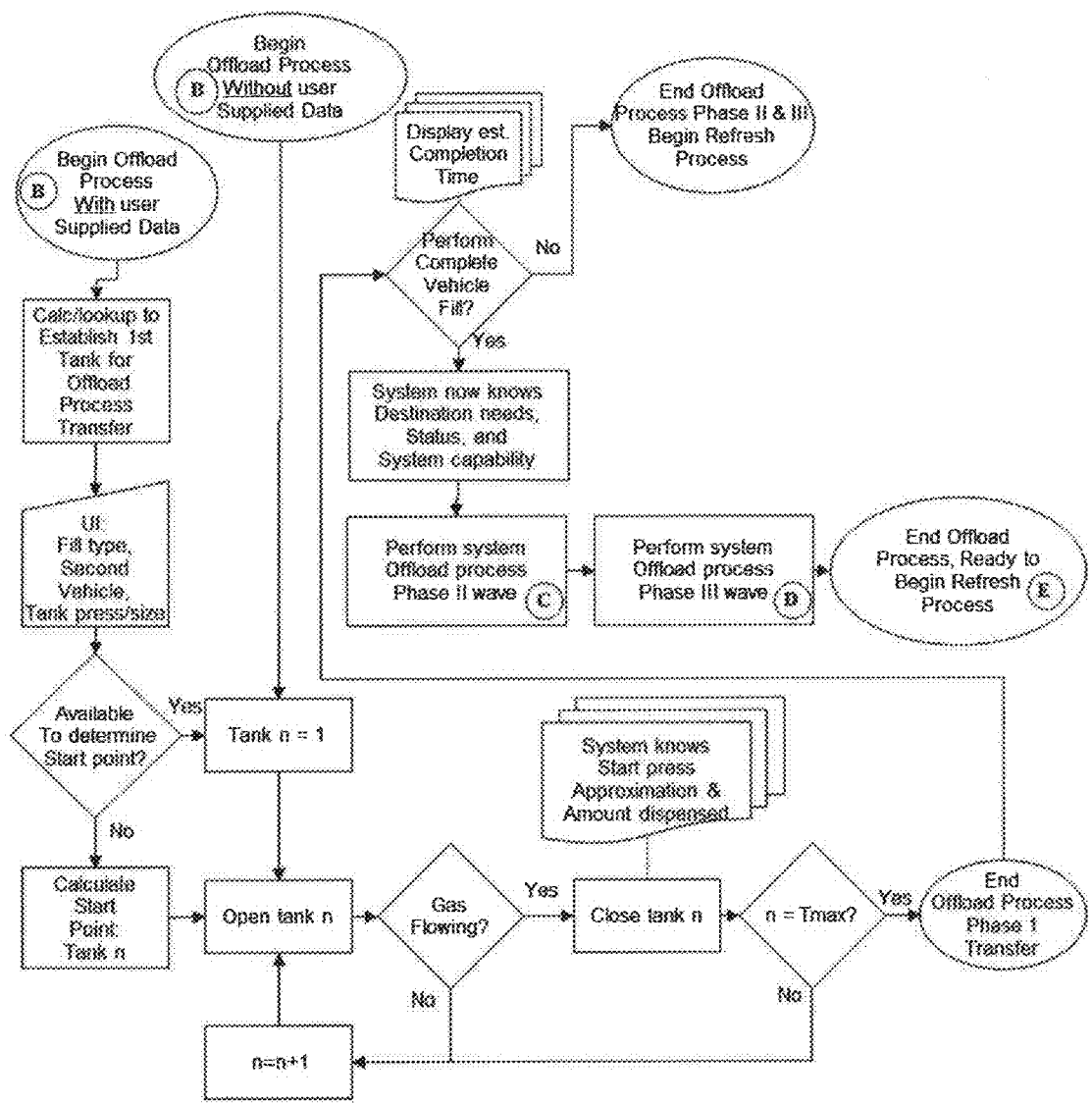
FIG. 61 is a process flow diagram showing a method determination and an off-load transfer via pressure equalization.
Figure 62:
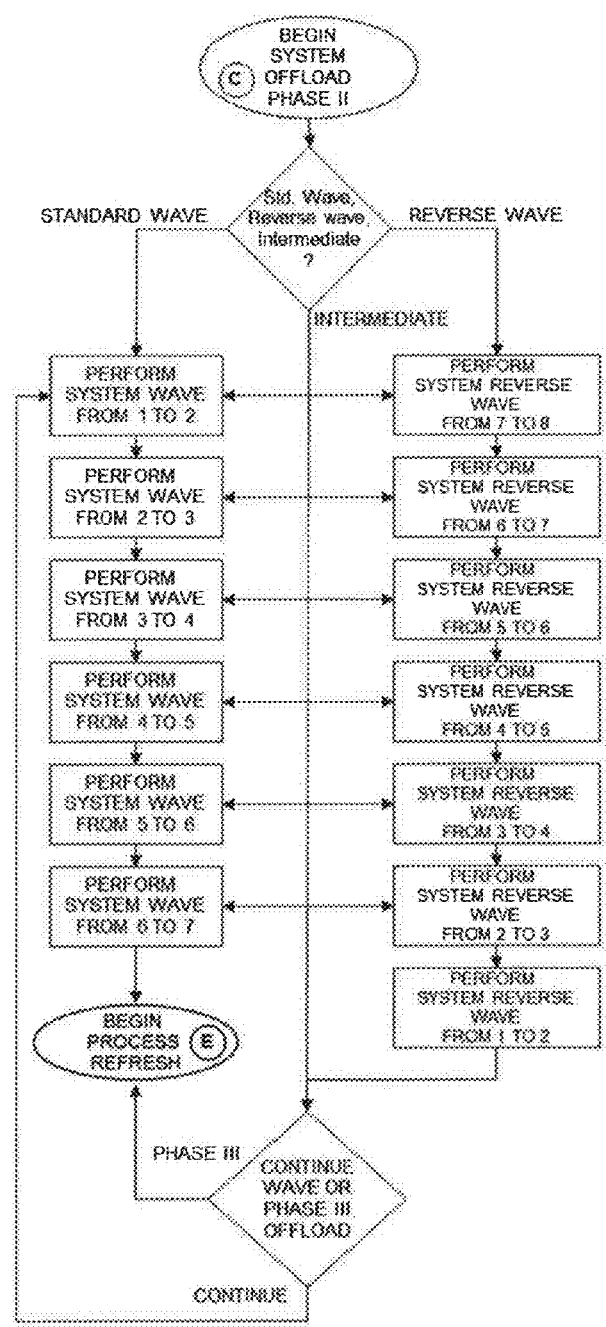
FIG. 62 is a process flow diagram showing off-load tank sequencing.
Figure 63:
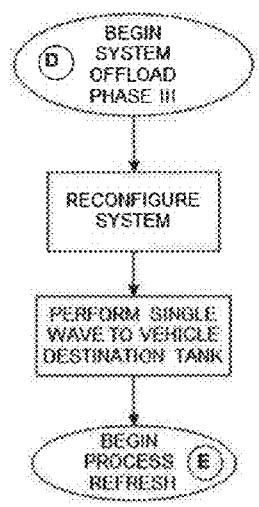
FIG. 63 is a process flow diagram showing a system reconfigure and off-load tank sequencing.
Figure 64:
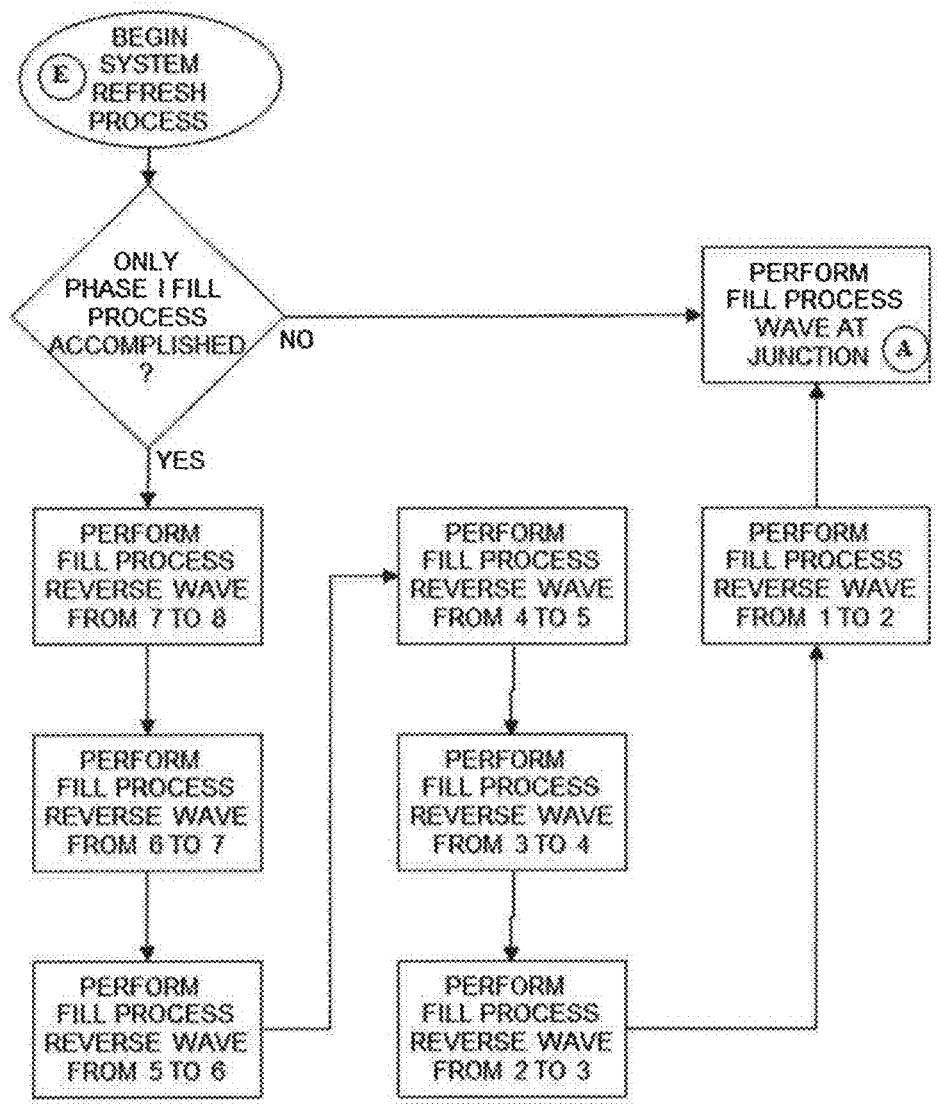
FIG. 64 is a process flow diagram showing a system refresh process.

FIG. 43 includes various embodiments of high pressure tubing connections 1300 which can be used with one or more embodiments disclosed in this application. The high pressure tubing connection can include threaded connector 1310 with softer sealing element 1320. Softer sealing element 1320 is preferably made of teflon or some other material that is softer than flared tubing 1330. Sealing element 1320 can be placed in cavity 1340. Sealing element 1320 can be placed in cavity 1340 and can be easily replaced if damaged. This sealing design has the added advantage of being simple to mechanically produce. Those skilled in the art only need to drill them tap the cavity but not all the way to the bottom of the hole. This creates a sealing surface beyond the length of the threads for sealing element 1320 to press against. This design has the added advantage of creating a smooth internal bore between the cavity and the flared tubing as seen in the bottom illustration of the elbow. This design has the added advantage of compactness because it does not require the use of a conventional adapter fitting which usually leaves a gap at the bottom of the cavity. That gap causes turbulence during high speed gas flow which creates thermal shock to the conventional fitting, eventually causing it to leak.

Valve Embodiments

In one embodiment is provided a selecting valve 100 having a first family of ports 109 having a plurality of ports (e.g., 101, 110, 120, 130, 140, 150, 160, 170, and/or 170) and a second family of ports 209 having a plurality of ports (e.g., 260 and 270), at selected option of a user a plurality of ports from the first family of ports being selectively fluidly connectable with a plurality of ports of the second family of ports 209.

In one embodiment the first family 109 has a plurality of ports. In one embodiment the first family 109 has 2, 3, 4, 5, 6, 7, 8, 9, 10, 11, 12, 13, 14, 15, 16, 17, 18, 19, and 20 ports. In various embodiments the first family of ports 109 has between any two of the above specified number of ports.

In one embodiment the second family of ports 209 has a plurality of ports. In one embodiment the second family has 2, 3, 4, 5, 6, 7, 8, 9, 10, 11, 12, 13, 14, 15, 16, 17, 18, 19, and 20 ports. In various embodiments the second family of ports 209 has between any two of the above specified number of ports.

In one embodiment the first family of ports 109 has two ports and the second family of ports 209 has 4, 5, 6, 7, 8, 9, 10, 11, 12, 13, 14, 15, 16, 17, 18, 19, and 20 ports. In various embodiments the first family of ports 109 has two ports and the second family of ports 209 has between any two of the above specified number of ports.

In one embodiment the second family of ports 209 can be fluidly connected in a first direction by a plurality of one way valves (e.g., 1014, 1024, 1034, 1044, 1054, 1064, 1074, and 1084). In one embodiment the one way valves can be a plurality of check valves. In one embodiment the plurality of check valves can be ported in the top 400 of the valve 100. In one embodiment the plurality of check valves can be ported in the body 200 of the valve 100.

In one embodiment a selector 300 can be operatively connected to the first 109 and second family 209 of ports and used to selectively fluidly connect a first selected selector port (e.g., port 101) from the first family 109 to a first selected first port (e.g., port 270) from the second family 209, and a first selected second selector port (e.g., port 110) from the first family 109 to a first selected second selector port (e.g., port 260) from the second family 209. In one embodiment the selector 300 can be used to change the earlier selected connections between the first 109 and second 209 family of selector ports, to selectively fluidly change to a second selected selector port (e.g., port 110) from the first family 109 to a selector port (e.g., port 270) from the second family 209, and a second selected second port (e.g., port 120) from the first family 109 to a second selector port (e.g., port 260) from the second family 209. In such a manner selector 300 can be used to selectively change the selected connections between a plurality of selector ports from the first family of selector ports 109 to a plurality of selector ports from the second family of selector ports 209.

In one embodiment the selector 300 is used to selectively switch the fluid connection between the first port from the first family 109 and the first port from the second family 209 to the first port from the first family 109 to a third port from the second family 209, and from the second port from the first family 109 to a fourth port from the second family 209.

In one embodiment is provided a selecting valve 100 comprising a body 200 having a first family of ports 109 having a plurality of ports (e.g., 101, 110, 120, 130, 140, 150, 160, 170, and 180) and a second family of ports 209 having a plurality of ports (e.g., 260 and 270), and a selector 300 rotatably mounted with respect to the body 200, the selector 300 selectively fluidly connecting a first port from the first family 109 to a first port from the second family 209 and a second port from the first family 109 to a second port from the second family 209, where the first and second ports in the first family 109 are different ports, and the first and second ports in the second family 209 are different ports.

In one embodiment rotation of the selector 300 relative to the body 200 (e.g., in the direction of arrow 316) selectively switches the fluid connections between a first port from the first family 209 (and the first port from the second family 209) and a second port 209 from the first family 109 (and the second port from the second family 209) to fluidly connecting the first port from the first family 209 to a third port from the second family 209, and fluidly connecting the second port from the first family to a fourth port from the second family 209.

In one embodiment the selector 300 has a circular cross section and is rotationally connected to the body 200. In one embodiment the selector 300 has a rotational axis 304 relative to the body 200. In one embodiment the selector 300 has at least one trunnion 324 which rotationally connects the selector 300 to the body 200.

In one embodiment the first port 260 of the second family 209 includes an opening which fluidly connects with the selector 300 at the intersection of the rotational axis 304 of the selector 300 relative to the body 200. In one embodiment the second port 270 of the second family includes a fluid connection with the selector 300 that is spaced apart from the rotational axis 304 of the selector 300 relative to the body 200. In one embodiment the fluid connection between the selector 300 and the second port 270 of the second family 209 includes an annular recess (e.g., 390 in selector 300 and/or 390' in body 200) the annular recess being circular with its center aligned with the rotational axis 304 between the selector 300 and the body 200. In one embodiment the annular recess 390 is in the selector 300. In one embodiment the annular recess 390' is in the body 200. In one embodiment mating annular recesses 390 and 390' are located in the selector 300 and the body 200.

In one embodiment the selector 300 includes first and second selector fluid conduits (360 and 370), with the first selector fluid conduit 360 having first 362 and second 366 port connectors and the second selector fluid conduit 370 having first 372 and second port 376 connectors.

In one embodiment the first family of ports 109 includes a plurality of conduits (e.g., 101, 110, 120, 130, 140, 150, 160, 170, and 180) having first (e.g., 102, 112, 122, 132, 142, 152, 162, 172, and 182) and second connectors (e.g., 106, 116, 126, 136, 146, 156, 166, 176, and 186) with the second opening of each of the ports being located on a circle having its center located on the relative axis of rotation 304 between the selector 300 and the body 200, and with the angular spacing (e.g., 117, 127, 137, 147, 157, 167, 177, and 187) between adjacent second connectors (e.g., 106, 116, 126, 136, 146, 156, 166, 176, and 186) being the same, and the selector 300 having first 360 and second 370 conduits each having first and second connectors (first conduit 360 having first connector 362 and second connector; and second conduit 370 having first connector 372 and second connector 376), with the first connectors 362 and 372 of the first 360 and second 370 conduits being located on a circle having its center located on the relative axis of rotation 304 between the selector 300 and the body 200, and the angular spacing 380 between the first connectors 362 and 372 of the first and second conduits 360 and 370 being a multiple of the angular spacing between adjacent second openings of the second family of ports 109. In one embodiment the angular spacing between the first connectors 362 and 372 of the first 360 and second 370 conduits is the same as the angular spacing between adjacent second openings of the first family of ports 109. In various embodiments the multiple is 1, 2, 3, 4, 5, 6, 7, 8, 9, and/or 10. In various embodiments the multiple a set of integers falling within a range of any two of the above specified integers.

In one embodiment, regardless of the relative angular position between the selector 300 and the body 200, the second port connector 366 of the first selector conduit 360 of the selector 300 remains fluidly connected to the first port 260 of the second family of ports 209. In one embodiment, regardless of the relative angular position between the selector 300 and the body 200, the second port connector 376 of the second selector conduit 300 remains fluidly connected to the second port 270 of the second family of ports 209.

In one embodiment, regardless of the relative angular position between the selector 300 and the body 200, the second port connector 366 of the first selector conduit 360 of the selector 300 remains fluidly connected to the first port 260 of the second family of ports 209; and the second port connector 376 of the second selector conduit 300 remains fluidly connected to the second port 270 of the second family of ports 209.

In one embodiment relative angular movement between the selector 300 and the body 20 causes one of the second port connectors (e.g., 376) of the plurality of conduits (conduits 360 and 370) of the selector 300 to move in an arc having a substantially uniform radius of curvature about the axis of rotation 304 between the selector 300 and the body 200. In one embodiment, relative angular movement greater than 360 degrees causes one of the second port connectors (e.g., 376) of the plurality of conduits (conduits 360 and 370) of the selector 300 to move in a circle having a radius, while another second port connector (e.g., 366) of the first selector conduit 360 rotates in a single spot about the rotational axis 304 between the selector 300 and the body 200.

In one embodiment relative angular movement of the selector 300 with respect to body 200 causes a first selector port of the first family of selector ports 109 to be connected to a first selector port of the second family of selector ports 209 and a second selector port of the first family of selector ports 109 to be connected to a second selector port of the second family of selector ports, where both the first and second selector ports of the first family are different, and the first and second selector ports of the second family are different.

In one embodiment, relative angular rotation of selector with respect to body of less than the angular spacing between the adjacent second openings of the first family of selector ports 109 causes the first and second conduits of the selector 300 to change from being fluidly connected to being fluidly with the first family of selector ports 109, but such conduits remain fluidly connected with the second family of selector ports 209.

Below will be provided with various examples of system 10 performing steps in various embodiments of the method which include: (A) initial filling of storage tank array 1000 with compressed gaseous fuel; (B) using system 10 to fill a vehicle (e.g., offloading); and (C) refreshing storage tank array 1000 after offloading to be ready for another fill. In this section the term Work Adjusted Volumetric Efficiency (WAVE) methodology will be used as a general label for using a method and apparatus for compressing gases in a staged method with recompressing at least part of the same gas from a first storage medium, to a second storage medium, to a third storage medium, and beyond wherein previously compressed gas is used again as the suction gas in compressor 500 to compress in second, third, etc. stages above the earlier stage's compression pressure points. The storage media described in this embodiment include storage tanks.

By using tanks of progressively higher staged pressures, a single compressor 500 can be used to progressively compress gas to higher and higher staged pressures notwithstanding the fact that the maximum compression rating for such compressor is less than the higher stage pressures. In fact, increasing the number of stages can allow compressor 500 to multiply its effective maximum compression because, with respect to each stage, the compressor itself only sees the difference between its inlet/suction/source pressure and outlet/discharge pressures.

General Overview of Initial Fill Process for System 10 with an Eight Staged Tank System This section will describe just a brief overview of system 10 (filling the storage tanks or other device/medium), using Work Adjusted Volumetric Efficiency (WAVE) methodology for transferring compressed gas into the storage medium (tanks) through the compressor 500.

1. The described example fill process represents the initial filling of the staged storage tank array 10. This type of fill process is generally only accomplished one time since staged storage tank array 10 will not be subsequently completely depleted. It is believed that refilling the only partially depleted staged storage tank array 1000 gains a great deal of system efficiency by never fully depleting the system of the stored energy. It is also believed that the ability of operating with a single very small horse powered compressor 500, incrementally compressing multiple tanks in a pressurized staged tank array (in essence simulating the existence of other stages for a multiple staged compressor), will increase compression efficiency as the number of stages increase in the staged tank array 1000.

3. FIGS. 44-59 depict typical system Fill, Off-load and Refresh Process WAVE methodologies of efficiently storing the gas at ever increasing energy storage levels. This example represents the first and only time system 10 needs to be completely filled. The preferred embodiment of system 10 will generally not deplete the tank gas volumes in staged pressurized tank array 1000; however they could depending upon the need. These remaining system stored energy-states (in staged pressures of tank array 1000 used as suction sources for compressor 500) greatly benefit the subsequent compression, storage and off-loading process system efficiencies.

Initial System 10 Fill Process
Stage 1 WAVE Position 1

1. In this stage the first tank 1010 of the staged pressure tank array 1000 will be filled by compressor 500 to a first predefined set point pressure (SP1) of 150 psig. There currently is no pressure (0 psi) in any of the tanks of storage tank array 1000, compressor 500, tubing, or valves.

2. Ambient temperature exists for all components (conservatively accepted to be 80 degrees F.). For the purposes of this method description the pressure deltas across the valve's 100 internal check valving and ports (e.g., check valves 1014, 1024, 1034, etc.) is not accounted for in the text description so as to more easily describe the subsequent pressure changes in the higher compressed tank stages (such as between individual tanks 1010, 1020, 1030, etc. in storage tank array). It is noted that prototype valve 100 internal check valves have a release spring delta pressure of 3 psi each. Accordingly, as the disclosed Fill, Off-load, and/or Refresh processes are described, the WAVE gas moving between staged tanks 1010, 1020, 1030, etc. through the one way valving (e.g., check valves 1014, 1024, 1034, etc.) to the subsequent next higher staged tanks will be 3 psi less for each subsequently higher staged tank.

3. The source gas valve 17 between the external gas supply 16 is opened and gas flows to zero port 101 of valve 100 and is routed through first selector port 270 of second family of ports 209 into compressor 500 hermetic housing 504.

4. Controller 2000 causes valve 100 to be initially rotated to the first position for pressurizing staged tank array 1000 null position (i.e., Position 1). A motor can be operatively connected to stem 314 of valve 100 and operatively connected to controller 2000 allowing for selective positioning of selector 300 in valve 100, and thereby control which ports in first family ports 109 will be fluidly connected to which ports in second family of ports 209. In Position 1, selector port zero 101 of first family 109 is connected to second selector port 270 of second family 209, and first selector port 260 of second family 209 is connected to first port 110 of first family. Because second selector port 270 of second family is connected to inlet or suction 510 of compressor 500, inlet 16 at this stage will serve as the suction gas for compressor 500. Because first selector port 270 of second family 209 is connector to outlet or discharge 520 of compressor, at this stage first tank 1010 will receive the discharge of compressor 500.

Because check valves 1014, 1024, 1024, 1034, 1044, 1054, 1064, 1074, and 1084 respectively fluidly connect in a one way (e.g., increasing) direction tanks 1010, 1020, 1030, 1040, 1050, 1060, 1070, and 1080 to each other (tank 1010 to 1020, 1020 to 1030, 1030 to 1040, 1040 to 1050, 1050 to 1060, 1060 to 1070, and 1070 to 1080) allowing higher pressure gas to flow from lower numbered staged tanks in tank array 1000 to higher numbered tanks assuming that the minimum check valve activation pressure can be overcome at this stage inlet gas 16, although primarily discharging to tank 1010 (through first port 110), compressor 500 discharge gas also indirectly flows also to tanks 1020, 1030, 1040, 1050, 1060, 1070, and 1080.

NOTE: The safety shutoffvalves (e.g., 1013, 1023, 1033, 1043, 1053, 1063, 1073, and 1083) to the storage tanks are operated corresponding to the associated need for such valves to be opened/closed and their particular operation, and are not further discussed in this section.

5. Compressor 500 is turned on.

6. Time 0 minutes, temperature ambient—compressed gas begins to flow from the Compressor 500 through line 520, through separator 40, through line 521, through valve 524, through valve 528, through line 522, to second port 260 in the middle of the valve 100, through selector 300, and as described above through each of the internal check valves (1014, 1024, 1024, 1034, 1044, 1054, 1064, 1074, and 1084) since each of the higher numbered tanks (tank 1010 to 1020, 1020 to 1030, 1030 to 1040, 1040 to 1050, 1050 to 1060, 1060 to 1070, and 1070 to 1080 are at less pressure than its connected lower numbered tank. In one embodiment, the charge gas temperature for valve 100 never exceeds approximately 110 degrees F.

7. The discharge gas from compressor 500 effluent enters each of the eight tanks of storage tank array 1000 substantially simultaneously. The pressure in storage tank array 1000 slowly and uniformly rises from approximately 0 to 150 psig. Throughout this range of pressure rise, the temperature of the gas within compressor chamber 570 of compressor 500, compressor 500 structural housing 504 and within the downstream tank array 1000, rises proportionally related to the formula PV=nRT. NOTE: Due to the nature of system 10 and its process, the latent heat of compression can be substantially reduced by volumetric sizing of the system and the process accomplishment speed. In various embodiments no added external cooling is needed to lower the gas temperature back to ambient. NOTE: In one embodiment compressor 500 has been optimally designed for a horsepower to displacement to volumetric efficiency to system tank size to system delivery rate, and to a system recovery rate. Therefore in such optimized embodiment the single stage compressor 500 is able to accomplish single stage compression process steps, the work of a multi-stage compressor (e.g., an eight stage compressor).

8. At approximately 8.3 hours the pressure in each of the tanks in tank array 1000 has reached a system stage 1 set point pressure stage 1(SP1) of 150 psig. Note: Tank 1010 of staged tank array 1000 is the first stage tank, and system 10 is now ready to proceed to step two by pressurizing higher numbered staged pressure tanks 1020, 1030, 1040, 1050, 1060, 1070, and 1080 to the second predefined staged set point pressure 2 (SP2) using the gas in the first stage of operation (i.e., the compressed gas in first tank 1010 which was compressed to the first predefined staged pressure SP1 which in this embodiment is 150 psig) and compressor 500 to recompress gas to higher numbered tanks in tank array. Stage 2 WAVE Position 2

9. In this stage the first tank 1010 in staged tank array 1000 will be used as the suction source for compressor 500 in filling higher stages of staged tank array 1000. Controller 2000 causes valve 100 to rotated from Position 1 to position two (i.e., Position 2). In Position 2, first selector port 110 of first family 109 is connected to second selector port 270 of second family 209, and second selector port 260 of second family 209 is connected to second port 120 of first family 109. Gas from tank 1010 at this stage will serve as the suction gas for compressor 500, and second tank 1020 will receive the discharge of compressor 500. Because check valves 1024, 1034, 1044, 1054, 1064, 1074, and 1084 respectively fluidly connect in a one way (e.g., increasing) direction tanks 1030, 1040, 1050, 1060, 1070, and 1080 to each other (tank 1030 to 1040, 1040 to 1050, 1050 to 1060, 1060 to 1070, and 1070 to 1080) allowing higher pressure gas to flow from lower numbered tanks to higher numbered tanks assuming that the minimum check valve activation pressure can be overcome) at this stage gas from tank 1010, although primarily discharging to tank 1020 (through second port 110), Compressor 500 discharge gas also indirectly flows also to tanks 1030, 1040, 1050, 1060, 1070, and 1080. Because tank 1020 is at a higher pressure than tank 1010, check valve 1014 will prevent flow from tank 1020 to tank 1010.

Using both selector ports and check valve porting, Compressor 500 utilizes the 150 psig gas of tank 1010 to compress into tanks 1020, 1030, 1040, 1050, 1060, 1070, and 1080. Compressor 500 continues to run until the pressure in tank 1010 drops to a predefined first tank set point lower pressure (SP1.1) which in this embodiment can be 100 psig. However, it should be noted that SP1.1 is predetermined such that it can be the most efficient pressure point, given the challenge system 10's compressor 500 to compress with higher of a differential pressures. During this stage it is noted that compressor 500 is hermetically sealed, and the rear of piston 560 of compressor 500 sees the inlet pressure (i.e., the pressure of being fed by tank 1010) and the discharge 520 sees the pressure in tanks 1020, 1030, 1040, 1050, 1060, 1070, and 1080. Accordingly, in this second stage when the pressure in tank 1010 drops to 100 psig the differential that compressor 500 is attempting to compress over is equal to the back pressure of the higher numbered tanks less than the pressure in the current suction tank 1010.

It is noted that SP1.1 can also chosen so that the transferred gas' temperature returns to ambient, the piston housing's 504 oil bath temperature lowers because the compressor 500 is no longer compressing at its higher horsepower loading.

10. Once tank 1010 reaches SP1.1, system 10 now proceeds back a step to gain additional moles of gas to refill tank

1010 up to SP1. Controller 2000 causes stem 314 of valve 100 to be rotated to Position 1 and 0.5 psig is waiting at port zero 101.

11. Compressor 500 is now taking gas from inlet 16 at 0.5 psig and compressing this gas against the 100 psig in tank 1010 until the pressure of tank 1010 rises above the pressure seen in tank 1020 (and higher numbered tanks in tank array 1000 via one way check valves). The gas exiting compressor 500 is approximately 110 degrees F., and quickly cools to 70 degrees as it expands into the tanks. Compressor 500 uses inlet 16 gas at 0.5 psig to again fill tank 1010 with compressed gas at SP1 of 150 psig, and then controller 2000 moves valve 100 to Position 2 to cause tank 1010 to be the suction for compressor 500 when compressing gas as described in step 9.

12. The repeating process of:
    (a) using tank 1010 as the suction gas source for compressor 500 when compressing to higher staged tanks in tank array 1000 (tanks 1020, 1030, 1040, 1050, 1060, 1070, and 1080) until the pressure of now source tank 1010 SP1.1 drops to 100 psig; and then
    (b) switching valve 100 to Position 1 where home source 16 becomes the suction pressure source for compressor 500 and tank 1010 becomes the discharge until tank 1010 is refilled to its SP1 pressure of 150 psig: and then
    (c) switching valve 100 to Position 2 where tank 1010 is again the suction source for compressor 500 to compress gas to higher staged tanks in tank array 1000 until the next staged tank 1020 in tank array 1000 reaches a desired staged set point pressure (SP2) of 650 psig.

It takes about 22.5 minutes for compressor 500 to use home source 16 to fill first tank 1010 to its SP1 pressure of 150 psi., repeating steps 9(a), (b), and (c) are repeated 63 times, at an approximate rate of 22.5 minutes per (a) to (c) step, and the entire time line for bringing the next staged tank 1020 in tank array 1000 to desired staged set point pressure (SP2) of 650 psig takes approximately 23.7 hours to complete, for a cumulative time period for compression Stage 1 and Stage 2 run-time is about 32 hours. Now, when SP1 of 650 psig is achieved in tank 1020, and system 10 is ready to move from Stage 2 to Stage 3, the actual pressure in first staged tank 1010 will be somewhere between its predefined SP1 of 150 psig and predefined lower SP1.1 of 100 psig.

Stage 3 WAVE Position 3

13. Valve 100 is rotated to Position 3. In this stage the second tank 1020 in staged tank array 1000 will be used as the suction source for compressor 500 in filling higher stages of staged tank array 1000 to a third predefined staged pressure set point (SP3) which in this embodiment is 1,150 psig. Controller 2000 causes valve 100 to be rotated to position three (i.e., Position 3). In Position 3, second selector port 120 of first family 109 is connected to second selector port 270 of second family 209, and selector port 260 of second family 209 is connected to third port 130 of first family 109. Gas from tank 1020 at this stage will serve as the suction gas for compressor 500, and third tank 1030 will receive the discharge of compressor 500. Because check valves 1034, 1044, 1054, 1064, 1074, and 1084 respectively fluidly connect in a one way (e.g., increasing) direction tanks 1040, 1050, 1060, 1070, and 1080 to each other (tank 1030 to 1040, 1040 to 1050, 1050 to 1060, 1060 to 1070, and 1070 to 1080) allowing higher pressure gas to flow from lower numbered tanks to higher numbered tanks assuming that the minimum check valve activation pressure can be overcome) at this stage gas from tank 1020, although primarily discharging to tank 1030 (through third port 130), Compressor 500 discharge gas also indirectly flows also to tanks 1040, 1050, 1060, 1070, and 1080. Because tank 1030 is at a higher pressure than tank 1020, check valve 1024 will prevent flow from tank 1030 to tank 1020.

Using both selector ports and check valve porting, Compressor 500 utilizes the 650 psig gas of tank 1020 to compress into tanks 1030, 1040, 1050, 1060, 1070, and 1080. Compressor 500 continues to run until the pressure in tank 1020 drops to a predefined second tank set point lower pressure (SP2.1) which in this embodiment can be 350 psig. However, it should be noted that SP2.1 is predetermined such that it can be the most efficient pressure point, given the challenge system 10's compressor 500 to compress with higher of a differential pressures. During this stage it is noted that compressor 500 is hermetically sealed, and the rear of piston 560 of compressor 500 sees the inlet pressure (i.e., the pressure of being fed by tank 1020) and the discharge 520 sees the pressure in tanks 1030, 1040, 1050, 1060, 1070, and 1080. Accordingly, in this third stage when the pressure in tank 1020 drops to 350 psig the differential that compressor 500 is attempting to compress over is equal to the back pressure of the higher numbered tanks less than the pressure in the current suction tank 1020.

The compressor 500 continues to run until the pressure in tank 1020 drops to SP2.1 at 350 psig. At this lower set point pressure, system 10 proceeds back a step (or rolls back) to gain additional moles of gas to refill tank 1020 up to its predefined SP2. Such rolling back is called a wave, and system 10 has a choice of whether to make the immediately proceeding staged tank in tank array as the suction source for compressor 500 or go back to the initial suction source of home gas 16. In this embodiment, system 10 going back multiple steps to home source 16 is disclosed.

Stage 1 WAVE

14. First staged tank 1010 is some amount between its predefined SP1 of 150 psig and predefined lower SP1.1 of 100 psig, and will be brought back up to its SP1 of 150 psig. Valve 100 is rotated to Position 1 with home source 16 as suction and first staged tank 1010 as discharge for compressor 500. Gas at ambient temp from the external supply at 0.5 psig flows through port 101 to the Compressor 500 hermetic housing 504. Compressor 500 which is still running utilizes the 0.5 psig gas to compress into tank 1010 until tank 1010 reaches its predefined SP1 of 150 psig so that tank 1010 can be used as suction for the next staged compression step.

Stage 2 WAVE

15. Valve 100 is rotated to Position 2 with first staged tank 110 as the suction and second staged tank 1020 as the discharge. Gas at ambient temp from tank 1010 at 150 psig flows through compressor 500 hermetic housing 504 and is compressed into tank 1020 which starts initially at the lower second stage predefined set point SP2.2. of 350 psig. Because at this point higher staged tanks are at least at 650 psig, check valves 1034, 1044 do not allow gas to flow through the check valve porting to the higher staged tanks and gas only flows from discharge into second staged tank 1020. Compressor 500 continues to run until the pressure in tank 1010 drops to SP1.1 at 100 psig. Note that the accomplishment of Step 14 and 15 takes approximately 27 minutes and accomplishes a 65 psig differential pressure increase into second staged tank 1020.

16. Steps 14 and 15 are repeated 5 times, over a cumulative 2.2 hours

17. All steps above in Stage 3 are repeated 9 times over a 20 hour period and this brings the pressures of staged pressure tanks 1030, 1040, 1050, 1060, 1070, 1080 up to 1150 psig which in this embodiment is the predefined third staged pressure set point (SP3). Each of the nine Stage 3 process sub-steps provides an approximately 55 psig pressure gain in the higher staged tanks.

Stage 4 WAVE Position 4

18. The valve 100 is rotated to Position 4. In this stage the third tank 1030 in staged tank array 1000 will be used as the suction source for compressor 500 in filling higher stages of staged tank array 1000 to a fourth predefined staged pressure set point (SP4) which in this embodiment is 1,650 psig. Controller 2000 causes valve 100 to be rotated to Position 4 wherein third selector port 130 of first family 109 is connected to second selector port 270 of second family 209, and selector port 260 of second family 209 is connected to fourth port 140 of first family 109. Gas from tank 1030 at this stage will serve as the suction gas for compressor 500, and fourth tank 1040 will receive the discharge of compressor 500. Because check valves 1054, 1064, 1074, and 1084 respectively fluidly connect in a one way (e.g., increasing) direction tanks 1060, 1070, and 1080 to each other (tank 1050 to 1060, 1060 to 1070, and 1070 to 1080) allowing higher pressure gas to flow from lower numbered tanks to higher numbered tanks assuming that the minimum check valve activation pressure can be overcome) at this stage gas from tank 1030, although primarily discharging to tank 1040 (through fourth port 140), compressor 500 discharge gas also indirectly flows also to tanks 1060, 1070, and 1080. Because tank 1040 is at a higher pressure than tank 1030, check valve 1044 will prevent flow from tank 1040 to tank 1030.

Using both selector ports and check valve porting, Compressor 500 utilizes the 1150 psig gas of tank 1030 to compress into tanks 1040, 1050, 1060, 1070, and 1080. Compressor 500 continues to run until the pressure in tank 1030 drops to a predefined third tank set point lower pressure (SP3.1) which in this embodiment can be 850 psig. However, it should be noted that SP3.1 is predetermined such that it can be the most efficient pressure point, given the challenge system 10's compressor 500 to compress with higher of a differential pressures. During this stage it is noted that compressor 500 is hermetically sealed, and the rear of piston 560 of compressor 500 sees the inlet pressure (i.e., the pressure of being fed by tank 1030) and the discharge 520 sees the pressure in tanks 1040, 1050, 1060, 1070, and 1080. Accordingly, in this fourth stage when the pressure in tank 1030 drops to SP3.1 the differential that compressor 500 is attempting to compress over is equal to the back pressure of the higher numbered tanks less than the pressure in the current suction tank 1030.

The compressor 500 continues to run until the pressure in tank 1030 drops to SP3.1 at 850 psig. At this lower set point pressure, system 10 proceeds back a step (or rolls back or waves) to gain additional moles of gas to refill tank 1030 up to its predefined SP3. The system wave has a choice of whether to make the immediately proceeding staged tank in tank array as the suction source for compressor 500 or go back to the initial suction source of home gas 16. In this embodiment, system 10 going back to multiple steps to home source 16 is disclosed. System 10 now proceeds back a step to gain additional moles of gas to refill tank 1030 up to SP3, and initiates waves which repeat steps comprising portions of the steps disclosed in fill Stages 1, 2 and 3

Stage 1 WAVE

19. Valve 100 is rotated to Position 1 (external source 16 suction/first tank 1010 discharge) so that gas at ambient temp from the external supply 16 at 0.5 psig flows through zero selector port 101 to compressor 500 hermetic housing 504, and is compressed into first staged tank 1010. Compressor 500 continues to run until the pressure in tank 1010 achieves SP1 at 150 psig at which point system 10 enters wave 2.

Stage 2 WAVE

20. Valve 100 is rotated to Position 2 (first tank 1010 suction/second tank 1020 discharge) so that gas at ambient temp from tank first staged 1010 of 150 psig flows through port 110 to compressor 500 hermetic housing 504, and into second staged tank 1020. Compressor 500 continues to run until the pressure in first staged tank 1010 drops to SP1.1 of 100 psig.

21. Steps 19 and 20 are repeated 5 times, over a cumulative 2.3 hours

Stage 3 WAVE

22. Valve 100 is rotated to Position 3 (second tank 1020 suction/third tank 1030 discharge) so that gas at ambient temp from tank 1020 at SP2 of 650 psig flows to compressor 500 hermetic housing 504, is compressed and discharged into third staged tank 1030. Compressor 500 continues to run until the pressure in second staged tank 1020 drops to SP2.1 of 350 psig.

23. All steps above in Stage 4 are repeated 8 times over an 18 hour period and this brings the pressure of staged tanks 1040, 1050, 1060, 1070, 1080 up to 1650 psig, SP4. Each of the 8 process steps is increases higher staged pressures by about 62 psig.

Stage 5 WAVE Position 5

24. Valve 100 is rotated to Position 5. In this stage the fourth tank 1040 in staged tank array 1000 will be used as the suction source for compressor 500 in filling higher stages of staged tank array 1000 to a fifth predefined staged pressure set point (SP5) which in this embodiment is 2,150 psig. Controller 2000 causes valve 100 to be rotated to Position 5, wherein fourth selector port 140 of first family 109 is connected to second selector port 270 of second family 209, and selector port 260 of second family 209 is connected to fifth port 150 of first family 109. Gas from tank 1040 at this stage will serve as the suction gas for compressor 500, and fifth tank 1050 will receive the discharge of compressor 500. Because check valves 1064, 1074, and 1084 respectively fluidly connect in a one way (e.g., increasing) direction tanks 1060, 1070, and 1080 to each other (tank 1050 to 1060, 1060 to 1070, and 1070 to 1080) allowing higher pressure gas to flow from lower numbered tanks to higher numbered tanks assuming that the minimum check valve activation pressure can be overcome at this stage gas from tank 1040, although primarily discharging to tank 1050 (through fifth port 150), compressor 500 discharge gas also indirectly flows also to tanks 1060, 1070, and 1080. Because tank 1050 is at a higher pressure than tank 1040, check valve 1044 will prevent flow from tank 1050 to tank 1040.

Using both selector ports and check valve porting, Compressor 500 utilizes the 1650 psig gas of tank 1040 to compress into tanks 1050, 1060, 1070, and 1080. Compressor 500 continues to run until the pressure in tank 1040 drops to a fourth predefined tank set point lower pressure (SP4.1) which in this embodiment can be 1,350 psig. However, it should be noted that SP4.1 is predetermined such that it can be the most efficient pressure point, given the challenge system 10's compressor 500 to compress with higher of a differential pressures. During this stage it is noted that compressor 500 is hermetically sealed, and the rear of piston 560 of compressor 500 sees the inlet pressure (i.e., the pressure of being fed by tank 1030) and the discharge 520 sees the pressure in tanks 1050, 1060, 1070, and 1080. Accordingly, in this fourth stage when the pressure in tank 1040 drops to SP4.1 the differential that compressor 500 is attempting to compress over is equal to the back pressure of the higher numbered tanks less than the pressure in the current suction tank 1040.

The compressor 500 continues to run until the pressure in tank 1040 drops to SP4.1 at 1,150 psig. At this lower set point pressure, system 10 proceeds back a step (or rolls back or waves) to gain additional moles of gas to refill tank 1040 up to its predefined SP4. The system wave has a choice of whether to make the immediately proceeding staged tank in tank array as the suction source for compressor 500 or go back to the initial suction source of external gas 16. In this embodiment, system 10 going back to multiple steps to external source 16 is disclosed. System 10 now proceeds back a step to gain additional moles of gas to refill tank 1040 up to SP4, and initiates waves which repeat of steps comprising portions of the steps disclosed in fill Stages 1, 2, 3, and 4.

Stage 1 WAVE

25. Valve 100 is rotated to Position 1 (external source 16 suction/first tank 1010 discharge) so that gas at ambient temp from the external supply 16 at 0.5 psig flows through zero selector port 101 to compressor 500 hermetic housing 504, and is compressed into first staged tank 1010. Compressor 500 continues to run until the pressure in tank 1010 achieves SP1 at 150 psig at which point system 10 enters wave 2.

Stage 2 WAVE

26. Valve 100 is rotated to Position 2 (first tank 1010 suction/second tank 1020 discharge) so that gas at ambient temp from tank first staged 1010 of 150 psig flows through port 110 to compressor 500 hermetic housing 504, and into second staged tank 1020. Compressor 500 continues to run until the pressure in first staged tank 1010 drops to SP1.1 of 100 psig.

27. Steps 26 and 27 are repeated 5 times, over a cumulative 2.4 hours

Stage 3 WAVE

28. Valve 100 is rotated to Position 3 (second tank 1020 suction/third tank 1030 discharge) so that gas at ambient temp from tank 1020 at SP2 of 650 psig flows to compressor 500 hermetic housing 504, is compressed and discharged into third staged tank 1030. Compressor 500 continues to run until the pressure in second staged tank 1020 drops to SP2.1 of 350 psig.

Stage 4 WAVE

29. Valve 100 is rotated to Position 4 (third tank 1030 suction/fourth tank 1040 discharge) so that gas at ambient temp from tank 1030 at SP3 of 1,150 psig flows to compressor 500 hermetic housing 504, is compressed and discharged into fourth staged tank 1040. Compressor 500 continues to run until the pressure in third staged tank 1030 drops to SP3.1 of 850 psig. Now system 10 proceeds back a step to gain additional moles of gas to refill third staged tank 1030 up to SP3 of 1,150 psig.

30. All steps above in Stage 5 are repeated 6 times over a 14 hour period and this brings the pressure of tanks SP5 of 2,150 psig for tanks 1050, 1060, 1070, 1080. Each of the six stage 5 process steps is approximately 83 psig.

Stage 6 WAVE Position 6

31. Valve 100 is rotated to Position 6. In this stage the fifth tank 1050 in staged tank array 1000 will be used as the suction source for compressor 500 in filling higher stages of staged tank array 1000 to a sixth predefined staged pressure set point (SP6) which in this embodiment is 2,650 psig. Controller 2000 causes valve 100 to be rotated to Position 6, wherein fifth selector port 150 of first family 109 is connected to second selector port 270 of second family 209, and selector port 260 of second family 209 is connected to sixth port 160 of first family 109. Gas from tank 1050 at this stage will serve as the suction gas for compressor 500, and sixth tank 1060 will receive the discharge of compressor 500. Because check valves 1074, and 1084 respectively fluidly connect in a one way (e.g., increasing) direction tanks 1070 and 1080 to each other (tank 1060 to 1070 and 1070 to 1080) allowing higher pressure gas to flow from lower numbered tanks to higher numbered tanks assuming that the minimum check valve activation pressure can be overcome) at this stage gas from tank 1050, although primarily discharging to tank 1060 (through sixth port 160), compressor 500 discharge gas also indirectly flows also to tanks 1070 and 1080. Because tank 1060 is at a higher pressure than tank 1050, check valve 1064 will prevent flow from tank 1060 to tank 1050.

Using both selector ports and check valve porting, Compressor 500 utilizes the 2,150 psig gas of tank 1050 to compress into tanks 1060, 1070, and 1080. Compressor 500 continues to run until the pressure in tank 1050 drops to a fifth predefined tank set point lower pressure (SP5.1) which in this embodiment can be 1,850 psig. However, it should be noted that SP5.1 is predetermined such that it can be the most efficient pressure point, given the challenge system 10's compressor 500 to compress with higher of a differential pressures. During this stage it is noted that compressor 500 is hermetically sealed, and the rear of piston 560 of compressor 500 sees the inlet pressure (i.e., the pressure of being fed by tank 1050) and the discharge 520 sees the pressure in tanks 1060, 1070, and 1080. Accordingly, in this sixth stage when the pressure in tank 1050 drops to SP5.1 the differential that compressor 500 is attempting to compress over is equal to the back pressure of the higher numbered tanks less than the pressure in the current suction tank 1050.

The compressor 500 continues to run until the pressure in tank 1050 drops to SP5.1 at 1,850 psig. At this lower set point pressure, system 10 proceeds back a step (or rolls back or waves) to gain additional moles of gas to refill tank 1050 up to its predefined SP5. The system wave has a choice of whether to make the immediately proceeding staged tank in tank array as the suction source for compressor 500 or go back to the initial suction source of external gas 16. In this embodiment, system 10 going back to multiple steps to external source 16 is disclosed. System 10 now proceeds back a step to gain additional moles of gas to refill tank 1050 up to SP5, and initiates waves which repeat steps comprising portions of the steps disclosed in fill Stages 1, 2, 3, 4, and 5.

Stage 1 WAVE

32. Valve 100 is rotated to Position 1 (external source 16 suction/first tank 1010 discharge) so that gas at ambient temp from the external supply 16 at 0.5 psig flows through zero selector port 101 to compressor 500 hermetic housing 504, and is compressed into first staged tank 1010. Compressor 500 continues to run until the pressure in tank 1010 achieves SP1 at 150 psig at which point system 10 enters wave 2.

Stage 2 WAVE

33. Valve 100 is rotated to Position 2 (first tank 1010 suction/second tank 1020 discharge) so that gas at ambient temp from tank first staged 1010 of 150 psig flows through port 110 to compressor 500 hermetic housing 504, and into second staged tank 1020. Compressor 500 continues to run until the pressure in first staged tank 1010 drops to SP1.1 of 100 psig.

34. Steps 32 and 33 are repeated 5 times, over a cumulative 2.5 hours

Stage 3 WAVE

35. Valve 100 is rotated to Position 3 (second tank 1020 suction/third tank 1030 discharge) so that gas at ambient temp from tank 1020 at SP2 of 650 psig flows to compressor 500 hermetic housing 504, is compressed and discharged into third staged tank 1030. Compressor 500 continues to run until the pressure in second staged tank 1020 drops to SP2.1 of 350 psig.

Stage 4 WAVE

36. Valve 100 is rotated to Position 4 (third tank 1030 suction/fourth tank 1040 discharge) so that gas at ambient temp from tank 1030 at SP3 of 1,150 psig flows to compressor 500 hermetic housing 504, is compressed and discharged into fourth staged tank 1040. Compressor 500 continues to run until the pressure in third staged tank 1030 drops to SP3.1 of 850 psig.

Stage 5 WAVE

37A. Valve 100 is rotated to Position 5 (fourth tank 1040 suction/fifth tank 1050 discharge) so that gas at ambient temp from tank 1040 at SP3 of 1,650 psig flows to compressor 500 hermetic housing 504, is compressed and discharged into fifth staged tank 1050. Compressor 500 continues to run until the pressure in fourth staged tank 1040 drops to SP4.1 of 1,350 psig.

Stage 6 WAVE

37B. Valve 100 is rotated to Position 6 (fifth tank 1050 suction/sixth tank 1060 discharge) so that gas at ambient temp from tank 1050 at SP5 of 2,150 psig flows to compressor 500 hermetic housing 504, is compressed and discharged into sixth staged tank 1060. Compressor 500 continues to run until the pressure in fifth staged tank 1050 drops to SP5.1 of 1,850 psig.

38. All steps above in Stage 6 are repeated 4 times over a 10 hour period and this brings the pressure of stages tanks up to the sixth predefined staged pressure point of 2,650 psig (tanks 1060, 1070, and 1080). Each of the four stage 6 process steps is approximately 125 psig.

Stage 7 WAVE Position 7

39. Valve 100 is rotated to Position 7. In this stage the sixth tank 1060 in staged tank array 1000 will be used as the suction source for compressor 500 in filling higher stages of staged tank array 1000 to a seventh predefined staged pressure set point (SP7) which in this embodiment is 3,150 psig. Controller 2000 causes valve 100 to be rotated to Position 7, wherein sixth selector port 160 of first family 109 is connected to second selector port 270 of second family 209, and selector port 260 of second family 209 is connected to seventh port 170 of first family 109. Gas from tank 1060 at this stage will serve as the suction gas for compressor 500, and seventh tank 1070 will receive the discharge of compressor 500. Because check valve 1084 fluidly connects in a one way (e.g., increasing) direction tanks 1070 and 1080 to each other (tank 1070 to 1080) allowing higher pressure gas to flow from lower numbered tank 1070 to higher numbered tank 1080, assuming that the minimum check valve activation pressure can be overcome, at this stage gas from tank 1060, although primarily discharging to tank 1070 (through seventh port 170), compressor 500 discharge gas also indirectly flows also to tank 1080. Because tank 1070 is at a higher pressure than tank 1060, check valve 1074 will prevent flow from tank 1070 to tank 1060.

Using both selector ports and check valve porting, Compressor 500 utilizes the 2,650 psig gas of tank 1060 to compress into tanks 1070 and 1080. Compressor 500 continues to run until the pressure in tank 1060 drops to a sixth predefined tank set point lower pressure (SP6.1) which in this embodiment can be 2,350 psig. However, it should be noted that SP6.1 is predetermined such that it can be the most efficient pressure point, given the challenge system 10's compressor 500 to compress with higher of a differential pressures. During this stage it is noted that compressor 500 is hermetically sealed, and the rear of piston 560 of compressor 500 sees the inlet pressure (i.e., the pressure of being fed by tank 1060) and the discharge 520 sees the pressure in tanks 1070 and 1080. Accordingly, in this seventh stage when the pressure in tank 1060 drops to SP6.1 the differential that compressor 500 is attempting to compress over is equal to the back pressure of the higher numbered tanks less than the pressure in the current suction tank 1060.

The compressor 500 continues to run until the pressure in tank 1060 drops to SP6.1 at 2,350 psig. At this lower set point pressure, system 10 proceeds back a step (or rolls back or waves) to gain additional moles of gas to refill tank 1060 up to its predefined SP6. The system wave has a choice of whether to make the immediately proceeding staged tank in tank array as the suction source for compressor 500 or go back to the initial suction source of external gas 16. In this embodiment, system 10 going back to multiple steps to external source 16 is disclosed. System 10 now proceeds back a step to gain additional moles of gas to refill tank 1060 up to SP6, and initiates waves which repeat of steps comprising portions of the steps disclosed in fill Stages 1, 2, 3, 4, 5, and 6.

Stage 1 WAVE

40. Valve 100 is rotated to Position 1 (external source 16 suction/first tank 1010 discharge) so that gas at ambient temp from the external supply 16 at 0.5 psig flows through zero selector port 101 to compressor 500 hermetic housing 504, and is compressed into first staged tank 1010. Compressor 500 continues to run until the pressure in tank 1010 achieves SP1 at 150 psig at which point system 10 enters wave 2.

Stage 2 WAVE

41. Valve 100 is rotated to Position 2 (first tank 1010 suction/second tank 1020 discharge) so that gas at ambient temp from tank first staged 1010 of 150 psig flows through port 110 to compressor 500 hermetic housing 504, and into second staged tank 1020. Compressor 500 continues to run until the pressure in first staged tank 1010 drops to SP1.1 of 100 psig.

42. Steps 40 and 41 are repeated 5 times, over a cumulative 2.5 hours

Stage 3 WAVE

43. Valve 100 is rotated to Position 3 (second tank 1020 suction/third tank 1030 discharge) so that gas at ambient temp from tank 1020 at SP2 of 650 psig flows to compressor 500 hermetic housing 504, is compressed and discharged into third staged tank 1030. Compressor 500 continues to run until the pressure in second staged tank 1020 drops to SP2.1 of 350 psig. Now system 10 proceeds back a step to gain additional moles of gas to refill second staged tank 1020 up to SP2 of 650 psig.

Stage 4 WAVE

44. Valve 100 is rotated to Position 4 (third tank 1030 suction/fourth tank 1040 discharge) so that gas at ambient temp from tank 1030 at SP3 of 1,150 psig flows to compressor 500 hermetic housing 504, is compressed and discharged into fourth staged tank 1040. Compressor 500 continues to run until the pressure in third staged tank 1030 drops to SP3.1 of 850 psig.

Stage 5 WAVE

45. Valve 100 is rotated to Position 5 (fourth tank 1040 suction/fifth tank 1050 discharge) so that gas at ambient temp from tank 1040 at SP3 of 1,650 psig flows to compressor 500 hermetic housing 504, is compressed and discharged into fifth staged tank 1050. Compressor 500 continues to run until the pressure in fourth staged tank 1040 drops to SP4.1 of 1,350 psig.

Stage 6 WAVE

46. Valve 100 is rotated to Position 6 (fifth tank 1050 suction/sixth tank 1060 discharge) so that gas at ambient temp from tank 1050 at SP5 of 2,150 psig flows to compressor 500 hermetic housing 504, is compressed and discharged into sixth staged tank 1060. Compressor 500 continues to run until the pressure in fifth staged tank 1050 drops to SP5.1 of 1,850 psig.

47. All steps above in Stage 7 are repeated 3 times over a 7 hour period and this brings the pressure of staged tanks 1070 1080 up to the seventh predefined staged pressure point SP7 of 3,650 psig (tanks 1070 and 1080). Each of the three stage 7 process steps is approximately 165 psig.

Stage 8 WAVE Position 8

48. Valve 100 is rotated to Position 8. In this stage the seventh tank 1070 in staged tank array 1000 will be used as the suction source for compressor 500 in filling higher stages of staged tank array 1000 to an eighth predefined staged pressure set point (SP8) which in this embodiment is 3,650 psig. Controller 2000 causes valve 100 to be rotated to Position 8, wherein seventh selector port 170 of first family 109 is connected to second selector port 270 of second family 209, and selector port 260 of second family 209 is connected to eighth port 170 of first family 109. Gas from tank 1070 at this stage will serve as the suction gas for compressor 500, and eighth tank 1080 will receive the discharge of compressor 500. Because tank 1080 is at a higher pressure than tank 1070, check valve 1084 will prevent flow from tank 1080 to tank 1070.

Using both selector ports and check valve porting, Compressor 500 utilizes the 2,650 psig gas of tank 1070 to compress into tank 1080. Compressor 500 continues to run until the pressure in tank 1070 drops to a seventh predefined tank set point lower pressure (SP7.1) which in this embodiment can be 2,850 psig. However, it should be noted that SP7.1 is predetermined such that it can be the most efficient pressure point, given the challenge system 10's compressor 500 to compress with higher of a differential pressures. During this stage it is noted that compressor 500 is hermetically sealed, and the rear of piston 560 of compressor 500 sees the inlet pressure (i.e., the pressure of being fed by tank 1070) and the discharge 520 sees the pressure in tank 1080. Accordingly, in this eighth stage when the pressure in tank 1070 drops to SP7.1 the differential that compressor 500 is attempting to compress over is equal to the back pressure of tank 1080 less the pressure in the current suction tank 1070.

The compressor 500 continues to run until the pressure in tank 1070 drops to SP7.1 at 2,850 psig. At this lower set point pressure, system 10 proceeds back a step (or rolls back or waves) to gain additional moles of gas to refill tank 1070 up to its predefined SP7. The system wave has a choice of whether to make the immediately proceeding staged tank in tank array as the suction source for compressor 500 or go back to the initial suction source of external gas 16. In this embodiment, system 10 going back to multiple steps to external source 16 is disclosed. System 10 now proceeds back a step to gain additional moles of gas to refill tank 1070 up to SP7, and initiates waves which repeat of steps comprising portions of the steps disclosed in fill Stages 1, 2, 3, 4, 5, 6, and 7.

Stage 1 WAVE

49. Valve 100 is rotated to Position 1 (external source 16 suction/first tank 1010 discharge) so that gas at ambient temp from the external supply 16 at 0.5 psig flows through zero selector port 101 to compressor 500 hermetic housing 504, and is compressed into first staged tank 1010. Compressor 500 continues to run until the pressure in tank 1010 achieves SP1 at 150 psig at which point system 10 enters wave 2.

Stage 2 WAVE

50. Valve 100 is rotated to Position 2 (first tank 1010 suction/second tank 1020 discharge) so that gas at ambient temp from tank first staged 1010 of 150 psig flows through port 110 to compressor 500 hermetic housing 504, and into second staged tank 1020. Compressor 500 continues to run until the pressure in first staged tank 1010 drops to SP1.1 of 100 psig.

51. Steps 49 and 50 are repeated 5 times, over a cumulative 2.5 hours Stage 3 WAVE 52. Valve 100 is rotated to Position 3 (second tank 1020 suction/third tank 1030 discharge) so that gas at ambient temp from tank 1020 at SP2 of 650 psig flows to compressor 500 hermetic housing 504, is compressed and discharged into third staged tank 1030. Compressor 500 continues to run until the pressure in second staged tank 1020 drops to SP2.1 of 350 psig.

Stage 4 WAVE

53. Valve 100 is rotated to Position 4 (third tank 1030 suction/fourth tank 1040 discharge) so that gas at ambient temp from tank 1030 at SP3 of 1,150 psig flows to compressor 500 hermetic housing 504, is compressed and discharged into fourth staged tank 1040. Compressor 500 continues to run until the pressure in third staged tank 1030 drops to SP3.1 of 850 psig.

Stage 5 WAVE

54. Valve 100 is rotated to Position 5 (fourth tank 1040 suction/fifth tank 1050 discharge) so that gas at ambient temp from tank 1040 at SP4 of 1,650 psig flows to compressor 500 hermetic housing 504, is compressed and discharged into fifth staged tank 1050. Compressor 500 continues to run until the pressure in fourth staged tank 1040 drops to SP4.1 of 1,350 psig.

Stage 6 WAVE

55. Valve 100 is rotated to Position 6 (fifth tank 1050 suction/sixth tank 1060 discharge) so that gas at ambient temp from tank 1050 at SP5 of 2,150 psig flows to compressor 500 hermetic housing 504, is compressed and discharged into sixth staged tank 1060. Compressor 500 continues to run until the pressure in fifth staged tank 1050 drops to SP5.1 of 1,850 psig.

Stage 7 WAVE

56. Valve 100 is rotated to Position 7 (sixth tank 1060 suction/seventh tank 1070 discharge) so that gas at ambient temp from tank 1060 at SP6 of 2,650 psig flows to compressor 500 hermetic housing 504, is compressed and discharged into seventh staged tank 1070. Compressor 500 continues to run until the pressure in sixth staged tank 1060 drops to SP6.1 of 2,350 psig.

Stage 8 WAVE

57. Valve 100 is rotated to Position 8 (seventh tank 1070 suction/eighth tank 1080 discharge) so that gas at ambient temp from tank 1070 at SP7 of 3,150 psig flows to compressor 500 hermetic housing 504, is compressed and discharged into eighth staged tank 1080. Compressor 500 continues to run until the pressure in seventh staged tank 1070 drops to SP7.1 of 2,850 psig.

58. All steps above in Stage 8 are only accomplished once over a 2 hour period, for a process subtotal runtime of approximately 103 hours, and this brings the pressure of tank 1080 up to 3650 psig, SP8. The single 8 WAVE step is approximately 500 psig.

59. Valve 100 is rotated to accomplish Stage 1, 2, 3, 4, 5, 6 and then Stage 7 WAVE processes in order to bring Stage 7 up from SP7.1 to SP7.

60. Valve 100 is rotated to accomplish Stage 1, 2, 3, 4, 5 and then Stage 6 WAVE processes in order to bring Stage 6 up from SP6.1 to SP6.

61. Valve 100 is rotated to accomplish Stage 1, 2, 3, 4 and then Stage 5 WAVE processes in order to bring Stage 5 up from SP5.1 to SP5.

62. Valve 100 is rotated to accomplish Stage 1, 2, 3 and then Stage 4 WAVE processes in order to bring Stage 4 up from SP4.1 to SP4.

63. Valve 100 is rotated to accomplish Stage 1, 2 and then Stage 3 WAVE processes in order to bring Stage 3 up from SP3.1 to SP3.

64. Valve 100 is rotated to accomplish Stage 1 and then Stage 2 WAVE processes in order to bring Stage 2 up from SP2.1 to SP2.

65. Valve 100 is rotated to accomplish Stage 1 replenishment process in order to bring Stage 1 up from SP1.1 to SP1.

66. After a cumulative run-time of approximately 113 hours the entire system 10 is full and either ready for Off-loading or for additional work on the alternate embodiment of system 10, Compressor 500 is stopped, and valve 100 is rotated to the Null Position or Position 1.

In one embodiment, Position 9 can be defined as both ports 260 and 270 as resting over blank seals. For practical reasons, it is usually sufficient to park the suction over a blank port or the discharge over a blank port (Position 9 as shown in FIG. 1A). Position 9 can be used when compressor 500 is actively filling vehicle car. Position 0 (not shown in FIG. 1A)=port 270 blanked off, Port 260 to port 101 is where system 10 can normally rest after staged tank array 1000 is full. Position 9=Port 270 to port 180 and port 260 blanked off is where system 10 preferably sits during an active compressor suction to vehicle 20. Position NULL would be defined as both ports 260 and 270 blanked off but in practice is not normally required. Instead, system 10 can normally use Position 0 instead (which can include the possibility of using an extra position is somehow an end run. Additionally, it is preferred that valve 100 not be operated where it is moved from Position 9 to Position 1.

Overall System Off-Loading Process

This section will include a brief overview of using one embodiment of system 10 in an Off-loading Process (filling a car tank or other device/medium), by utilizing differential pressure transfers between two devices coupled with the Work Adjusted Volumetric Efficient (WAVE) methodology for moving compressed gas through the Compressor 500 but this time into a car tank or other device.

The Off-load Process benefits from the higher stored pressures during the simple transfer phase and is therefore more efficiently able to then WAVE process move gas to the destination tank(s) during the System 10 compression phase II and III portion of the process. This in turn allows the System 10 Refresh Process to therefore more quickly and efficiently replenish the System 10 System by utilizing the System 10 Refresh Process.

FIGS. 47-54 depict typical System 10 System off-loading of gas to destination tank(s) and are described below as the System 10 Off-load Processes Phase I, II and III.

Example 1: Offloading to 100% Empty Destination

Phase I

Off-Load Stage 1 Transfer

1. Valve 100 is rotated to Position 1. Valve 524 is closed, and valves 528 and 532 are opened. Gas at ambient temp from tank 1010 at SP1, 150 psig, flows through first selector port 110 of first family 109 to first selector port 260 of second family 209, through tee 53, and to the vehicle tank(s)/destination. The gas will either stop or continue to flow into the destination tank(s), series of tanks or other flow path.

If the flow of the gas stops then this either signifies the car's tank(s) is at a pressure greater than the supplying tank's gas pressure. If the flow continues, the destination tank(s) will then come into a pressure equalization setting shared with the System 10 System source tank. Once equalization has been achieved, system 10 will proceed to the next Stage.

Off-Load Stage 2 Transfer

2. Valve 100 is rotated to Position 2. Gas at ambient temp from tank 1020 at SP2, 650 psig, flows through first second selector port 120 of first family 109 to first selector port 260 of second family 209, through tee 53, and to the vehicle tank(s)/destination. The gas will either stop or continue to flow into the destination tank(s), series of tanks or other flow path.

If the flow of the gas stops then this either signifies the car's tank(s) is at a pressure greater than the supplying tank's gas pressure. If the flow continues, the destination tank(s) will then come into a pressure equalization setting shared with the System 10 source tank. Once equalization has been achieved, system 10 will proceed to the next Stage Off-Load Stage 3 Transfer 3. Valve 100 is rotated to Position 3. Gas at ambient temp from tank 1030 at SP3, 1,150 psig, flows through third selector port 130 of first family 109 to first selector port 260 of second family 209, through tee 53, and to the vehicle tank(s)/destination. The gas will either stop or continue to flow into the destination tank(s), series of tanks or other flow path.

If the flow of the gas stops then this either signifies the car's tank(s) is at a pressure greater than the supplying tank's gas pressure. If the flow continues, the destination tank(s) will then come into a pressure equalization setting shared with the System 10 System source tank. Once equalization has been achieved, system 10 will proceed to the next Stage Off-Load Stage 4 Transfer 4. Valve 100 is rotated to Position 4. Gas at ambient temp from tank 1040 at SP4, 1650 psig, flows through fourth selector port 140 of first family 109 to first selector port 260 of second family 209, through tee 53, and to the vehicle tank(s)/destination. The gas will either stop or continue to flow into the destination tank(s), series of tanks or other flow path.

If the flow of the gas stops then this either signifies the car's tank(s) is at a pressure greater than the supplying tank's gas pressure. If the flow continues, the destination tank(s) will then come into a pressure equalization setting shared with the System 10 System source tank. Once equalization has been achieved, system 10 will proceed to the next Stage.

Off-Load Stage 5 Transfer

5. Valve 100 is rotated to Position 5. Gas at ambient temp from tank 1050 at SP5, 2150 psig, flows through fifth selector port 150 of first family 109 to first selector port 260 of second family 209, through tee 53, and to the vehicle tank(s)/destination. The gas will either stop or continue to flow into the destination tank(s), series of tanks or other flow path.

If the flow of the gas stops then this either signifies the car's tank(s) is at a pressure greater than the supplying tank's gas pressure. If the flow continues, the destination tank(s) will then come into a pressure equalization setting shared with the source tank. Once equalization has been achieved, system 10 will proceed to the next Stage.

Off-Load Stage 6 Transfer

6. Valve 100 is rotated to Position 6. gas at ambient temp from tank 1060 at SP6, 2650 psig, flows through sixth selector port 160 of first family 109 to first selector port 260 of second family 209, through tee 53, and to the vehicle tank(s)/destination. The gas will either stop or continue to flow into the destination tank(s), series of tanks or other flow path.

If the flow of the gas stops then this either signifies the car's tank(s) is at a pressure greater than the supplying tank's gas pressure. If the flow continues, the destination tank(s) will then come into a pressure equalization setting shared with the source tank. Once equalization has been achieved, system 10 will proceed to the Stage.

Off-Load Stage 7 Transfer

7. Valve 100 is rotated to Position 7. Gas at ambient temp from tank 1070 at SP7, 3150 psig, flows through first seventh port 170 of first family 109 to first selector port 260 of second family 209, through tee 53, and to the vehicle tank(s)/destination. The gas will either stop or continue to flow into the destination tank(s), series of tanks or other flow path.

If the flow of the gas stops then this either signifies the car's tank(s) is at a pressure greater than the supplying tank's gas pressure. If the flow continues, the destination tank(s) will then come into a pressure equalization setting shared with the source tank. Once equalization has been achieved, system 10 will proceed to the Stage Off-Load Stage 8 Transfer 8. Valve 100 is rotated to Position 8. Gas at ambient temp from tank 1080 at SP8, 3650 psig, flows through eighth selector port 180 of first family 109 to first selector port 260 of second family 209, through tee 53, and to the vehicle tank(s)/destination. The gas will either stop or continue to flow into the destination tank(s).

If the flow of the gas stops then the process is complete. If the flow continues, the destination tank(s) will then come into a pressure equalization setting shared with the source tank. Once equalization has been achieved, the Fill Phase I is complete. It should be noted that system 10 has now completed Phase 1 of the Off-Load Process and is ready to perform the WAVE Off-load Phase II. In one embodiment a user can have the choice to continue or not continue with process of WAVE offloads or offloading.

Phase II

1. Valve 532 is closed.
2. Valve 524 and 528 are open.
3. The Compressor 500 is started.

Off-Load Stage 2 WAVE

4. Valve 100 is rotated to Position 2. Gas at ambient temp from tank 1010 at SP1.3 psig flows through port 110 of first family of ports 109 to second port 270 of second family of ports 209, to input 510, and to compressor 500 hermetic housing 504.

Compressor 500 which is still running further compresses the pressurized psig gas of tank 1010 to compress and discharges such gas into tank 1020. The compressor continues to run until the pressure in tank 1020 rises to be approximately 500 psig higher than the falling pressure of tank 1010

Off-Load Stage 3 WAVE

5. The Valve 100 is rotated to Position 3. Gas at below ambient temp from tank 1020, SP2.3, flows through port 120 of first family of ports 109 to second port 270 of second family of ports 209, to input 510, and to compressor 500 hermetic housing 504. Compressor 500 which is still running further compresses the pressurized/compressed gas of tank 1020 and discharges such gas into tank 1030. Compressor 500 continues to run until the pressure in tank 1030 rises to be approximately 500 psig higher than the falling pressure of tank 1020

Off-Load Stage 4 WAVE

6. Valve 100 is rotated to Position 4. Gas at ambient temp from tank 1030, SP3.3, flows through port 130 of first family of ports 109 to second port 270 of second family of ports 209, to input 510, and to compressor 500 hermetic housing 504. Compressor 500 which is still running further compresses the pressurized/compressed gas of tank 1030 and discharges such gas into tank 1040. Compressor 500 continues to run until the pressure in tank 1040 rises to be approximately 500 psig higher than the falling pressure of tank 1030.

Off-Load Stage 5 WAVE

7. Valve 100 is rotated to Position 5. Gas at ambient temp from tank 1040, SP4.3, flows through port 150 of first family of ports 109 to second port 270 of second family of ports 209, to input 510, and to compressor 500 hermetic housing 504. Compressor 500 which is still running further compresses the pressurize/compressed gas of tank 1040 and discharges such gas into tank 1050. Compressor 500 continues to run until the pressure in tank 1050 rises to be approximately 500 psig higher than the falling pressure of tank 1040.

Off-Load Stage 6 WAVE

8. Valve 100 is rotated to Position 6. Gas at ambient temp from tank 1050, SP5.3, flows through port 150 of first family of ports 109 to second port 270 of second family of ports 209, to input 510, and to compressor 500 hermetic housing 504. Compressor 500 which is still running further compresses the pressurized/compressed gas of tank 1050 and discharges such gas into tank 1060. Compressor 500 continues to run until the pressure in tank 1060 rises to be approximately 500 psig higher than the falling pressure of tank 1050.

Off-Load Stage 7 WAVE

9. Valve 100 is rotated to Position 7. Gas at ambient temp from tank 1060, SP6.3, flows through port 160 of first family of ports 109 to second port 270 of second family of ports 209, to input 510, and to compressor 500 hermetic housing 504. Compressor 500 which is still running further compresses the pressurized/compressed gas of tank 1060 and discharges such gas into tank 1070. Compressor 500 continues to run until the pressure in tank 1070 rises to be approximately 500 psig higher than the falling pressure of tank 1060.

Off-Load Stage 8 WAVE

10. Valve 100 is rotated to Position 8. Gas at ambient temp from tank 1070, SP7.3, flows through port 170 of first family of ports 109 to second port 270 of second family of ports 209, to input 510, and to compressor 500 hermetic housing 504. Compressor 500 which is still running further compresses the pressurized/compressed gas of tank 1070 and discharges such gas into tank 1080. Compressor 500 continues to run until the pressure in tank 1080 rises to be approximately 500 psig higher than the falling pressure of tank 1070.

Phase III

NOTE: The accomplishment of the above described Off-load Process Phase II now has system 10 ready for utilization of compressor 500 to move gas from tank 1080 to the vehicle tank(s)/destination, with an additional 500 delta pressure WAVE.

11. Valve 528 is closed, and valves 524 and 532 are opened.

12. Valve 100 is rotated to Position 9 (shown FIG. 1A rotated clockwise relative to Position 8 in FIG. 1A). Gas at ambient temp from tank 1080 flows through eighth port 180 of first family 109 to second selector port 270 of second family 209, and to compressor 500 hermetic housing 504. Compressor 500 which is still running further compresses the pressurized/compressed gas of tank 1080 and discharges such gas into the vehicle tank(s)/destination. Compressor 5000 continues to run until the pressure of tank 1080 decreases to SP8.2 which is the current pressure of tank 1080 (SP8.3) minus 200 psi. Correspondingly, System 10 is able to stop the process flow as based on known to the industry practices of motor amperage draw, compressor delta P measurements.

13. The above series of Off-load Process WAVE Stages can be performed if, and as many times as needed, to the point where the allowable Compressor 500 P/D has been exceeded. The methodology for predetermining the number of times to repeat the process is described above. System 10 can be purposely sized such that the ability to over pressurize the destination tank is not possible because compressor 500 can be uniquely sized, in conjunction with the tank set points to not have the ability to compress over a specific delta P.

14. This entire described Off-load Process, with only a single WAVE took approximately 13 minutes for a 100% depleted destination tank.

15. The above Off-load Process, Phases II and III can be repeated as needed to accomplish the System 10's needs.

16. Valve 532 is closed, and valves 524 and 528 are opened.

Example 2: Offloading to 95% Full Destination

Phase I

1. The Off-load Process needs to deliver a quantity of gas to the vehicle (exampled here as a destination tank of 100 L, arriving at approximately 3420 psig for a fill).

2. Valve 524 is closed, and valves 528 and 532 are opened. System 10 by the means previously discussed embodiment regarding an ability to receive user interface, for this example, system 10 knows approximately what the pressure of the destination tank is. Therefore, system 10 has chosen not to perform a WAVE from Tank 1010, 1020, 1030, 1040, 1050, 1060, 1070 and 1080, and not to perform a reverse WAVE from Tank 1080, 1070, 1060, 1050, 1040, 1030, 1020, and 1010. Instead, system 10 has chosen, in this example to start the Off-load Process at valve Position 6, tank 1060.

3. System 10 rotates valve 100 to Position 6 (attempting to offload from tank 1060) and no gas flows from system 10 because the vehicle/destination is at 3420 psig. which is greater than the pressure in tank 1060.

4. System 10 rotates valve 100 to Position 7 and no gas flowed from system 10 because the vehicle/destination is at 3420 psig. which is greater than the pressure in tank 1070.

Off-Load Stage 8 Transfer

5. Valve 100 is rotated to Position 8. Gas at ambient temp from tank 1080 at SP8, 3650 psig, flows through eighth selector port 110 of first family 109 to first selector port 260 of second family 209, through tee 53, and towards to car tank(s)/destination. Once the flow rate virtually stops, the destination tank(s) will then be at a pressure equalization setting shared with the system 10 source tank. This is approximately 3,490 psi (dependent on tank temperatures and other known to the industry factors)

Phase II

System 10 by the means previously discussed with regards to its ability to calculate the approximate need of the destination tank, has determined that it only needs to perform an Off-load WAVE utilizing only the gas in tank 1080. An Off-load Process WAVE from any lower tank was not needed.

Phase III

6. Valve 532 is opened.

7. Valve 524 is opened and valve 528 is closed.

8. Compressor 500 is started.

9. Valve 100 is rotated to Position 9. Gas at ambient temp from tank 1080, which is in equilibrium pressure with the destination tank at approximately 3,420 psi, SP8.3 flows through eighth selector port 110 of first family 109 to first selector port 260 of second family 209, and to compressor 500 hermetic housing 504. Compressor 500 which is still running further compresses the SP8.3 gas of tank 1080, and discharges such compressed gas into the destination tank. Compressor 500 continues to run until the pressure of tank 1080 decreases to SP8.2 which equals the initial pressure of tank 1080 (SP8.3) minus 350 psi. However, the setting of SP8.2 to 350 psi less than SP8.3 could be varied due to system 10 status and sizing and temperatures. Correspondingly, system 10 is also able to stop the process flow as based on known to the industry practices of motor amperage draw, compressor delta P measurements, etc.

10. The destination tank is approximately at 3,600 psi and this entire Off-load process took approximately 0.5 minutes to accomplish for a destination tank that was 95% full.

11. Valve 532 is closed, and valves 524 and 528 are opened.

Example 3: Offloading to Two-Thirds Full Destination

Phase I

1. The Off-load Process needs to deliver a quantity of gas to the vehicle (used and an example here as a destination tank of 100 L, arriving at approximately 2,400 psi. for a fill).

2. Valve 524 is closed, and valves 528 and 532 are opened.

Off-Load Stage 5 Transfer

3. Controller 2000 rotates valve 100 to Position 5 and no gas flows from the system 10 because the vehicle/destination tank 1050 is higher than SP5 at 2,150 psi. System 10 is now ready to proceed to the next Stage.

Off-Load Stage 6 Transfer

4. The Valve 100 is rotated to Position 6. Gas at ambient temp from tank 1060 at SP6 2,650 psig flows through sixth selector port 160 of first family 109 to first selector port 260 of second family 209, through tee 53, and towards the either car tank(s) or other destination. The flow continues and the destination tank(s) come into a pressure equalization setting shared with the System 10 source tank at approximately 2,400 psi. System 10 is now ready to proceed to the next System 10 Stage Off-Load Stage 7 Transfer 5. The Valve 100 is rotated to Position 7. Gas at ambient temp from tank 1070 at SP7, 3150 psig, flows through seventh selector port 170 of first family 109 to first selector port 260 of second family 209, through tee 53, and towards the either car tank(s) or other destination. The flow continues, the destination tank(s) come into a pressure equalization setting shared with the System 10 System source tank at approximately 2,675 psi. System 10 is now ready to proceed to the next Stage.

Off-Load Stage 8 Transfer

6. The Valve 100 is rotated to Position 8. Gas at ambient temp from tank 1080 at SP8, 3650 psig, flows through eighth selector port 180 of first family 109 to first selector port 260 of second family 209, through tee 53, and towards the either car tank(s) or other destination. The flow rate continues, the destination tank(s) come into a pressure equalization setting shared with the System 10 System source tank at approximately 2,950 psi. NOTE: System 10 has now completed Phase 1 of the Off-Load Process and is ready to perform the WAVE Off-load Phase II Phase II 7. Valve 532 is closed.
8. Valve 524 is opened.
9. Compressor 500 is started. NOTE: In this example of Off-load Process WAVE methodology, system 10 has determined that the allowable delta P between Stages 5 and 6 is such that the system can quickly and easily attain a destination set point at approximately 3,250 psi and alerts the user to choosing a quick fill or 3,200 psi in 1.0 minutes, or for a complete fill to 3,600 psi within 15 minutes. For the purposes of this example the use has chosen to perform a complete fill to 3,600 psi.

Off-Load Stage 6 WAVE

10. The Valve 100 is rotated to Position 6. Gas at ambient temp from tank 1050, SP5 at 2,150 psi, flows to compressor 500 hermetic housing 504. Compressor 500 which is still running utilizes the gas of tank 1050 to compress into tank 1060. Compressor 500 continues to run until the pressure in tank 1060 rises to be approximately 500 psig higher than the falling pressure of tank 1050 which is now at 2,000 psi.

Off-Load Stage 7 WAVE

11. The Valve 100 is rotated to Position 7. Gas at ambient temp from tank 1060, SP6.3 at 2,480 psi flows to the Compressor 500 hermetic housing 504. Compressor 500 which is still running utilizes the gas of tank 1060 to compress into tank 1070. Compressor 500 continues to run until the pressure in tank 1070 rises to be approximately 500 psig higher than the falling pressure of tank 1060 which is now at 2,375 psi.

Off-Load Stage 8 WAVE

12. Valve 100 is rotated to Position 8. Gas at ambient temp from tank 1070, SP7.3 at 2,810 psi, flows to compressor 500 hermetic housing 504. Compressor 500 which is still running utilizes the gas of tank 1070 to compress into tank 1080. Compressor 500 continues to run until the pressure in tank 1080 rises to be approximately 500 psig higher than the falling pressure of tank 1070 which is now at 2,620 psi.

Phase III

NOTE: The accomplishment of the Off-load Process second phase now has system 10 ready for utilization of compressor 500 to move gas from tank 1080 to the vehicle tank(s)/destination.

13. Valve 532 is opened, valve 524 is opened, valve 528 is closed, and compressor 500 is started.
14. The Valve 100 is rotated to Position 9. Gas at ambient temp from tank 1080 flows to the Compressor 500 hermetic housing 504. Compressor 500 which is still running compresses the pressurized gas of tank 1080 and discharges such gas into the vehicle tank(s)/destination. Compressor 500 continues to run until the pressure of tank 1080 decreases to SP8.2 which is approximately 200 psi less than the starting pressure. The destination tank is approximately at ambient temperature and 3,200 psi. The user could have chosen to stop the process here but has decided to continue until the vehicle/destination tank is full at 3,600 psi.

15. Therefore, system 10 begins to perform 5 series of Off-load Process WAVE Phase II method steps as described above from Tank 1010 to Tank 1020, 1030, 1040, 1050, 1060, 1070 and 1080.

Phase II (SECOND TIME)

Off-Load Stage 2 WAVE

16. Valve 100 is rotated to Position 2. Gas at ambient temp from tank 1010 at SP1, 150 psig flows through port 110 to compressor 500 hermetic housing 504. Compressor 500 which is still running utilizes the gas of tank 1010 to compress into tank 1020. Compressor 500 continues to run until the pressure in tank 1020 rises to be approximately 680 psi while SP1.3 becomes 138 psi.

Off-Load Stage 3 WAVE

17. The Valve 100 is rotated to Position 3. Gas at below ambient temp from tank 1020, SP2.3 at 680 psi flows to compressor 500 hermetic housing 504. Compressor 500 which is still running utilizes the gas of tank 1020 to compress into tank 1030. Compressor 500 continues to run until the pressure in tank 1030 rises to be approximately 1,185 psi and the falling pressure of tank 1020 is approximately 640 psi.

Off-Load Stage 4 WAVE

18. The Valve 100 is rotated to Position 4. Gas at ambient temp from tank 1030, SP3.3 at 1,185 psi. flows to compressor 500 hermetic housing 504. Compressor 500 which is still running utilizes the gas of tank 1030 to compress into tank 1040. Compressor 500 continues to run until the pressure in tank 1040 rises to be approximately 1,680 psi and the falling pressure of tank 1030 is approximately 1,150 psi.

Off-Load Stage 5 WAVE

19. The Valve 100 is rotated to Position 5. Gas at ambient temp from tank 1040, SP4.3 at 1,680 flows to compressor 500 hermetic housing 504. The Compressor 500 which is still running utilizes the gas of tank 1040 to compress into tank 1050. Compressor 500 continues to run until the pressure in tank 1050 rises to be approximately 2,085 psi and the falling pressure of tank 1040 is approximately 1,590 psi.

Off-Load Stage 6 WAVE

20. The Valve 100 is rotated to Position 6. Gas at ambient temp from tank 1050, SP5.3 at 2,085 psi flows to compressor 500 hermetic housing 504. Compressor 500 which is still running utilizes the gas of tank 1050 to compress into tank 1060. Compressor 500 continues to run until the pressure in tank 1060 rises to be approximately 2,450 psi and the falling pressure of tank 1050 is approximately 1,985 psi.

Off-Load Stage 7 WAVE

21. The Valve 100 is rotated to Position 7. Gas at ambient temp from tank 1060, SP6.3 at 2,450 psi flows to compressor 500 hermetic housing 504. Compressor 500 which is still running utilizes the gas of tank 1060 to compress into tank 1070. Compressor 500 continues to run until the pressure in tank 1070 rises to be approximately 2,720 psi the falling pressure of tank 1060 is approximately 2,380 psi.

Off-Load Stage 8 WAVE

22. The Valve 100 is rotated to position 8. Gas at ambient temp from tank 1070, SP7.3 at 2,720 psi. flows to compressor 500 hermetic housing 504. Compressor 500 which is still running utilizes the gas of tank 1070 to compress into tank 1080. Compressor 500 continues to run until the pressure in tank 1080 rises to be approximately 2,940 psi and the falling pressure of tank 1070 is approximately 2,485 psi.

Phase III (SECOND TIME)

NOTE: This second accomplishment of the Off-load Process second phase now has the system 10 ready for utilization of the Compressor 500 to move gas from tank 1080 to the vehicle tank(s)/destination.

23. Valve 524 is closed, and valves 528 and 532 are opened.

24. Valve 100 is rotated to Position 9. Gas at ambient temp from tank 1080 at 2,940, which is in equilibrium pressure with the destination tank at approximately 3,420 psi, SP8.3 flows through eighth selector port 110 of first family 109 to first selector port 260 of second family 209, and to compressor 500 hermetic housing 504. Compressor 500 continues to run until the pressure of tank 1080 decreases to SP8.2 which is approximately 200 psi less than the starting pressure, and the destination tank is approximately at 3,300 psi.

25. The above "Second" series of Off-load Process WAVE Stages, for this example, is repeated 4 more times. The pressure set points are continually readjusted as the process proceeds. 26. This entire Off-load Process, with the single (1) Off-load Transfer starting at Stage 6, single (1) Off-load Process WAVE starting at Stage 5 and then five (5) each Off-load Process WAVE starting at Stage 2 took approximately 15 minutes for a ⅔rd full destination tank filling to 3,600 psi.

27. Valve 532 is closed, and valves 524 and 528 are opened.

System Refresh Process Overview

This section will describe just a brief overview of the Replenish Process (refilling of staged storage tank array 10), using the Work Adjusted Volumetric Efficient (WAVE) methodology. Since the quantity of gas is controlled such that there is never a true desire to deplete the system, the remaining Stage pressures are beneficial for the Refresh Process' ability to relatively quickly and easily recover.

Example 4: Standard Wave, Option #5

This section will give the example of WAVE Option #5 where the set point differences have been coincidentally reduced along with smaller staging pressure changes. In general ambient temperature on average exists for all components (conservatively accepted to be 80 degrees F.). The source gas valve 17 between the gas external supply (House gas) 16 is opened. Gas flows through zero port 101 to the valve 100 and to compressor 500 through port 270 into compressor 500 hermetic housing 504.

System Refresh Process

Stage 1

1. Valve 100 is rotated to Position 1. Gas at ambient temp from the external source flows to compressor 500 hermetic housing 504. Compressor 500 which is still running utilizes the gas of the external source to compress into tank 1010, targeting SP1. Compressor 500 continues to run until the pressure in tank 1010 rises to SP1.

Refresh Stage 2 WAVE

2. Valve 100 is rotated to Position 2. Gas at ambient temp from tank 1010 flows to compressor 500 hermetic housing 504. Compressor 500 which is still running utilizes the gas of tank 1010 to compress into tank 1020. Compressor 500 continues to run until the pressure in tank 1010 drops to SP1.1 at 100 psig, or until SP2.2, which is set by system 10 to be less than SP2 for a WAVE Option #5, is achieved.

Refresh Stage 3 WAVE

3. Valve 100 is rotated to Position 3. Gas at ambient temp from tank 1020 flows to compressor 500 hermetic housing 504. Compressor 500 which is still running utilizes the gas of tank 1020 to compress into tank 1030. Compressor 500 continues to run until the pressure in tank 1020 drops to SP2.1 at 350 psig or until SP3.2, which is set by the system to be less than SP3 for a WAVE Option #5, is achieved.

Refresh Stage 4 WAVE

4. Valve 100 is rotated to Position 4. Gas at ambient temp from tank 1030 flows to compressor 500 hermetic housing 504. Compressor 500 which is still running utilizes the gas of tank 1030 to compress into tank 1040. Compressor 500 continues to run until the pressure in tank 1030 drops to SP3.1 at 850 psig, or until SP4.2, which is set by the system to be less than SP4 for a WAVE Option #5, is achieved.

Refresh Stage 5 WAVE

5. Valve 100 is rotated to Position 5. Gas at ambient temp from tank 1040 flows to the Compressor 500 hermetic housing 504. Compressor 500 which is still running utilizes the gas of tank 1040 to compress into tank 1050. Compressor 500 continues to run until the pressure in tank 1040 drops to SP4.1 at 1350 psig, or until SP5.2, which is set by the system to be less than SP5 for a WAVE Option #5, is achieved.

Refresh Stage 6 WAVE

6. Valve 100 is rotated to Position 6. Gas at ambient temp from tank 1050 flows to compressor 500 hermetic housing 504. Compressor 500 which is still running utilizes the gas of tank 1050 to compress into tank 1060. Compressor 500 continues to run until the pressure in tank 1050 drops to SP5.1 at 1850 psig, or until SP6.2, which is set by the system to be less than SP6 for a WAVE Option #5, is achieved.

Refresh Stage 7 WAVE

7. Valve 100 is rotated to Position 7. Gas at ambient temp from tank 1060 flows to compressor 500 hermetic housing 504. Compressor 500 which is still running utilizes the gas of tank 1060 to compress into tank 1070. Compressor 500 continues to run until the pressure in tank 1060 drops to SP6.1 at 2350 psig, or until SP7.2, which is set by the system to be less than SP7 for a WAVE Option #5, is achieved.

Refresh Stage 8 WAVE

8. Valve 100 is rotated to Position 8. Gas at ambient temp from tank 1070 flows to compressor 500 hermetic housing 504. Compressor 500 which is still running utilizes the gas of tank 1070 to compress into tank 1080. Compressor 500 continues to run until the pressure in tank 1070 drops to SP7.1 at 2850 psig, or until SP8.2, which is set by the system to be less than SP8 for a WAVE Option #5, is achieved.

9. All System Refresh Stage WAVE process steps above are performed 120 times over a 48 hour period. Pressure of all tanks are back up to their initial set points SP1, SP2, SP3, SP4, SP5, SP6, SP7, and SP8.

Example 5: Reverse Wave, Option #3

The Off-load Process delivered a quantity of gas to the vehicle (example here shows a destination tank of 100 L, arriving for a fill at approximately 3420 psi.). System 10 determines that the tank current pressures and assigns new set points to those values that are no longer at their initially defined SP1, SP2, SP3, SP4, SP5, SP6, SP7, and SP8 for the original fill described above. Since the pressure of tank 1080 is approximately 3,175 psi which is below its SP8.1, a new SP8.3 is established and system 10 uses controller 2000 to operate motor to rotate valve 100 to Position 7, and compressor 500 is started.

Refresh Stage 8 WAVE

5. Valve 100 is rotated to Position 7. Gas at ambient temp from tank 1070 flows to compressor 500 hermetic housing 504. Compressor 500 which is still running utilizes the gas of tank 1070 to compress into tank 1080, targeting SP8. Compressor 500 continues to run until the pressure in tank 1080 rises to be approximately 500 psig higher than the falling pressure of tank 1070. Tank 1080 is approximately at 3,390 psi, which is above SP8.2, and tank 1070 is approximately at 2,790 psi, which is below SP7.1 and is now labeled SP7.3.

6. System 10 is now at a point where it knows the other tanks are at their SP#0.2, and it also recognizes that there is less than a 350 psi differential between the current tank and the next lower tank. System 10 therefore "backs down" through the tanks and performs a WAVE Option #3 process to the next lower numbered tank.

Note: If the quantity of gas used from each lower tank was greater than a 350 psi differential due to the fact that the vehicle/destination tank had a greater System 10 Fill Process demand, then the system could decide to return directly to Position 1 (Port 110) and begin performing a Fill Process WAVE as described above.

Refresh Stage 7 WAVE

10. Valve 100 is rotated to Position 7. Gas at ambient temp from tank 1060 flows to compressor 500 hermetic housing 504. Compressor 500 which is still running utilizes the gas of tank 1060 to compress into tank 1070, targeting SP7. Compressor 500 continues to run until the pressure in tank 1070 rises to be approximately 500 psig higher than the falling pressure of tank 1060. If SP7 is achieved then this Refresh Stage 7 WAVE process is stopped and the system proceeds to Refresh Stage 6 WAVE Refresh Stage 6 WAVE 11. Valve 100 is rotated to Position 6. Gas at ambient temp from tank 1050 flows to compressor 500 hermetic housing 504. Compressor 500 which is still running utilizes the gas of tank 1050 to compress into tank 1060, targeting SP6. Compressor 500 continues to run until the pressure in tank 1060 rises to be approximately 500 psig higher than the falling pressure of tank 1050. If SP6 is achieved then this Refresh Stage 6 WAVE process is stopped and the system proceeds to Refresh Stage 5 WAVE.

Refresh Stage 5 WAVE

12. Valve 100 is rotated to Position 5. Gas at ambient temp from tank 1040 flows to compressor 500 hermetic housing 504. Compressor 500 which is still running utilizes the gas of tank 1040 to compress into tank 1050, targeting SP5. Compressor 500 continues to run until the pressure in tank 1050 rises to be approximately 500 psig higher than the falling pressure of tank 1040. If SP5 is achieved then this Refresh Stage 5 WAVE process is stopped and the system proceeds to Refresh Stage 4 WAVE.

Refresh Stage 4 WAVE

13. Valve 100 is rotated to Position 4. Gas at ambient temp from tank 1030 flows to compressor 500 hermetic housing 504. Compressor 500 which is still running utilizes the gas of tank 1030 to compress into tank 1040, targeting SP4. Compressor 500 continues to run until the pressure in tank 1040 rises to be approximately 500 psig higher than the falling pressure of tank 1030. If SP4 is achieved then this Refresh Stage 4 WAVE process is stopped and the system proceeds to Refresh Stage 3 WAVE.

Refresh Stage 3 WAVE

14. Valve 100 is rotated to Position 3. Gas at ambient temp from tank 1020 flows to compressor 500 hermetic housing 504. Compressor 500 which is still running utilizes the gas of tank 1020 to compress into tank 1030, targeting SP3. Compressor 500 continues to run until the pressure in tank 1030 rises to be approximately 500 psig higher than the falling pressure of tank 1020. If SP3 is achieved then this Refresh Stage 3 WAVE process is stopped and the system proceeds to Refresh Stage 2 WAVE.

Refresh Stage 2 WAVE

15. Valve 100 is rotated to Position 2. Gas at ambient temp from tank 1010 flows to compressor 500 hermetic housing 504. Compressor 500 which is still running utilizes the gas of tank 1010 to compress into tank 1020, targeting SP2. Compressor continues to run until the pressure in tank 1020 rises to be approximately 500 psig higher than the falling pressure of tank 1010. If SP2 is achieved then this Refresh Stage 2 WAVE process is stopped and the system proceeds to Refresh Stage 1.

16. System 10 reviews the system set points and determines if a Fill Process WAVE Option#2 is required. For this particular Off-load case to a 95% full vehicle or destination tank(s) the System 10 System needs to perform 5 each complete system Fill Process WAVE methods from Stage 1 to Stage 8. Since staged storage tank array 1000 was only marginally diminished from Stage 8, the time to complete this entire Refresh Process will only be 2.2 hours Example 6: WAVE Option #2 Process—System Refresh Stage 1 WAVE 17. Valve 100 is rotated to Position 1. Gas at ambient temp from the external source flows to compressor 500 hermetic housing 504. Compressor 500 which is still running utilizes the gas of the external source to compress into tank 1010, targeting SP1. Compressor 500 continues to run until the pressure in tank 1010 rises to SP1.

Refresh Stage 2 WAVE

18. Valve 100 is rotated to Position 2. Gas at ambient temp from tank 1010 flows to compressor 500 hermetic housing 504. Compressor 500 which is still running utilizes the gas of tank 1010 to compress into tank 1020. Compressor 500 continues to run until the pressure in tank 1010 drops to SP1.1 at 100 psig, or until SP2 is achieved.

Refresh Stage 3 WAVE

19. Valve 100 is rotated to Position 3. Gas at ambient temp from tank 1020 flows to compressor 500 hermetic housing 504. Compressor 500 which is still running utilizes the gas of tank 1020 to compress into tank 1030. Compressor 500 continues to run until the pressure in tank 1020 drops to SP2.1 at 350 psig or until SP3 is achieved.

Refresh Stage 4 WAVE

20. Valve 100 is rotated to Position 4. Gas at ambient temp from tank 1030 flows to the Compressor 500 hermetic housing 504. Compressor 500 which is still running utilizes the gas of tank 1030 to compress into tank 1040. Compressor 500 continues to run until the pressure in tank 1030 drops to SP3.1 at 850 psig, or until SP4 is achieved.

Refresh Stage 5 WAVE

21. Valve 100 is rotated to Position 5. Gas at ambient temp from tank 1040 flows to compressor 500 hermetic housing 504. Compressor 500 which is still running utilizes the gas of tank 1040 to compress into tank 1050. Compressor 500 continues to run until the pressure in tank 1040 drops to SP4.1 at 1350 psig, or until SP5 is achieved.

Refresh Stage 6 WAVE

22. Valve 100 is rotated to Position 6. Gas at ambient temp from tank 1050 flows to the Compressor 500 hermetic housing 504. Compressor 500 which is still running utilizes the gas of tank 1050 to compress into tank 1060. Compressor 500 continues to run until the pressure in tank 1050 drops to SP5.1 at 1850 psig, or until SP6 is achieved.

Refresh Stage 7 WAVE

23. Valve 100 is rotated to Position 7. Gas at ambient temp from tank 1060 flows to compressor 500 hermetic housing 504. Compressor 500 which is still running utilizes the gas of tank 1060 to compress into tank 1070. Compressor 500 continues to run until the pressure in tank 1060 drops to SP6.1 at 2350 psig, or until SP7 is achieved.

System Refresh Stage 8 WAVE

24. Valve 100 is rotated to Position 8. Gas at ambient temp from tank 1070 flows to compressor 500 hermetic housing 504. Compressor 500 which is still running utilizes the gas of tank 1070 to compress into tank 1080. Compressor 500 continues to run until the pressure in tank 1070 drops to SP7.1 at 2850 psig, or until SP8 is achieved.

25. All system 10 Refresh Stage WAVE process steps above are performed 5 times over a 2 hour period, for a process subtotal runtime of approximately 2.2 hours, and this brings the pressure of all tanks back up to their initial set points SP1, SP2, SP3, SP4, SP5, SP6, SP7, and SP8.

System Wave Direction Choices or Options

The above examples of System Fill Process, Off-load Process, and/or Refresh Processes can be accomplished via a multiplicity of methodologies. Below are described five possibilities.

WAVE Option Number 1—

A methodology is to start at the lower tank pressure value, such as tank 1 (1010) and then pressurize into several lower pressured tanks simultaneously 2, 3, 4, 5, 6, 7, 8, 9, 10, 11, 12 . . . as described in the method steps associated with the initial System Fill WAVE process for system 10. That example starts by using gas from Tank 1 to pressurize into Tanks 2, 3, 4, 5, 6, 7, and 8 simultaneously up to the predefined pressurized set point pressure SP2 for staged Tank 2 of staged tank array 1000. Gas from tank 1010 at this stage will serve as the suction gas for compressor 500, and second tank 1020 will receive the discharge of compressor 500. Because check valves 1024, 1034, 1044, 1054, 1064, 1074, and 1084 respectively fluidly connect in a one way (e.g., increasing) direction tanks 1030, 1040, 1050, 1060, 1070, and 1080 to each other (tank 1030 to 1040, 1040 to 1050, 1050 to 1060, 1060 to 1070, and 1070 to 1080) allowing higher pressure gas to flow from lower numbered tanks to higher numbered tanks assuming that the minimum check valve activation pressure can be overcome) at this stage gas from tank 1010, although primarily discharging to tank 1020 (through second port 110), Compressor 500 discharge gas also indirectly flows also to tanks 1030, 1030, 1040, 1050, 1060, 1070, and 1080. Because tank 1020 is at a higher pressure than tank 1020, check valve 1014 will prevent flow from tank 1020 to tank 1010. The system then proceeds to Tank 2 (1020) as suction for compressor 500 and discharges into Tanks 3, 4, 5, 6, 7, and 8 etc. (where discharge is primarily directed to Tank 3 up to predefined pressurized set point pressure SP3, but check valves 1034, 1044, 1054, 1064, 1074, etc. allow higher pressure to bleed into the higher numbered tanks of staged tank array 1000. The next step would be to use Tank 3 (1030) as the suction to pressurize as suction for compressor 500 and discharges into Tanks 4, 5, 6, 7, and 8 etc. This upwardly staging process is performed until staged tank array has the following upwardly staged set point pressures: Tank 1—SP1; Tank 2—SP3; Tank 3—SP3; Tank 4—SP4; Tank 5—SP5; Tank 6—SP6; Tank 7—SP7; and Tank 8—SP8.

WAVE Option Number 2—

A methodology is to start at a lower tank pressure value, such as tank 1 and then proceed up to tank 8, while only pressurizing into one upstream destination tank at one time. An example of is found in the method steps for the System Refresh Process where gas from a lower pressure tank is placed into the next higher tank, and then the system proceeds to take that pressurized gas and compress it into only the next highest tank. That example appears as having the valve 100 rotated to Position 1. Gas at ambient temp from the external source 16 flows to compressor 500 hermetic housing 504, and compressor 500, which is still running, utilizes the gas of the external source 16 to compress into tank 1010, targeting SP1. Compressor 500 continues to run until the pressure in tank 1010 rises to SP1. System 10 then proceeds to the next WAVE Stage and valve 100 is rotated to Position 2. Gas at ambient temp from tank 1010 flows to compressor 500 hermetic housing 504, and compressor 500, which is still running, utilizes the gas of tank 1010 to compress into tank 1020. Compressor 500 continues to run until the pressure in tank 1010 drops to SP1.1 at 100 psig, or until SP2 is achieved etc. Another example of this WAVE Option #2 method is found in the methods outlined in the System Off-load Process where gas from Tank 8 is Compressor 500 pressurized by the limiting delta P amount into the vehicle/destination tank.

Reverse WAVE Option Number 3— a methodology is to perform a Reverse WAVE where system 10 pressurizes gas from the next lower tank up to the existing positioned tank, then repositions valve 100 to the next lower position and backs-down the stages while it is quickly replenishing more dense gas to the top stages. The Refresh Process or Off-load Processes can employ this methodology for two special but not limiting cases: (1) allowing for a quick refresh of the upper staged pressurized tanks in staged tank array 1000 for potential immediate needs by a second vehicle or second destination need; and (2) quickly translating higher density gas up the staged tank array 1000 to make room for another System Fill Process WAVE. That example starts with gas at ambient temp from tank 1060 flows to compressor 500 hermetic housing 504 and compressor 500 which is running utilizes the gas of tank 1060 to compress into tank 1070, targeting SP7. Compressor 500 continues to run until the pressure in tank 1070 rises to be approximately 500 psig higher than the falling pressure of tank 1060. If SP7 is achieved then this Refresh Stage 7 WAVE process is stopped and system 10 proceeds to Refresh Stage 6 WAVE where gas at ambient temp from tank 1050 flows to compressor 500 hermetic housing 504, and compressor 500, which is running, utilizes the gas of tank 1050 to compress into tank 1060, targeting SP6. Compressor 500 continues to run until the pressure in tank 1060 rises to be approximately 500 psig higher than the falling pressure of tank 1050. If SP6 is achieved then this Refresh Stage 6 WAVE process is stopped and the system proceeds to Refresh Stage 5 WAVE etc.

Mid WAVE Option Number 4— a methodology is to choose to start and/or stop a given process at some other determinable point in the pressurized staged tank array 1000. An example of this is described in the System Off-load Process for a 95% full vehicle fill where system 10 has determined the destination tank 22 only needed gas from tank 1080 and system 10 decided to perform an System Off-load to destination tank 22 using only Tank 1080. In the Off-load Process for a vehicle 20 that is two thirds full, system 10 determined to start the offloading process with Tank 1040 to destination tank 22 until system 10 found the actual tank from the pressurized staged tank array 1000 at which the gas began offloading flow from the pressurized tank to the destination stank (i.e., because the pressure in the pressurized tank of the staged tank array 1000 is higher than the pressure in the destination tank 22). Once vehicle 20 was filled by the Off-load Process Phase I methods, system 10 then determined it only needed to start the Off-load Process Phase II by utilizing an Off-load Process WAVE starting with Stage 6. If the user is time-bound then the user could have chosen to complete the vehicle/destination Off-load Process after this initial 2 minutes, and thereby precluded waiting an additional 13 minutes for a vehicle/destination complete fill to 3600 psig. The methodology example described in the two thirds full destination Off-load Process is one where the system decided it was best to perform a multiplicity of Process methodologies.

WAVE Option Number 5— a methodology is to raise stage pressures at smaller differential pressure increments. System 10 can increase an upper stage's pressure by using smaller incremental differential steps than outlined in the initial System Fill WAVE Option #1. It would utilize the same process and methodology for establishing the second set of set points, and the same processing methodology with regards to choosing other available WAVE Options, just at lower differential pressure values. WAVE Options 1, 2, 3 and 4 can each employ Option Number 5 if and as needed.

The versatility of these highly unique processes, in part or in total, acting as a method for using single stage compressor 500 with staged tank array 1000 in simulating a multi-staged compressor gives the user the abilities not previously afforded, to make choices with regards to time to wait, instantaneous choice of quantity of gas for a particular vehicle or destination tank fill or off-load, choice of quantity of immediately available gas for the immediate transfer to another vehicle/destination, gives an ability to choose either a lengthy or reduced time-to-refresh need for the System, for the next system use while the user's vehicle is no longer still interfaced/attached for lengthy periods of time with the unit.

Fill Capacity Determination of Destination Tank

There are various ways for controller 2000 the system 10 and therefore destination tank's 22 current state of charge, and subsequently be able to calculate its needed capacity. System 10 understands (by industry understood methods) what the 1000 storage array pressures are and therefore can predict system's 10 capacity for a given destination need. Correspondingly, while controller 2000 is processing it has the ability to estimate the destination tank's 22 need, and can, as needed assign new set points (SP1 becomes SP1.3, SP1.1 becomes SP1.2, etc.) so as to recalculate both estimated run-time of the system to achieve a filled condition, and to establish a temporary tank target pressure that is achievable by compressor 500. These new set points are then utilized proportionally until the unit is able to utilize the WAVE Stage Processes to return the storage medium 1000 back to their respective Fill Process principle set-points (SP1, SP2, SP3 . . . )

System 10, though use of controller 2000 and remote control panel 2100, is thereby able to alert the user as to when the projected System Full status will be re-established, how much time it will take to complete a complete filling of the destination tank etc. The system is thereby able to real-time report the available system destination tank(s) filling capability, the amount available immediately or in the future for the user at any given time between fill-ups. This functionality is usable by a host of applications such as PDA, cell phones, home or remote computers, fire alarm system companies, fire department notifications, maintenance systems or personnel, local and federal authorities, etc.

In addition to the system's ability to approximate, then measure and then refine the destination tank's 22 needs, system 10 is also able to accept direct user input as a more direct method of knowing the given conditions:

There is method of human interface to input to system 10 the user known destination tank 22 size or volume.

There is the method of human interface to input to system 10 the user known current destination tank 22 pressure.

There is the method of human interface to input to system 10 the user known vehicle 20 type and year.

There is the method of human interface to input to system 10 whether the user prefers to only perform a quick fill in less than a few minutes, or to proceed with a complete fill lasting approximately 15 minutes. System 10 therefore then knows the potential capacity maximum needs for the destination tank(s) 22 and is also able to jointly communicate back to the use the potential options available for choosing, system 10 needed maintenance, system 10's health, etc.

As system 10 performs an Off-load Process the pressure differences of gas from any given stage then establishes the destination tank(s)'s 22 minimum pressure starting state. Additionally system 10 knows the unit's post operation current array 1000 pressures and can label then as SP1.3, SP2.3, SP3.3, SP4.3, etc. These are momentarily considered to be the new "High" set points, and establishes new "Low" set points SP1.2, SP2.2, SP3.2, etc. The system then utilizes, via obvious to the industry methodologies to know the approximate needed quantity of gas for the destination, and the system is then able to decide how many WAVE Off-load Processes to accomplish and to which options are to be utilized.

The following is a list of reference numerals:

LIST FOR REFERENCE NUMERALS

| (Reference No.) | (Description) |
|---|---|
| 10 | system |
| 12 | inlet |
| 14 | outlet |
| 15 | housing |
| 16 | gaseous fuel supply |
| 17 | valve |
| 18 | check valve |
| 20 | vehicle |
| 22 | storage tank |
| 40 | separator/filter |
| 42 | valve |
| 50 | cooling system |
| 53 | tee connection |
| 100 | valve assemby |
| 101 | port zero, where selector is in zero position |
| 102 | first opening of zero port |
| 104 | conduit between openings |
| 106 | second opening zero port |
| 109 | first family of ports |
| 110 | first port, where selector is in position 1 |
| 112 | first opening of first port |
| 114 | conduit between openings |
| 116 | second opening first port |
| 117 | angle |
| 120 | second port, where selector is in position 2 |
| 122 | first opening of second port |
| 124 | conduit between openings |
| 126 | second opening second port |

-continued

LIST FOR REFERENCE NUMERALS

| (Reference No.) | (Description) |
|---|---|
| 127 | angle |
| 130 | third port, where selector is in position 3 |
| 132 | first opening of third port |
| 134 | conduit between openings |
| 136 | second opening third port |
| 137 | angle |
| 140 | fourth port, where selector is in position 4 |
| 142 | first opening of fourth port |
| 144 | conduit between openings |
| 146 | second opening fourth port |
| 147 | angle |
| 150 | fifth port, where selector is in position 5 |
| 152 | first opening of fifth port |
| 154 | conduit between openings |
| 156 | second opening fifth port |
| 157 | angle |
| 160 | sixth port, where selector is in position 6 |
| 162 | first opening of sixth port |
| 164 | conduit between openings |
| 166 | second opening sixth port |
| 167 | angle |
| 170 | seventh port, where selector is in position 7 |
| 172 | first opening of seventh port |
| 174 | conduit between openings |
| 176 | second opening seventh port |
| 177 | angle |
| 180 | eighth port, where selector is in position 8 |
| 182 | first opening of eighth port |
| 184 | conduit between openings |
| 186 | second opening eights port |
| 187' | angle |
| 187" | angle |
| 200 | body or selector rotor housing |
| 204 | plurality of openings |
| 209 | second family of ports |
| 210 | top |
| 212 | bottom |
| 214 | outer periphery |
| 216 | seal recess |
| 220 | selector recess |
| 222 | side wall of selector recess |
| 224 | base of selector recess |
| 240 | trunnion recess |
| 250 | relative rotational axis between body and selector |
| 260 | first conduit |
| 262 | first connector of first conduit |
| 264 | pathway between connectors |
| 266 | second connector of first conduit |
| 270 | second conduit |
| 272 | first connector of second conduit |
| 274 | pathway between connectors |
| 276 | second connector of second conduit |
| 290 | annular recess/cavity |
| 300 | port selector rotor |
| 304 | rotational axis |
| 310 | upper surface |
| 314 | rod |
| 316 | arrow |
| 320 | lower surface |
| 321 | upper rod or shaft seal |
| 322 | lower rod or shaft seal |
| 323 | family isolating seal |
| 324 | trunnion |
| 325 | seal for trunnion |
| 330 | outer periphery |
| 360 | first conduit |
| 362 | first connector of first conduit |
| 364 | pathway between connectors |
| 366 | second connector of first conduit |
| 370 | second conduit |
| 372 | first connector of second conduit |
| 374 | pathway between connectors |
| 376 | second connector of second conduit |
| 380 | angle |
| 390 | cavity for second conduit selector |

-continued

LIST FOR REFERENCE NUMERALS

| (Reference No.) | (Description) |
|---|---|
| 400 | top porting manifold |
| 404 | plurality of openings |
| 410 | upper |
| 412 | lower |
| 414 | outer periphery |
| 420 | opening for rod of selector |
| 430 | plurality of selector porting |
| 450 | plurality of check valve porting |
| 500 | gas compressor |
| 504 | body |
| 506 | interior |
| 510 | input or suction line for compressor |
| 512 | check valve for input to compressor |
| 520 | output or discharge line for compressor |
| 521 | output from filter separatort |
| 522 | output valve |
| 524 | valve |
| 528 | valve |
| 529 | line |
| 532 | valve to vehicle fill |
| 540 | motor |
| 550 | cylinder |
| 560 | piston |
| 570 | chamber |
| 572 | input |
| 573 | check valve for input to compression chamber |
| 574 | output |
| 575 | check valve for discharge from compression chamber |
| 1000 | storage tank array |
| 1010 | tank 1 |
| 1013 | valve for tank 1 |
| 1014 | check valve (zero port to tank 1) and normally used in dual compression system (e.g., FIG. 6) |
| 1015 | check valve port first end |
| 1016 | check valve port second end |
| 1020 | tank 2 |
| 1023 | valve for tank 2 |
| 1024 | check valve (tank 1 to tank 2) |
| 1025 | check valve port first end |
| 1026 | check valve port second end |
| 1027 | shutoff valve |
| 1030 | tank 3 |
| 1033 | valve for tank 3 |
| 1034 | check valve (tank 2 to tank 3) |
| 1035 | check valve port first end |
| 1036 | check valve port second end |
| 1040 | tank 4 |
| 1043 | valve for tank 4 |
| 1044 | check valve (tank 3 to tank 4) |
| 1045 | check valve port first end |
| 1046 | check valve port second end |
| 1050 | tank 5 |
| 1053 | valve for tank 5 |
| 1054 | check valve (tank 4 to tank 5) |
| 1055 | check valve port first end |
| 1056 | check valve port second end |
| 1060 | tank 6 |
| 1063 | valve for tank 6 |
| 1064 | check valve (tank 5 to tank 6) |
| 1065 | check valve port first end |
| 1066 | check valve port second end |
| 1070 | tank 7 |
| 1073 | valve for tank 7 |
| 1074 | check valve (tank 6 to tank 7) |
| 1075 | check valve port first end |
| 1076 | check valve port second end |
| 1080 | tank 8 |
| 1083 | valve for tank 8 |
| 1084 | check valve (tank 7 to tank 8) |
| 1085 | check valve port first end |
| 1086 | check valve port second end |
| 1200 | arrow |
| 1210 | arrow |
| 1220 | arrow |
| 1230 | arrow |

-continued

LIST FOR REFERENCE NUMERALS

| (Reference No.) | (Description) |
|---|---|
| 1240 | arrow |
| 1250 | arrow |
| 1260 | arrow |
| 1270 | arrow |
| 1300 | high pressure connector/seal |
| 1310 | threaded connection |
| 1320 | flexible connector |
| 1330 | flared metal tube |
| 1340 | cavity |
| 1400 | valve |
| 1410 | valve |
| 2000 | controller |
| 2100 | remote control panel |
| 5000 | compressor (which operates as a pre-compressor) |
| 5100 | compressor output tank (can also operate as a oil/liquid recovery system for pre-compressor) |

All measurements disclosed herein are at standard temperature and pressure, at sea level on Earth, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

What is claimed is:

1. A method of filling a tank with compressed gaseous fuel, comprising the steps of:
   (a) providing an array of tanks comprising a first Tank, a second Tank, a third Tank, and a fourth Tank, and a compressor fluidly connected to the array;
   (b) before step "e", taking gas from the first tank, compressing it with the compressor and discharging the compressed gas to the second Tank in the array, and continuing this step until one of the following conditions are met:
      (i) the first tank experiences a pressure drop which reaches a predefined pressure drop set point for the first Tank, or
      (ii) the pressure in the first Tank drops to a predefined minimum set point pressure for the first Tank, or
      (iii) the differential pressure between the second Tank and the first Tank reaches a predefined set point pressure differential; or
      (iv) second Tank pressure reaches a predefined upper set point pressure for second Tank;
   (c) between steps "b" and "e", taking gas from the second Tank, compressing it with the compressor and discharging the compressed gas to the third Tank, and continuing this step until one of the following conditions are met:
      (i) second Tank experiences a pressure drop which reaches a predefined pressure drop set point for the second Tank, or
      (ii) the pressure in the second Tank drops to a predefined minimum set point pressure for the second Tank, or
      (iii) the differential pressure between the third Tank and the second Tank reaches the predefined set point pressure differential; or
      (iv) third Tank pressure reaches a predefined upper set point pressure for third Tank;
   (d) between steps "c" and "e", taking gas from the first Tank compressing it with the compressor and discharging compressed gas to the second Tank in the array, and continuing this step until one of the following conditions are met:
      (i) first tank experiences a pressure drop which reaches the predefined pressure drop set point for the first Tank, or
      (ii) the pressure in the first Tank drops to the predefined minimum set point pressure for the first Tank, or
      (iii) the differential pressure between the second Tank and the first Tank reaches the predefined set point pressure differential; or
      (iv) second Tank pressure reaches the predefined upper set point pressure for the second Tank;
   (e) between steps "d" and "f", taking gas from the second Tank, compressing it with the compressor, and discharging compressed gas to the third Tank in the array until one of the following conditions are met:
      (i) second Tank experiences a pressure drop which reaches a predefined pressure drop set point for the second Tank, or
      (ii) the pressure in the second Tank drops to a predefined minimum set point pressure for the second Tank, or
      (iii) the differential pressure between the third Tank and the second Tank reaches a predefined set point pressure differential; or
      (iv) the third Tank pressure reaches a predefined upper set point pressure for third Tank;
   (f) between steps "e" and "g" taking gas from the third Tank, compressing it with the compressor and discharging the compressed gas to the fourth Tank, and continuing this step until one of the following conditions are met:
      (i) third Tank experiences a pressure drop which reaches a predefined pressure drop set point for the third Tank, or
      (ii) the pressure in the third Tank drops to a predefined minimum set point pressure for the third Tank, or
      (iii) the differential pressure between the fourth Tank and the third Tank reaches a predefined set point pressure differential; or
      (iv) the fourth Tank pressure reaches a predefined upper set point pressure for fourth Tank; and
   (g) dispensing compressed gas from at least two tanks of the array first to the compressor and then to a vehicle storage tank, wherein during the method steps the compressor is selectively fluidly connected to selected combinations of the first, second, third, and fourth Tanks in the array by a selector valve, and the selector valve having a plurality of selector positions, first and second families of ports, wherein each family of ports have a plurality of selector ports, and wherein in a first selector position from the plurality of selector positions for the selector a plurality of the selector ports from the first family can be fluidly connected in two way fluid directions to a plurality of selector ports from the second family where the remaining ports in the first family are not fluidly connected to each other, and in a second selector position from the plurality of selector positions for the selector a different plurality of ports from the first family can be fluidly connected in two way directions to the same plurality of ports from the second family, where the remaining ports in the first family are not fluidly connected to each other and where in the second selector position the ports in the second family are each fluidly connected to a different port than fluidly connected to in the first selector position.

2. The method of claim 1, wherein the selector valve includes a body and the selector is rotatively connected to the body.

3. The method of claim 1, wherein a plurality of selector ports in the first family are connected in a one way direction by a plurality of check valves.

4. The method of claim 1, wherein rotation of the selector causes the switching in connection between first and second selector positions.

5. The method of claim 1, wherein the first family of selector ports includes at least six selector ports and the second family of selector ports includes at least two selector ports.

6. The method of claim 1, wherein in step "a" the compressor is a single compressor of one stage.

7. The method of claim 1, further including the step of during step "g" repeating steps "b" through "f" until the fourth Tank pressure reaches the predefined upper set point pressures for each of the first, second, third, and fourth Tanks.

8. The method of claim 1, further including the step of, during step "g", repeating steps "b" through "f" in reverse order until the fourth Tank pressure reaches the predefined upper set point pressures for each of the first, second, third, and fourth Tanks.

9. A method of filling a tank with compressed gaseous fuel, comprising the steps of:
  (a) providing an array of tanks comprising a first tank, second tank, third tank, and fourth tank, fifth tank, and a compressor fluidly connected to the array;
  (b) before step "c", taking gas from the first tank, compressing it with the compressor and discharging the compressed gas to the second Tank in the array, and continuing this step until one of the following conditions are met:
    (i) first Tank experiences a pressure drop which reaches a predefined pressure drop set point for the first Tank, or
    (ii) the pressure in the first Tank drops to a predefined minimum set point pressure for the first Tank, or
    (iii) the differential pressure between the second Tank and the first Tank reaches a predefined set point pressure differential; or
    (iv) second Tank pressure reaches a predefined upper set point pressure for second Tank;
  (c) between steps "b" and "d", taking gas from the second Tank, compressing it with the compressor and discharging the compressed gas to the third Tank, and continuing this step until one of the following conditions are met:
    (i) second Tank experiences a pressure drop which reaches a predefined pressure drop set point for the second Tank, or
    (ii) the pressure in the second Tank drops to a predefined minimum set point pressure for the second Tank, or
    (iii) the differential pressure between the third Tank and the second Tank reaches the predefined set point pressure differential; or
    (iv) third Tank pressure reaches a predefined upper set point pressure for third Tank;
  (d) between steps "c" and "e", taking gas from the first Tank compressing it with the compressor and discharging compressed gas to the second Tank in the array, and continuing this step until one of the following conditions are met:
    (i) first tank experiences a pressure drop which reaches the predefined pressure drop set point for the first Tank, or
    (ii) the pressure in the first Tank drops to the predefined minimum set point pressure for the first Tank, or
    (iii) the differential pressure between the second Tank and the first Tank reaches the predefined set point pressure differential; or
    (iv) second Tank pressure reaches the predefined upper set point pressure for the second Tank;
  (e) between steps "d" and "f", taking gas from the second Tank, compressing it with the compressor, and discharging compressed gas to the third Tank in the array until one of the following conditions are met:
    (i) second Tank experiences a pressure drop which reaches the predefined pressure drop set point for the second Tank, or
    (ii) the pressure in the second Tank drops to the predefined minimum set point pressure for the second Tank, or
    (iii) the differential pressure between the third Tank and the second Tank reaches the predefined set point pressure differential; or
    (iv) the third Tank pressure reaches the predefined upper set point pressure for third Tank;
  (f) between steps "e" and "g" taking gas from the third Tank, compressing it with the compressor and discharging the compressed gas to the fourth tank, and continuing this step until one of the following conditions are met:
    (i) third Tank experiences a pressure drop which reaches a predefined pressure drop set point for the third Tank, or
    (ii) the pressure in the third Tank drops to the predefined minimum set point pressure for the third Tank, or
    (iii) the differential pressure between the fourth Tank and the third Tank reaches the predefined set point pressure differential; or
    (iv) the fourth Tank pressure reaches a predefined upper set point pressure for fourth Tank; and
  (g) between steps "f" and "h", taking gas from the first Tank compressing it with the compressor and discharging compressed gas to the second Tank in the array, and continuing this step until one of the following conditions are met:
    (i) first tank experiences a pressure drop which reaches the predefined pressure drop set point for the first Tank, or
    (ii) the pressure in the first Tank drops to the predefined minimum set point pressure for the first Tank, or
    (iii) the differential pressure between the second Tank and the first Tank reaches the predefined set point pressure differential; or
    (iv) second Tank pressure reaches the predefined upper set point pressure for the second Tank;

(h) between steps "g" and "i", taking gas from the second Tank, compressing it with the compressor, and discharging compressed gas to the third Tank in the array until one of the following conditions are met:
   (i) second Tank experiences a pressure drop which reaches the predefined pressure drop set point for the second Tank, or
   (ii) the pressure in the second Tank drops to the predefined minimum set point pressure for the second Tank, or
   (iii) the differential pressure between the third Tank and the second Tank reaches the predefined set point pressure differential; or
   (iv) the third Tank pressure reaches the predefined upper set point pressure for third Tank;
(i) between steps "h" and "j" taking gas from the third Tank, compressing it with the compressor and discharging the compressed gas to the fourth tank, and continuing this step until one of the following conditions are met:
   (i) third Tank experiences a pressure drop which reaches the predefined pressure drop set point for the third Tank, or
   (ii) the pressure in the third Tank drops to the predefined minimum set point pressure for the third Tank, or
   (iii) the differential pressure between the fourth Tank and the third Tank reaches the predefined set point pressure differential; or
   (iv) the fourth Tank pressure reaches the predefined upper set point pressure for fourth Tank; and
(j) between steps "i" and "k" taking gas from the fourth Tank, compressing it with the compressor and discharging the compressed gas to the fifth Tank, and continuing this step until one of the following conditions are met:
   (i) fourth Tank experiences a pressure drop which reaches a predefined pressure drop set point for the fourth Tank, or
   (ii) the pressure in the fourth Tank drops to a predefined minimum set point pressure for the fourth Tank, or
   (iii) the differential pressure between the fifth Tank and the fourth Tank reaches the predefined set point pressure differential; or
   (iv) the fifth Tank pressure reaches a predefined upper set point pressure for fifth Tank; and
(k) after step "j", dispensing compressed gas from at least two tanks of the array first to the compressor and then to a vehicle storage tank, wherein during the method steps the compressor is selectively fluidly connected to selected combinations of the first, second, third, and fourth Tanks in the array by a selector valve, and the selector valve having a plurality of selector positions, first and second families of ports, wherein each family of ports have a plurality of selector ports, and wherein in a first selector position from the plurality of selector positions for the selector a plurality of the selector ports from the first family can be fluidly connected in two way fluid directions to a plurality of selector ports from the second family where the remaining ports in the first family are not fluidly connected to each other, and in a second selector position from the plurality of selector positions for the selector a different plurality of ports from the first family can be fluidly connected in two way directions to the same plurality of ports from the second family, where the remaining ports in the first family are not fluidly connected to each other and where in the second selector position the ports in the second family are each fluidly connected to a different port than fluidly connected to in the first selector position.

10. The method of claim 9, wherein in step "a" the compressor is a single stage hermetically sealed compressor.

11. The method of claim 9, wherein before step "k" each of the first, second, third, fourth, and fifth Tanks each reach their respective predefined upper set point pressures.

12. The method of claim 9, further including the step of during step "k" repeating steps "b" through "j" until the fifth Tank pressure reaches the predefined upper set point pressures for each of the first, second, third, fourth, and fifth Tanks.

13. The method of claim 9, further including the step of, during step "k", repeating steps "b" through "j" in reverse order until the fifth Tank pressure reaches the predefined upper set point pressures for each of the first, second, third, fourth, and fifth Tanks.

14. A method of filling a tank with compressed gaseous fuel, comprising the steps of:
   (a) providing an array of tanks comprising a first tank, second tank, third tank, fourth tank, fifth tank, and sixth tank a compressor fluidly connected to the array;
   (b) before step "c", taking gas from the first tank, compressing it with the compressor and discharging the compressed gas to the second Tank in the array, and continuing this step until one of the following conditions are met:
      (i) first Tank experiences a pressure drop which reaches a predefined pressure drop set point for the first Tank, or
      (ii) the pressure in the first Tank drops to a predefined minimum set point pressure for the first Tank, or
      (iii) the differential pressure between the second Tank and the first Tank reaches a predefined set point pressure differential; or
      (iv) second Tank pressure reaches a predefined upper set point pressure for the second Tank;
   (c) between steps "b" and "d", taking gas from the second Tank, compressing it with the compressor and discharging the compressed gas to the third Tank, and continuing this step until one of the following conditions are met:
      (i) second Tank experiences a pressure drop which reaches a predefined pressure drop set point for the second Tank, or
      (ii) the pressure in the second Tank drops to a predefined minimum set point pressure for the second Tank, or
      (iii) the differential pressure between the third Tank and the second Tank reaches the predefined set point pressure differential; or
      (iv) third Tank pressure reaches a predefined upper set point pressure for third Tank;
   (d) between steps "c" and "e", taking gas from the first Tank compressing it with the compressor and discharging compressed gas to the second Tank in the array, and continuing this step until one of the following conditions are met:
      (i) first tank experiences a pressure drop which reaches the predefined pressure drop set point for the first Tank, or
      (ii) the pressure in the first Tank drops to the predefined minimum set point pressure for the first Tank, or
      (iii) the differential pressure between the second Tank and the first Tank reaches the predefined set point pressure differential; or (iv) second Tank pressure reaches the predefined upper set point pressure for the second Tank;
(e) between steps "d" and "f", taking gas from the second Tank, compressing it with the compressor, and discharging compressed gas to the third Tank in the array until one of the following conditions are met:
  (i) second Tank experiences a pressure drop which reaches the predefined pressure drop set point for the second Tank, or
  (ii) the pressure in the second Tank drops to the predefined minimum set point pressure for the second Tank, or
  (iii) the differential pressure between the third Tank and the second Tank reaches the predefined set point pressure differential; or
  (iv) the third Tank pressure reaches the predefined upper set point pressure for third Tank;
(f) between steps "e" and "g" taking gas from the third Tank, compressing it with the compressor and discharging the compressed gas to the fourth tank, and continuing this step until one of the following conditions are met:
  (i) third Tank experiences a pressure drop which reaches a predefined pressure drop set point for the third Tank, or
  (ii) the pressure in the third Tank drops to a predefined minimum set point pressure for the third Tank, or
  (iii) the differential pressure between the fourth Tank and the third Tank reaches the predefined set point pressure differential; or
  (iv) the fourth Tank pressure reaches a predefined upper set point pressure for fourth Tank; and
(g) between steps "f" and "h", taking gas from the first Tank compressing it with the compressor and discharging compressed gas to the second Tank in the array, and continuing this step until one of the following conditions are met:
  (i) first tank experiences a pressure drop which reaches the predefined pressure drop set point for the first Tank, or
  (ii) the pressure in the first Tank drops to the predefined minimum set point pressure for the first Tank, or
  (iii) the differential pressure between the second Tank and the first Tank reaches the predefined set point pressure differential; or
  (iv) second Tank pressure reaches the predefined upper set point pressure for the second Tank;
(h) between steps "g" and "i", taking gas from the second Tank, compressing it with the compressor, and discharging compressed gas to the third Tank in the array until one of the following conditions are met:
  (i) second Tank experiences a pressure drop which reaches the predefined pressure drop set point for the second Tank, or
  (ii) the pressure in the second Tank drops to the predefined minimum set point pressure for the second Tank, or
  (iii) the differential pressure between the third Tank and the second Tank reaches the predefined set point pressure differential; or
  (iv) the third Tank pressure reaches the predefined upper set point pressure for third Tank;
(i) between steps "h" and "j" taking gas from the third Tank, compressing it with the compressor and discharging the compressed gas to the fourth tank, and continuing this step until one of the following conditions are met:
  (i) third Tank experiences a pressure drop which reaches the predefined pressure drop set point for the third Tank, or
  (ii) the pressure in the third Tank drops to the predefined minimum set point pressure for the third Tank, or
  (iii) the differential pressure between the fourth Tank and the third Tank reaches the predefined set point pressure differential; or
  (iv) the fourth Tank pressure reaches the predefined upper set point pressure for fourth Tank; and
(j) between steps "i" and "k" taking gas from the fourth Tank, compressing it with the compressor and discharging the compressed gas to the fifth Tank, and continuing this step until one of the following conditions are met:
  (i) fourth Tank experiences a pressure drop which reaches a predefined pressure drop set point for the fourth Tank, or
  (ii) the pressure in the fourth Tank drops to predefined minimum set point pressure for the fourth Tank, or
  (iii) the differential pressure between the fifth Tank and the fourth Tank reaches the predefined set point pressure differential; or
  (iv) the fifth Tank pressure reaches a predefined upper set point pressure for fifth Tank; and
(k) between steps "j" and "1", taking gas from the first Tank compressing it with the compressor and discharging compressed gas to the second Tank in the array, and continuing this step until one of the following conditions are met:
  (i) first tank experiences a pressure drop which reaches the predefined pressure drop set point for the first Tank, or
  (ii) the pressure in the first Tank drops to the predefined minimum set point pressure for the first Tank, or
  (iii) the differential pressure between the second Tank and the first Tank reaches the predefined set point pressure differential; or
  (iv) second Tank pressure reaches the predefined upper set point pressure for the second Tank;
(l) between steps "k" and "m", taking gas from the second Tank, compressing it with the compressor, and discharging compressed gas to the third Tank in the array until one of the following conditions are met:
  (i) second Tank experiences a pressure drop which reaches the predefined pressure drop set point for the second Tank, or
  (ii) the pressure in the second Tank drops to the predefined minimum set point pressure for the second Tank, or
  (iii) the differential pressure between the third Tank and the second Tank reaches the predefined set point pressure differential; or
  (iv) the third Tank pressure reaches the predefined upper set point pressure for third Tank;
(m) between steps "1" and "n" taking gas from the third Tank, compressing it with the compressor and discharging the compressed gas to the fourth tank, and continuing this step until one of the following conditions are met:
  (i) third Tank experiences a pressure drop which reaches the predefined pressure drop set point for the third Tank, or
  (ii) the pressure in the third Tank drops to the predefined minimum set point pressure for the third Tank, or (iii) the differential pressure between the fourth Tank and the third Tank reaches the predefined set point pressure differential; or
(iv) the fourth Tank pressure reaches the predefined upper set point pressure for fourth Tank; and
(n) between steps "m" and "o" taking gas from the fourth Tank, compressing it with the compressor and discharging the compressed gas to the fifth Tank, and continuing this step until one of the following conditions are met:
  (i) fourth Tank experiences a pressure drop which reaches the predefined pressure drop set point for the fourth Tank, or
  (ii) the pressure in the fourth Tank drops to the predefined minimum set point pressure for the fourth Tank, or
  (iii) the differential pressure between the fifth Tank and the fourth Tank reaches the predefined set point pressure differential; or
  (iv) the fifth Tank pressure reaches the predefined upper set point pressure for fifth Tank; and
(o) between steps "n" and "p" taking gas from the fifth Tank, compressing it with the compressor and discharging the compressed gas to the sixth Tank, and continuing this step until one of the following conditions are met:
  (i) fifth Tank experiences a pressure drop which reaches the predefined pressure drop set point for the fifth Tank, or
  (ii) the pressure in the fifth Tank drops to the predefined minimum set point pressure for the fifth Tank, or
  (iii) the differential pressure between the sixth Tank and the fifth Tank reaches the predefined set point pressure differential; or
  (iv) the sixth Tank pressure reaches a predefined upper set point pressure for sixth Tank; and
(p) after step "o", dispensing compressed gas from at least two tanks of the array first to the compressor and then to a vehicle storage tank, wherein during the method steps the compressor is selectively fluidly connected to selected combinations of the first, second, third, and fourth Tanks in the array by at least one selector valve, and the at least one selector valve having a plurality of selector positions, first and second families of ports, wherein each family of ports have a plurality of selector ports, and wherein in a first selector position from the plurality of selector positions for the selector a plurality of the selector ports from the first family can be fluidly connected in two way fluid directions to a plurality of selector ports from the second family where the remaining ports in the first family are not fluidly connected to each other, and in a second selector position from the plurality of selector positions for the selector a different plurality of ports from the first family can be fluidly connected in two way directions to the same plurality of ports from the second family, where the remaining ports in the first family are not fluidly connected to each other and where in the second selector position the ports in the second family are each fluidly connected to a different port than fluidly connected to in the first selector position.

15. The method of claim 14, further including the step of during step "p" repeating steps "b" through "o" until the sixth Tank pressure reaches the predefined upper set point pressures for each of the first, second, third, fourth, fifth, and sixth Tanks.

16. The method of claim 14, further including the step of, during step "p", repeating steps "b" through "o" in reverse order until the sixth Tank pressure reaches the predefined upper set point pressures for each of the first, second, third, fourth, fifth, and sixth Tanks.

17. The method of claim 14, wherein in step "a" the compressor is a single compressor of one stage and hermetically sealed.

* * * * *